US012551514B1

(12) United States Patent
Ghiraldini et al.

(10) Patent No.: US 12,551,514 B1

(45) Date of Patent: Feb. 17, 2026

(54) **COMBINATION OF NON-VIABLE CELLS OF *STREPTOCOCCUS PYOGENES* AND IMMUNE CHECKPOINT INHIBITOR FOR THE TREATMENT OF TRIPLE NEGATIVE BREAST CANCER AND NON-MUSCLE INVASIVE BLADDER CANCER**

(71) Applicant: PROTARA THERAPEUTICS, INC., New York, NY (US)

(72) Inventors: Flavia Gerelli Ghiraldini, New York, NY (US); Jacqueline Zummo, New York, NY (US); Maurizio Mauro, New York, NY (US)

(73) Assignee: PROTARA THERAPEUTICS, INC., New York, NY (US)

( * ) Notice: Subject to any disclaimer, the term of this patent is extended or adjusted under 35 U.S.C. 154(b) by 0 days.

(21) Appl. No.: 19/280,968

(22) Filed: Jul. 25, 2025

(51) Int. Cl.

| | |
|---|---|
| ***A61K 35/744*** | (2015.01) |
| ***A61K 9/19*** | (2006.01) |
| ***A61K 39/00*** | (2006.01) |
| ***A61P 35/00*** | (2006.01) |
| ***C07K 16/28*** | (2006.01) |

(52) U.S. Cl.

CPC .............. *A61K 35/744* (2013.01); *A61K 9/19* (2013.01); *A61P 35/00* (2018.01); *C07K 16/2818* (2013.01); *A61K 2039/505* (2013.01); *A61K 2039/545* (2013.01)

(58) Field of Classification Search

CPC .. A61K 35/744; A61K 9/19; A61K 2039/505; A61K 2039/545; A61P 35/00; C07K 16/2818

See application file for complete search history.

(56) References Cited

U.S. PATENT DOCUMENTS

| | | | | |
|---|---|---|---|---|
| 3,477,914 | A | 11/1969 | Okamoto et al. | |
| 3,632,746 | A | 1/1972 | Wada et al. | |
| 4,401,653 | A | 8/1983 | Eng | |
| 9,572,836 | B2 * | 2/2017 | June | A61P 35/00 |
| 9,574,000 | B2 | 2/2017 | Langermann et al. | |
| 2019/0309070 | A1 * | 10/2019 | Copik | C12N 5/0646 |
| 2025/0136698 | A1 * | 5/2025 | Copik | C07K 16/2827 |

FOREIGN PATENT DOCUMENTS

| | | | |
|---|---|---|---|
| JP | 2019011317 | A * | 1/2019 |
| WO | 2010084158 | A1 | 7/2010 |
| WO | 2013025779 | A1 | 2/2013 |
| WO | 2016040724 | A1 | 3/2016 |
| WO | 2018039090 | A1 | 3/2018 |
| WO | 2019025440 | A1 | 2/2019 |
| WO | 2021087439 | A1 | 5/2021 |

OTHER PUBLICATIONS

Aoki et al., "Brief Communication: *Streptococcus pyogenes* Preparation OK-432: Immunoprophylactic and Immunotherapeutic Effects on the Incidence of Spontaneous Leukemia in AKR Mice," Journal of the National Cancer Institute 56(3):687-690, Mar. 1976. (4 pages).

Bellmunt et al., "A review on the evolution of PD-1/ PD-L1 immunotherapy for bladder cancer: The future is now," Cancer Treatment Reviews 54:58-67, Mar. 2017 [Published online Feb. 2, 2017]. (10 pages).

Dangaj et al., "Novel Recombinant Human B7-H4 Antibodies Overcome Tumoral Immune Escape to Potentiate T-Cell Antitumor Responses," Cancer Research 73(15):4820-4829, Aug. 1, 2013 [Published online May 30, 2013]. (11 pages).

Dunn, "Multiple Comparisons Using Rank Sums," Technometrics 6(3):241-252, Aug. 1964. (12 pages).

Facklam et al., "Extension of the Lancefield Classification for Group A Streptococci by Addition of 22 New M Protein Gene Sequence Types from Clinical Isolates: emm 103 to emm 124," Clinical Infectious Diseases 34:28-38, Jan. 1, 2002 [Published online Nov. 26, 2001]. (11 pages).

Floros et al., "Anticancer Cytokines: Biology and Clinical Effects of IFN-a2, IL-2, IL-15, IL-21, and IL-12," Semin. Oncol. 42(4):539-548, Aug. 2015 (HHS Public Access Author Manuscript, available in PMC Aug. 1, 2016). (17 pages).

Galluzzi et al., "Classification of current anticancer immunotherapies," Oncotarget 5(24):12472-12508, Dec. 18, 2014.

Hollmén et al., "New tools to prevent cancer growth and spread: a 'Clever' approach," British Journal of Cancer 123:501-509, Jun. 29, 2020. (9 pages).

Kim et al., "Immunotherapeutic effects of recombinant Bacillus Calmette-Guerin containing sic gene in ex vivo and in vivo bladder cancer models," Investigative and Clinical Urology 63:228-237, Feb. 23, 2022. (10 pages).

Krishnamurthy et al., "Atezolizumab: A novel PD-LI inhibitor in cancer therapy with a focus in bladder and non-small cell lung cancers," Drugs of Today 53(4):217-237, Apr. 2017. (21 pages).

Kruskal et al., "Use of Ranks in One-Criterion Variance Analysis," Journal of the American Statistical Association 47 (260):583-621, Dec. 1952. (40 pages).

Lancefield, "Current Knowledge of Type-Specific M Antigens of Group A Streptococci," The Journal of Immunology 89 (3):307-313, Sep. 1, 1962. (8 pages).

Lancefield, "The Antigenic Complex of *Streptococcus haemolyticus* : I. Demonstration of a Type-Specific Substance in Extracts of *Streptococcus haemolyticus*," Journal of Experimental Medicine 47(1):91-103, Jan. 1, 1928. (13 pages).

Larsson et al., "Local co-administration of gene-silencing RNA and drugs in cancer therapy: State-of-the-art and therapeutic potential," Cancer Treat Rev. 55:128-135, Apr. 2017.

Li et al., "Array of M Protein Gene Subtypes in 1064 Recent Invasive Group A *Streptococcus* Isolates Recovered from the Active Bacterial Core Surveillance," The Journal of Infectious Diseases 188:1587-1592, Nov. 15, 2003 [Published online Nov. 10, 2003].

(Continued)

*Primary Examiner* — Aaron J Kosar

(74) *Attorney, Agent, or Firm* — Seed Intellectual Property Law Group LLP

(57) ABSTRACT

The present disclosure relates to methods of treating triple negative breast cancer or non-muscle invasive bladder cancer in a subject comprising administering to the subject a composition comprising non-viable cells of *Streptococcus pyogenes* and an immune checkpoint inhibitor.

28 Claims, 90 Drawing Sheets

(56) References Cited

OTHER PUBLICATIONS

Liu et al., "Selective inhibition of IDO1 effectively regulates mediators of antitumor immunity," Blood 115 (17):3520-3530, Apr. 29, 2010. (11 pages).
Luo et al., "Progress and Prospect of Immunotherapy for Triple-Negative Breast Cancer," Frontiers in Oncology 12:919072, Jun. 20, 2022. (22 pages).
Mautino et al., "Abstract 491: NLG919, a novel indoleamine-2,3-dioxygenase (IDO)-pathway inhibitor drug candidate for cancer therapy," in Proceedings: AACR 104th Annual Meeting 2013, American Association for Cancer Research, Washington, DC, Apr. 6-10, 2013. (4 pages).
O'Brien et al., "Epidemiology of Invasive Group A *Streptococcus* Disease in the United States, 1995-1999," Clinical Infectious Diseases 35:268-276, Aug. 1, 2002 [Published online Jul. 10, 2002]. (9 pages).
Terentis et al., "The Selenazal Drug Ebselen Potently Inhibits Indoleamine 2,3-Dioxygenase by Targeting Enzyme Cysteine Residues," Biochemistry 49(3):591-600, 2010. (10 pages).

* cited by examiner

*Group 5:Comp. 002 15 mg/Kg IV (Day 1) >20 mg/Kg IT (on Day 4)

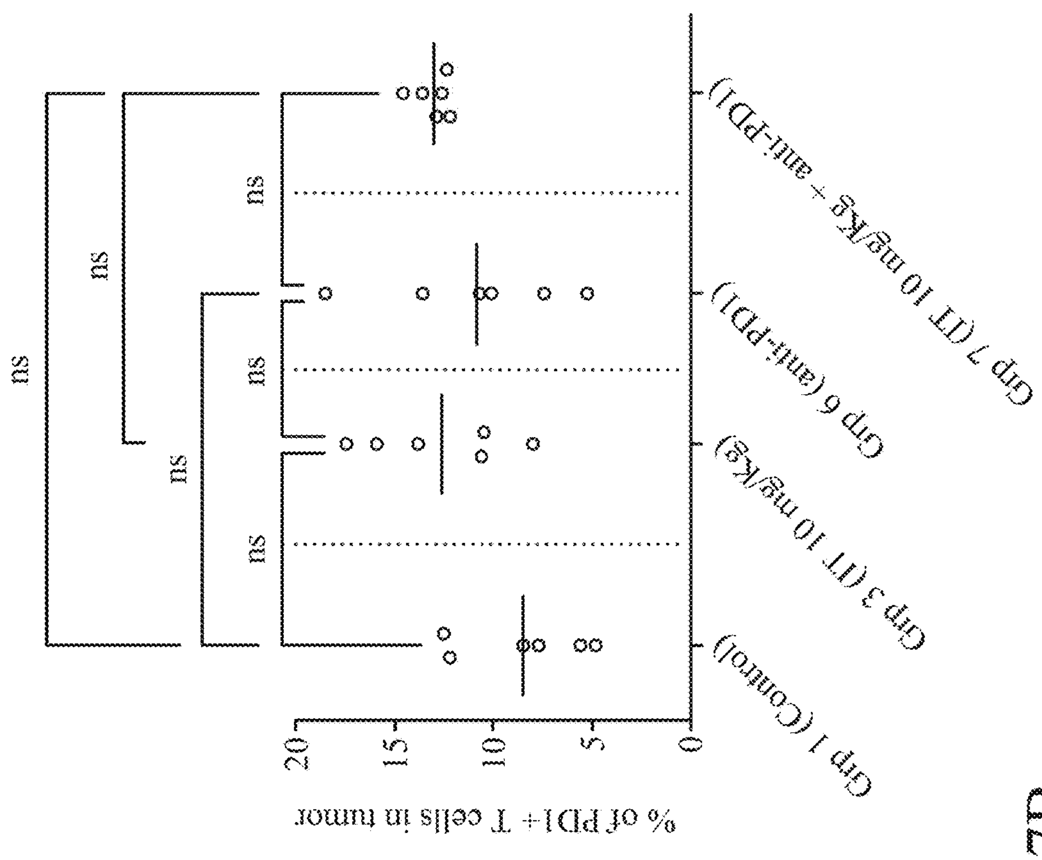
FIG. 17B
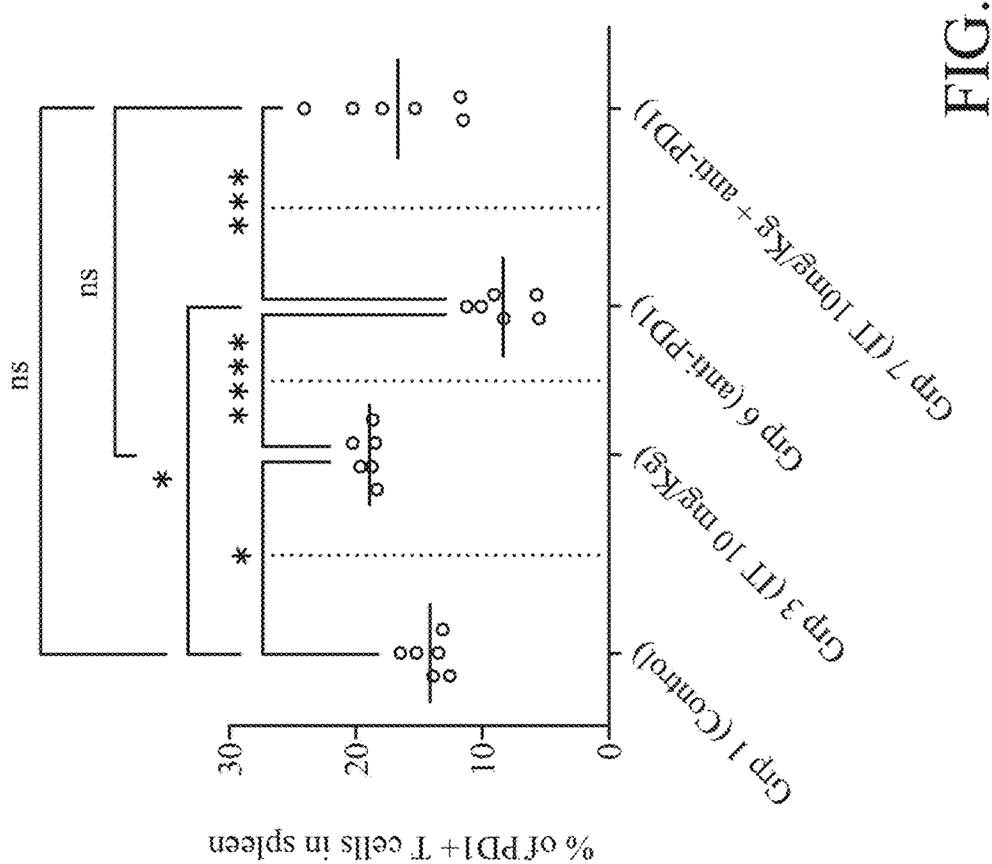

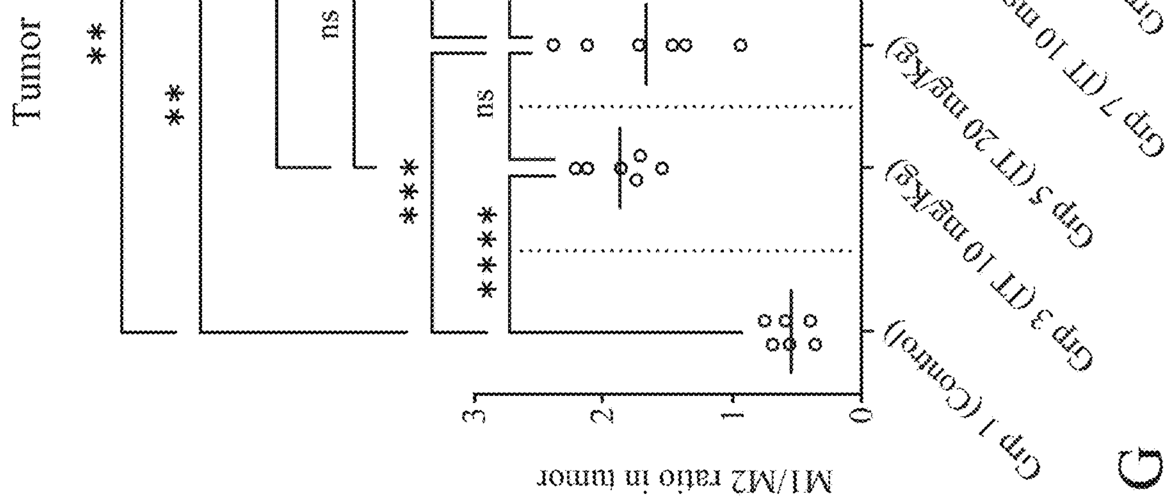
FIG. 21G
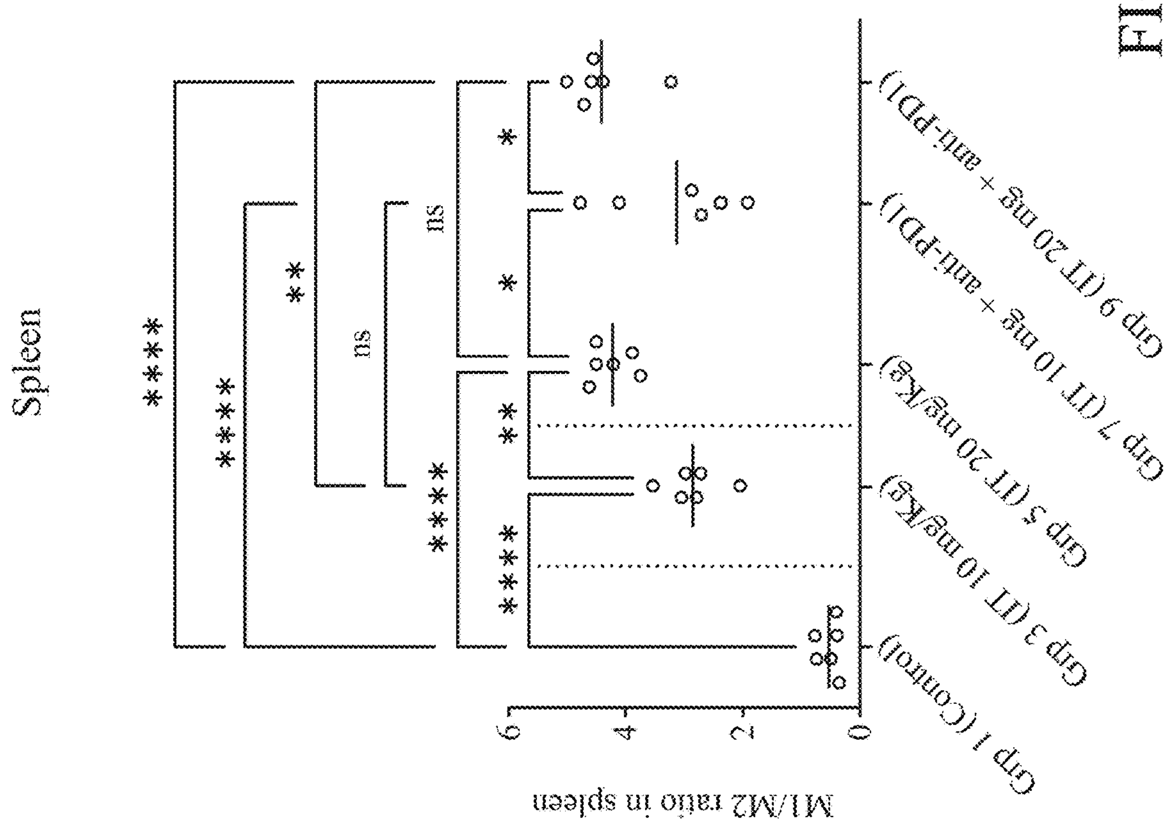

Immunogenic Cell Death

Dendritic Cell Killing Assay

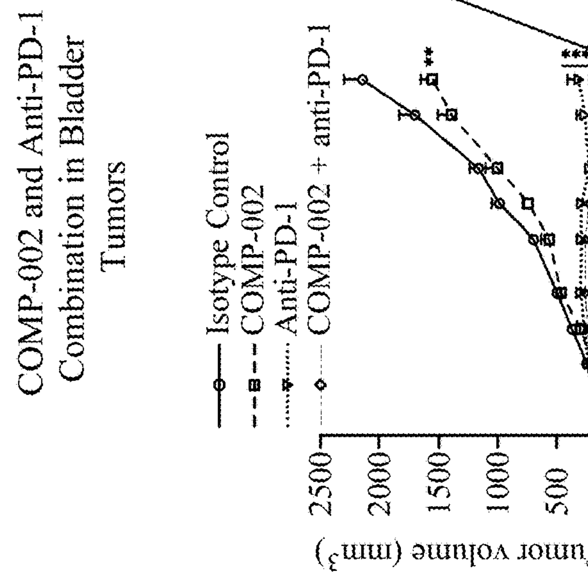
FIG. 37A
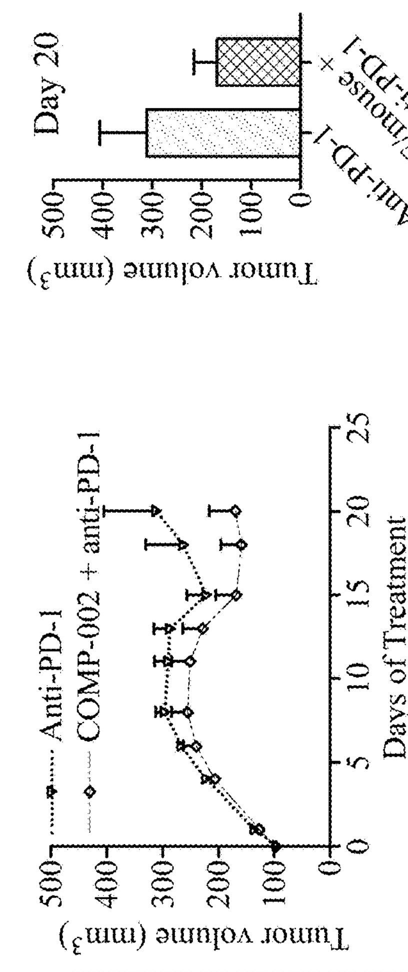
FIG. 37C
FIG. 37B
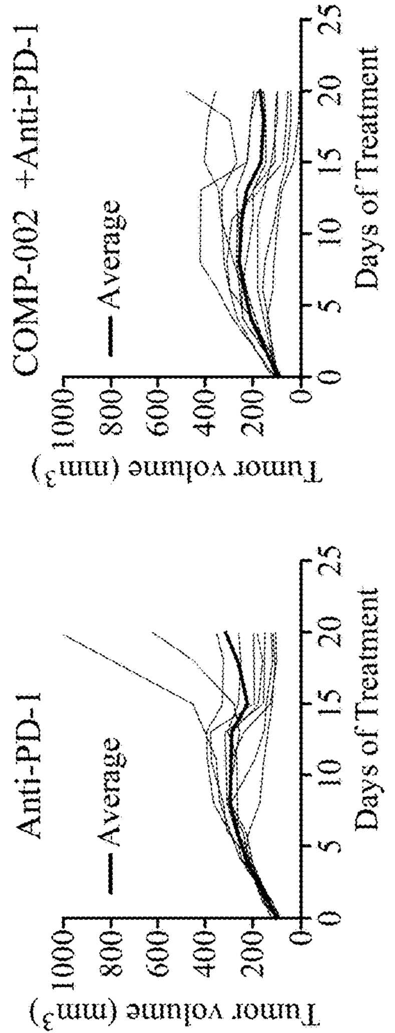
FIG. 37E
FIG. 37D COMP-002 Dose finding in Triple Breast Cancer Model (EMT6)

COMP-002 and Anti-PD-1 Combination Therapy on Triple Negative Breast Cancer EMT6 Model

COMBINATION OF NON-VIABLE CELLS OF *STREPTOCOCCUS PYOGENES* AND IMMUNE CHECKPOINT INHIBITOR FOR THE TREATMENT OF TRIPLE NEGATIVE BREAST CANCER AND NON-MUSCLE INVASIVE BLADDER CANCER

CROSS-REFERENCE TO RELATED APPLICATIONS

The present application is a continuation of U.S. patent application Ser. No. 19/146,376, filed Jul. 8, 2025, which is a 371 national stage application of International Patent Application No. PCT/US2024/010754, filed Jan. 8, 2024, which claims the benefit of U.S. Provisional Application No. 63/479,170, filed Jan. 9, 2023, U.S. Provisional Patent Application No. 63/487,224, filed on Feb. 27, 2023, and U.S. Provisional Patent Application No. 63/487,232, filed on Feb. 27, 2023, which applications are incorporated herein by reference in their entirety.

BACKGROUND

Triple negative breast cancer refers to breast tumors characterized by the absence of estrogen receptor, progesterone receptor, and HER2. Patients with triple negative breast cancer do not respond to hormonal or trastuzumab-based therapies. Triple negative breast cancer tends to be more aggressive, harder to treat, and more likely to recur than other forms of the disease, such as hormone receptor-positive or HER2-positive breast cancers. Conventional chemotherapy has not been very effective against triple-negative breast cancer, and new treatment options are needed.

Bladder cancer is the tenth most common cancer worldwide, with an incidence rate of almost half a million per year. Non-muscle invasive bladder cancer (NMIBC), which is defined as cancer confined to the bladder mucosa and submucosa, constitutes 75% of bladder cancer cases. The most common histological subtype is urothelial carcinoma. Non-muscle invasive bladder cancer includes papillary tumors within the mucosa (stage Ta), tumors invading the lamina propria (stage T1), and flat high-grade lesions referred to as carcinoma in situ (CIS). NMIBC is primarily managed with local endoscopic/intravesical therapy and surveillance.

Non-muscle invasive bladder cancer's progression risk to muscle invasion or recurrence risk varies according to tumor grade and depth. For instance, at one end of the spectrum, low-grade Ta bladder cancer recurs in almost two-thirds of cases, but seldom (only approx. 6%) progresses into a more invasive disease, whereas NMIBC with high-risk features, including high-grade T1, is reported to have a recurrence rate of almost 50%. Moreover, such cancers progress to invade the muscle in one of five patients, typically within 2 years of diagnosis.

BCG is the standard immunotherapy for NMIBC. Current treatment options following unsuccessful BCG therapy are limited to radical cystectomy the standard of care. For patients who are unfit or unwilling to undergo cystectomy, intravesical valrubicin and systemic pembrolizumab are currently the only two FDA-approved treatments for recurrent CIS. Given the limited options in BCG-unresponsive disease, particularly considering the recent global BCG shortage, and high morbidity associated with radical cystectomy, there is an unmet need for treatments of high-risk NMIBC.

BRIEF SUMMARY

In one aspect, the present disclosure provides methods of treating triple negative breast cancer in a subject, comprising administering to the subject (i) a composition comprising non-viable cells of *Streptococcus pyogenes*; and (ii) an immune checkpoint inhibitor.

In another aspect, the present disclosure provides a pharmaceutical composition comprising non-viable cells of *Streptococcus pyogenes* for use in combination with an immune checkpoint inhibitor for treating triple negative breast cancer.

In another aspect, the present disclosure provides a medicament comprising non-viable cells of *Streptococcus pyogenes* for use in combination with an immune checkpoint inhibitor for treating triple negative breast cancer.

In some embodiments, the immune checkpoint inhibitor is an inhibitor of PD1/PD-L1/PD-L2 axis, CD80, CD86, B7-H3, B7 H4, HVEM, adenosine, GAL9, VISTA, CEACAM-1, PVRL2, CTLA 4, BTLA, KIR, LAG3, TIM3, A2aR, CD244/2B4, CD160, TIGIT, LAIR-1, PVRIG/CD112R, arginase, indoleamine 2,3 dioxygenase (IDO), IL-10, IL-4, IL-1RA, IL-35, or any combination thereof.

In some embodiments, the immune checkpoint inhibitor is an inhibitor of the PD-1/PD-L1/PD-L2 axis.

In some embodiments, the immune checkpoint inhibitor is a PD-1 inhibitor. In some embodiments, the composition comprising non-viable cells of *Streptococcus pyogenes* comprises *Streptococcus pyogenes* [A Group, Type 3] Su strain.

In some embodiments, the composition comprising non-viable cells of *Streptococcus pyogenes* comprises benzylpenicillin-treated *Streptococcus pyogenes*.

In another aspect, the present disclosure provides methods of treating non-muscle invasive bladder cancer in a subject, comprising administering to the subject (i) a composition comprising non-viable cells of *Streptococcus pyogenes*; and (ii) an immune checkpoint inhibitor.

In another aspect, the present disclosure provides a pharmaceutical composition comprising non-viable cells of *Streptococcus pyogenes* for use in combination with an immune checkpoint inhibitor for treating non-muscle invasive bladder cancer.

In another aspect, the present disclosure provides a medicament comprising non-viable cells of *Streptococcus pyogenes* for use in combination with an immune checkpoint inhibitor for treating non-muscle invasive bladder cancer.

In some embodiments, the immune checkpoint inhibitor is an inhibitor of PD1/PD-L1/PD-L2 axis, CD80, CD86, B7-H3, B7 H4, HVEM, adenosine, GAL9, VISTA, CEACAM-1, PVRL2, CTLA 4, BTLA, KIR, LAG3, TIM3, A2aR, CD244/2B4, CD160, TIGIT, LAIR-1, PVRIG/CD112R, arginase, indoleamine 2,3 dioxygenase (IDO), IL-10, IL-4, IL-1RA, IL-35, or any combination thereof.

In some embodiments, the immune checkpoint inhibitor is an inhibitor of the PD-1/PD-L1/PD-L2 axis.

In some embodiments, the immune checkpoint inhibitor is a PD-1 inhibitor.

In some embodiments, the composition comprising non-viable cells of *Streptococcus pyogenes* comprises *Streptococcus pyogenes* [A Group, Type 3] Su strain.

In some embodiments, the composition comprising non-viable cells of *Streptococcus pyogenes* comprises benzyl-penicillin-treated *Streptococcus pyogenes.*

BRIEF DESCRIPTION OF THE SEVERAL VIEWS OF THE DRAWINGS

FIGS. 17A-17B: Analysis of $PD1^{+/high}$ T cells (gated on $CD45^+$ $CD3^+$) in spleen (Left) and tumors-TILs (Right) of the intravenous treatment groups (FIG. 17A) and intratumor groups (FIG. 17B).

FIGS. 21A-21K: Summary of the flow cytometry analysis data for Composition 002 (dose 20 mg/Kg) in the splenocytes and TILs of the intratumor delivery groups: $CD3^+$ T cells (FIG. 21A), $CD4^+$ T cells (FIG. 21B), $CD8^+$ T cells (FIG. 21C), NK cells (FIG. 21D), MDSCs/Monocytes ratio (FIG. 21E), Treg cells (FIG. 21F), Macrophages M1/M2 ratio (FIG. 21G), $PD1^+$ T cells (FIG. 21H), PD-$L1^+$ T cells (FIG. 21I), PD-$L1^+$ macrophages (FIG. 21J), and PD-$L1^+$ macrophages (FIG. 21K).

(FIG. 22A) Mean absolute tumor volumes±SEM over time; (FIG. 22B) Individual absolute tumor volumes on Day 7 (the final day on which all groups remained on study).

(FIG. 23A) Antibody panel A: $CD45^+$ cells; (FIG. 23B) Antibody panel A: $CD4^+$/$CD8^+$ T cells and Treg cells; (FIG. 23C) Antibody panel A: granulocytic and monocytic MDSC; (FIG. 23D) Antibody panel B: $CD45^+$ $CD3^-$ $CD11b^+$ cells; (FIG. 23E) Antibody panel B: NK cells; (FIG. 23F) Antibody panel B: M1 and M2 macrophages.

(FIG. 24A) Antibody panel A: $CD45^+$ cells; (FIG. 24B) Antibody panel A: $CD4^+$/$CD8^+$ T cells and Treg cells; (FIG. 24C) Antibody panel A: granulocytic and monocytic MDSC; (FIG. 24D) Antibody panel B: $CD45^+$ $CD3^-$ $CD11b^+$ cells; (FIG. 24E) Antibody panel B: NK cells; (FIG. 24F) Antibody panel B: M1 and M2 macrophages.

FIG. 28A: Percentage of Annexin V positive MB49 cells were measured by Flow Cytometry as a marker for apoptosis. Data is presented as Mean±SEM. FIG. 28B: Calreticulin-positive MB49 cells quantified by Flow cytometry. FIG. 28C. Extracellular ATP (eATP) luminescence was measured and quantified using the formula: [(average of triplicate $cells_{treated}$ RLU−average of cell−free $_{media}+_{drug}$ RLU)/(average of $cell_{suntreated}$ RLU−cell−free media RLU)×100−100]. Where RLU represents background-subtracted luminescence. FIG. 28D. After 24 hours of treatment, supernatant was harvested and HMGB1 was quantified using Lumit Immunoassay. FIGS. 28B-28D Data is presented Average Fold Change±SEM over the untreated control group. One-way ANOVA with Tuckey's post test *, P<0.05; , P<0.01; **, P<0.0001. N=3.

FIG. 29D: To evaluate phagocytosis, co-localization of pre-labeled tumor cell signal (DiO+) with DC cells (CD11+) were quantified by Flow Cytometry. Dinaciclib (1 uM) was used as positive control. Data is presented as Mean±SEM. One-way ANOVA with Tuckey's post test *, P<0.05; ; P<0.01; *, P<0.001; ****, P<0.0001. N=3.

FIG. 30A: Human bladder cancer cells 5637 and RT112 were treated with COMPOSITION-002 (0.2 KE/mL) for 72 hs. FIG. 30B: Human bladder cancer cells 5637 and RT112 were co-cultured with PBMCs with or without COMPOSITION-002 (0.2 KE/mL) for 72 hs. Tumor cell viability was accessed by Flow Cytometry using Live/Dead dye. Data is presented as Mean±SEM. T-test; **; P<0.01; * * * *, P<0.0001. N=3; One PBMC donor was used.

FIG. 31A: Th1 cytokines (from left to right: IFN-γ, TNF-α and IL-12p70) and FIG. 31B: Th2 cytokines (from left to right: IL-13, IL-10, and IL-4) were quantified. Data is presented as Mean±SEM. T-test; *, P<0.05; **; P<0.01; * * *, P<0.001; * * * *, P<0.0001. N=3; One PBMC donor was used.

FIG. 32H: CD8 T cell proliferation was assessed by quantification of Ki67-positive cells by flow cytometry. CD8+ T cells' CTLA4 (FIG. 32I), LAG3 (FIG. 32J), PD-1 (FIG. 32K), TIGIT (FIG. 32L) and TIM3 (FIG. 32M) markers were also analyzed by Flow cytometry. Data is presented as Mean±SEM of 2 different donors in triplicate. N=6. T-test; ; P<0.01; *, P<0.001.

FIG. 33A: IFN-7 and FIG. 33B: Granzyme B were detected and quantified by ELISA assay. Data is presented as Mean±SEM of 2 different donors in triplicate. N=6. T-test; * *; P<0.01; * **, P<0.001.

(FIGS. 35A-35B) anti-PD-L1, (FIGS. 35C-35D) anti-CTLA-4, (FIGS. 35E-35F) anti-PD-1. Irrelevant IgG4, and IgG1 were used as isotype controls. Impedance measurements were collected by xCelligence RTCA eSight (Agilent) every 15 min. Same data as from (FIGS. 35A, 35C, and 35E) but compared with each group at one specific time point (143 h:49 m:32 s) shown as bar charts (FIGS. 35B, 35D, and 35F, respectively) with error bars. Data are presented as Mean SEM. N=4. Statistical significance was determined using the two-way ANOVA and Bonferroni Post test *, P<0.05; , P<0.01; *P<0.001; * * * *, P<0.0001 (n=4).

FIG. 36A: Tumor Volume was analyzed biweekly using calipers. Data is presented as Mean Tumor Volume. N=10, Two-way ANOVA and Bonferroni Post test; ; P<0.01 compared to the untreated control (Saline Vehicle). FIG. 36**B: Kaplan Meier curve comparing percentage of survival rates between COMPOSITION-002 treated animals and the Vehicle control. N=10.

FIGS. 37A-37E: COMPOSITION-002 in combination with the checkpoint inhibitor Anti-PD-1 led to reduced tumor size in the MB49 subcutaneous mouse model. MB49 cells were implanted subcutaneously in C57bl/6 mice. After 6 days, animals were randomized and received COMPOSITION-002 treatment (0.4 KE/mouse) once a week intravenously for 4 weeks and Anti-PD-1 treatment (10 mg/Kg) intraperitoneally twice a week for 2 weeks. FIG. 37A: Tumor Volume was analyzed biweekly using calipers. Data is presented as Mean±SEM. N=10, Two-way ANOVA and Bonferroni Post test; **; P<0.01; * * * *, P<0.0001 compared to the untreated control (Isotype Control). FIG. 37B: Detailed Tumor Volume curve comparing Anti-PD-1 as a monotherapy and COMPOSITION-002+Anti-PD-1 in combination. Data is presented as Mean±SEM. N=10. FIG. 37C: Histogram analysis of average tumor volume from mice treated with Anti-PD-1 as a monotherapy or COMPOSITION-002+Anti-PD-1 in combination at Day 20 of treatment. FIG. 37D: Tumor Growth progression in mice treated with Anti-PD-1. Light green lines indicate individual mice enrolled in the study; whole dark green line represents the average tumor volume. FIG. 37E: Tumor Growth progression in mice treated with Anti-PD-1. Light purple lines indicate individual mice enrolled in the study whole dark purple line represents the average tumor volume.

FIG. 38A: Tumor volume was measured using calipers. Data is presented as Mean±SEM. N=6, T-test; *; P<0.05. FIG. 38B: On day 22 after treatment initiation, mice were euthanized, tumors were collected, processed stained for Flow Cytometry analysis of tumor infiltrated immune cells. Tumor infiltrated T cells were analyzed for presence of PD-1 marker (left to right: control; COMP-002 0.4 KE/mouse; COMP-002 1 KE/mouse; COMP-002 2 KE/mouse). Data presented as Mean±SEM. One-Way ANOVA Dunnett's Post Test. , P<0.01, *, P<0.001. N=3.

FIG. 39A: Tumor Volume was measured biweekly using calipers. Data is presented as Mean±SEM. N=6, One-way ANOVA and Bonferroni Post test; *; P<0.05; , P<0.001 compared to the untreated control (Saline Control). FIG. 39B: Tumor weight was quantified at the end of the study (Day 30 after tumor implantation). Data is presented as Mean±SEM. One-Way ANOVA Tucket Post test. , P<0.001. N=6.

DETAILED DESCRIPTION

Figure 1:
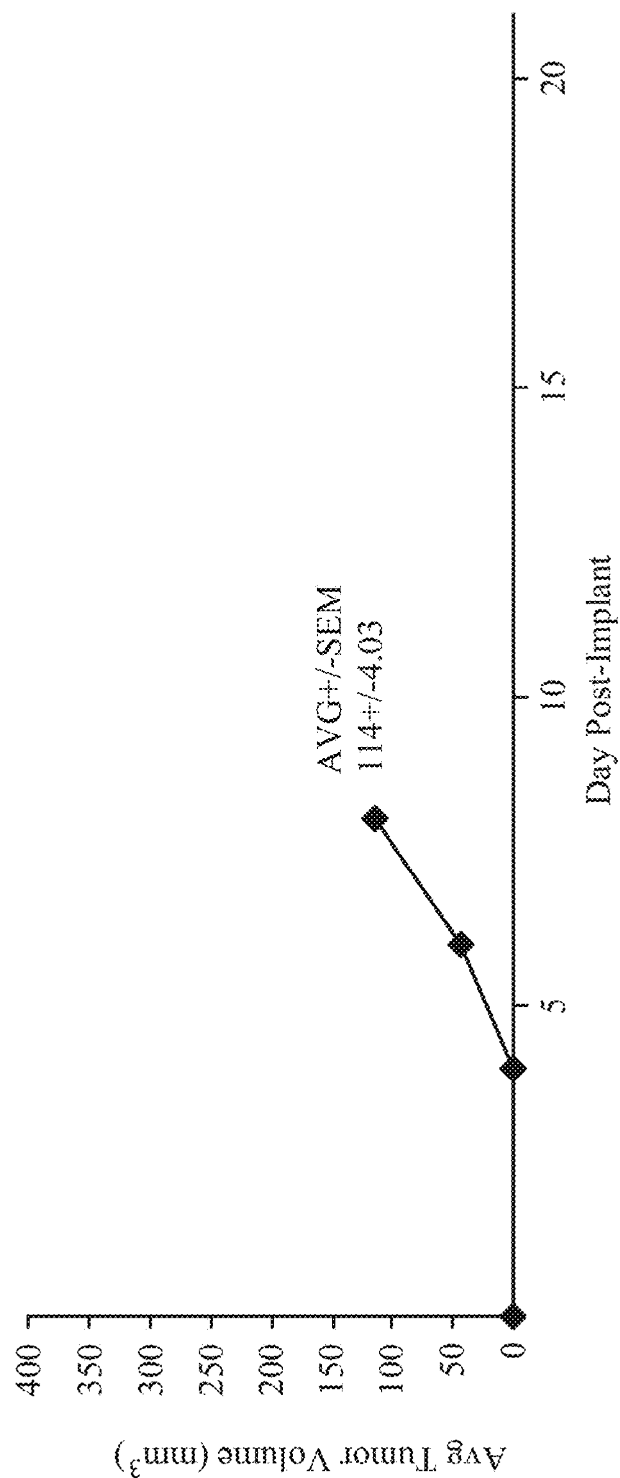
FIG. 1: Evaluation of EMT6 triple negative breast cancer tumor growth (pre-randomization) in the 54 mice enrolled in the study.

Prior to setting forth this disclosure in more detail, it may be helpful to an understanding thereof to provide definitions of certain terms used herein. Additional definitions are set forth throughout this disclosure.

In the present description, any concentration range, percentage range, ratio range, or integer range is to be understood to include the value of any integer within the recited range and, when appropriate, fractions thereof (such as one tenth and one hundredth of an integer) or subranges, unless otherwise indicated.

As used herein, the term "about" means+20% of the indicated range, value, or structure, unless otherwise indicated.

It should be understood that the terms "a" and "an" as used herein refer to "one or more" of the enumerated components. The use of the alternative (e.g., "or") should be understood to mean either one, both, or any combination thereof of the alternatives.

As used herein, the terms "include," "have," and "comprise" are used synonymously, which terms and variants thereof are intended to be construed as non-limiting.

"Optional" or "optionally" means that the subsequently described element, component, event, or circumstance may or may not occur, and that the description includes instances in which the element, component, event, or circumstance occurs and instances in which they do not.

The term "antibody" refers to an intact antibody comprising at least two heavy (H) chains and two light (L) chains inter-connected by disulfide bonds, as well as any antigen-binding portion or fragment of an intact antibody that has or retains the ability to bind to the antigen target molecule recognized by the intact antibody, such as an scFv, Fab, or Fab'2 fragment. Thus, the term "antibody" herein is used in the broadest sense and includes polyclonal and monoclonal antibodies, including intact antibodies and functional (antigen-binding) antibody fragments thereof, including fragment antigen binding (Fab) fragments, F(ab')2 fragments, Fab' fragments, Fv fragments, recombinant IgG (rIgG) fragments, single chain antibody fragments, including single chain variable fragments (scFv), and single domain antibodies (e.g., sdAb, sdFv, nanobody). The term encompasses genetically engineered and/or otherwise modified forms of immunoglobulins, such as intrabodies, peptibodies, chimeric antibodies, fully human antibodies, humanized antibodies, and heteroconjugate antibodies, multispecific, e.g., bispecific antibodies, diabodies, triabodies, tetrabodies, tandem di-scFv, and tandem tri-scFv. Unless otherwise stated, the term "antibody" should be understood to encompass functional antibody fragments thereof. The term also encompasses intact or full-length antibodies, including antibodies of any class or sub-class, including IgG and sub-classes thereof (IgG1, IgG2, IgG3, IgG4), IgM, IgE, IgA, and IgD.

As used herein, the term "immune checkpoint molecule" refers to one or more proteins, molecules, compounds or complexes providing inhibitory signals to assist in controlling or suppressing an immune response. For example, immune checkpoint molecules include those molecules that partially or totally block immune stimulation; decrease, prevent or delay immune activation; or increase, activate, or up regulate immune suppression. "Controlling or suppressing an immune response," as used herein, means reducing any one or more of antigen presentation, T cell activation, T cell proliferation, T cell effector function, cytokine secretion or production, and target cell lysis. Such modulation, control or suppression can promote or permit the persistence of a hyperproliferative disease or disorder (e.g., cancer, chronic infections).

Exemplary immune checkpoint molecules include immune checkpoint ligands (such as PD-L1, PD-L2, CD80, CD86, B7-H3, B7-H4, HVEM, adenosine, GAL9), immune checkpoint receptors (such as PD-1, CTLA-4, BTLA, KIR, LAG3, TIM3, A2aR), metabolic enzymes (such as arginase, indoleamine 2,3-dioxygenase (IDO)), immunosuppressive cytokines (such as IL-10, IL-4, IL-1RA, IL-35), $T_{reg}$ cells, or any combination thereof. In certain embodiments, an immune checkpoint molecule may initiate an immune suppression signal through a ligand-receptor interaction, such as by modulating (e.g., inhibiting) an antigen-specific T cell response. For example, a T cell may express on its surface an immune checkpoint receptor (e.g., PD-1, LAG3) and an antigen presenting cell may express on its surface an immune checkpoint receptor ligand (e.g., PD-L1, MHC/HLA molecule). In further embodiments, an immune checkpoint molecule is a metabolic enzyme that inhibits immune responses through the local depletion of amino acids essential for lymphocyte, particularly T cell, survival and function. In still further embodiments, an immune checkpoint molecule may be a signaling molecule, such as an immunosuppressive cytokine (e.g., IL-10, IL-4, IL-1RA, IL-35).

Furthermore, an immune checkpoint molecule (e.g., IL-10) may cause a reduction in the expression or level of a major histocompatibility complex (MHC) or human leukocyte antigen (HLA) molecule, which can in turn reduce antigen presentation and thereby reduce, impede or detectably prevent T cell activation and a corresponding immune response.

An "immune checkpoint inhibitor" refers to any molecule that can alter, interfere, reduce, downregulate, block, suppress, abrogate, degrade, directly or indirectly, expression, amount, or activity of an immune checkpoint molecule. Exemplary immune checkpoint inhibitors include small molecules, nucleic acid molecules (including vaccines, such as mRNA vaccines, and inhibitory nucleic acids such as antisense oligonucleotides, siRNAs, shRNAs, and miRNAs), peptides, proteins, antibodies or antigen binding fragments thereof, fusion proteins, ribozymes, or gene editing systems.

As used herein, "triple negative breast cancer" refers to a type of breast cancer that lacks expression of estrogen receptor, progesterone receptor, and human epidermal growth factor receptor 2.

As used herein, "non-muscle invasive bladder cancer" or "NMIBC" refers to urothelial carcinoma confined to the bladder mucosa and submucosa and does not invade into or beyond the muscularis propia.

As used herein, the term "treating" or "treat" describes the management and care of a patient for the purpose of combating a disease, condition, or disorder and includes the administration of a composition of the present disclosure, to alleviate the symptoms or complications of a disease, condition or disorder, or to eliminate the disease, condition or disorder. The term "treat" can also include treatment of an animal model.

As used herein, the term "treating" or "treat" describes the management and care of a patient for the purpose of combating a disease, condition, or disorder and includes the administration of a composition of the present disclosure, to alleviate the symptoms or complications of a disease, condition or disorder, or to eliminate the disease, condition or disorder. The term "treat" can also include treatment of an animal model.

Composition Comprising Non-Viable Cells of *Streptococcus pyogenes*

The present disclosures provides a composition comprising non-viable cells of *Streptococcus pyogenes* and an immune checkpoint inhibitor for use in combination with an immune checkpoint inhibitor to treat a subject with triple negative breast cancer or non-muscle invasive bladder cancer.

Streptococci are Gram-positive, catalase-negative, coagulase-negative cocci that occur in pairs or chains. They are divided into three groups by the type of hemolysis on blood agar: beta-hemolytic (complete lysis of red cells), a hemolytic (green hemolysis), and gamma-hemolytic (no hemolysis). Beta-hemolytic streptococci are characterized as group A streptococci (*Streptococcus pyogenes*) and group B streptococci (*Streptococcus agalactiae*). *Streptococcus pyogenes* are Gram-positive, non-spore forming coccus-shaped bacteria which typically exist in chains or in pairs of cells. *S. pyogenes* are subdivided according to serotype based on a large, highly variable cell surface antigen call the M protein (Lancefield, J. Exp. Med. 47, 9-10, 1928; Lancefield, J. Immunol. 89, 307-13, 1962). DNA sequencing of genes encoding M proteins has become the most common method of determining *S. pyogenes* M types (emm sequence types). To date, 124 different M types have been identified (Facklam et al., Clin. Infect. Dis. 34, 28-38, 2002). M1, M28, M12, M3, M11, and M6 are among the most prevalent GAS types worldwide (Li et al., Infect. Dis. 188, 1587-92, 2003; O'Brien et al., Clin. Infect. Dis. 35, 268-76, 2002). Any strain of *Streptococcus pyogenes* (*S. pyogenes*) is envisaged for use within the disclosure of the instant claims. In some embodiments of the disclosure, the strain of *S. pyogenes* used is selected by the strain M protein (serotype). In some embodiments, the strain is an invasive strain. In some embodiments, the strain was isolated from a clinical sample. In some embodiments, the strain is a virulent strain. In some embodiments, the strain encodes an exotoxin. In some embodiments, the strain does not encode an exotoxin. In some embodiments, the strain is non-invasive. In some embodiments, the strain is avirulent. In some embodiments, the strain is avirulent due to a genetic mutation in a virulent strain.

In some embodiments, the composition comprises *Streptococcus pyogenes* M protein type 3.

In some embodiments, the composition comprises *Streptococcus pyogenes* (A Group, Type 3) Su strain.

In some embodiments of the disclosure of the instant claims, the strain of *S. pyogenes* used is selected from the group consisting of the strains that have been deposited with the American Type Culture Collection (ATCC). In some embodiments, the instant disclosure provides for a mixture comprising more than one strain of *S. pyogenes*. In some embodiments, the mixture comprises the Su strain and at least one additional strain of *S. pyogenes*. Exemplary *S. pyogenes* strains, including the Su strain, that are envisaged for use in the present disclosure are described in Table A. Additional information on individual strains is described at: https://www.atcc.org/search#q=*streptococcus*%20pyogenes&sort=relevancy&numberOfResults=24&f:Productcategory=[Bacteria], which is incorporated herein by reference. In some embodiments, the composition comprises any one or more of the *S. pyogenes* strains identified in Table A below:

TABLE A

Exemplary strains of *S. pyogenes*

| Strain designation | ATCC Number |
|---|---|
| Su | 21060 |
| Bruno [CIP 104226] | 19615 |
| Typing strain T1 [NCIB 11841, SF 130] | 12344 |
| SF370; M1 GAS | 700294 |
| Richards-L | 19563 |
| QC A62 | 49399 |
| C203 S | 14289 |
| MGAS 6180 [BE98-762] | BAA-1064 |
| MGAS 10394 | BAA-946 |
| MGAS 315 | BAA-595 |
| NCTC 8709 (Type 6 glossy) | 12203 |
| NCTC 8370 (Type I) | 12202 |
| Typing strain C203 [Dochez 1708] | 12384 |
| NZ131 | BAA-1633 |
| MGAS 10270 | BAA-1063 |
| MGAS 5005 | BAA-947 |
| Blackmore | 21548 |
| D58 [ATCC 12346, ATCC 9959] | 10389 |
| 397 | 49117 |
| 1805 [ON1763] | 51339 |
| Typing strain T14 | 12972 |
| NCTC 8306 [Mathews type 25] | 12204 |
| Typing strain C94 [13RS1] | 12370 |
| H3 | 11434 |
| [40] | 624 |
| MGAS 2096 [A374] | BAA-1065 |
| Typing strain C121 [19RS63] | 12364 |
| Typing strain J17C [A. Coburn R20] | 12357 |
| MGAS 10750 [FL01-86] | BAA-1066 |
| MGAS 8232 | BAA-572 |
| MGAS9429 Serotype M12 | BAA-1315 |
| S-43 | 21547 |
| C 203 S | 21546 |
| Typing strain T5B [F. Griffith strain Franklin] | 12347 |
| Typing strain C265 [F. Griffith NF14 or SFH] | 12349 |
| Typing strain T22 [F. Griffith 63T] | 10403 |
| Typing strain T23 [F. Griffith strain Barts 102] | 8133 |
| [Kjem's 3807, NIH 61 x 99] | 14918 |
| [Kjem's strain K56, NIH 61 x 101] | 14919 |
| [P20080] | 25663 |
| SH | 8058 |
| Wilders D58 | 43202 |
| NYDP 14E [ATCC 6550, Dochez 5] | 4543 |
| S376 | 51877 |
| 12151 | 51878 |
| M-3 [DLS 88002, Weller] | 51500 |
| 22 | 51574 |
| CDC-SS-1435 [MstNS1] | BAA-361 |
| CDC-SS-1437 [MstNS14X] | BAA-363 |
| CDC-SS-1462 [MstNS5] | BAA-362 |
| CDC-SS-1433 [Mst90/85] | BAA-360 |
| CDC-SS-1434 [Mst88/25] | BAA-359 |
| CDC-SS-1475 [Mst13w, R90/865] | BAA-355 |
| CDC-SS-1432 [Mst88/31] | BAA-358 |
| CDC-SS-1343 [Mst64/14] | BAA-356 |
| CDC-SS-1413 [MstA207] | BAA-357 |
| 59388 | BAA-1414 |
| Typing strain T28 | 12962 |
| Typing strain B403 | 12963 |

TABLE A-continued

Exemplary strains of *S. pyogenes*

| Strain designation | ATCC Number |
|---|---|
| Typing strain C649A | 12961 |
| Typing strain C510 | 12964 |
| Typing strain C113 [RS79] | 12374 |
| Typing strain B447 [R. Williams strain Corby B6522] | 12381 |
| Grouping strain J17A4 [A.F. Coburn RPHI] | 12385 |
| Typing strain B514 [J. Nelson 7353] | 12382 |
| London [E. Todd strain London] | 12379 |
| Typing strain H105op [W. Tillett strain CO] | 12380 |
| Typing strain C126 [2RS63] | 12375 |
| Typing strain D58X | 12383 |
| Typing strain C744 [F. Griffith SF 13] | 12378 |
| C105 [20RS14] | 12377 |
| Typing strain C143 [C143] | 12372 |
| Typing strain C101 [4RS8] | 12373 |
| Typing strain C142 [A. Kuttner B22] | 12366 |
| Typing strain C95 [19RS14] | 12371 |
| Typing strain J137 | 12363 |
| Typing strain C119 [A. Kuttner B35] | 12368 |
| Typing strain C171 [A. Kuttner 24 Berg] | 12367 |
| Typing strain D24/94/1 [F. Griffith strain Quinn] | 12362 |
| Typing strain C107 [14RS60] | 12365 |
| Typing strain B346op [41459] | 12359 |
| Typing strain J17E [A. Coburn R9] | 12356 |
| Typing strain T13 [ATCC 6553, F. Griffith strain Glover] | 12354 |
| Start page 3 | |
| Typing strain C95 [19RS14] | 12371 |
| Typing strain J17F [A. Coburn R17] | 12360 |
| Typing strain C119 [A. Kuttner B35] | 12368 |
| Typing strain C171 [A. Kuttner 24 Berg] | 12367 |
| Typing strain D24/94/1 [F. Griffith strain Quinn] | 12362 |
| Typing strain C107 [14RS60] | 12365 |
| Typing strain B346op [41459] | 12359 |
| Typing strain J17E [A. Coburn R9] | 12356 |
| Typing strain T13 [ATCC 6553, F. Griffith strain Glover] | 12354 |
| Typing strain J17F [A. Coburn R17] | 12360 |
| Typing strain E14 [Dochez NY 5] | 12351 |
| Typing strain T12 [F. Griffith SF 42] | 12353 |
| Typing strain J17D [A. Coburn R3] | 12358 |
| Typing strain T11 [F. Griffith NE 73T] | 12352 |
| Typing strain S43 [Dochez and Avery S43 (Texas)] | 12348 |
| Typing strain T9 [F. Griffith strain Symons] | 12350 |
| Typing strain T2 [BIT] | 12345 |
| C115 [G54] | 10781 |
| Typing strain C98 | 10782 |
| Typing strain Coggins D23 | 10096 |
| 35 | 11435 |
| 8 | 11436 |
| Typing strain T27 [780 Tate] | 8135 |
| C203G | 8669 |
| C203M [NCIB 8884, PCI 1307] | 8668 |
| C203R | 8670 |
| 1685M | 8671 |
| [77/4523] | 29218 |
| Typing strain T15 [F. Griffith JS 5] | 9898 |
| CDC-SS-1173 [1233] | 700503 |
| CDC-SS-1152 [R75/2681] | 700502 |
| CDC-SS-1151 [R74/2015] | 700501 |
| CDC-SS-1150 [R72/3085] | 700500 |
| CDC-SS-1098 [Cairo 5] | 700493 |
| CDC-SS-1146 [R67/1720] | 700496 |
| CDC-SS-1097 [Cairo 4] | 700490 |
| CDC-SS-1144 [R65/3961] | 700494 |
| CDC-SS-1149 [PT2773, R72/2773] | 700499 |
| CDC-SS-1147 [R68/3354] | 700497 |
| CDC-SS-1042 [5654-15] | 700485 |
| CDC-SS-1145 [R67/239] | 700495 |
| CDC-SS-989 [644] | 700484 |
| CDC-SS-984 [R68/485] | 700482 |
| CDC-SS-1148 [PT Furo, R72/943] | 700498 |
| CDC-SS-1096 [Cairo 3] | 700489 |
| CDC-SS-985 [SF2] | 700483 |
| CDC-SS-875 [2998-T, Alabama 11] | 700481 |
| CDC-SS-1037 [M66 vaccine strain] | 700486 |

TABLE A-continued

| Exemplary strains of *S. pyogenes* | |
| --- | --- |
| Strain designation | ATCC Number |
| CDC-SS-1399 [NCTC 12065, PT-2841, R76/2841] | 700947 |
| CDC-SS-1448 [PT-2631, PT-Trinidad 2631, R76/2631] | 700946 |
| CDC-SS-1402 [NCTC 12062, PT-180, R72/180, SS-1395] | 700942 |
| CDC-SS-1400 [NCTC 12064, PT-Leeds 2110, R82/2110] | 700943 |
| CDC-SS-1396 [NCTC 12068, PT-4931, R61/2516] | 700950 |
| CDC-SS-1398 [NCTC 12066, PT-5757, R79/5757] | 700951 |
| CDC-SS-1493 [Potter 41, R80/5991] | 700953 |
| CDC-SS-1460 [2974-95, PT-NZ5118, SF1617A] | 700952 |
| 59221 | BAA-1411 |
| 59650 | BAA-1413 |
| 56889 | BAA-1415 |
| 65512 | BAA-1412 |
| Typing strain T27 [780 Tate] | 8135 |
| C203G | 8669 |
| C203M [NCIB 8884, PCI 1307] | 8668 |
| C203R | 8670 |
| 1685M | 8671 |
| [77/4523] | 29218 |
| YL15 | BAA-1324 |
| YL16 | BAA-1325 |
| YL17 | BAA-1326 |
| ALAB49 | BAA-1323 |
| Typing strain T15 [F. Griffith JS 5] | 9898 |
| B737 [Wanamaker strain Red Lake 12 Sp. II] | 13540 |
| C203 U | 27762 |
| P20080-L | 27080 |

In some embodiments, the composition comprising non-viable *Streptococcus pyogenes* is a pharmaceutical composition and optionally comprises at least one pharmaceutically acceptable excipient, for example, a stabilizing agent, a buffering agent, a bulking agent, an antioxidant, a tonicity agent, an antimicrobial agent, or any combination thereof. As is known to one skilled in the art, in some instances a component may have more than one activity, function or effect. For example, without wishing to be bound by theory, in some embodiments some components (e.g., sodium chloride) may function as both a bulking agent and a tonicity agent.

In some embodiments, the composition is a lyophilized composition.

In some embodiments, the stabilization agent is selected from magnesium hydroxide, calcium hydroxide, calcium carbonate, magnesium oxide, magnesium carbonate, magnesium sulfate, and a combination thereof.

In some embodiments, the stabilization agent is magnesium hydroxide. In some embodiments, the stabilization agent is calcium hydroxide. In some embodiments, the stabilization agent is calcium carbonate. In some embodiments, the stabilization agent is magnesium oxide. In some embodiments, the stabilization agent is magnesium carbonate. In some embodiments, the stabilization agent is magnesium sulfate.

In some embodiments, the stabilization agent is present in the lyophilized composition from about 0.10% (w/w) to about 10.00% (w/w), from about 0.10% (w/w) to about 5.00% (w/w), from about 0.10% (w/w) to about 4.50% (w/w), from about 0.10% (w/w) to about 4.00% (w/w), from about 0.10% (w/w) to about 3.50% (w/w), from about 0.10% (w/w) to about 3.00% (w/w), from about 0.10% (w/w) to about 2.50% (w/w), from about 0.10% (w/w) to about 2.00% (w/w), from about 0.10% (w/w) to about 1.50% (w/w), from about 0.10% (w/w) to about 1.00% (w/w), or from about 0.10% (w/w) to about 0.50% (w/w).

In some embodiments, the stabilization agent is present in the lyophilized composition from about 0.50% (w/w) to about 10.00% (w/w), from about 0.50% (w/w) to about 5.00% (w/w), from about 0.50% (w/w) to about 4.50% (w/w), from about 0.50% (w/w) to about 4.00% (w/w), from about 0.50% (w/w) to about 3.50% (w/w), from about 0.50% (w/w) to about 3.00% (w/w), from about 0.50% (w/w) to about 2.50% (w/w), from about 0.50% (w/w) to about 2.00% (w/w), from about 0.50% (w/w) to about 1.50% (w/w), or from about 0.50% (w/w) to about 1.00% (w/w).

In some embodiments, the stabilization agent is present in the lyophilized composition from about 1.00% (w/w) to about 10.00% (w/w), from about 1.00% (w/w) to about 5.00% (w/w), from about 1.00% (w/w) to about 4.50% (w/w), from about 1.00% (w/w) to about 4.00% (w/w), from about 1.00% (w/w) to about 3.50% (w/w), from about 1.00% (w/w) to about 3.00% (w/w), from about 1.00% (w/w) to about 2.50% (w/w), from about 1.00% (w/w) to about 2.00% (w/w), or from about 1.00% (w/w) to about 1.50% (w/w).

In some embodiments, the stabilization agent is present in the lyophilized composition from about 1.50% (w/w) to about 10.00% (w/w), from about 1.50% (w/w) to about 5.00% (w/w), from about 1.50% (w/w) to about 4.50% (w/w), from about 1.50% (w/w) to about 4.00% (w/w), from about 1.50% (w/w) to about 3.50% (w/w), from about 1.50% (w/w) to about 3.00% (w/w), from about 1.50% (w/w) to about 2.50% (w/w), or from about 1.50% (w/w) to about 2.00% (w/w).

In some embodiments, the stabilization agent is present in the lyophilized composition from about 2.00% (w/w) to about 10.00% (w/w), from about 2.00% (w/w) to about 5.00% (w/w), from about 2.00% (w/w) to about 4.50% (w/w), from about 2.00% (w/w) to about 4.00% (w/w), from about 2.00% (w/w) to about 3.50% (w/w), from about 2.00% (w/w) to about 3.00% (w/w), or from about 2.00% (w/w) to about 2.50% (w/w).

In some embodiments, the stabilization agent is present in the lyophilized composition from about 2.50% (w/w) to about 10.00% (w/w), from about 2.50% (w/w) to about 5.00% (w/w), from about 2.50% (w/w) to about 4.50% (w/w), from about 2.50% (w/w) to about 4.00% (w/w), from about 2.50% (w/w) to about 3.50% (w/w), or from about 2.50% (w/w) to about 3.00% (w/w).

In some embodiments, the stabilization agent is present in the lyophilized composition from about 3.00% (w/w) to about 10.00% (w/w), from about 3.00% (w/w) to about 5.00% (w/w), from about 3.00% (w/w) to about 4.50% (w/w), from about 3.00% (w/w) to about 4.00% (w/w), or from about 3.00% (w/w) to about 3.50% (w/w).

In some embodiments, the stabilization agent is present in the lyophilized composition from about 3.50% (w/w) to about 10.00% (w/w), from about 3.50% (w/w) to about 5.00% (w/w), from about 3.50% (w/w) to about 4.50% (w/w), or from about 3.50% (w/w) to about 4.00% (w/w).

In some embodiments, the stabilization agent is present in the lyophilized composition from about 4.00% (w/w) to about 10.00% (w/w), from about 4.00% (w/w) to about 5.00% (w/w), or from about 4.00% (w/w) to about 4.50% (w/w).

In some embodiments, the stabilization agent is present in the lyophilized composition from about 4.50% (w/w) to about 10.00% (w/w) or from about 4.50% (w/w) to about 5.00% (w/w).

In some embodiments, the buffering agent is a phosphate salt. In some embodiments, the buffering agent is selected from potassium dihydrogen phosphate, sodium phosphate, potassium phosphate, potassium hydrogen phosphate, potassium dihydrogen phosphate, sodium hydrogen phosphate, and sodium dihydrogen phosphate and a combination thereof.

In some embodiments, the buffering agent is potassium dihydrogen phosphate. In some embodiments, the buffering agent is sodium phosphate.

In some embodiments, the buffering agent is present in the lyophilized composition from about 1.00% (w/w) to about 25.00% (w/w), from about 1.00% (w/w) to about 24.00% (w/w), from about 1.00% (w/w) to about 23.00% (w/w), from about 1.00% (w/w) to about 22.00% (w/w), from about 1.00% (w/w) to about 21.00% (w/w), from about 1.00% (w/w) to about 20.00% (w/w), from about 1.00% (w/w) to about 19.00% (w/w), from about 1.00% (w/w) to about 18.00% (w/w), from about 1.00% (w/w) to about 17.00% (w/w), from about 1.00% (w/w) to about 16.00% (w/w), from about 1.00% (w/w) to about 15.00% (w/w), from about 1.00% (w/w) to about 14.00% (w/w), from about 1.00% (w/w) to about 13.00% (w/w), from about 1.00% (w/w) to about 12.00% (w/w), from about 1.00% (w/w) to about 11.00% (w/w), from about 1.00% (w/w) to about 10.00% (w/w), from about 1.00% (w/w) to about 9.00% (w/w), from about 1.00% (w/w) to about 8.00% (w/w), from about 1.00% (w/w) to about 7.00% (w/w), from about 1.00% (w/w) to about 6.00% (w/w), from about from about 1.00% (w/w) to about 5.00% (w/w), from about 1.00% (w/w) to about 4.00% (w/w), from about 1.00% (w/w) to about 3.00% (w/w), or from about 1.00% (w/w) to about 2.00% (w/w).

In some embodiments, the buffering agent is present in the lyophilized composition from about 5.00% (w/w) to about 25.00% (w/w), from about 5.00% (w/w) to about 24.00% (w/w), from about 5.00% (w/w) to about 23.00% (w/w), from about 5.00% (w/w) to about 22.00% (w/w), from about 5.00% (w/w) to about 21.00% (w/w), from about 5.00% (w/w) to about 20.00% (w/w), from about 5.00% (w/w) to about 19.00% (w/w), from about 5.00% (w/w) to about 18.00% (w/w), from about 5.00% (w/w) to about 17.00% (w/w), from about 5.00% (w/w) to about 16.00% (w/w), from about 5.00% (w/w) to about 15.00% (w/w), from about 5.00% (w/w) to about 14.00% (w/w), from about 5.00% (w/w) to about 13.00% (w/w), from about 5.00% (w/w) to about 12.00% (w/w), from about 5.00% (w/w) to about 11.00% (w/w), from about 5.00% (w/w) to about 10.00% (w/w), from about 5.00% (w/w) to about 9.00% (w/w), from about 5.00% (w/w) to about 8.00% (w/w), from about 5.00% (w/w) to about 7.00% (w/w), or from 5.00% (w/w) to about 6.00% (w/w).

In some embodiments, the buffering agent is present in the lyophilized composition from about 10.00% (w/w) to about 25.00% (w/w), from about 10.00% (w/w) to about 24.00% (w/w), 1 from about 0.00% (w/w) to about 23.00% (w/w), from about 10.00% (w/w) to about 22.00% (w/w), from about 10.00% (w/w) to about 21.00% (w/w), from about 10.00% (w/w) to about 20.00% (w/w), from about 10.00% (w/w) to about 19.00% (w/w), from about 10.00% (w/w) to about 18.00% (w/w), from about 10.00% (w/w) to about 17.00% (w/w), from about 10.00% (w/w) to about 16.00% (w/w), from about 10.00% (w/w) to about 15.00% (w/w), from about 10.00% (w/w) to about 14.00% (w/w), from about 10.00% (w/w) to about 13.00% (w/w), from about 10.00% (w/w) to about 12.00% (w/w), from about 10.00% (w/w) to about 11.00% (w/w). In some embodiments, the buffering agent is present in the lyophilized composition from about 15.00% (w/w) to about 25.00% (w/w), from about 15.00% (w/w) to about 24.00% (w/w), from about 15.00% (w/w) to about 23.00% (w/w), from about 15.00% (w/w) to about 22.00% (w/w), from about 15.00% (w/w) to about 21.00% (w/w), from about 15.00% (w/w) to about 20.00% (w/w), from about 15.00% (w/w) to about 19.00% (w/w), from about 15.00% (w/w) to about 18.00% (w/w), from about 15.00% (w/w) to about 17.00% (w/w), or from about 15.00% (w/w) to about 16.00% (w/w).

In some embodiments, the buffering agent is present in the lyophilized composition from about 18.00% (w/w) to about 25.00% (w/w), from about 18.00% (w/w) to about 24.00% (w/w), from about 18.00% (w/w) to about 23.00% (w/w), from about 18.00% (w/w) to about 22.00% (w/w), from about 18.00% (w/w) to about 21.00% (w/w), from about 18.00% (w/w) to about 20.00% (w/w), or from about 18.00% (w/w) to about 19.00% (w/w).

In some embodiments, the bulking agent is selected from sodium chloride, mannitol, sucrose, lactose, dextran, trehalose, glycine, maltose and a combination thereof.

In some embodiments, the bulking agent is sodium chloride. In some embodiments, the bulking agent is mannitol. In some embodiments, the bulking agent is sucrose. In some embodiments, the bulking agent is lactose. In some embodiments, the bulking agent is dextran. In some embodiments, the bulking agent is trehalose. In some embodiments, the bulking agent is maltose. In some embodiments, the bulking agent is glycine.

In some embodiments, the bulking agent is present in the lyophilized composition from about 0.05% (w/w) to about 3.00% (w/w), from about 0.05% (w/w) to about 2.50% (w/w), from about 0.05% (w/w) to about 2.00% (w/w), from about 0.05% (w/w) to about 1.50% (w/w), from about 0.05% (w/w) to about 1.25% (w/w), from about 0.05% (w/w) to about 1.00% (w/w), from about 0.050% (w/w) to about 0.75% (w/w), from about 0.050% (w/w) to about 0.500% (w/w), or from about 0.05% (w/w) to about 0.25% (w/w).

In some embodiments, the bulking agent is present in the lyophilized composition from about 0.25% (w/w) to about 3.00% (w/w), from about 0.25% (w/w) to about 2.50% (w/w), from about 0.25% (w/w) to about 2.00% (w/w), from about 0.25% (w/w) to about 1.50% (w/w), from about 0.25% (w/w) to about 1.25% (w/w), from about 0.25% (w/w) to about 1.00% (w/w), from about 0.25% (w/w) to about 0.75% (w/w), or from about 0.25% (w/w) to about 0.50% (w/w). In some embodiments, the bulking agent is present in the lyophilized composition from about 0.50% (w/w) to about 3.00% (w/w), from about 0.50% (w/w) to about 2.50% (w/w), from about 0.50% (w/w) to about 2.00% (w/w), from about 0.50% (w/w) to about 1.50% (w/w), from about 0.50% (w/w) to about 1.25% (w/w), from about 0.50% (w/w) to about 1.00% (w/w), or from about 0.50% (w/w) to about 0.75% (w/w).

In some embodiments, the bulking agent is present in the lyophilized composition from about 0.75% (w/w) to about 3.00% (w/w), from about 0.75% (w/w) to about 2.50% (w/w), from about 0.75% (w/w) to about 2.00% (w/w), from about 0.75% (w/w) to about 1.50% (w/w), from about 0.75% (w/w) to about 1.25% (w/w), or from about 0.75% (w/w) to about 1.00% (w/w). In some embodiments, the bulking agent is present in the lyophilized composition from about 1.00% (w/w) to about 3.00% (w/w), from about 1.00% (w/w) to about 2.50% (w/w), about 1.00% (w/w) to about 2.00% (w/w), from about 1.00% (w/w) to about 1.50% (w/w), or from about 1.00% (w/w) to about 1.25% (w/w).

In some embodiments, the bulking agent is present in the lyophilized composition from about 0.80% (w/w) to about 1.40% (w/w).

In some embodiments, the tonicity agent is selected from mannitol, D-mannitol, trehalose, αα-trehalose dehydrate, sucrose, dextrose, sodium chloride, and maltose. In some embodiments, the tonicity agent is mannitol. In some embodiments, the tonicity agent is D-mannitol. In some embodiments, the tonicity agent is trehalose. In some embodiments, the tonicity agent is αα-trehalose dihydrate. In another embodiment, the tonicity agent is sucrose. In another embodiment, the tonicity agent is dextrose. In another embodiment, the tonicity agent is sodium chloride. In some embodiments, the tonicity agent is maltose.

In some embodiments, the tonicity agent is present in the lyophilized composition from about 0.05% (w/w) to about 2.00% (w/w), from about 0.05% (w/w) to about 1.50% (w/w), from about 0.05% (w/w) to about 1.25% (w/w), from about 0.05% (w/w) to about 1.00% (w/w), from about 0.050% (w/w) to about 0.75% (w/w), from about 0.050% (w/w) to about 0.500% (w/w), or from about 0.05% (w/w) to about 0.25% (w/w).

In some embodiments, the tonicity agent is present in the lyophilized composition from about 0.25% (w/w) to about 2.00% (w/w), from about 0.25% (w/w) to about 1.50% (w/w), from about 0.25% (w/w) to about 1.25% (w/w), from about 0.25% (w/w) to about 1.00% (w/w), from about 0.25% (w/w) to about 0.75% (w/w), or from about 0.25% (w/w) to about 0.50% (w/w).

In some embodiments, the tonicity agent is present in the lyophilized composition from about 0.50% (w/w) to about 2.00% (w/w), from about 0.50% (w/w) to about 1.50% (w/w), from about 0.50% (w/w) to about 1.25% (w/w), from about 0.50% (w/w) to about 1.00% (w/w), or from about 0.50% (w/w) to about 0.75% (w/w).

In some embodiments, the tonicity agent is present in the lyophilized composition from about 0.75% (w/w) to about 2.00% (w/w), from about 0.75% (w/w) to about 1.50% (w/w), from about 0.75% (w/w) to about 1.25% (w/w), or from about 0.75% (w/w) to about 1.00% (w/w). In some embodiments, the tonicity agent is present in the lyophilized composition from about 1.00% (w/w) to about 2.00% (w/w), from about 1.00% (w/w) to about 1.50% (w/w), or from about 1.00% (w/w) to about 1.25% (w/w).

In some embodiments, the tonicity agent is present in the lyophilized composition from about 0.05% (w/w) to about 10.00% (w/w), from about 0.05% (w/w) to about 6.00% (w/w), from about 0.05% (w/w) to about 5.50% (w/w), from about 0.05% (w/w) to about 5.00% (w/w), from about 0.05% (w/w) to about 4.50% (w/w), or from about 0.05% (w/w) to about 4.00% (w/w).

In some embodiments, the tonicity agent is present in the lyophilized composition from about 0.25% (w/w) to about 10.00% (w/w), from about 0.25% (w/w) to about 6.00% (w/w), from about 0.25% (w/w) to about 5.50% (w/w), from about 0.25% (w/w) to about 5.00% (w/w), from about 0.25% (w/w) to about 4.50% (w/w), or from about 0.25% (w/w) to about 4.00% (w/w).

In some embodiments, the tonicity agent is present in the lyophilized composition from about 0.50% (w/w) to about 10.00% (w/w), from about 0.50% (w/w) to about 6.00% (w/w), from about 0.50% (w/w) to about 5.50% (w/w), from about 0.50% (w/w) to about 5.00% (w/w), from about 0.50% (w/w) to about 4.50% (w/w), or from about 0.50% (w/w) to about 4.00% (w/w).

In some embodiments, the tonicity agent is present in the lyophilized composition from about 0.75% (w/w) to about 10.00% (w/w), from about 0.75% (w/w) to about 6.00% (w/w), from about 0.75% (w/w) to about 5.50% (w/w), from about 0.75% (w/w) to about 5.00% (w/w), from about 0.75% (w/w) to about 4.50% (w/w), or from about 0.75% (w/w) to about 4.00% (w/w).

In some embodiments, the tonicity agent is present in the lyophilized composition from about 1.00% (w/w) to about 10.00% (w/w), from about 1.00% (w/w) to about 6.00% (w/w), from about 1.00% (w/w) to about 5.50% (w/w), from about 1.00% (w/w) to about 5.00% (w/w), from about 1.00% (w/w) to about 4.50% (w/w), or from about 1.00% (w/w) to about 4.00% (w/w).

In some embodiments, the tonicity agent is present in the lyophilized composition from about 0.80% (w/w) to about 1.40% (w/w).

In some embodiments, the tonicity agent is present in the lyophilized composition in an amount calculated to produce an osmolarity equivalent to between about 0.25% saline (w/w) to about 3% saline (w/w) when the lyophilized composition is reconstituted in water. In some embodiments, the tonicity agent is present in the lyophilized composition in an amount calculated to produce an osmolarity equivalent to between about 1% saline (w/w) to about 2% saline (w/w) when the lyophilized composition is reconstituted in water. In some embodiments, the tonicity agent is present in the lyophilized composition in an amount calculated to produce a hyperosmotic solution. In some embodiments, the hyperosmotic solution has an osmolarity equivalent to greater than 0.9% saline (w/w).

In some embodiments, the antioxidant is selected from methionine, cysteine, histidine, arginine, lysine, and a combination thereof.

In some embodiments, the antioxidant is methionine. In some embodiments, the antioxidant is L-methionine. In some embodiments, the antioxidant is cysteine. In some embodiments, the antioxidant is L-cysteine. In some embodiments, the antioxidant is histidine. In some embodiments, the antioxidant is L-histidine. In some embodiments, the antioxidant is arginine. In some embodiments, the antioxidant is L-arginine. In some embodiments, the antioxidant is lysine. In some embodiments, the antioxidant is L-lysine.

In some embodiments, the antioxidant is present in the lyophilized composition from about 0.10% (w/w) to about 15.00% (w/w), from about 0.10% (w/w) to about 10.00% (w/w), from about 0.10% (w/w) to about 7.50% (w/w), from about 0.10% (w/w) to about 5.00% (w/w), from about 0.10% (w/w) to about 4.50% (w/w), from about 0.10% (w/w) to about 4.00% (w/w), from about 0.10% (w/w) to about 3.50% (w/w), from about 0.10% (w/w) to about 3.00% (w/w), from about 0.10% (w/w) to about 2.50% (w/w), from about 0.10% (w/w) to about 2.00% (w/w), from about 0.10% (w/w) to about 1.50% (w/w), from about 0.10% (w/w) to about 1.00% (w/w), or from about 0.10% (w/w) to about 0.50% (w/w).

In some embodiments, the antioxidant is present in the lyophilized composition from about 2.50% (w/w) to about 15.00% (w/w), from about 2.50% (w/w) to about 10.00% (w/w), 2.50% (w/w) to about 7.50% (w/w), from about 2.50% (w/w) to about 5.00% (w/w), from about 2.50% (w/w) to about 4.50% (w/w), from about 2.50% (w/w) to about 4.00% (w/w), from about 2.50% (w/w) to about 3.50% (w/w), or from about 2.50% (w/w) to about 3.00% (w/w). In some embodiments, the antioxidant is present in the lyophilized composition from about 5.00% (w/w) to about 15.00% (w/w), from about 5.00% (w/w) to about 10.00% (w/w), from about 5.00% (w/w) to about 7.50% (w/w).

In some embodiments, the antioxidant is present in the lyophilized composition from about 7.50% (w/w) to about 15.00% (w/w) or from about 7.50% (w/w) to about 10.00% (w/w).

In some embodiments, the antioxidant is present in the lyophilized composition from about 6.00% (w/w) to about 8.00% (w/w).

In some embodiments, the antimicrobial agent is a penicillin. In some embodiments, the antimicrobial agent is selected from Penicillin G or a pharmaceutically acceptable salt thereof, Penicillin V or a pharmaceutically acceptable salt thereof, and a combination thereof.

In some embodiments, the antimicrobial agent is selected from Penicillin G Potassium (Benzylpenicillin), Penicillin V potassium (Penicillin VK), and a combination thereof.

In some embodiments, the antimicrobial agent is Penicillin G Potassium (Benzylpenicillin). In some embodiments, the antimicrobial agent is Penicillin V.

In some embodiments, the antimicrobial agent is present in the lyophilized composition from about 1.00% (w/w) to about 85.00% (w/w), from about 1.00% (w/w) to about 75.00% (w/w), from about 1.00% (w/w) to about 65.00% (w/w), from about 1.00% (w/w) to about 55.00% (w/w), from about 1.00% (w/w) to about 45.00% (w/w), from about 1.00% (w/w) to about 35.00% (w/w), from about 1.00% (w/w) to about 25.00% (w/w), from about 1.00% (w/w) to about 15.00% (w/w), or from about 1.00% (w/w) to about 5.00% (w/w).

In some embodiments, the antimicrobial agent is present in the lyophilized composition from about 15.00% (w/w) to about 85.00% (w/w), from about 15.00% (w/w) to about 75.00% (w/w), from about 15.00% (w/w) to about 65.00% (w/w), from about 15.00% (w/w) to about 55.00% (w/w), from about 15.00% (w/w) to about 45.00% (w/w), from about 15.00% (w/w) to about 35.00% (w/w), or from about 15.00% (w/w) to about 25.00% (w/w).

In some embodiments, the antimicrobial agent is present in the lyophilized composition from about 3.00% (w/w) to about 85.00% (w/w), from about 3.00% (w/w) to about 75.00% (w/w), from about 3.00% (w/w) to about 65.00% (w/w), from about 3.00% (w/w) to about 55.00% (w/w), from about 30.00% (w/w) to about 45.00% (w/w), or from about 30.00% (w/w) to about 35.00% (w/w).

In some embodiments, the antimicrobial agent is present in the lyophilized composition from about 55.00% (w/w) to about 85.00% (w/w), from about 55.00% (w/w) to about 75.00% (w/w), or from about 55.00% (w/w) to about 65.00% (w/w).

In some embodiments, the antimicrobial agent is present in the lyophilized composition from about 60.00% (w/w) to about 85.00% (w/w), from about 60.00% (w/w) to about 75.00% (w/w), or from about 6.00% (w/w) to about 65.00% (w/w).

In some embodiments, the *Streptococcus pyogenes* is treated with benzylpenicillin. In some embodiments, the *Streptococcus pyogenes* is treated with benzylpenicillin and hydrogen peroxide. In some embodiments, the *Streptococcus pyogenes* is heated following the benzylpenicillin treatment. For example, the benzylpencillin treated *Streptococcus pyogenes* may be incubated at 30-38° C. for more than 10 minutes, preferably for 10-45 minutes and then further heated at 38-50° C. for 20-60 minutes. An exemplary process for preparing a composition of the present disclosure comprises starting with a main culture of *Streptococcus pyogenes*; harvesting the *Streptococcus pyogenes* cells from the main culture; treating the *Streptococcus pyogenes* cells with hydrogen peroxide; washing the *Streptococcus pyogenes* cells; resuspending the *Streptococcus pyogenes* cells in suspension medium; treating the *Streptococcus pyogenes* cells with benzylpenicillin; heating the *Streptococcus pyogenes* cells; preparing final suspension of *Streptococcus pyogenes* cells; and lyophilizing the *Streptococcus pyogenes* cells.

In some embodiments, the lyophilized composition comprising non-viable *Streptococcus pyogenes* comprises: non-viable *Streptococcus* pyogenese (A Group, Type 3) Su strain; maltose, magnesium sulfate, potassium dihydrogen phosphate, 0.9% sodium chloride, methionine, and benzylpenicillin.

Exemplary quantitative formulae for different proposed dosage strengths of an exemplary composition comprising non-viable *Streptococcus pyogenes* are presented in Table 13A. These compositions are based on the lyophilized product. Exemplary quantitative formulations of the exemplary composition suspended in 0.9% saline are provided in Table 13B.

In some embodiments, the composition comprising non-viable *Streptococcus pyogenes* comprises intact *Streptococcus pyogenes* cells.

In some embodiments, viable *Streptococcus pyogenes* is determined by testing for bacterial growth. In a preferred embodiment, viable *Streptococcus pyogenes* is detected using a growth test for hemolytic *Streptococcus* using blood agar.

In some embodiments, the composition comprises no detectable viable *Streptococcus pyogenes* upon storage for an extended period (e.g., at least two weeks, at least three weeks, at least four weeks, at least six weeks, at least two months, at least four months, at least six months, at least twelve months, at least eighteen months, at least twenty-four months, or at least thirty-six months), under various temperature (e.g., from about −15° C. to about 40° C., from about −5° C. to about 30° C., from about 0° C. to about 20° C., from about 0° C. to about 10° C.) and humidity (e.g., about 40% RH, about 45% RH, about 50% RH, about 55% RH, about 60% RH, about 65% RH, about 70% RH, about 75% RH, about 80% RH, about 85% RH, or about 90% RH).

In some embodiments, the composition comprises no detectable viable *Streptococcus pyogenes* upon storage at below 10° C. and above 0° C. for about 1 month, about 2 months, about 3, months, about 4 months, about 5 months, about 6 months, about 7 months, about 8 months, about 9 months, about 10 months, about 11 months, about 12 months, about 14 months, about 16 months, about 18 months, about 20 months, about 22 months, about 24 months, about 26 months, about 28 months, about 30 months, about 32 months, about 34 months, about 36 months, about 38 months, about 40 months, about 42 months, about 44 months, about 46 months, or about 48 months.

As used herein, a composition of the disclosure is considered to have "retained potency," if, after the period specified, the measured potency (as determined by common methods known in the art) of the composition is within a predetermined range of the potency of a suitable reference standard. In some embodiments, potency is calculated with a cytokine release assay. In some embodiments, the range is between 20 and 180% of the reference standard. In some embodiments, the range is between 40 and 160% of the reference standard. In some embodiments, the range is between 50 and 150% of the reference standard. In some embodiments, the range is between 60 and 140% of the reference standard. In some embodiments, the range is between 70 and 130% of the reference standard. In some embodiments, the range is between 80 and 120% of the reference standard. In a preferred embodiment, the range is between 60 and 140% of the reference standard.

In some embodiments, the composition retains potency for more than about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 19 months, about 20 months, about 21 months, about 22 months, about 23 months, about 24 months, about 26 months, about 28 months, about 30 months, about 32 months, about 34 months, about 36 months, about 38 months, about 40 months, about 42 months, about 44 months, about 46 months, or about 48 months after storage of the composition as described herein.

In some embodiments, the composition retains potency for more than about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 19 months, about 20 months, about 21 months, about 22 months, about 23 months, about 24 months, about 26 months, about 28 months, about 30 months, about 32 months, about 34 months, about 36 months, about 38 months, about 40 months, about 42 months, about 44 months, about 46 months, or about 48 months after storage of the composition in conditions of between about 2° C. and about 8° C. as described herein.

In some embodiments, the composition retains potency for more than about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 19 months, about 20 months, about 21 months, about 22 months, about 23 months, about 24 months, about 26 months, about 28 months, about 30 months, about 32 months, about 34 months, about 36 months, about 38 months, about 40 months, about 42 months, about 44 months, about 46 months, or about 48 months after storage of the composition in conditions of between about 23° C. and about 27° C. and between about 55% and about 65% relative humidity as described herein.

In some embodiments, the potency of the non-viable cells of *Streptococcus pyogenes* and/or the relative percentage amount of the non-viable cells of *Streptococcus pyogenes* in the composition is stable, i.e., does not change or changes by not more than about 25%, about 20%, about 19%, about 18%, about 17%, about 16%, about 15%, about 14%, about 13%, about 12%, about 11%, about 10%, about 9%, about 8%, about 7%, about 6%, about 5%, about 4%, about 3%, about 2%, about 1%, about 0.9%, about 0.8%, about 0.7%, about 0.6%, about 0.5%, about 0.4%, about 0.3%, about 0.2%, or about 0.1%, for more than about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 19 months, about 20 months, about 21 months, about 22 months, about 23 months, about 24 months, about 26 months, about 28 months, about 30 months, about 32 months, about 34 months, about 36 months, about 38 months, about 40 months, about 42 months, about 44 months, about 46 months, or about 48 months after storage of the composition as described herein.

In some embodiments, the composition comprising non-viable *Streptococcus pyogenes* is a lyophilized composition or lyophilized formulation. In some embodiments, the composition comprising non-viable *Streptococcus pyogenes* is a lyophilized powder.

In some embodiments, the composition comprising non-viable *Streptococcus pyogenes* is OK-432 (Picibanil™, Chugai Pharmaceutical CO., Ltd. Tokyo, Japan). OK-432 is a freeze-dried biological product that is prepared from the Su strain of *Streptococcus pyogenes* (group A, Type 3) by treatment with benzylpenicillin and heat. OK-432 is not subjected to further treatment, such as isolation, extraction or purification. Bacterial cells remain intact. However, proliferative capacity is lost and Streptococcal infection does not occur when it is administered to humans.

In some embodiments, the composition comprising non-viable *Streptococcus pyogenes* is developed from the same master cell bank of genetically distinct group A, Type 3 *Streptococcus pyogenes* as OK-432.

Methods of preparing compositions comprising non-viable *Streptococcus pyogenes* have been described, for example, in U.S. Pat. Nos. 3,477,914; 3,632,746; Aoki et al., J. Natl. Cancer Inst. 56:687 (1976); each of which is incorporated by reference in its entirety.

In some embodiments, a lyophilized composition as described herein may further be used to prepare a liquid composition of *Streptococcus pyogenes*. In some embodiments, the liquid composition is a suspension.

In some embodiments, the liquid composition comprises a mixture of a lyophilized composition as described herein and water. In some embodiments, the liquid composition comprises a mixture of a lyophilized composition as described herein and aqueous NaCl solution. In some embodiments, the concentration of sodium chloride is between about 0.5% and about 1.5%, about 0.6% and about 1.4%, about 0.7% and about 1.3%, about 0.8% and about 1.2%, or about 0.8% and about 1.0% (w/v). In some embodiments, the concentration of sodium chloride is about 0.5%, about 0.6%, about 0.7%, about 0.8%, about 0.9%, about 1.0%, about 1.1%, about 1.2%, about 1.3%, about 1.4%, or about 1.5% (w/v). In some embodiments, the vehicle for the lyophilized composition is 0.9% sodium chloride solution.

In some embodiments, the lyophilized composition is suspended in liquid (e.g., isotonic sodium chloride solution) to prepare a suspension at a concentration of about 0.005 mg/mL to about 0.01 mg/mL.

In certain embodiments, Klinische Einheit (KE) is used as a unit of measurement for doses of the composition comprising non-viable cells of *Streptococcus pyogenes*. One KE corresponds to 0.1 mg of freeze-dried Streptococci containing approximately $1\times10^8$ cells.

In some embodiments, the non-viable cells of *Streptococcus pyogenes* are present in the lyophilized composition in the amount from about 15 KE to about 200 KE, from about 15 KE to about 150 KE, from about 15 KE to about 100 KE, from about 15 KE to about 90 KE, from about 15 KE to about 80 KE, from about 15 KE to about 70 KE, from about 15 KE to about 60 KE, from about 15 KE to about 50 KE, from about 15 KE to about 40 KE, from about 15 KE to about 30 KE, or from about 15 KE to about 20 KE.

In some embodiments, the non-viable cells of *Streptococcus pyogenes* are present in the lyophilized composition in the amount from about 20 KE to about 200 KE, from about 20 KE to about 150 KE, from about 20 KE to about 100 KE, from about 20 KE to about 90 KE, from about 20 KE to about 80 KE, from about 20 KE to about 70 KE, from about 20 KE to about 60 KE, from about 20 KE to about 50 KE, from about 20 KE to about 40 KE, or from about 20 KE to about 30 KE.

In some embodiments, the non-viable cells of *Streptococcus pyogenes* are present in the lyophilized composition in the amount from about 30 KE to about 200 KE, from about 30 KE to about 150 KE, from about 30 KE to about 100 KE, from about 30 KE to about 90 KE, from about 30 KE to about 80 KE, from about 30 KE to about 70 KE, from about 30 KE to about 60 KE, from about 30 KE to about 50 KE, or from about 30 KE to about 40 KE.

In some embodiments, the non-viable cells of *Streptococcus pyogenes* are present in the lyophilized composition in the amount from about 40 KE to about 200 KE, from about 40 KE to about 150 KE, from about 40 KE to about 100 KE, from about 40 KE to about 90 KE, from about 40 KE to about 80 KE, from about 40 KE to about 70 KE, from about 40 KE to about 60 KE, or from about 40 KE to about 50 KE.

In some embodiments, the non-viable cells of *Streptococcus pyogenes* are present in the lyophilized composition in the amount from about 50 KE to about 200 KE, from about 50 KE to about 150 KE, from about 50 KE to about 100 KE, from about 50 KE to about 90 KE, from about 50 KE to about 80 KE, from about 50 KE to about 70 KE, or from about 50 KE to about 60 KE.

In some embodiments, the non-viable cells of *Streptococcus pyogenes* are present in the lyophilized composition in the amount of at least 15 KE, at least 20 KE, at least 30 KE, at least 40 KE, at least 50 KE, at least 60 KE, at least 70 KE, at least 80 KE, at least 90 KE, at least 100 KE, or at least 150 KE.

In some embodiments, the non-viable cells of *Streptococcus pyogenes* are present in the lyophilized composition in the amount of about 15 KE, about 20 KE, about 30 KE, about 40 KE, about 50 KE, about 60 KE, about 70 KE, about 80 KE, about 90 KE, about 100 KE, or about 150 KE. In some embodiments, the non-viable cells of *Streptococcus pyogenes* are present in the lyophilized composition in the amount of 15±1, ±2, ±3, or ±4 KE, 20±1, ±2, ±3, or +4 KE, 30±1, ±2, +3, or ±4 KE, 40±1, ±2, +3, or ±4 KE, 50±1, ±2, +3, or ±4 KE, 60±1, ±2, +3, or ±4 KE, 70±1, ±2, +3, or ±4 KE, 80±1, ±2, +3, or ±4 KE, 90±1, ±2, 3, or ±4 KE, 100±1, ±2, +3, or ±4 KE, or 150±1, ±2, +3, or ±4 KE.

In some embodiments, the non-viable cells of *Streptococcus pyogenes* are present in the lyophilized composition in the amount of about 15 KE, about 20 KE, about 30 KE, about 40 KE, about 50 KE, or about 60 KE. In some embodiments, the non-viable cells of *Streptococcus pyogenes* are present in the lyophilized composition in the amount of 15±1, ±2, ±3, or ±4 KE, 20±1, ±2, +3, or ±4 KE, 30±1, ±2, +3, or ±4 KE, 40±1, ±2, +3, or ±4 KE, 50±1, ±2, +3, or ±4 KE, or 660 1, ±2, +3, or ±4 KE.

In some embodiments, the non-viable cells of *Streptococcus pyogenes* are present in the lyophilized composition in the amount of about 15 KE, about 20 KE, about 30 KE, or about 40 KE. In some embodiments, the non-viable cells of *Streptococcus pyogenes* are present in the lyophilized composition in the amount of 15±1, ±2, ±3, or +4 KE, 20±1, ±2, ±3, or +4 KE, 30±1, ±2, 3, or ±4 KE, or 40±1, ±2, 3, or ±4 KE.

In some embodiments, the non-viable cells of *Streptococcus pyogenes* are present in the lyophilized composition in the amount of at least 3.5% (w/w), at least 3.6% (w/w), at least 3.7% (w/w), at least 3.8% (w/w), at least 3.9% (w/w), at least 4.0% (w/w), at least 4.1% (w/w), at least 4.2% (w/w), at least 4.3% (w/w), at least 4.4% (w/w), at least 4.5% (w/w), at least 4.6% (w/w), at least 4.7% (w/w), at least 4.8% (w/w), at least 4.9% (w/w), at least 5.0% (w/w), at least 5.5% (w/w), at least 6.0% (w/w), at least 6.5% (w/w), at least 7.0% (w/w), at least 7.5% (w/w), at least 8.0% (w/w), at least 8.5% (w/w), at least 9.0% (w/w), at least 9.5% (w/w), or at least 10.0% (w/w) of the total weight of the lyophilized composition. In some embodiments, the non-viable cells of *Streptococcus pyogenes* are present in the lyophilized composition in the amount of at least 3.5% (w/w), at least 3.6% (w/w), at least 3.7% (w/w), at least 3.8% (w/w), at least 3.9% (w/w), at least 4.0% (w/w), at least 4.1% (w/w), at least 4.2% (w/w), at least 4.3% (w/w), at least 4.4% (w/w), at least 4.5% (w/w), at least 4.6% (w/w), at least 4.7% (w/w), at least 4.8% (w/w), at least 4.9% (w/w), or at least 5.0% (w/w) of the total weight of the lyophilized composition.

In some embodiments, the non-viable cells of *Streptococcus pyogenes* are present in the lyophilized composition in the amount of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), about 5.0% (w/w), about 5.5% (w/w), about 6.0% (w/w), about 6.5% (w/w), about 7.0% (w/w), about 7.5% (w/w), about 8.0% (w/w), about 8.5% (w/w), about 9.0% (w/w), about 9.5% (w/w), or about 10.0% (w/w) of the total weight of the lyophilized composition. In some embodiments, the non-viable cells of *Streptococcus pyogenes* are present in the lyophilized composition in the amount of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), or about 5.0% (w/w) of the total weight of the lyophilized composition.

In some embodiments, the non-viable cells of *Streptococcus pyogenes* are present in the lyophilized composition in the amount of 15±1, ±2, ±3, or ±4 KE, and of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), or about 5.0% (w/w) of the total weight of the lyophilized composition.

In some embodiments, the non-viable cells of *Streptococcus pyogenes* are present in the lyophilized composition in the amount of 20±1, ±2, ±3, or ±4 KE, and of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), or about 5.0% (w/w) of the total weight of the lyophilized composition. In some embodiments, the non-viable cells of *Streptococcus pyogenes* are present in the lyophilized composition in the amount of 20±1, ±2, ±3, or ±4 KE, and of about 3.7% (w/w), about 3.8% (w/w), about 3.9% (w/w), about 4.0% (w/w), or about 4.1% (w/w) of the total weight of the lyophilized composition. In some embodiments, the non-viable cells of *Streptococcus pyogenes* are present in the lyophilized composition in the amount of 40±1, ±2, ±3, or ±4 KE, and of about 3.9% (w/w) of the total weight of the lyophilized composition.

In some embodiments, the non-viable cells of *Streptococcus pyogenes* are present in the lyophilized composition in the amount of 30±1, ±2, ±3, or ±4 KE, and of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), or about 5.0% (w/w) of the total weight of the lyophilized composition.

In some embodiments, the non-viable cells of *Streptococcus pyogenes* are present in the lyophilized composition in the amount of 40±1, ±2, ±3, or ±4 KE, and of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), or about 5.0% (w/w) of the total weight of the lyophilized composition. In some embodiments, the non-viable cells of *Streptococcus pyogenes* are present in the lyophilized composition in the amount of 40±1, ±2, ±3, or ±4 KE, and of about 3.7% (w/w), about 3.8% (w/w), about 3.9% (w/w), about 4.0% (w/w), or about 4.1% (w/w) of the total weight of the lyophilized composition. In some embodiments, the non-viable cells of *Streptococcus pyogenes* are present in the lyophilized composition in the amount of 40±1, ±2, ±3, or ±4 KE, and of about 3.9% (w/w) of the total weight of the lyophilized composition.

In some embodiments, the non-viable cells of *Streptococcus pyogenes* are present in the lyophilized composition in the amount of 50±1, ±2, ±3, or ±4 KE, and of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), or about 5.0% (w/w) of the total weight of the lyophilized composition.

In some embodiments, the non-viable cells of *Streptococcus pyogenes* are present in the lyophilized composition in the amount of 60±1, ±2, ±3, or ±4 KE, and of about 3.5% (w/w), about 3.6% (w/w), about 3.7% (w/w), about 3.8% (w/w), about 3.9% (w/w), about 4.0% (w/w), about 4.1% (w/w), about 4.2% (w/w), about 4.3% (w/w), about 4.4% (w/w), about 4.5% (w/w), about 4.6% (w/w), about 4.7% (w/w), about 4.8% (w/w), about 4.9% (w/w), or about 5.0% (w/w) of the total weight of the lyophilized composition.

In some embodiments, the relative percentage amount of the non-viable cells of *Streptococcus pyogenes* increases when the amount of the non-viable cells of *Streptococcus pyogenes* increases in the lyophilized composition. For example, the relative percentage amount of the non-viable cells of *Streptococcus pyogenes* in the lyophilized composition is higher when the non-viable cells of *Streptococcus pyogenes* are present in the lyophilized composition in the amount of 40 KE, 30 KE, 20 KE, 15 KE, or 10 KE.

In some embodiments, the relative percentage amount of the non-viable cells of *Streptococcus pyogenes* in the lyophilized composition is at least 15%, at least 20%, at least 25%, at least 30%, at least 35%, at least 40%, at least 45%, or at least 50% higher when the non-viable cells of *Streptococcus pyogenes* are present in the lyophilized composition in the amount of 40 KE, 30 KE, 20 KE, or 15 KE than 10 KE. In some embodiments, the relative percentage amount of the non-viable cells of *Streptococcus pyogenes* in the lyophilized composition is 20±3, ±2, or ±1%, 25±3, ±2, or ±1%, 30±3, ±2, or ±1%, 35±3, ±2, or ±1%, 40±3, ±2, or ±1%, ±3, ±2, or ±1%, or 50±3, ±2, or ±1% higher when the non-viable cells of *Streptococcus pyogenes* are present in the lyophilized composition in the amount of 40 KE, 30 KE, 20 KE, or 15 KE than 10 KE. In some embodiments, the relative percentage amount of the non-viable cells of *Streptococcus pyogenes* in the lyophilized composition is 20±1%, 25±1%, 30±1%, 35±1%, 40±1%, 45±1%, or 50±1% higher when the non-viable cells of *Streptococcus pyogenes* are present in the lyophilized composition in the amount of 40 KE, 30 KE, 20 KE, or 15 KE than 10 KE.

In some embodiments, the relative percentage amount of the non-viable cells of *Streptococcus pyogenes* in the lyophilized composition is at least 15%, at least 20%, at least 25%, at least 30%, at least 35%, at least 40%, at least 45%, or at least 50% higher when the non-viable cells of *Streptococcus pyogenes* are present in the lyophilized composition in the amount of 15 KE than 10 KE. In some embodiments, the relative percentage amount of the non-viable cells of *Streptococcus pyogenes* in the lyophilized composition is 20±3, ±2, or ±1%, 25±3, ±2, or ±1%, 30±3, ±2, or ±1%, 35±3, ±2, or ±1%, 40±3, ±2, or ±1%, 45±3, ±2, or ±1%, or 50±3, ±2, or ±1% higher when the non-viable cells of *Streptococcus pyogenes* are present in the lyophilized composition in the amount of 15 KE than 10 KE. In some embodiments, the relative percentage amount of the non-viable cells of *Streptococcus pyogenes* in the lyophilized composition is 20±1%, 25±1%, 30±1%, 35±1%, 40±1%, 45±1%, or 50±1% higher when the non-viable cells of *Streptococcus pyogenes* are present in the lyophilized composition in the amount of 15 KE than 10 KE.

In some embodiments, the relative percentage amount of the non-viable cells of *Streptococcus pyogenes* in the lyophilized composition is at least 15%, at least 20%, at least 25%, at least 30%, at least 35%, at least 40%, at least 45%, or at least 50% higher when the non-viable cells of *Streptococcus pyogenes* are present in the lyophilized composition in the amount of 20 KE than 10 KE. In some embodiments, the relative percentage amount of the non-viable cells of *Streptococcus pyogenes* in the lyophilized composition is 20±3, ±2, or ±1%, 25±3, ±2, or ±1%, 30±3, 2, or ±1%, 35±3, 2, or ±1%, 40±3, ±2, or ±1%, 45±3, 2, or ±1%, or 50±3, ±2, or ±1% higher when the non-viable cells of *Streptococcus pyogenes* are present in the lyophilized composition in the amount of 20 KE than 10 KE. In some embodiments, the relative percentage amount of the non-viable cells of *Streptococcus pyogenes* in the lyophilized composition is 20±1%, 25±1%, 30±1%, 35±1%, 40±1%, 45±1%, or 50±1% higher when the non-viable cells of *Streptococcus pyogenes* are present in the lyophilized composition in the amount of 20 KE than 10 KE.

In some embodiments, the relative percentage amount of the non-viable cells of *Streptococcus pyogenes* in the lyophilized composition is at least 15%, at least 20%, at least 25%, at least 30%, at least 35%, at least 40%, at least 45%, or at least 50% higher when the non-viable cells of *Streptococcus pyogenes* are present in the lyophilized composition in the amount of 30 KE than 10 KE. In some embodiments, the relative percentage amount of the non-viable cells of *Streptococcus pyogenes* in the lyophilized composition is 20±3, ±2, or ±1%, 25±3, ±2, or ±1%, 30±3, ±2, or ±1%, 35±3, ±2, or ±1%, 40±3, ±2, or ±1%, 45±3, ±2, or ±1%, or 50±3, ±2, or ±1% higher when the non-viable cells of *Streptococcus pyogenes* are present in the lyophilized composition in the amount of 30 KE than 10 KE. In some embodiments, the relative percentage amount of the non-viable cells of *Streptococcus pyogenes* in the lyophilized composition is 20±1%, 25±1%, 30±1%, 35±1%, 40±1%, 45±1%, or 50±1% higher when the non-viable cells of *Streptococcus pyogenes* are present in the lyophilized composition in the amount of 30 KE than 10 KE.

In some embodiments, the relative percentage amount of the non-viable cells of *Streptococcus pyogenes* in the lyophilized composition is at least 15%, at least 20%, at least 25%, at least 30%, at least 35%, at least 40%, at least 45%, or at least 50% higher when the non-viable cells of *Streptococcus pyogenes* are present in the lyophilized composition in the amount of 40 KE than 10 KE. In some embodiments, the relative percentage amount of the non-viable cells of *Streptococcus pyogenes* in the lyophilized composition is 20±3, ±2, or ±1%, 25±3, ±2, or ±1%, 30±3, ±2, or ±1%, 35±3, ±2, or ±1%, 40±3, ±2, or ±1%, 45±3, ±2, or ±1%, or 50±3, ±2, or ±1% higher when the non-viable cells of *Streptococcus pyogenes* are present in the lyophilized composition in the amount of 40 KE than 10 KE. In some embodiments, the relative percentage amount of the non-viable cells of *Streptococcus pyogenes* in the lyophilized composition is 20±1%, 25±1%, 30±1%, 35±1%, 40±1%, 45±1%, or 50±1% higher when the non-viable cells of *Streptococcus pyogenes* are present in the lyophilized composition in the amount of 40 KE than 10 KE.

Immune Checkpoint Inhibitors

The methods of the present disclosure provide for administration of a composition comprising non-viable cells of *Streptococcus pyogenes* and an immune checkpoint inhibitor. An immune checkpoint inhibitor may In some embodiments, an immune checkpoint inhibitor may target PD1/PD-L1/PD-L2 axis, CD80, CD86, B7-H3, B7 H4, HVEM, adenosine, GAL9, VISTA, CEACAM-1, PVRL2, CTLA-4, BTLA, KIR, LAG3, TIM3, A2aR, CD244/2B4, CD160, TIGIT, LAIR-1, PVRIG/CD112R, arginase, indoleamine 2,3 dioxygenase (IDO), IL-10, IL-4, IL-1RA, IL-35, or any combination thereof.

In certain embodiments, an immune checkpoint inhibitor is a small molecule, nucleic acid molecule, peptide, protein, antibody or antigen binding fragment thereof, fusion protein, ribozyme, vaccine, or gene editing system. In some embodiments, a nucleic acid molecule is a gene therapy, vaccine, or an inhibitory nucleic acid. In some embodiments, an inhibitory nucleic acid is an antisense oligonucleotide, siRNA, shRNA, or miRNA. In some embodiments, a gene editing system is a CRISPR system, TALEN system, or ZFN system.

In certain embodiments, an immune checkpoint inhibitor targets the PD1/PD-L1/PD-L2 axis. In certain embodiments, an immune checkpoint inhibitor comprises a PD1 inhibitor and/or a PD-L1 inhibitor.

In certain embodiments, the composition comprising non-viable cells of *Streptococcus pyogenes* is used in combination with a PD-1 inhibitor, for example a PD-1-specific antibody or binding fragment thereof, such as lambrolizumab, pidilizumab, nivolumab (Opdivo™, formerly MDX-1106), pembrolizumab (Keytruda™, formerly MK-3475), cetrelimab (formerly JNJ 63723283), cemiplimab (Libtayo™), sintilimab (Tyvyt™), tislelizumab (Baizean™), toripalimab (Tuoyi™), penpulimab (formerly AK105), dostarlimab (Jemperli™), camrelizumab (Airuika™ SHR-1210), prolgolimab (formerly BCD 100), pucotenlimab (HX008), serplulimab (HLX10), cadonilimab (Ketanil™, anti-PD1×anti-CTLA4 bispecific), zimberelimab (AB122), geptanolimab (GB226), nofazinlimab, sasanlimab (PF-06801591), QL-1604, finotonlimab (formerly SCT I10A), BAT-1306, budigalimab, ezabenlimab, peresolimab, pimivalimab, rulonilimab (formerly F520), spartalizumab, MK-3475A, MEDI0680 (formerly AMP-514), AMP-224, BMS-936558, IAP-0971, IBI-318 (anti-PD1×anti-PD-L1 bispecific antibody), ivonescimab (anti-PD-1×anti-VEGFA bispecific antibody), tebotelimab (anti-PD-1×anti-LAG3 bispecific antibody), AZD-2936 (anti-TIGIT×anti-PD-1 bispecific antibody), EMB-02 (anti-PD-1×anti-LAG3 bispecific antibody), lorigerlimab (anti-PD-1×anti-CTLA4 bispecific antibody), vudalimab (anti-PD-1×anti-CTLA4 bispecific antibody), volrustomig (anti-PD-1×anti-CTLA4 bispecific antibody), fidasimtamab (anti-PD-1×anti-HER2 bispecific antibody), izuralimab (anti-PD-1×anti-ICOS bispecific antibody), RG-6139 (anti-PD-1×anti-LAG3 bispecific antibody), or any combination thereof.

In certain embodiments, the composition comprising non-viable cells of *Streptococcus pyogenes* is used in combination with a PD-L1 specific antibody or binding fragment thereof, such as BMS-936559, durvalumab (Imfinzi™, MEDI4736), atezolizumab (Tecentriq™ RG7446), avelumab (Bavencio™, MSB0010718C), envafolimab (Enweida™, KN035), sugemalimab (Cejemly™), cosibelimab (CK-301), socazolimab (STI A1014), tagitanlimab (HBM 9167 or KL A167), MPDL3280A, SHR-1316, APL-502 (TQB 2450 or CBT 502), danburstotug, betifisolimab, lesabelimab, pacmilimab, sudubrilimab (HS-636), LP-002, bintrafusp alfa (anti-PD-L1 antibody/TGFβRII extracellular domain fusion protein), SHR-1701 (anti-PD-L1 antibody/TGFβRII extracellular domain fusion protein), IBI-318 (anti-PD1×anti-PD-L1 bispecific antibody), KN-046 (anti-PD-L1×anti-CTLA4 bispecific antibody), 6MW-3211 (anti-CD47×anti-PD-L1 bispecific antibody), BNT-311 (anti-PD-L1×anti-4-1BB bispecific antibody), emfizatamab (anti-CD3e, anti-CD-19 anti-PD-L1, anti-4-1BB tetraspecific antibody), HB-0036 (anti-PD-L1×anti-TIGIT bispecific antibody), HLX-301 (anti-TIGIT×anti-PD-L1 bispecific), or any combination thereof.

In certain embodiments, the composition comprising non-viable cells of *Streptococcus pyogenes* is used in combination with a PD-L1 inhibitor, for example a vaccine, such as IO102/IO103 (IDO peptide+PD-L1 peptide vaccine) or mRNA-4359 (IDO peptide+PD-L1 mRNA vaccine).

In certain embodiments, the composition comprising non-viable cells of *Streptococcus pyogenes* is used in combination with a LAG3 inhibitor, such as LAG525, IMP321, IMP701, 9H12, BMS-986016, tebotelimab (anti-PD-1×anti-LAG3 bispecific antibody), RG-6139 (anti-PD-1×anti-LAG3 bispecific antibody), or any combination thereof.

In certain embodiments, the composition comprising non-viable cells of *Streptococcus pyogenes* is used in combination with an inhibitor of CTLA4. In particular embodiments, a modified immune cell is used in combination with a CTLA4 specific antibody or binding fragment thereof, such as ipilimumab, tremelimumab, tuvonralimab, CTLA4-Ig fusion proteins (e.g., abatacept, belatacept), cadonilimab (anti-PD1×anti-CTLA4 bispecific), KN-046 (anti-PD-L1×anti-CTLA4 bispecific antibody), lorigerlimab (anti-PD-1×anti-CTLA4 bispecific antibody), vudalimab (anti-PD-1×anti-CTLA4 bispecific antibody), volrustomig (anti-PD-1×anti-CTLA4 bispecific antibody), or any combination thereof.

In certain embodiments, the composition comprising non-viable cells of *Streptococcus pyogenes* is used in combination with a B7-H3 specific antibody or binding fragment thereof, such as enoblituzumab (MGA271), 376.96, or both.

In certain embodiments, the composition comprising non-viable cells of *Streptococcus pyogenes* is used in combination with a B7-H4 specific antibody or binding fragment thereof, such as a scFv or fusion protein thereof, as described in, for example, Dangaj et al., *Cancer Res.* 73:4820, 2013, as well as those described in U.S. Pat. No. 9,574,000 and PCT Patent Publication Nos. WO 2016/40724 and WO 2013/025779, each of which is incorporated herein in its entirety.

In some embodiments, the composition comprising non-viable cells of *Streptococcus pyogenes* is used in combination with an inhibitor of CD244.

In certain embodiments, the composition comprising non-viable cells of *Streptococcus pyogenes* is used in combination with an inhibitor of BLTA, HVEM, CD160, or any combination thereof. Anti-CD160 antibodies are described in, for example, PCT Publication No. WO 2010/084158, which is incorporated herein in its entirety.

In more embodiments, the composition comprising non-viable cells of *Streptococcus pyogenes* is used in combination with an inhibitor of TIM3.

In still more embodiments, the composition comprising non-viable cells of *Streptococcus pyogenes* is used in combination with an inhibitor of Gal9.

In certain embodiments, the composition comprising non-viable cells of *Streptococcus pyogenes* is used in combination with an inhibitor of adenosine signaling, such as a decoy adenosine receptor.

In certain embodiments, the composition comprising non-viable cells of *Streptococcus pyogenes* is used in combination with an inhibitor of A2aR.

In certain embodiments, the composition comprising non-viable cells of *Streptococcus pyogenes* is used in combination with an inhibitor of KIR, such as lirilumab (BMS-986015). In certain embodiments, the composition comprising non-viable cells of *Streptococcus pyogenes* is used in combination with an inhibitor of an inhibitory cytokine (typically, a cytokine other than TGFβ) or Treg development or activity.

In certain embodiments, the composition comprising non-viable cells of *Streptococcus pyogenes* is used in combination with an IDO inhibitor, such as levo-1-methyl tryptophan, epacadostat (INCB024360; Liu et al., *Blood* 115: 3520-30, 2010), ebselen (Terentis et al; *Biochem.* 49:591-600, 2010), indoximod, NLG919 (Mautino et al., American Association for Cancer Research 104th Annual Meeting 2013; Apr. 6-10, 2013), 1-methyl-tryptophan (1-MT)-tirapazamine, IO102/IO103 (IDO peptide+PD-L1 peptide vaccine), or any combination thereof.

In certain embodiments, the composition comprising non-viable cells of *Streptococcus pyogenes* is used in combination with an arginase inhibitor, such as N(omega)-Nitro-L-arginine methyl ester (L-NAME), N-omega-hydroxy-nor-1-arginine (nor-NOHA), L-NOHA, 2(S)-amino-6-boronohexanoic acid (ABH), S-(2-boronoethyl)-L-cysteine (BEC), or any combination thereof.

In certain embodiments, the composition comprising non-viable cells of *Streptococcus pyogenes* is used in combination with an inhibitor of VISTA, such as CA-170 (Curis, Lexington, MA).

In certain embodiments, the composition comprising non-viable cells of *Streptococcus pyogenes* is used in combination with a LAIR1 inhibitor.

In certain embodiments, the composition comprising non-viable cells of *Streptococcus pyogenes* is used in combination with an inhibitor of CEACAM-1, CEACAM-3, CEACAM-5, or any combination thereof.

Methods of Treatment

Triple Negative Breast Cancer

The present disclosure provides methods of treating triple negative breast cancer in a subject, comprising administering to the subject (i) a composition comprising non-viable cells of *Streptococcus pyogenes*; and (ii) an immune checkpoint inhibitor.

In certain embodiments, the subject is a human or non-human animal, such as a non-human primate, cow, horse, sheep, pig, cat, dog, goat, mouse, rat, rabbit, or guinea pig. In some embodiments, the subject is a human, such as a human adult, adolescent, child, or infant.

In some embodiments, the triple negative breast cancer may be localized, regional, or metastatic. In some embodiments, the triple negative breast cancer may be newly diagnosed or a recurrent cancer.

Triple negative breast cancer may be divided into six distinct subgroups: basal-like 1 (BL1), basal-like 2 (BL2), mesenchymal (M), mesenchymal stem-like (MSL), immunomodulatory (IM), and luminal androgen receptor (LAR).

In some embodiments, the triple negative breast cancer exhibits complete or partial resistance to a PD1 inhibitor or PD-L1 inhibitor.

A biological sample may be obtained from a subject for determining the presence and/or level of estrogen receptor, progesterone receptor, and HER2, or triple negative status. A "biological sample" as used herein may be a biopsy specimen, blood sample (from which serum or plasma may be prepared), body fluids (e.g., lung lavage, ascites, mucosal washings, synovial fluid), bone marrow, lymph nodes, tissue explant, organ culture, or any other tissue or cell preparation from the subject or a biological source. Biological samples may also be obtained from the subject prior to receiving any composition comprising non-viable cells of *Streptococcus pyogenes*.

Pharmaceutical compositions may be administered in a manner appropriate to the disease or condition to be treated (or prevented) as determined by persons skilled in the medical art. An appropriate dose and a suitable duration and frequency of administration of the compositions will be determined by such factors as the health condition of the patient, size of the patient (i.e., weight, mass, or body area), the type and severity of the patient's disease, the particular form of the active ingredient, and the method of administration. In general, an appropriate dose and treatment regimen provide the composition(s) in an amount sufficient to provide therapeutic and/or prophylactic benefit (such as described herein, including an improved clinical outcome, such as more frequent complete or partial remissions, or longer disease-free and/or overall survival, or a lessening of symptom severity). For prophylactic use, a dose should be sufficient to prevent, delay the onset of, or diminish the severity of a disease associated with disease or disorder. Prophylactic benefit of the immunogenic compositions administered according to the methods described herein can be determined by performing pre-clinical (including in vitro and in vivo animal studies) and clinical studies and analyzing data obtained therefrom by appropriate statistical, biological, and clinical methods and techniques, all of which can readily be practiced by a person skilled in the art.

The pharmaceutical compositions described herein may be presented in unit-dose or multi-dose containers, such as sealed ampoules or vials. Such containers may be frozen to preserve the stability of the formulation until use. The development of suitable dosing and treatment regimens for using the particular compositions described herein in a variety of treatment regimens, including e.g., parenteral or intravenous administration or formulation.

The composition comprising non-viable Streptococcus-pyogenese may be dosed based on milligrams of dried cell mass or KE. Accordingly, references may be made to either mg or KE. In certain embodiments, a dose of the composition comprising non-viable *Streptococcus* pyogenese is at about 0.1 KE to about 200 KE, about 1 KE to about 100 KE, about 5 KE to about 50 KE, or about 0.1KE, 0.5 KE, 1 KE, 2.5 KE, 5 KE, 10 KE, 15 KE, 20 KE, 30 KE, 40 KE, 50 KE, 60 KE, 70 KE, 80 KE, 90 KE, 100 KE, 125 KE, 150 KE, 175 KE, or 200 KE. In certain embodiments, a unit dose comprises of the composition comprising non-viable *Streptococcus* pyogenese is at about 0.01 mg to about 20 mg, or about 0.01 mg, 0.025 mg, 0.05 mg, 0.075 mg, 0.1 mg, 0.125 mg, 0.150 mg, 0.175 mg, 0.2 mg, 0.3 mg, 0.4 mg, 0.5 mg, 0.6 mg, 0.7 mg, 0.8 mg, 0.9 mg, 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, or 20 mg.

In some embodiments, the composition comprising non-viable Streptococcuspyogenese is administered to the subject once a day, twice a week, once a week, biweekly, or once a month. If the subject composition is administered parenterally, the composition may also include sterile aqueous or oleaginous solution or suspension. Suitable non-toxic parenterally acceptable diluents or solvents include water, Ringer's solution, isotonic salt solution, 1,3-butanediol, ethanol, propylene glycol or polyethylene glycols in mixtures with water. Aqueous solutions or suspensions may further comprise one or more buffering agents, such as sodium acetate, sodium citrate, sodium borate or sodium tartrate. Of course, any material used in preparing any dosage unit formulation should be pharmaceutically pure and substantially non-toxic in the amounts employed. In addition, the active compounds may be incorporated into sustained-release preparation and formulations. Dosage unit form, as used herein, refers to physically discrete units suited as unitary dosages for the subject to be treated; each unit may contain a predetermined quantity of recombinant cells or active compound calculated to produce the desired therapeutic effect in association with an appropriate pharmaceutical carrier.

In general, an appropriate dosage and treatment regimen provides the active molecules or cells in an amount sufficient to provide therapeutic or prophylactic benefit. Such a response can be monitored by establishing an improved clinical outcome (e.g., more frequent remissions, complete or partial, or longer disease-free survival) in treated subjects as compared to non-treated subjects. Increases in preexisting immune responses to a tumor protein generally correlate with an improved clinical outcome. Such immune responses may generally be evaluated using standard proliferation, cytotoxicity or cytokine assays, which may be performed using samples obtained from a subject before and after treatment.

In some aspects, the lyophilized pharmaceutical formulation is reconstituted prior to administration, e.g., to form a liquid formulation of the present disclosure.

In some embodiments, the formulation is administered to the subject using conventional modes of delivery including, but not limited to, intravesical, intravenous, intraperitoneal, intraarterial, intrapleural, intrathecal, intramuscular, subcutaneous, or intratumoral administration.

In some embodiments, the composition comprising non-viable cells of *Streptococcus pyogenes* is administered to the subject prior to the immune checkpoint inhibitor. For example, the composition comprising non-viable cells of *Streptococcus pyogenes* may be administered 1, 2, 3, 4, 5, 6, 7, 14, 21, 28, or more days before the immune checkpoint inhibitor. In some embodiments, the composition comprising non-viable cells of *Streptococcus pyogenes* is administered to the subject concurrently with the immune checkpoint inhibitor. For example, the composition comprising non-viable cells of *Streptococcus pyogenes* may be administered on the same day as the immune checkpoint inhibitor. In some embodiments, the composition comprising non-viable cells of *Streptococcus pyogenes* is administered to the subject subsequent to the immune checkpoint inhibitor. For example, the composition comprising non-viable cells of *Streptococcus pyogenes* may be administered 1, 2, 3, 4, 5, 6, 7, 14, 21, 28, or more days after the immune checkpoint inhibitor.

In other embodiments, a method of this disclosure further comprises administering an additional therapy comprising one or more of: an antibody or antigen binding fragment specific for a cancer antigen expressed by the solid tumor being targeted; a small molecule, a chemotherapeutic agent; surgery; radiation therapy treatment; a cytokine; an RNA interference therapy, or any combination thereof.

Exemplary monoclonal antibodies useful in cancer therapies include, for example, monoclonal antibodies described in Galluzzi et al., *Oncotarget* 5(24):12472-12508, 2014, which antibodies are incorporated by reference in their entirety.

In certain embodiments, a combination therapy method comprises further administering a radiation treatment or a surgery to a subject. Radiation therapy includes X-ray therapies, such as gamma-irradiation, and radiopharmaceutical therapies. Surgeries and surgical techniques appropriate to treating a given cancer or non-inflamed solid tumor may be used in a subject in combination with a modified immune cell of this disclosure.

In certain embodiments, a combination therapy method comprises further administering a chemotherapeutic agent to a subject. A chemotherapeutic agent includes, but is not limited to, an inhibitor of chromatin function, a topoisomerase inhibitor, a microtubule inhibiting drug, a DNA damaging agent, an antimetabolite (such as folate antagonists, pyrimidine analogs, purine analogs, and sugar-modified analogs), a DNA synthesis inhibitor, a DNA interactive agent (such as an intercalating agent), and a DNA repair inhibitor. Illustrative chemotherapeutic agents include, without limitation, the following groups: anti-metabolites/anticancer agents, such as pyrimidine analogs (5-fluorouracil, floxuridine, capecitabine, gemcitabine and cytarabine) and purine analogs, folate antagonists and related inhibitors (mercaptopurine, thioguanine, pentostatin and 2-chlorodeoxyadenosine (cladribine)); antiproliferative/antimitotic agents including *vinca* alkaloids (vinblastine, vincristine, and vinorelbine), microtubule disruptors such as taxane (paclitaxel, docetaxel), vincristin, vinblastin, nocodazole, epothilones and navelbine, epidipodophyllotoxins (etoposide, teniposide), DNA damaging agents (actinomycin, amsacrine, anthracyclines, bleomycin, busulfan, camptothecin, carboplatin, chlorambucil, cisplatin, cyclophosphamide, cytoxan, dactinomycin, daunorubicin, doxorubicin, epirubicin, hexamethylmelamineoxaliplatin, iphosphamide, melphalan, merchlorehtamine, mitomycin, mitoxantrone, nitrosourea, plicamycin, procarbazine, taxol, taxotere, temozolamide, teniposide, triethylenethiophosphoramide and etoposide (VP 16)); antibiotics such as dactinomycin (actinomycin D), daunorubicin, doxorubicin (adriamycin), idarubicin, anthracyclines, mitoxantrone, bleomycins, plicamycin (mithramycin) and mitomycin; enzymes (L-asparaginase which systemically metabolizes L-asparagine and deprives cells which do not have the capacity to synthesize their own asparagine); antiplatelet agents; antiproliferative/antimitotic alkylating agents such as nitrogen mustards (mechlorethamine, cyclophosphamide and analogs, melphalan, chlorambucil), ethylenimines and methylmelamines (hexamethylmelamine and thiotepa), alkyl sulfonates-busulfan, nitrosoureas (carmustine (BCNU) and analogs, streptozocin), trazenes-dacarbazinine (DTIC); antiproliferative/antimitotic antimetabolites such as folic acid analogs (methotrexate); platinum coordination complexes (cisplatin, carboplatin), procarbazine, hydroxyurea, mitotane, aminoglutethimide; hormones, hormone analogs (estrogen, tamoxifen, goserelin, bicalutamide, nilutamide) and aromatase inhibitors (letrozole, anastrozole); anticoagulants (heparin, synthetic heparin salts and other inhibitors of thrombin); fibrinolytic agents (such as tissue plasminogen activator, streptokinase and urokinase), aspirin, dipyridamole, ticlopidine, clopidogrel, abciximab; antimigratory agents; antisecretory agents (breveldin); immunosuppressives (cyclosporine, tacrolimus (FK-506), sirolimus (rapamycin), azathioprine, mycophenolate mofetil); anti-angiogenic compounds (TNP470, genistein) and growth factor inhibitors (vascular endothelial growth factor (VEGF) inhibitors, fibroblast growth factor (FGF) inhibitors); angiotensin receptor blocker; nitric oxide donors; anti-sense oligonucleotides; antibodies (trastuzumab, rituximab); chimeric antigen receptors; cell cycle inhibitors and differentiation inducers (tretinoin); mTOR inhibitors, topoisomerase inhibitors (doxorubicin (adriamycin), amsacrine, camptothecin, daunorubicin, dactinomycin, eniposide, epirubicin, etoposide, idarubicin, irinotecan (CPT-11) and mitoxantrone, topotecan, irinotecan), corticosteroids (cortisone, dexamethasone, hydrocortisone, methylpednisolone, prednisone, and prenisolone); growth factor signal transduction kinase inhibitors; mitochondrial dysfunction inducers, toxins such as Cholera toxin, ricin, *Pseudomonas* exotoxin, *Bordetella pertussis* adenylate cyclase toxin, or diphtheria toxin, and caspase activators; and chromatin disruptors.

Cytokines can be used to manipulate host immune response towards anticancer activity. See, e.g., Floros and Tarhini, *Semin. Oncol.* 42:539, 2015. Cytokines useful for promoting anticancer or antitumor response include, for example, IFN-α, IL-2, IL-3, IL-4, IL-10, IL-12, IL-13, IL-15, IL-16, IL-17, IL-18, IL-21, IL-24, and GM-CSF, singly or in any combination. Another cancer therapy approach involves reducing expression of oncogenes and other genes needed for growth, maintenance, proliferation, and immune evasion by cancer cells. RNA interference, and in particular the use of microRNAs (miRNAs) small inhibitory RNAs (siRNAs) provides an approach for knocking down expression of cancer genes. See, e.g., Larsson et al., *Cancer Treat. Rev.* 16:128, 2017.

In any of the embodiments disclosed herein, any of the therapeutic agents may be administered once or more than once to the subject over the course of a treatment, and, in combinations, may be administered to the subject in any order (e.g., simultaneously, concurrently, or in any sequence) or any combination. An appropriate dose, suitable duration, and frequency of administration of the compositions will be determined by such factors as a condition of the patient; size, type, spread, growth, and severity of the tumor or cancer; particular form of the active ingredient; and the method of administration.

An effective amount of a therapeutic or pharmaceutical composition refers to an amount sufficient, at dosages and for periods of time needed, to achieve the desired clinical results or beneficial treatment, as described herein. An effective amount may be delivered in one or more administrations. If the administration is to a subject already known or confirmed to have a disease or disease-state, the term "therapeutic amount" may be used in reference to treatment, whereas "prophylactically effective amount" may be used to describe administrating an effective amount to a subject that is susceptible or at risk of developing a disease or disease-state (e.g., recurrence) as a preventative course.

Non-Muscle Invasive Bladder Cancer

The present disclosure provides methods of treating non-muscle invasive bladder cancer in a subject, comprising administering to the subject (i) a composition comprising non-viable cells of *Streptococcus pyogenes*; and (ii) an immune checkpoint inhibitor.

In certain embodiments, the subject is a human or non-human animal, such as a non-human primate, cow, horse, sheep, pig, cat, dog, goat, mouse, rat, rabbit, or guinea pig. In some embodiments, the subject is a human, such as a human adult, adolescent, child, or infant.

Bladder cancer may be classified according to traditional American Joint Committee on Cancer (AJCC) TNM staging. In the absence of nodal (N stage) or distant metastases (M stage), depth of tumor invasion (T stage) is the most important determination to be made and can be dichotomized based on whether the tumor is invading into or beyond the muscularis propia (muscle-invasive bladder cancer, MIBC) or not (non-muscle-invasive bladder cancer, NMIBC). Table B sets forth the staging of primary tumors (T) in bladder cancer according to the AJCC. Tumors may be further classified according to histological grade (low or high). The World Health Organization (WHO)/International Society of Urological Pathology (ISUP) 2004 classification of Non-muscle Invasive Urothelial Neoplasia is provided in Table C. The World Health Organziation (WHO) 2004 Grading System for Urothelial Carcinoma is provided in Table D.

TABLE B

Staging of primary tumors (T) in bladder cancer

| Primary Tumor Stage | Description |
|---|---|
| TX | Primary tumor cannot be assessed |
| Ta | Noninvasive papillary carcinoma |
| Tis | Carcinoma in situ (CIS) |
| T1 | Tumor invades lamina propria |
| T2 | Tumor invades muscularis propria |
| T2a | Tumor invades superficial muscularis propria (inner half) |
| T2b | Tumor invades deep muscularis propria (outer half) |
| T3 | Tumor invades perivesical tissue/fat |
| T3a | Tumor invades perivesical tissue/fat microscopically |
| T3b | Tumor invades perivesical tissue fat macroscopically (extravesical mass) |
| T4 | Tumor invades prostate, uterus, vagina, pelvic wall, or abdominal wall |
| T4a | Tumor invades adjacent organs (uterus, ovaries, prostate stoma) |
| T4b | Tumor invades pelvic wall and/ or abdominal wall |

TABLE C

| 2004 World Health Organization/International Society of Urologic Pathologists: Classification of Non-muscle Invasive Urothelial Neoplasia |
|---|
| Hyperplasia (flat and papillary) |
| Reactive atypia |
| Atypia of unknown significance |
| Urothelial dysplasia |

TABLE C-continued

| 2004 World Health Organization/International Society of Urologic Pathologists: Classification of Non-muscle Invasive Urothelial Neoplasia |
|---|
| Urothelial CIS |
| Urothelial papilloma |
| Papillary urothelial neoplasm of low malignant potential (PUNLMP) |
| Non-muscle invasive low-grade (LG) papillary urothelial carcinoma |
| Non-muscle invasive high-grade (HG) papillary urothelial carcinoma |

TABLE D

| WHO 2004 Grading for Urothelial Carcinoma | |
|---|---|
| Urothelial papilloma (completely benign lesion) | Papillary lesion with no abnormal histological features<br>Classified as benign<br>Very rare but may occur in conjunction with UC<br>Do not recur once resected |
| Papillary urothelial neoplasm of low malignant potential (PUNLMP) | Papillary lesion with no cytologic features of malignancy<br>Negligible risk for progression<br>May recur |

TABLE D-continued

| WHO 2004 Grading for Urothelial Carcinoma | |
|---|---|
| Low grade (LG) papillary urothelial carcinoma | Moderately differentiated papillary lesions<br>Cytologic features of malignancy are present |
| High grade (HG) papillary urothelial carcinoma | Poorly differentiated tumors<br>Marked cytologic abnormalities |

In certain embodiments, the subject having non-muscle invasive bladder cancer has a Ta stage tumor. In certain embodiments, the subject having non-muscle invasive bladder cancer has a T1 stage tumor. In certain embodiments, the subject having non-muscle invasive bladder cancer has a Tis stage (CIS) tumor. In certain embodiments, the CIS tumor may be with or without Ta and/or T1.

In certain embodiments, the subject has a papillary urothelial neoplasm of low malignant potential (PUNLMP). In certain embodiments, the subject has low grade non-muscle invasive bladder cancer. In certain embodiments, the subject has high grade non-muscle invasive bladder cancer. In certain embodiments, the subject has high grade Ta non-muscle invasive bladder cancer. In certain embodiments, the subject has high grade T1 non-muscle invasive bladder cancer.

Non-muscle invasive bladder cancer may also be divided into three distinct risk categories based upon American Urological Association (AUA) and/or the European Association of Urology (EAU) guidelines. The NMIBC risk stratification groups and criteria are provided in Table E.

TABLE E

Definitions of risk stratification groups non-muscle-invasive bladder cancer according to the American and European Urologic Associations

| Risk Group | American Urological Association (AUA) | European Urologic Association (EUA) |
|---|---|---|
| Low | Solitary LG Ta tumor, <3 cm<br>PUNLMP | Solitary LG Ta tumor, <3 cm<br>PUNLMP |
| Intermediate | Recurrence within 1 year, LG Ta<br>Solitary LG Ta, >3 cm<br>LG Ta, multifocal<br>HG Ta, ≤3 cm LG T1 | All tumors not defined as low or high risk |
| High | Carcinoma in situ<br>High-grade Tl tumors<br>Recurrent or multifocal or large (>3 cm) high-grade Ta tumors<br>Any tumor following BCG failure<br>Lymphovascular invasion or non-urothelial histology<br>High-grade tumor involving prostatic urethra | Carcinoma in situ<br>Any high-grade tumor<br>Any T1 tumor<br>Multiple, recurrent, >3 cm tumors<br>Highest risk:<br>T1 HG with CIS<br>Multiple, large (>3 cm), or recurrent T1 high-grade tumors<br>T1 with CIS in prostatic urethra<br>Some variant histology or lymphovascular invasion |

LG = low grade;

PUNLMP = papillary urothelial neoplasm of low malignant potential;

[c]HG = high grade;

CIS = carcinoma in situ;

LVI = lymphovascular invasion

In certain embodiments, the subject has non-muscle invasive bladder cancer that has been identified as low risk according to the AUA and/or EUA guidelines. In certain embodiments, the subject has non-muscle invasive bladder cancer that has been identified as intermediate risk according to the AUA and/or EUA guidelines. In certain embodiments, the subject has non-muscle invasive bladder cancer that has been identified as high risk according to the AUA and/or EUA guidelines. In certain embodiments, the subject has non-muscle invasive bladder cancer that has been identified as highest risk according to the EUA guidelines. In certain embodiments, the subject having non-muscle invasive bladder cancer has lymphovascular invasion.

Intravesical *Bacillus* Calmette-Guerin (BCG) is standard therapy for treating high risk non-muscle invasive bladder cancer for BCG naïve patients, such as following surgical resection or ablation of the tumor. In certain embodiments, the subject having non-muscle invasive bladder cancer has not received prior BCG therapy (BCG naïve). In certain embodiments, the subject having non-muscle invasive bladder cancer has received adequate BCG treatment. In certain embodiments, the subject having non-muscle invasive bladder cancer is unresponsive to BCG therapy. Definitions for BCG-unresponsive disease and adequate BCG treatment is provided in Table F.

TABLE F

Key definitions of BCG-unresponsive non-muscle invasive bladder cancer and adequate BCG treatment

| BCG-unresponsive non-muscle invasive bladder cancer | Adequate BCG treatment |
|---|---|
| Persistent or recurrent CIS alone or with Ta/T1 disease within 12 months of adequate BCG therapy | At least five of six doses of the initial induction course and at least two of three doses of the maintenance treatment |
| Recurrent high-grade Ta/T1 disease within 6 months of completion of adequate BCG therapy | At least five of six doses of the initial induction course and at least two of six doses of the second induction course |
| T1 high-grade disease on the first evaluation following an induction BCG course | |

Other terms for describing clinical scenarios where BCG is unsuccessful in treating high risk non-muscle invasive bladder cancer and is no longer a treatment option include, BCG failure (where muscle invasive bladder cancer is detected), BCG-refractory (detection of high-risk lesions during or after adequate treatment at 3 or 6 months of treatment), BCG-relapsing (detection of tumor following initial response after completion of treatment), and BCG inadequately treated (patient did not receive full BCG dose due to intolerance to or unavailability of BCG drug). In certain embodiments, the subject having non-muscle invasive bladder cancer has BCG failure NMIBC. In certain embodiments, the subject having non-muscle invasive bladder cancer has BCG-refractory NMIBC. In certain embodiments, the subject having non-muscle invasive bladder cancer has BCG-relapsing NMIBC. In certain embodiments, the subject having non-muscle invasive bladder cancer was inadequately treated with BCG.

In certain embodiments, the subject having non-muscle invasive bladder cancer has not had a radical cystectomy. In certain embodiments, the subject having non-muscle invasive bladder cancer is ineligible for radical cystectomy.

In some embodiments, the non-muscle invasive bladder cancer may be newly diagnosed or a recurrent cancer.

In some embodiments, the non-muscle invasive bladder cancer exhibits complete or partial resistance to a PD1 or PD-L1 inhibitor.

A biological sample may be obtained from a subject for determining the presence and/or staging or risk level of non-muscle invasive bladder cancer. A "biological sample" as used herein may be a biopsy specimen, blood sample (from which serum or plasma may be prepared), body fluids (e.g., urine, mucosal washings), bone marrow, lymph nodes, tissue explant, organ culture, or any other tissue or cell preparation from the subject or a biological source. Biological samples may also be obtained from the subject prior to receiving any composition comprising non-viable cells of *Streptococcus pyogenes*.

Pharmaceutical compositions may be administered in a manner appropriate to the disease or condition to be treated (or prevented) as determined by persons skilled in the medical art. An appropriate dose and a suitable duration and frequency of administration of the compositions will be determined by such factors as the health condition of the patient, size of the patient (i.e., weight, mass, or body area), the type and severity of the patient's disease, the particular form of the active ingredient, and the method of administration. In general, an appropriate dose and treatment regimen provide the composition(s) in an amount sufficient to provide therapeutic and/or prophylactic benefit (such as described herein, including an improved clinical outcome, such as more frequent complete or partial remissions, or longer disease-free and/or overall survival, or a lessening of symptom severity). For prophylactic use, a dose should be sufficient to prevent, delay the onset of, or diminish the severity of a disease associated with disease or disorder. Prophylactic benefit of the immunogenic compositions administered according to the methods described herein can be determined by performing pre-clinical (including in vitro and in vivo animal studies) and clinical studies and analyzing data obtained therefrom by appropriate statistical, biological, and clinical methods and techniques, all of which can readily be practiced by a person skilled in the art.

The pharmaceutical compositions described herein may be presented in unit-dose or multi-dose containers, such as sealed ampoules or vials. Such containers may be frozen to preserve the stability of the formulation until use. The development of suitable dosing and treatment regimens for using the particular compositions described herein in a variety of treatment regimens, including e.g., parenteral or intravenous administration or formulation.

The composition comprising non-viable Streptococcus-pyogenese may be dosed based on milligrams of dried cell mass or KE. Accordingly, references may be made to either mg or KE. In certain embodiments, a dose of the composition comprising non-viable *Streptococcus* pyogenese is at about 0.1 KE to about 200 KE, about 1 KE to about 100 KE, about 5 KE to about 50 KE, or about 0.1 KE, 0.5 KE, 1 KE, 2.5 KE, 5 KE, 10 KE, 15 KE, 20 KE, 30 KE, 40 KE, 50 KE, 60 KE, 70 KE, 80 KE, 90 KE, 100 KE, 125 KE, 150 KE, 175 KE, or 200 KE. In certain embodiments, a unit dose comprises of the composition comprising non-viable *Streptococcus* pyogenese is at about 0.01 mg to about 20 mg, or about 0.01 mg, 0.025 mg, 0.05 mg, 0.075 mg, 0.1 mg, 0.125 mg, 0.150 mg, 0.175 mg, 0.2 mg, 0.3 mg, 0.4 mg, 0.5 mg, 0.6 mg, 0.7 mg, 0.8 mg, 0.9 mg, 1 mg, 2 mg, 3 mg, 4 mg, 5 mg, 6 mg, 7 mg, 8 mg, 9 mg, 10 mg, 11 mg, 12 mg, 13 mg, 14 mg, 15 mg, 16 mg, 17 mg, 18 mg, 19 mg, or 20 mg.

In some embodiments, the composition comprising non-viable Streptococcuspyogenese is administered to the subject once a day, twice a week, once a week, biweekly, or once a month.

If the subject composition is administered parenterally, the composition may also include sterile aqueous or oleaginous solution or suspension. Suitable non-toxic parenterally acceptable diluents or solvents include water, Ringer's solution, isotonic salt solution, 1,3-butanediol, ethanol, propylene glycol or polyethylene glycols in mixtures with water. Aqueous solutions or suspensions may further comprise one or more buffering agents, such as sodium acetate, sodium citrate, sodium borate or sodium tartrate. Of course, any material used in preparing any dosage unit formulation should be pharmaceutically pure and substantially non-toxic in the amounts employed. In addition, the active compounds may be incorporated into sustained-release preparation and formulations. Dosage unit form, as used herein, refers to physically discrete units suited as unitary dosages for the subject to be treated; each unit may contain a predetermined quantity of recombinant cells or active compound calculated to produce the desired therapeutic effect in association with an appropriate pharmaceutical carrier.

In general, an appropriate dosage and treatment regimen provides the active molecules or cells in an amount sufficient to provide therapeutic or prophylactic benefit. Such a response can be monitored by establishing an improved clinical outcome (e.g., more frequent remissions, complete or partial, or longer disease-free survival) in treated subjects as compared to non-treated subjects. Increases in preexisting immune responses to a tumor protein generally correlate with an improved clinical outcome. Such immune responses may generally be evaluated using standard proliferation, cytotoxicity or cytokine assays, which may be performed using samples obtained from a subject before and after treatment.

In some aspects, the lyophilized pharmaceutical formulation is reconstituted prior to administration, e.g., to form a liquid formulation of the present disclosure.

In some embodiments, the formulation is administered to the subject using conventional modes of delivery including, but not limited to, intravesical, intravenous, intraperitoneal, intraarterial, intrapleural, intrathecal, intramuscular, subcutaneous, or intratumoral administration.

In some embodiments, the composition comprising non-viable cells of *Streptococcus pyogenes* is administered to the subject prior to the immune checkpoint inhibitor. For example, the composition comprising non-viable cells of *Streptococcus pyogenes* may be administered 1, 2, 3, 4, 5, 6, 7, 14, 21, 28, or more days before the immune checkpoint inhibitor. In some embodiments, the composition comprising non-viable cells of *Streptococcus pyogenes* is administered to the subject concurrently with the immune checkpoint inhibitor. For example, the composition comprising non-viable cells of *Streptococcus pyogenes* may be administered on the same day as the immune checkpoint inhibitor. In some embodiments, the composition comprising non-viable cells of *Streptococcus pyogenes* is administered to the subject subsequent to the immune checkpoint inhibitor. For example, the composition comprising non-viable cells of *Streptococcus pyogenes* may be administered 1, 2, 3, 4, 5, 6, 7, 14, 21, 28, or more days after the immune checkpoint inhibitor.

In other embodiments, a method of this disclosure further comprises administering an additional therapy comprising one or more of: an antibody or antigen binding fragment specific for a cancer antigen expressed by the solid tumor being targeted; a small molecule, a chemotherapeutic agent; surgery; radiation therapy treatment; a cytokine; an RNA interference therapy; a cancer vaccine, or any combination thereof.

Exemplary monoclonal antibodies useful in cancer therapies include, for example, monoclonal antibodies described in Galluzzi et al., *Oncotarget* 5(24):12472-12508, 2014, which antibodies are incorporated by reference in their entirety.

In certain embodiments, a combination therapy method comprises further administering a radiation treatment or a surgery to a subject. Radiation therapy includes X-ray therapies, such as gamma-irradiation, and radiopharmaceutical therapies. Surgeries and surgical techniques appropriate to treating a given cancer or non-inflamed solid tumor may be used in a subject in combination with a modified immune cell of this disclosure.

In certain embodiments, a combination therapy method comprises further administering BCG therapy to a subject.

In certain embodiments, a combination therapy method comprises further administering a chemotherapeutic agent to a subject. A chemotherapeutic agent includes, but is not limited to, an inhibitor of chromatin function, a topoisomerase inhibitor, a microtubule inhibiting drug, a DNA damaging agent, an antimetabolite (such as folate antagonists, pyrimidine analogs, purine analogs, and sugar-modified analogs), a DNA synthesis inhibitor, a DNA interactive agent (such as an intercalating agent), and a DNA repair inhibitor. Illustrative chemotherapeutic agents include, without limitation, the following groups: anti-metabolites/anticancer agents, such as pyrimidine analogs (5-fluorouracil, floxuridine, capecitabine, gemcitabine and cytarabine) and purine analogs, folate antagonists and related inhibitors (mercaptopurine, thioguanine, pentostatin and 2-chlorodeoxyadenosine (cladribine)); antiproliferative/antimitotic agents including *vinca* alkaloids (vinblastine, vincristine, and vinorelbine), microtubule disruptors such as taxane (paclitaxel, docetaxel), vincristin, vinblastin, nocodazole, epothilones and navelbine, epidipodophyllotoxins (etoposide, teniposide), DNA damaging agents (actinomycin, amsacrine, anthracyclines, bleomycin, busulfan, camptothecin, carboplatin, chlorambucil, cisplatin, cyclophosphamide, cytoxan, dactinomycin, daunorubicin, doxorubicin, epirubicin, hexamethylmelamineoxaliplatin, iphosphamide, melphalan, merchlorehtamine, mitomycin, mitoxantrone, nitrosourea, plicamycin, procarbazine, taxol, taxotere, temozolamide, teniposide, triethylenethiophosphoramide and etoposide (VP 16)); antibiotics such as dactinomycin (actinomycin D), daunorubicin, doxorubicin (adriamycin), idarubicin, anthracyclines, mitoxantrone, bleomycins, plicamycin (mithramycin) and mitomycin; enzymes (L-asparaginase which systemically metabolizes L-asparagine and deprives cells which do not have the capacity to synthesize their own asparagine); antiplatelet agents; antiproliferative/antimitotic alkylating agents such as nitrogen mustards (mechlorethamine, cyclophosphamide and analogs, melphalan, chlorambucil), ethylenimines and methylmelamines (hexamethylmelamine and thiotepa), alkyl sulfonates-busulfan, nitrosoureas (carmustine (BCNU) and analogs, streptozocin), trazenes-dacarbazinine (DTIC); antiproliferative/antimitotic antimetabolites such as folic acid analogs (methotrexate); platinum coordination complexes (cisplatin, carboplatin), procarbazine, hydroxyurea, mitotane, aminoglutethimide; hormones, hormone analogs (estrogen, tamoxifen, goserelin, bicalutamide, nilutamide) and aromatase inhibitors (letrozole, anastrozole); anticoagulants (heparin, synthetic heparin salts and other inhibitors of thrombin); fibrinolytic agents (such as tissue plasminogen activator, streptokinase and urokinase), aspirin, dipyridamole, ticlopidine, clopidogrel, abciximab; antimigratory agents; antisecretory agents (breveldin); immunosuppressives (cyclosporine, tacrolimus (FK-506), sirolimus (rapamycin), azathioprine, mycophenolate mofetil); anti-angiogenic compounds (TNP470, genistein) and growth factor inhibitors (vascular endothelial growth factor (VEGF) inhibitors, fibroblast growth factor (FGF) inhibitors); angiotensin receptor blocker; nitric oxide donors; anti-sense oligonucleotides; antibodies (trastuzumab, rituximab); chimeric antigen receptors; cell cycle inhibitors and differentiation inducers (tretinoin); mTOR inhibitors, topoisomerase inhibitors (doxorubicin (adriamycin), amsacrine, camptothecin, daunorubicin, dactinomycin, eniposide, epirubicin, etoposide, idarubicin, irinotecan (CPT-11) and mitoxantrone, topotecan, irinotecan), corticosteroids (cortisone, dexamethasone, hydrocortisone, methylpednisolone, prednisone, and prenisolone); growth factor signal transduction kinase inhibitors; mitochondrial dysfunction inducers, toxins such as Cholera toxin, ricin, *Pseudomonas* exotoxin, *Bordetella pertussis* adenylate cyclase toxin, or diphtheria toxin, and caspase activators; and chromatin disruptors.

Cytokines can be used to manipulate host immune response towards anticancer activity. See, e.g., Floros and Tarhini, *Semin. Oncol.* 42:539, 2015. Cytokines useful for promoting anticancer or antitumor response include, for example, IFN-α, IL-2, IL-3, IL-4, IL-10, IL-12, IL-13, IL-15, IL-16, IL-17, IL-18, IL-21, IL-24, and GM-CSF, singly or in any combination. Another cancer therapy approach involves reducing expression of oncogenes and other genes needed for growth, maintenance, proliferation, and immune evasion by cancer cells. RNA interference, and in particular the use of microRNAs (miRNAs) small inhibitory RNAs (siRNAs) provides an approach for knocking down expression of cancer genes. See, e.g., Larsson et al., *Cancer Treat. Rev.* 16:128, 2017.

In any of the embodiments disclosed herein, any of the therapeutic agents may be administered once or more than once to the subject over the course of a treatment, and, in combinations, may be administered to the subject in any order (e.g., simultaneously, concurrently, or in any sequence) or any combination. An appropriate dose, suitable duration, and frequency of administration of the compositions will be determined by such factors as a condition of the patient; size, type, spread, growth, and severity of the tumor or cancer; particular form of the active ingredient; and the method of administration.

An effective amount of a therapeutic or pharmaceutical composition refers to an amount sufficient, at dosages and for periods of time needed, to achieve the desired clinical results or beneficial treatment, as described herein. An effective amount may be delivered in one or more administrations. If the administration is to a subject already known or confirmed to have a disease or disease-state, the term "therapeutic amount" may be used in reference to treatment, whereas "prophylactically effective amount" may be used to describe administrating an effective amount to a subject that is susceptible or at risk of developing a disease or disease-state (e.g., recurrence) as a preventative course.

Example 1: In Vivo Efficacy of Non-Viable Cells of *Streptococcus pyogenes* in Monotherapy and in Combination with Anti-mPD-1 Triple Negative EMT6 Breast Cancer Model

Materials and Methods

Animals. 65 female Balb/c mice of 7 weeks of age were purchased from Jackson Laboratories and housed 5 mice per cage, upon arrival, at the in house animal facility with food and water provided ad libitum. Fifty four mice were enrolled in the study upon tumor randomization, the extra 11 mice (injected with tumor cells) were used for randomization purpose only. After one week acclimation, all mice confirmed to be healthy were weighed on Day 0, before implant of tumor cells, and then twice a week until the end of the study.

Treatment. Several days before the study began, Composition 002 ("Comp. 002" or "002") was received as lyophilized material in individual vials in a cold box. There were 49 vials containing each 20 KE, equivalent each to 2 mg amount of drug. Composition 002 is a lyophilized biological preparation for administration containing non-viable cells of *Streptococcus pyogenes* (Group A, type 3) Su strain treated with hydrogen peroxide and benzylpenicillin according to the present disclosure. Composition 002 is manufactured using the same master cell bank as OK-432 (Picibanil®).

All vials were kept in the refrigerator (at 4° C.) at the recommended 2-8° C. temperature. Before administration to mice at each treatment day, each vial was dissolved freshly with 1 ml of 0.9% sterile saline solution. Any remaining small dissolved amount from the dosing vial was discarded each time.

The anti-PD1 antibody (CD279, clone RMP1-14, cat #BP0146) and corresponding IgG control (isotype rat IgG2a,k (clone 2A3, cat #BP0089) were purchased from BioXcell. The shipment was delayed a few days, which led to the administration in mice a few days after the scheduled dose time.

Tumor cells and in vitro culture. EMT6 murine triple negative breast cancer cells were thawed from a frozen vial and placed in culture with sterile DMEM medium supplemented with sterile 10% FBS, incubated at 37° C. in a humidified atmosphere of 5% $CO_2$. The cells were passaged in culture at the constant split ratio ~1:6, which means the cells were consistently harvested at the same confluence (about 70-80%), at exponential phase growth, at each passage, before being re-plated in new T75 culture flasks.

The conditions for culturing and harvesting the cells were kept standardized to minimize any variability. The cells were passaged two days before the scheduled injection in mice. Each time and on the day of implant in mice, the cells were harvested after a brief treatment (1-2 min) with warm trypsin/EDTA solution followed by addition of sterile 10% serum-containing culture medium and two washes in sterile serum-free culture media.

The cell suspension was kept on ice during the preparation, until and during the time of injection to preserve the cell viability and adhesive properties. After the last centrifugation, the cells were counted and resuspended appropriately to the final concentration of $2.0\times10^6$/M1 in sterile serum-free culture media for injection of $2\times10^5$ cells/mouse.

The calculated percent of cell viability was 99% confirming highly viable cells were implanted in mice.

Sample process for flow cytometry (FACS) analysis of SPLCs and TILs: The spleens were collected from the subset of 3 mice in each group under sterile conditions and placed in sterile cold media. A single cell suspension of splenocytes (SPLCs) was prepared by pressing with the plunger of a 3-ml syringe and passing it through 40 um cell strainers. The SPLCs were then processed and stained for FACS analysis.

The tumors were also collected from the same subset of 3 mice in each group of mice and the tumor infiltrating lymphocytes (TILs) were prepared by mechanical dissociation, followed by 30 min treatment with the collagenase D enzyme at the final concentration of 2.5 mg/ml prepared freshly just before use. The cell suspensions were filtered through 70 um cell strainers, washed in sterile HBSS containing 2% FBS, and stained for FACS analysis.

Staining Antibodies and flow cytometry analysis. The antibody panels for flow cytometry and other associated reagents were purchased from BioLegend, BD Bioscience, and ThermoFisher Scientifics, in advance, before the process and staining of samples for FACS analysis.

The immunophenotyping (i.e. including $CD8^{+}$ T cells, regulatory $CD4^{+}$ T cells, NK cells, MDSCs, Tregs, and macrophages) and selected stained panels for FACS analysis are described in the Table below.

All samples were analyzed with the LSRFortessa™ (BD Biosciences) flow cytometer. FACS profiles were further analyzed by FloJo software (treeStar).

| Staining Panel (Immunophenotyping) | |
|---|---|
| Immune Cell Population | Markers |
| T cells | $CD45_{+}$ $CD3_{+}$ |
| $CD4_{+}$ T cells | $CD45_{+}$ $CD3_{+}$ $CD4_{+}$ |
| $CD8_{+}$ T cells | $CD45_{+}$ $CD3_{+}$ $CD8_{+}$ |
| $CD8_{+}$ T cells | $CD45_{+}$ $CD3_{+}$ $CD4_{-}$ $CD8_{+}$ |
| Tregs | $CD3_{+}$ $CD4_{+}$ $Foxp3_{+}$ $CD25_{+}$ |
| Granulocytic MDSC | $CD45_{+}$ $CD3_{-}$ $CD11b_{+}$ $Ly6G_{+}$ Ly6Clow |
| Monocytic MDSC | $CD45_{+}$ $CD3_{-}$ $CD11b_{+}$ $Ly6G_{-}$ Ly6Chigh |
| NK cells | $CD45_{+}$ $CD3_{-}$ $CD49b_{+}$ $CD335_{+}$ |
| M1 macrophages | $CD45_{+}$ $CD3_{-}$ $F4/80_{+}$ $CD206_{-}$ |
| M2 macrophages | $CD45_{+}$ $CD3_{-}$ $F4/80_{+}$ $CD206_{+}$ |
| PD1 | PD1+ |
| PD-L1 | PD-L1+ |

Preparation of single cells for scRNA seq.: At the end of the study, three selected tumors were processed for scRNA sequencing: one tumor from the intravenous arm control (Group 2, mouse #4), the second tumor from Composition 002, 10 mg/Kg of the intravenous arm (Group 3, mouse #6), and the third tumor from Composition 002, 10 mg/Kg of the intratumor arm (Group 4, mouse #6).

The tumors were mechanically and enzymatically dissociated to single cells with collagenase type IV (final concentration 1 mg/ml) and DNAse (final concentration 100 units/ml) for ~1 hr in an incubator at 370 C and 5% CO2 atmosphere. The samples were then gently washed in HBSS containing 2% FBS by centrifugation at 980 rpm, then treated with ACK on ice for 3 minutes, washed again and processed through the cell death removal kit, followed by resuspension in DMEM containing 20% FBS and 10% DMSO for cryopreservation. There are two vials (1 ml each) for each sample containing $2.5\times10^{6}$ cells (vial #1) and $5.0\times10^{6}$ cells (vial #2). All the samples contained single and highly viable cells (average >98%).

The samples were stored cryopreserved until scRNA seq analysis.

Experimental Design and Results

In vivo implant of tumor cells and treatment of tumor bearing mice. One week after acclimation, all 65 anesthetized mice were implanted in the left 4th mammary fat pad with $2\times10^{5}$ EMT tumor cells in the volume of 100 ul. The number of cells injected in this study was reduced compared to the number of $5\times10^{5}$ used an earlier experiment with the purpose to attenuate the rapid formation and growth of tumors, and prevent the early ulceration. This change was worthwhile because it enabled randomizing the mice when the tumor size was ~100 $mm^{3}$ prior to treatment initiation and obtain more accurate and less variable efficacy results.

The mice were carefully monitored twice a week and tumor growth was also evaluated twice a week by caliper measurements of length (L) and width (W). The tumor size was calculated with the formula (L×W2)/2). Almost all tumors became caliperable 6 days after the implant and reached their average size of –100 $mm^{3}$ in 8 days. The tumor take at this time was 97%. The tumor growth data, prior-to randomization, are expressed as average+SEM and represented graphically in FIG. 1.

Eight days after tumor cell injection, 54 mice with tumors of comparable size were randomized into 9 groups with 6 mice/group to ensure the tumor average and standard deviation were similar between the groups before treatment exposure. The remaining 11 mice with tumors too small (or not caliperable) or too large were not enrolled. After randomization, the mice in Group 1 and Group 2 (Controls) received the vehicle saline by the intratumor and intravenous route, respectively. The mice in Group 6 were dosed intraperitoneally (i.p.) with anti-PD-1 antibody (200 ug/mouse, 100 ul volume) as single agent, and mice in the control Groups 1 and 2 received the same dose and volume of IgG control intraperitoneally. The mice in Groups 4 and 8 were dosed intravenously with Composition 002 at the dose 10 mg/Kg (100 ul volume) alone and in combination with anti-PD-1 antibody, respectively.

The mice in the treatment Groups 3, 5, 7, and 9 were dosed with Composition 002 by the intratumoral (i.t.) route at the dose 10 mg/Kg and 20 mg/Kg, as single agent (Group 3 and Group 5) and in combination with anti-PD-1 antibody (Group 7 and Group 9).

The mice in Groups 5 and 9 were originally planned to be dosed intravenously (i.v.) with Composition 002 at the dose of 20 mg/Kg, however this high dose delivered intravenously was not tolerated causing death of one mouse that showed convulsions quickly after being treated. This dose was then reduced to 15 mg/Kg, which however still induced some adverse reactions: reduced activity, rough hair coat, and body weight loss in some mice that resolved within 2-3 days, and more severe symptoms in a few other mice. In a trial with a few extra mice, it was confirmed that 20 mg/Kg of Composition 002 was tolerated when given intratumorally, it was decided then to deliver this dose only intratumorally. Therefore, the mice in Group 5 and Group 9 received first one initial dose of 15 mg/Kg intravenously then continue to be dosed with 20 mg/Kg by the intratumor route.

The treatment schedule of Composition 002 for all mice was twice a week, i.e. Monday and Thursday for 3 weeks. The schedule for anti-PD-1 dosing was also twice a week, one day after treatment with Composition 002. The treatment groups are described in Table 1 below.

TABLE 1

| Structure of the Experimental Groups | | | | |
|---|---|---|---|---|
| Group | No of Mice | EMT6 Mouse Breast Tumor Cells (mfp) | Treatment mg/Kg | Sacrifice Day |
| 1 | 6 | $2\times10^{5}$ | 0 (IT) | 30 days |
| 2 | 6 | $2\times10^{5}$ | 0 (IV) | 30 days |

TABLE 1-continued

| Structure of the Experimental Groups | | | | |
|---|---|---|---|---|
| Group | No of Mice | EMT6 Mouse Breast Tumor Cells (mfp) | Treatment mg/Kg | Sacrifice Day |
| 3 | 6 | $2 \times 10^5$ | Composition 002 10 mg/Kg, IT | 30 days |
| 4 | 6 | $2 \times 10^5$ | Composition 002 10 mg/Kg, IV | 30 days |
| 5 | 6 | $2 \times 10^5$ | Composition 002 20 mg/Kg, IT | 30 days |
| 6 | 6 | $2 \times 10^5$ | Anti-PD1 Ab 200 ug/mouse, IP | 30 days |
| 7 | 6 | $2 \times 10^5$ | Composition 002 10 mg/Kg, IT+ anti-PD1 | 30 days |
| 8 | 6 | $2 \times 10^5$ | Composition 002 10 mg/Kg, IV+ anti-PD1 | 30 days |
| 9 | 6 | $2 \times 10^5$ | Composition 002 20 mg/Kg, IT+ anti-PD1 | 30 days |

The volume of the drug delivered intratumorally was 50 ul on the first week and increased to 100 ul thereafter in concomitance to the increased size of the tumors. The volume of 100 ul was kept constant in all other groups during the entire study. It was previously planned to use a multi-side needle (purchased from Cook Medical) to improve the intratumor delivery by better penetration and uniform diffusion of the drug. However, when the needle was used with saline in a trial with two extra mice, its performance was found to be very poor due to the size and thickness of the needle that made hard its insertion without damaging the skin, even though the dimensions were the smallest available.

Figure 2:
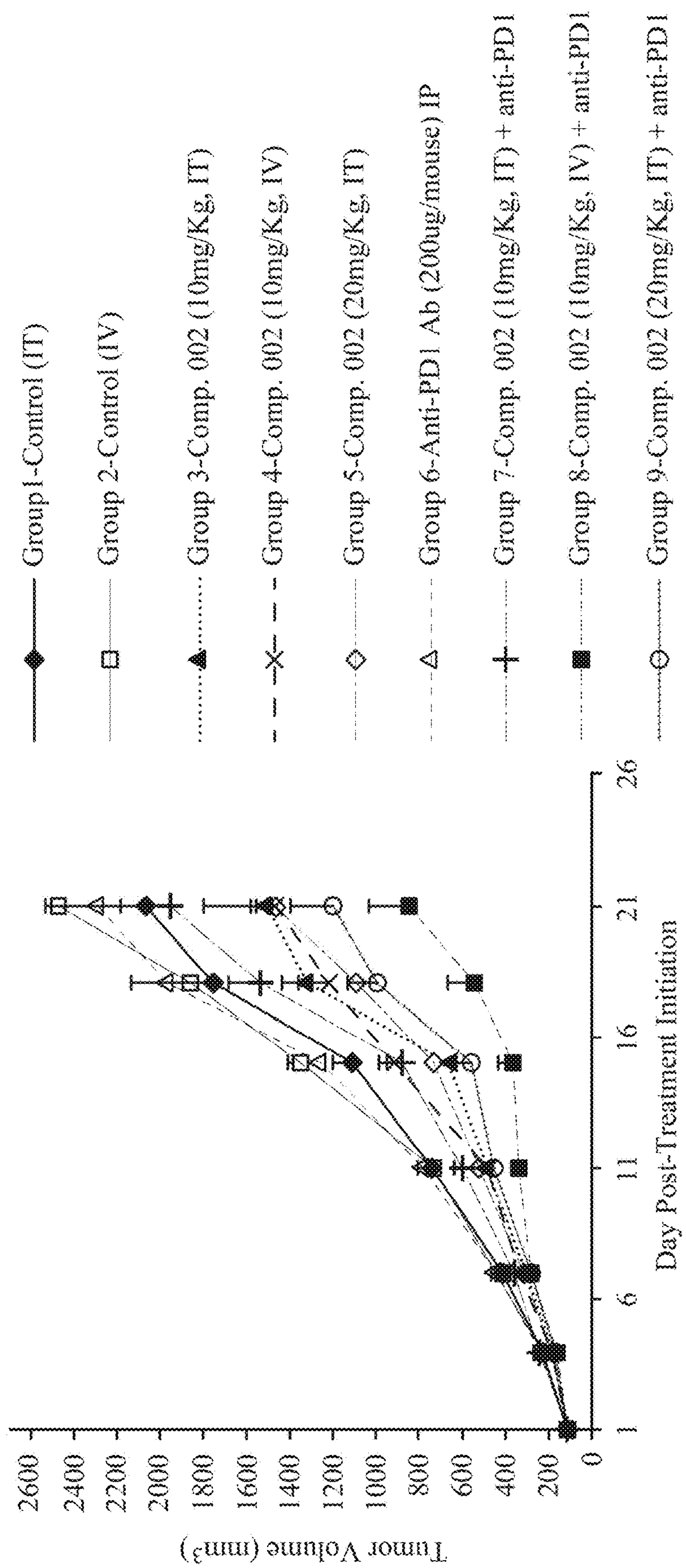
FIG. 2: In vivo efficacy results with an exemplary composition comprising non-viable cells of *Streptococcus pyogenes* ("Composition 002" or "Comp. 002") in the EMT6 Model.

After treatment initiation, tumor growth continued to be evaluated twice a week by caliper measurements. The data are expressed as tumor volume average+Standard Deviation (STDV) and Standard Error (SEM) and the growth curves for all groups (Average+SEM) are represented graphically in FIG. 2.

The percent tumor growth inhibition (% TGI) in the treatment groups was calculated and the results are reported in Table 2.

TABLE 2

| Measure of percent tumor growth inhibition (% TGI) in Balb/c mice after 3 week of treatment with Composition 002 delivered intravenously (IV) and intratumorally (IT) (Day 15 and Day 21) | | | | |
|---|---|---|---|---|
| Treatment Dose | Composition 002 Delivery Route | Group No | % TGI Day 15 | % TGI Day 21 |
| Composition 002 IT 10 mg/Kg (n = 6) | IT | 3 | 45 | 28 |
| Composition 002 IT 20 mg/Kg (n = 6) | | 5 | 50 | 43 |
| Composition 002 IT 10 mg/Kg + anti-PD1 (n = 6) | | 7 | 24 | 6 |
| Composition 002 IT 20 mg/Kg + anti-PD1 (n = 6) | IV | 9 | 64 | 54 |
| Composition 002 IV 10 mg/Kg (n = 6) | | 4 | 36 | 42 |
| Composition 002 IV 10 mg/Kg + anti-PD1 (n = 6) | | 8 | 79 | 69 |
| Anti-PD-1 IP 200 ug/mouse (n = 6) | IP | 6 | 0 | 0 |

Figure 3A:
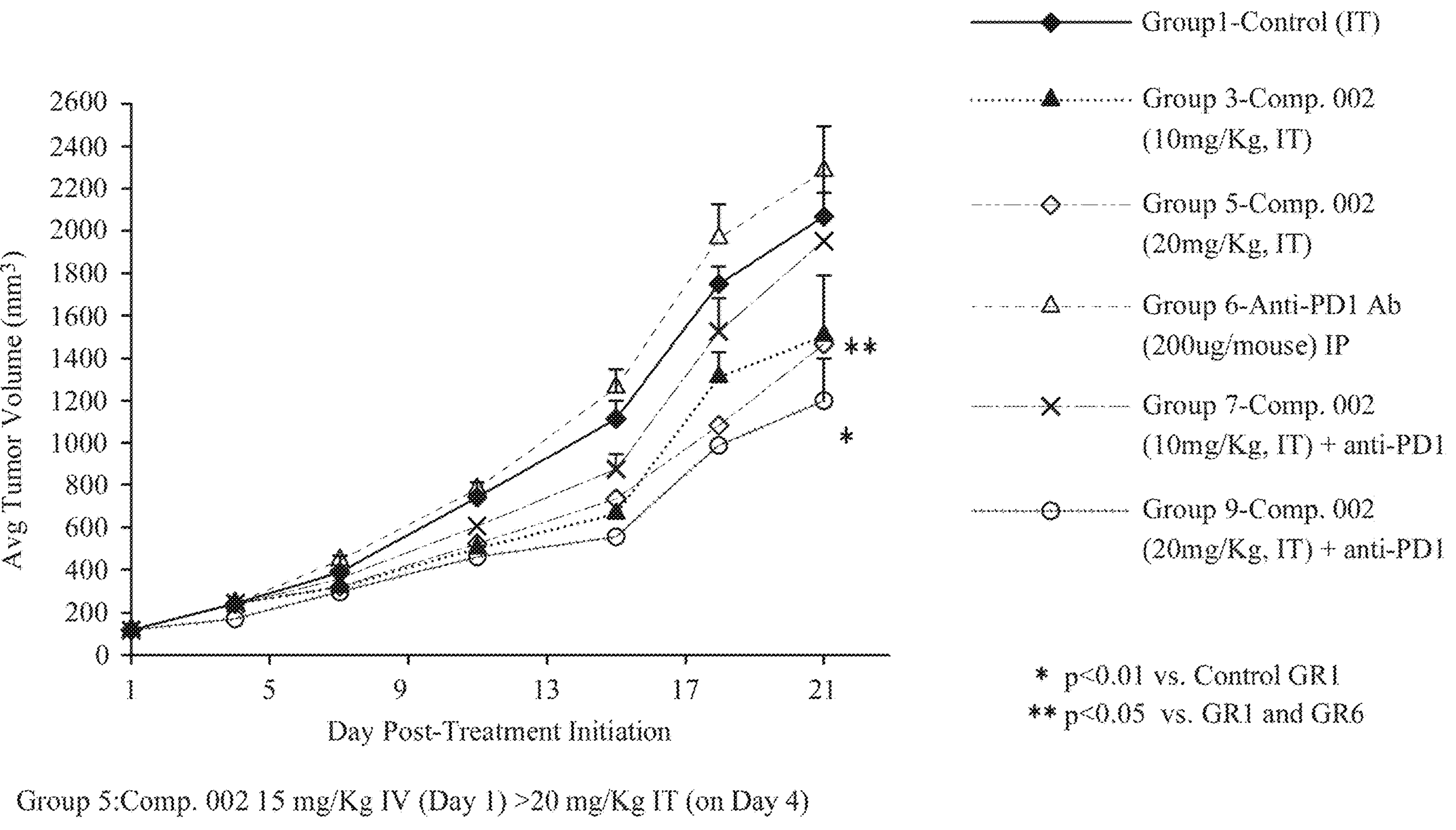
FIGS. 3A-3B: In vivo efficacy results with intratumor (FIG. 3A) or intravenous (FIG. 3B) delivery of Composition 002 as a single agent and in combination with anti-PD1 antibody.
Figure 3B:
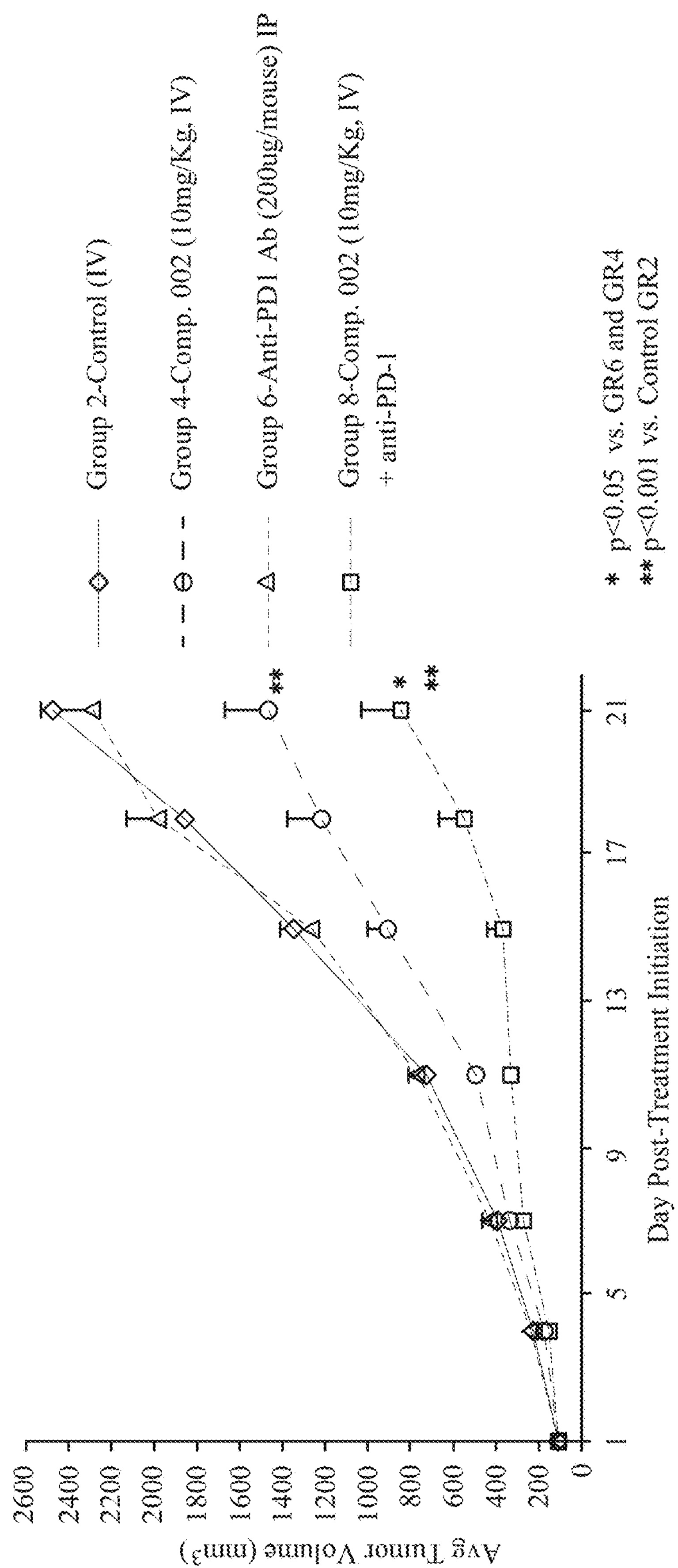

The tumor efficacy data obtained from the intravenous and intratumor administration of Composition 002 are also shown in separate graphics representations, as average+SEM, in FIGS. 3A and 3B, respectively.

Similar to the results from our earlier efficacy experiment (unpublished), the data in this study demonstrate that Composition 002 at the dose of 10 mg/Kg inhibited EMT6 tumor growth more effectively when it was delivered intravenously than intratumorally. Also, in combination with anti-PD1 antibody, systemic delivery of 10 mg/Kg Composition 002 demonstrated superior anti-tumor activity than the intratumoral administration of either 10 or 20 mg/Kg. Moreover, the intratumor treatment of Composition 002 did not induce a dose response recapitulating the earlier observations. Due to adverse events described above, the higher dose of 20 mg/Kg could not be evaluated for the intravenous delivery route.

Thirty days post-implant of tumor cells, which was Day 21 post-treatment initiation, the primary tumors and spleens were collected from 3 mice in each group, processed and stained for FACS analysis. Interestingly mouse #2 in Group 8 (Composition 002 intravenously+anti-PD-1) showed a tumor that measured 130 $mm^3$ on Day 15 post-treatment initiation and gradually decreased in size and regressed becoming not palpable by the end of the study. The spleen was collected from this mouse and analyzed by FACS.

A total of 3 tumors were harvested and dissociated in single cells for scRNA analysis. Interestingly mouse #2 in Group 8 (Composition 002 intravenously+anti-PD-1) showed regression until becoming not caliperable at the end of the study. For this mouse only the spleen was collected and analyzed by FACS. The primary tumors and livers from the remaining mice were fixed in 10% neutral buffered formalin. The lungs were collected from all mice in all groups and also fixed in formalin. The details on days of euthanasia and process of samples collected are summarized in Table 3.

TABLE 3

| Study termination - Summary | | | | | |
|---|---|---|---|---|---|
| Group No | Mouse No | Euthanasia or Death Date | Sample Process | Visible Lung Metastasis | Other Organs Metastases |
| Group 1 Control IT | 1 | Dec. 2, 2021 | Fixed tumor, liver and lungs | — | — |
| | 2 | Dec. 2, 2021 | Fixed tumor, liver and lungs | — | — |

TABLE 3-continued

| Study termination - Summary | | | | | |
|---|---|---|---|---|---|
| Group No | Mouse No | Euthanasia or Death Date | Sample Process | Visible Lung Metastasis | Other Organs Metastases |
| | 3 | Nov. 29, 2021 | Fixed tumor, liver and lungs | — | — |
| | 4 | Dec. 2, 2021 | Tumor and spleen-FACS Fixed lungs | — | — |
| | 5 | Dec. 2, 2021 | Tumor and spleen-FACS Fixed lungs | — | — |
| | 6 | Dec. 2, 2021 | Tumor and spleen-FACS Fixed lungs | — | — |
| Group 2 Control IV | 1 | Dec. 2, 2021 | Fixed tumor, liver and lungs | — | — |
| | 2 | Dec. 2, 2021 (dead) | Fixed tumor, liver and lungs | — | — |
| | 3 | Dec. 3, 2021 | Tumor and spleen-FACS Fixed lungs | — | — |
| | 4 | Dec. 3, 2021 | Tumor for scRNA seq Fixed lungs | — | — |
| | 5 | Dec. 3, 2021 | Tumor and spleen-FACS Fixed lungs | — | — |
| | 6 | Dec. 3, 2021 | Tumor and spleen-FACS Fixed lungs | — | — |
| Group 3 Composition 002 | 1 | Dec. 2, 2021 | Tumor and spleen-FACS Fixed lungs | — | — |
| 10 mg/Kg IT | 2 | Dec. 2, 2021 | Tumor and spleen-FACS Fixed lungs | — | — |
| | 3 | Dec. 2, 2021 | Fixed tumor, liver and lungs | — | — |
| | 4 | Dec. 2, 2021 | Tumor and spleen-FACS Fixed lungs | — | — |
| | 5 | Nov. 29, 2021 | Fixed tumor, liver and lungs | — | — |
| | 6 | Dec. 3, 2021 | Tumor for scRNA seq Fixed lungs and liver | — | — |
| Group 4 Composition 002 | 1 | Dec. 3, 2021 | Tumor and spleen-FACS Fixed lungs | — | — |
| 10 mg/Kg IV | 2 | Dec. 3, 2021 | Fixed tumor, liver and lungs | one lung met to confirm by histology | — |
| | 3 | Dec. 3, 2021 | Tumor and spleen-FACS Fixed lungs | — | — |
| | 4 | Dec. 3, 2021 | Tumor and spleen-FACS Fixed lungs | — | — |
| | 5 | Dec. 2, 2021 | Fixed tumor, liver and lungs | — | — |
| | 6 | Dec. 3, 2021 | Tumor for scRNA seq Fixed lungs and liver | — | — |
| Group 5 Composition | 1 | Nov. 23, 2021 (dead) | Fixed tumor, lungs and liver | Lung metastases | — |
| 002 IT 20 mg/Kg | 2 | Dec. 2, 2021 | Tumor and spleen-FACS Fixed lungs | — | — |
| | 3 | Dec. 2, 2021 | Fixed tumor, lungs and liver | — | — |
| | 4 | Dec. 2, 2021 | Fixed tumor, lungs and liver | — | — |

TABLE 3-continued

| Study termination - Summary | | | | | |
|---|---|---|---|---|---|
| Group No | Mouse No | Euthanasia or Death Date | Sample Process | Visible Lung Metastasis | Other Organs Metastases |
| | 5 | Dec. 2, 2021 | Tumor and spleen-FACS Fixed lungs | — | — |
| | 6 | Dec. 2, 2021 | Tumor and spleen-FACS Fixed lungs | — | — |
| Group 6 Anti-PD-1 IP | 1 | Dec. 3, 2021 | Fixed tumor, lungs and liver | — | — |
| | 2 | Dec. 3, 2021 | Tumor and spleen-FACS Fixed lungs | — | — |
| | 3 | Dec. 3, 2021 | Tumor and spleen-FACS Fixed lungs | — | — |
| | 4 | Nov. 30, 2021 | Fixed tumor, lungs and liver | — | — |
| | 5 | Dec. 3, 2021 | Tumor and spleen-FACS Fixed lungs | — | — |
| | 6 | Nov. 29, 2021 | Fixed tumor, lungs and liver | — | — |
| Group 7 Composition 002 10 mg/ Kg IT + anti-PD-1 | 1 | Dec. 2, 2021 | Tumor and spleen-FACS Fixed lungs | — | — |
| | 2 | Dec. 2, 2021 | Fixed tumor, lungs and liver | — | — |
| | 3 | Dec. 2, 2021 | Tumor and spleen-FACS Fixed lungs | — | — |
| | 4 | Dec. 2, 2021 | Fixed tumor, lungs and liver | — | — |
| | 5 | Dec. 2, 2021 | Fixed tumor, lungs and liver | — | — |
| | 6 | Dec. 2, 2021 | Tumor and spleen-FACS Fixed lungs | — | — |
| Group 8 Composition 002 10 mg/ Kg IV + anti-PD1 | 1 | Dec. 3, 2021 | Fixed tumor, lungs and liver | — | — |
| | 2 | Dec. 3, 2021 | Fixed mfp tissue, lungs and liver | — | — |
| | 3 | Dec. 3, 2021 | Tumor and spleen-FACS Fixed lungs | — | — |
| | 4 | Dec. 3, 2021 | Tumor and spleen-FACS Fixed lungs | — | — |
| | 5 | Dec. 3, 2021 | Tumor and spleen-FACS Fixed lungs | — | — |
| | 6 | Dec. 1, 2021 (dead) | Fixed tumor, lungs and liver | — | — |
| Group 9 Composition 002 20 mg/ Kg IT + anti-PD-1 | 1 | Dec. 2, 2021 | Fixed tumor, lungs and liver | — | — |
| | 2 | Dec. 2, 2021 | Tumor and spleen-FACS Fixed lungs | — | — |
| | 3 | Dec. 2, 2021 | Fixed tumor, lungs and liver | — | — |
| | 4 | Dec. 2, 2021 | Tumor and spleen-FACS Fixed lungs | — | — |
| | 5 | Dec. 2, 2021 | Tumor and spleen-FACS Fixed lungs | — | — |
| | 6 | Dec. 2, 2021 | Fixed tumor, lungs and liver | — | — |

There were no eye-visible metastases on the lungs of the mice from all groups except for one with size 1-2 mm on the lung surface of mouse #2 in Group 4 (Composition 002 10 mg/Kg, IV) that, however, will need to be confirmed by histology.

The fixed samples have been processed for paraffin embedding and blocks from all samples were made by a histopathology lab.

Figure 4A:
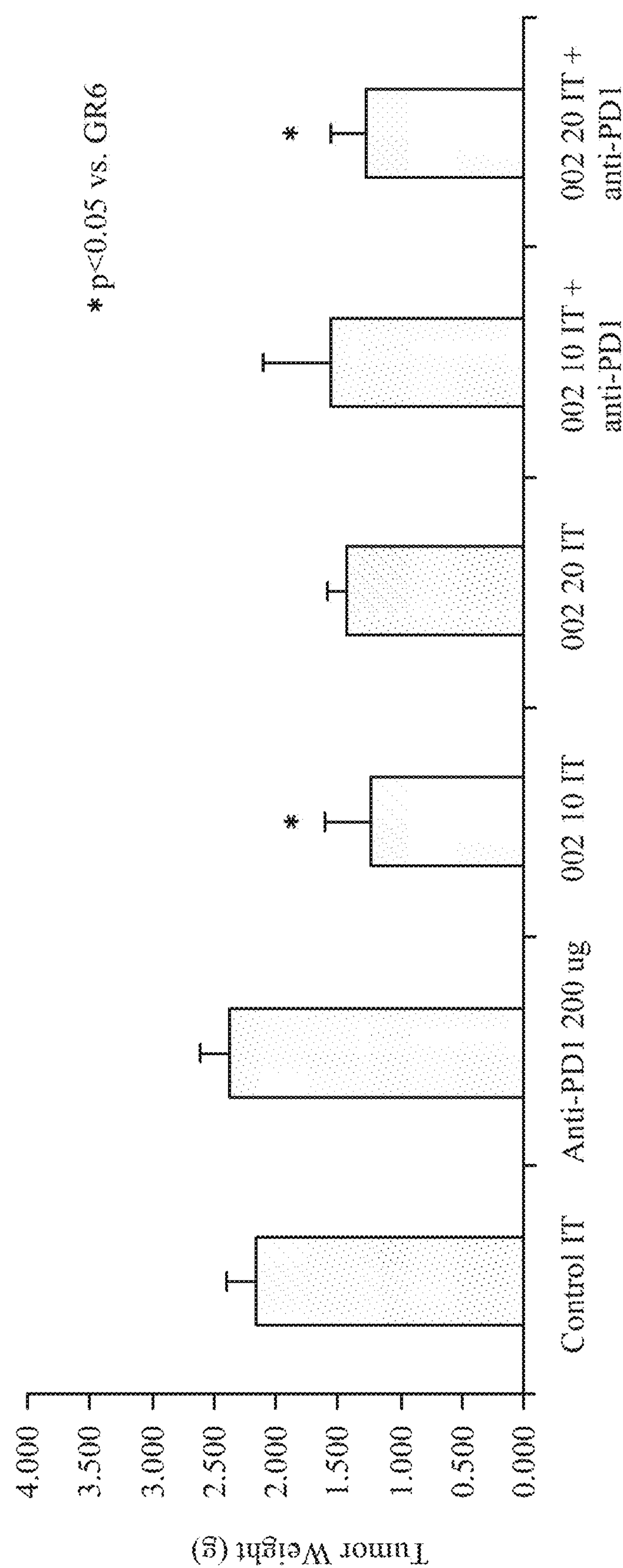
FIGS. 4A-4B: Body weigh measure data of primary tumors (FIG. 4A) and spleens (FIG. 4B) of mice dosed with Composition 002 intratumorally as a single agent and in combination with anti-PD1 antibody.
Figure 4B:
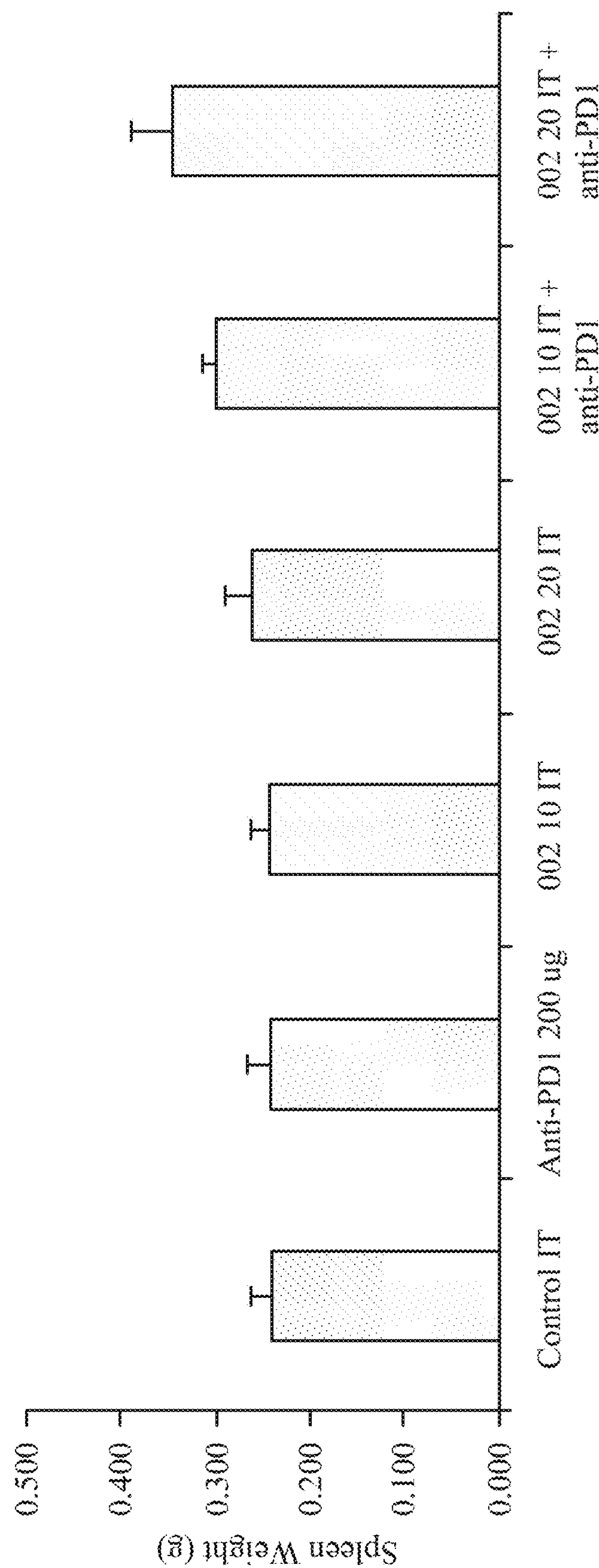
Figure 5A:
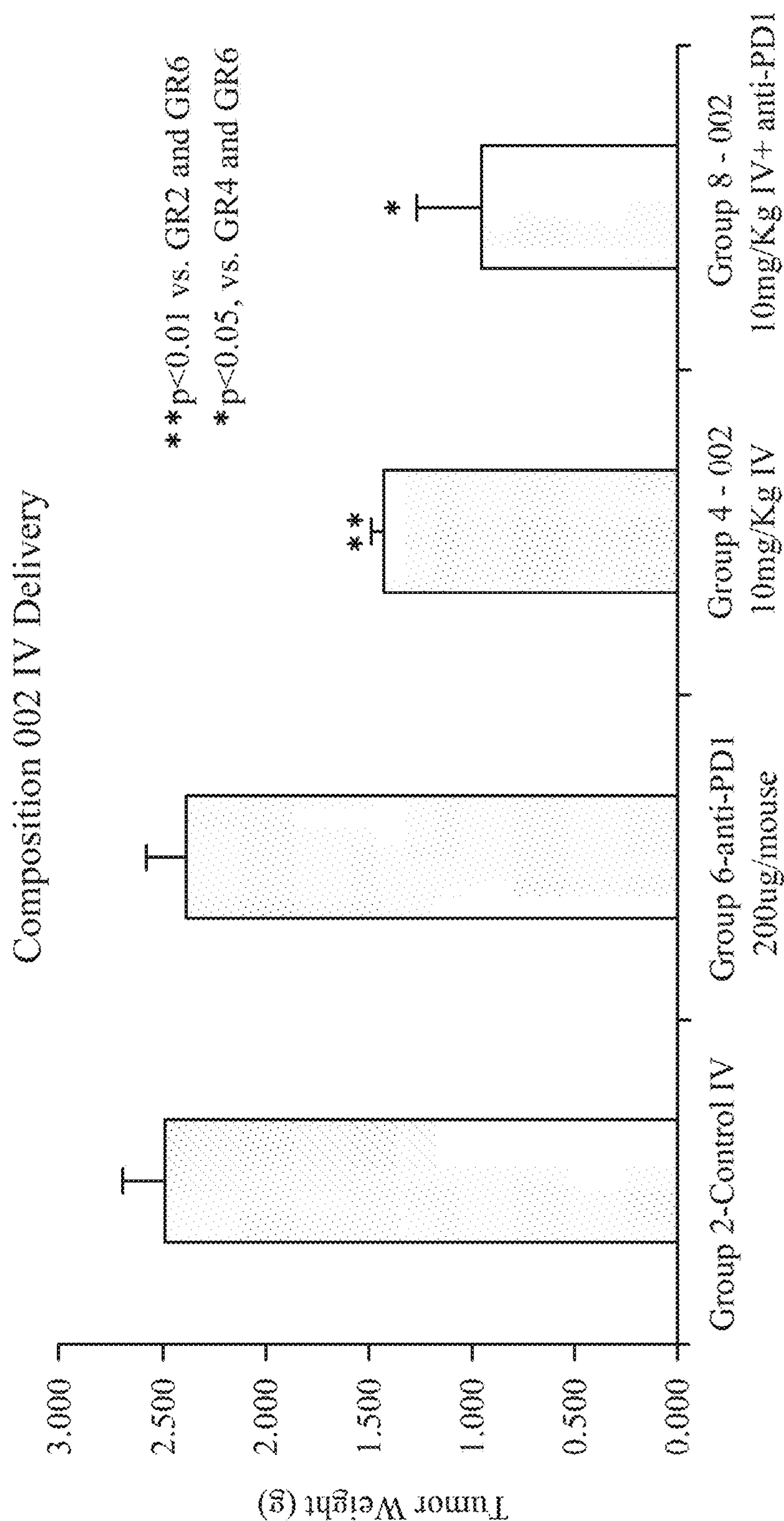
FIGS. 5A-5B: Weigh measure data of primary tumors (FIG. 5A) and spleens (FIG. 5B) of mice dosed with Composition 002 intravenously as a single agent and in combination with anti-PD1 antibody.
Figure 5B:
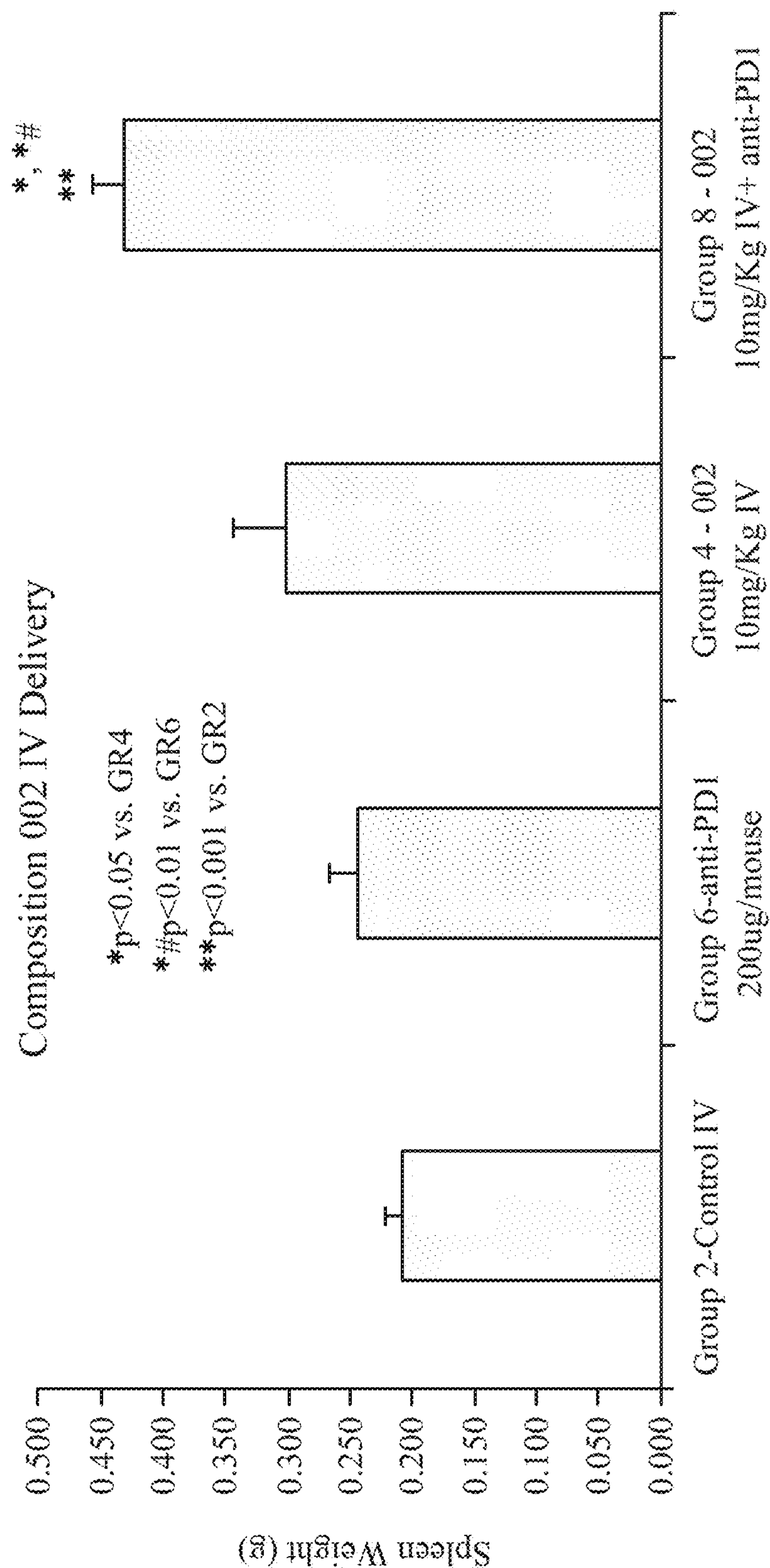
Figure 6A:
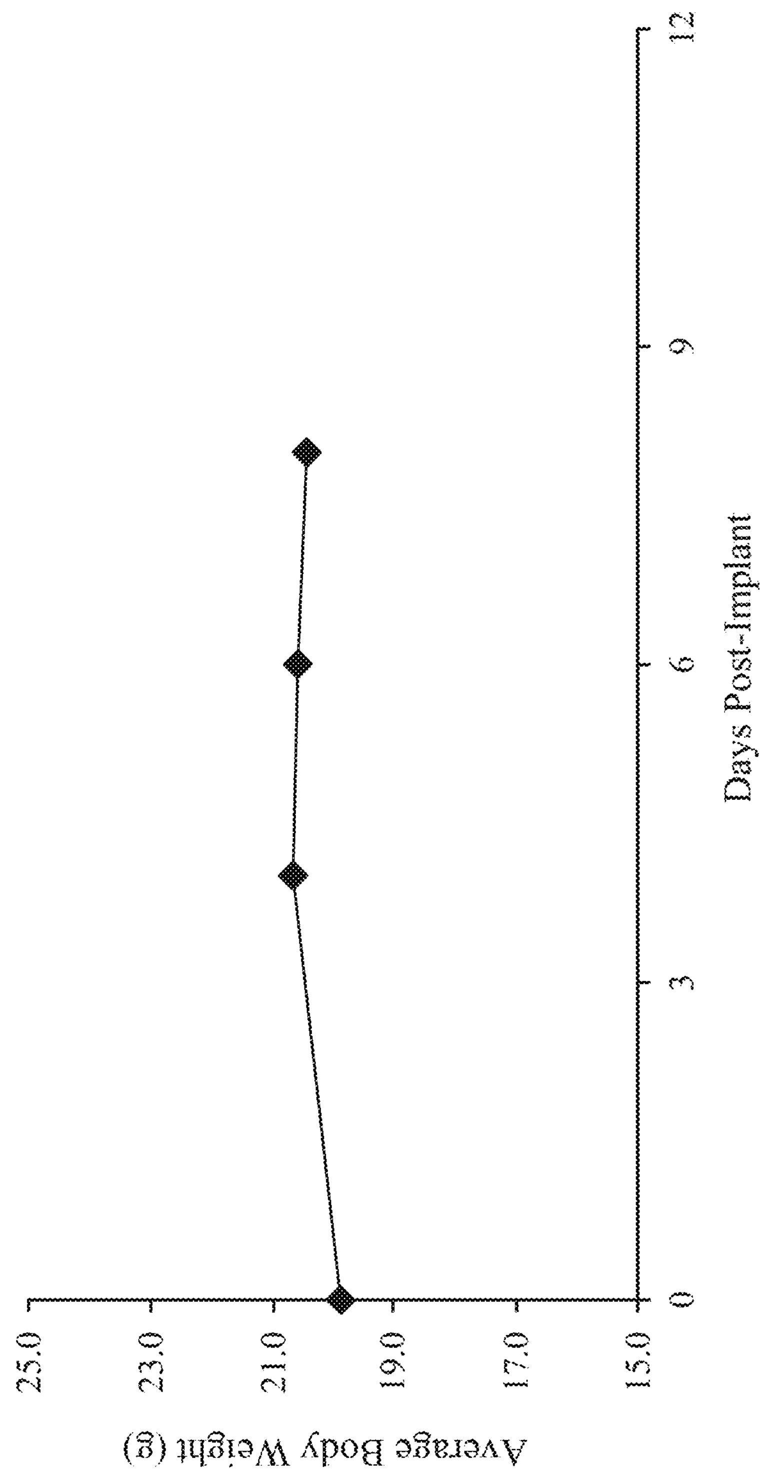
FIGS. 6A-6B: Measure of mouse body weights average (FIG. 6A) and percent body weight change (FIG. 6B) in Balb/c mice bearing EMT6 tumors (pre-randomization).
Figure 6B:
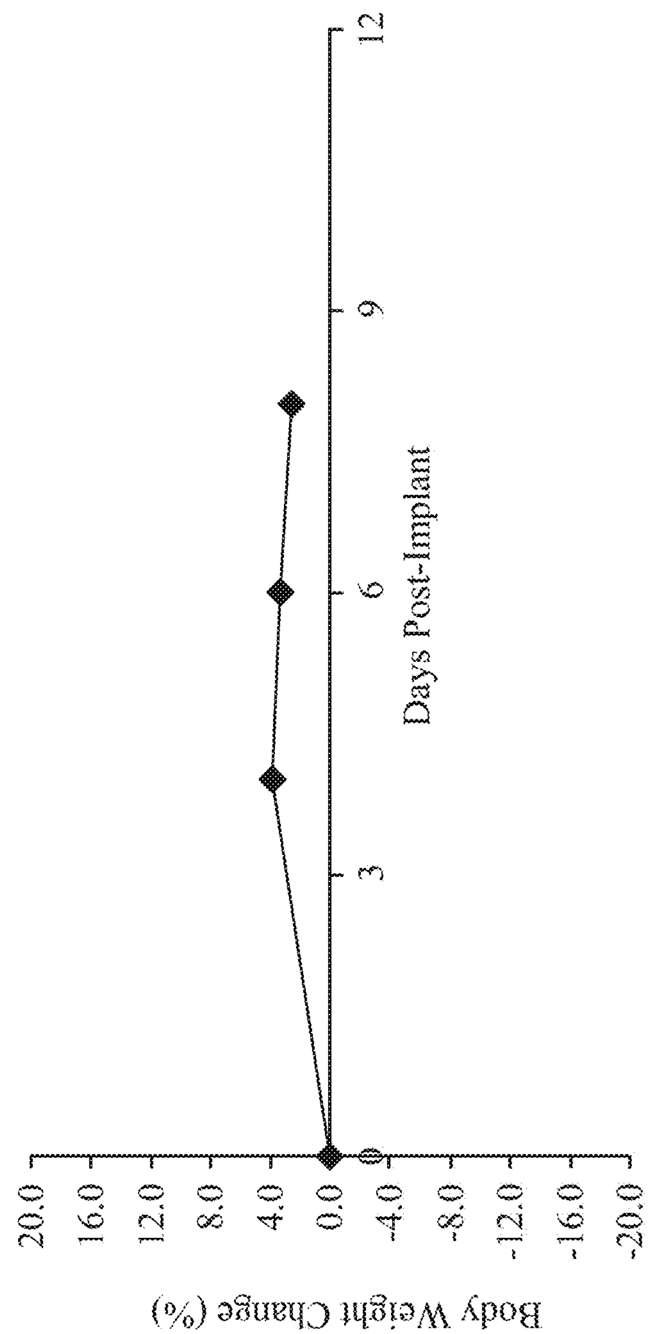

A few mice had tumors that grew larger and presented a dark scab as indicator of beginning ulceration, which led to their euthanasia a few days before the end of the study to be in compliance with the IACUC regulations. As shown by the data and compared with our earlier study (unpublished), this time the implant of a lower number of tumor cells resulted in less aggressive tumor growth and reduced number of large and ulcerated tumors. Both tumors and spleens were also weighed and the weigh data are expressed as mean+SEM are reported graphically in FIGS. 4A-4B (intratumor delivery groups) and FIGS. 5A-5B (intravenous delivery groups). Interestingly, an inverse correlation was found in the size between tumors and spleens: mice that showed better response to Composition 002 had reduced tumor growth and larger spleen. This result was more pronounced and statistically significant in the IV delivery groups that showed the best response to Composition 002 at 10 mg/Kg in combination with anti-PD-1 and the most enlarged spleen indicating a more robust systemic immune response.

Monitoring of body weights and health of mice. During the entire study, the mice were carefully monitored daily for any abnormal signs, including respiratory distress, weakness, lethargy, difficult ambulation, and/or body weight change (e.g. loss), large tumors (i.e. with >2,000 size limit), ulcerated tumors, metastatic burden, and death.

Figure 7A:
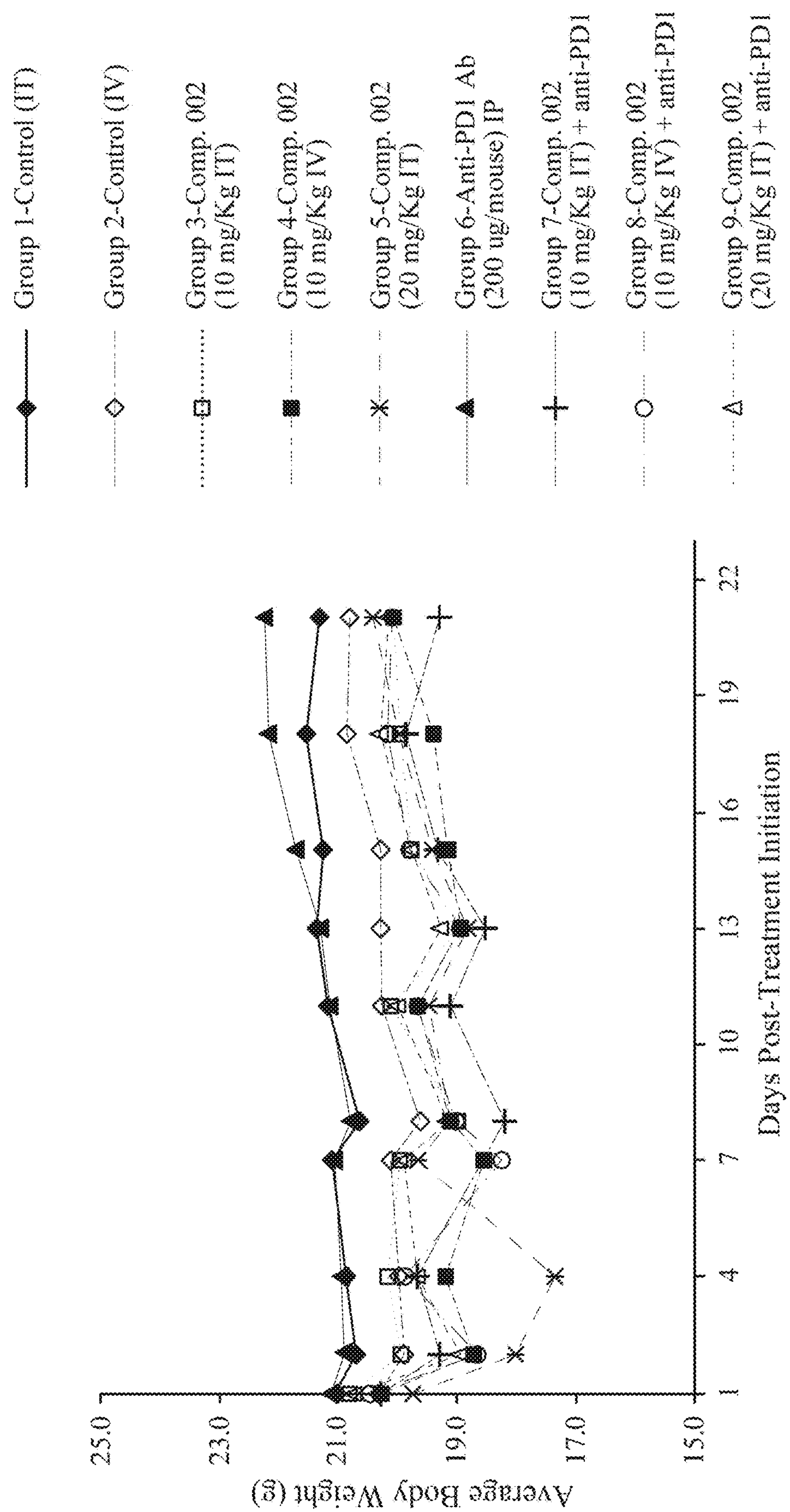
FIGS. 7A-7B: Measure of mouse body weights average (FIG. 7A) and percent body weight change (FIG. 7B) in Balb/c mice bearing EMT6 tumors (post-randomization, all groups).
Figure 7B:
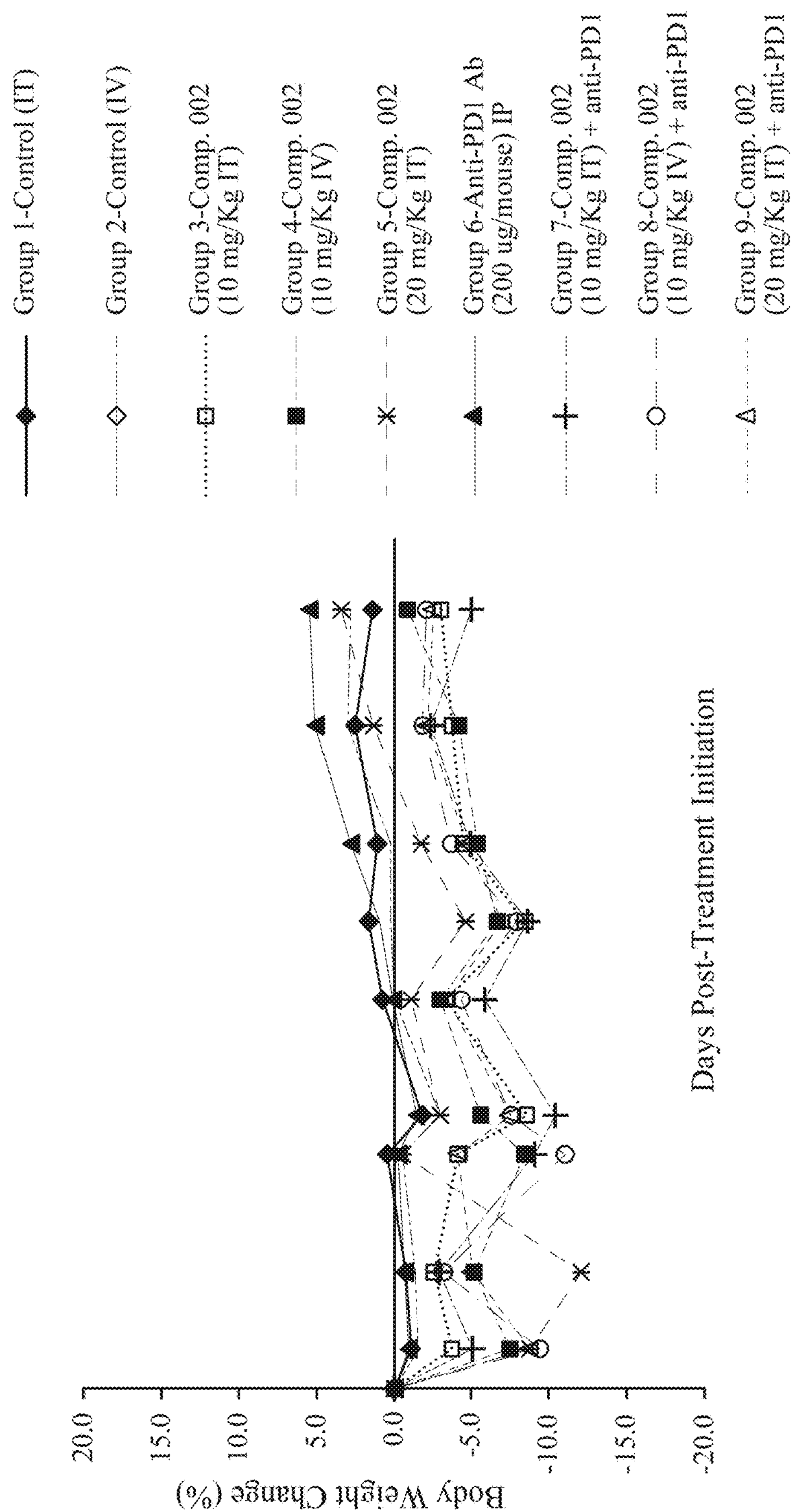
Figure 8A:
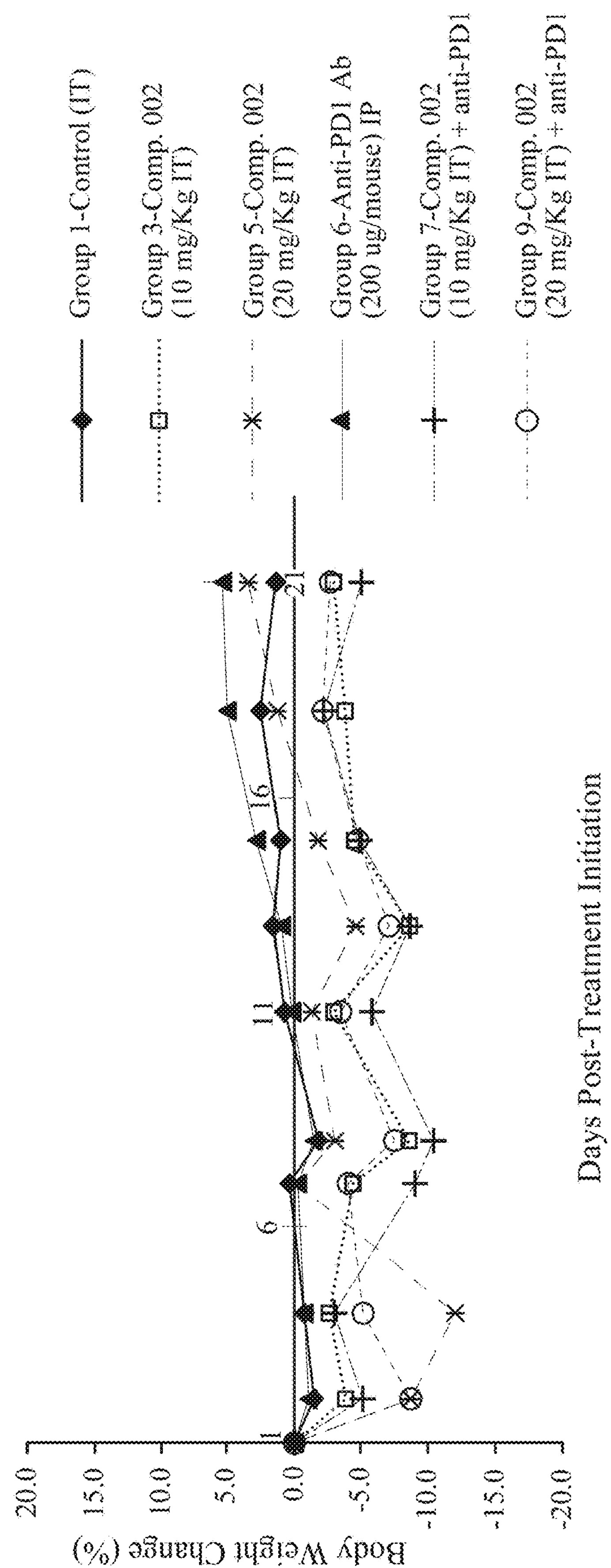
FIGS. 8A-8B: Measure of percent body weight change (post-randomization) in Balb/c mice bearing EMT6 tumors in the intratumor delivery groups (FIG. 8A) and intravenous delivery groups (FIG. 8B).
Figure 8B:
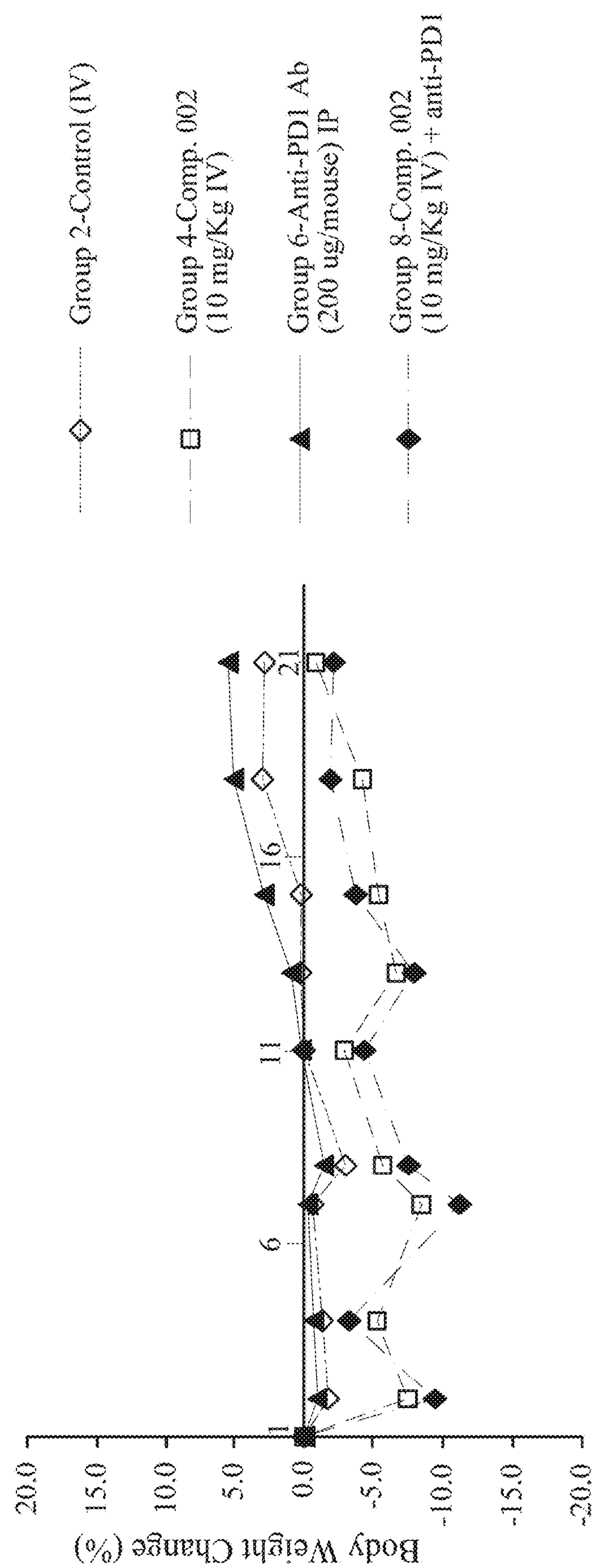

The body weights and health information were recorded and provided in excel files weekly. The body weight data are expressed as average and percent change; the graphic representations of these data for all groups are reported as pre-randomization and post-randomization, in FIGS. 6A and 6B and FIGS. 7A and 7B, respectively. Separate graphic representations of the data for the intratumor and intravenous drug delivery groups are shown in FIGS. 7A and 7B, respectively.

None of the mice showed a significant body weight change, i.e. >15 or >20% weight loss, however the accurate measure could not be done in the mice bearing the largest tumors or enlarged spleens because the increased weight of the tumor or spleen compensated in part for the reduced body weight. There were 2 death events, one in mouse #2 in Group 2 Control and the other in mouse #6 in Group 8 (combination Composition 002 10 mg/Kg IV and anti-PD-1 antibody); while the death of the control mouse was likely due to the large tumor with dark scab/ulceration, the reason of death for the other mouse was perhaps due to either a treatment effect or a strong immune response or a combination of both factors.

The mice with tumors that reached or surpassed the size limit of 2,000 $mm^3$ were euthanized within 24-48 hours to allow the planned harvest and analysis, and to be in compliance with the IACUC protocol requirements.

Flow cytometry analysis of Splenocytes (SPLNs) and Tumor-Infiltrating Lymphocytes (TILs). Following the harvest and process of tumors (for TIL,s) and spleens (for SPLCs), the samples were stained and analyzed by flow cytometry to determine the effect of Composition 002 on the different types of immune cells, according to the immune-phenotyping and selected panels described above in the procedures section. The data as individual duplicates for each sample and average values+standard deviation are reported in Tables 4A-7C. The percentage of T cells subsets in spleens and tumor-derived TIL,s were analyzed with the flow cytometer. The flow cytometry data of the spleen from the mouse #2 in the combination Group 8 (Composition 002 10 mg/Kg intravenously+anti-PD-1) that showed tumor regression were similar to the average values of this group in regard to all the immune phenotypes.

TABLE 4A

FACS analysis data of spleens from the intratumor groups

| Group No | Mouse No | T cells (%) | CD4+ T cells (%) | CD8+ T cells (%) | PD1+ T cells (%) | M1 Macrophages (%) | M2 Macrophages (%) |
|---|---|---|---|---|---|---|---|
| Group 1 | 4 | 21.30 | 55.20 | 23.00 | 15.20 | 40.40 | 53.80 |
| Control | 4 | 21.60 | 52.10 | 23.10 | 13.50 | 40.90 | 52.80 |
| (Saline IT) | 5 | 17.50 | 52.30 | 23.20 | 12.60 | 32.00 | 63.60 |
| | 5 | 18.70 | 50.40 | 21.10 | 16.50 | 27.60 | 68.20 |
| | 6 | 24.20 | 47.50 | 22.60 | 13.10 | 26.00 | 71.10 |
| | 6 | 24.80 | 47.10 | 23.20 | 13.90 | 28.00 | 69.10 |
| | AVG | 21.35 | 50.77 | 22.70 | 14.13 | 32.48 | 63.10 |
| | STDV | 2.90 | 3.10 | 0.81 | 1.46 | 6.63 | 7.99 |
| Group 3 | 1 | 25.90 | 50.00 | 19.20 | 18.50 | 60.60 | 29.50 |
| Composition | 1 | 29.10 | 48.50 | 18.70 | 18.80 | 66.40 | 23.90 |
| 002 (10 | 2 | 28.70 | 50.60 | 20.40 | 18.40 | 67.50 | 24.80 |
| mg/Kg IT) | 2 | 30.20 | 51.00 | 20.70 | 18.70 | 65.80 | 22.10 |
| | 4 | 27.90 | 50.20 | 16.80 | 19.70 | 68.00 | 22.30 |
| | 4 | 28.30 | 48.80 | 16.80 | 20.30 | 71.80 | 20.40 |
| | AVG | 28.35 | 49.85 | 18.77 | 19.07 | 66.68 | 23.83 |
| | STDV | 1.44% | 1.00% | 1.69 | 0.76 | 3.65 | 3.17 |
| Group 5 | 2 | 22.90 | 53.90 | 19.40 | 16.00 | 76.00 | 16.50 |
| Composition | 2 | 23.70 | 53.80 | 19.50 | 16.60 | 72.30 | 16.10 |
| 002 (20 | 5 | 22.70 | 50.90 | 18.70 | 22.00 | 77.70 | 17.30 |
| mg/Kg IT) | 5 | 23.00 | 53.10 | 18.40 | 22.40 | 74.00 | 19.80 |
| | 6 | 18.90 | 57.80 | 21.00 | 18.60 | 74.90 | 17.80 |
| | 6 | 19.60 | 58.50 | 20.70 | 18.40 | 75.20 | 19.40 |
| | AVG | 21.80 | 54.67 | 19.62 | 19.00 | 75.02 | 17.82 |
| | STDV | 2.02 | 2.92 | 1.05 | 2.68 | 1.82% | 1.51 |

TABLE 4A-continued

FACS analysis data of spleens from the intratumor groups

| Group No | Mouse No | T cells (%) | CD4+ T cells (%) | CD8+ T cells (%) | PD1+ T cells (%) | M1 Macro-phages (%) | M2 Macro-phages (%) |
|---|---|---|---|---|---|---|---|
| Group 7 | 1 | 20.40 | 58.90 | 22.90 | 11.70 | 68.90 | 24.00 |
| Composition | 1 | 19.80 | 58.30 | 23.00 | 15.30 | 69.00 | 25.50 |
| 002 0.02 (10 | 3 | 22.90 | 57.30 | 22.50 | 11.50 | 61.50 | 32.00 |
| mg/Kg IT + | 3 | 23.20 | 56.90 | 20.90 | 20.30 | 64.10 | 26.80 |
| anti-PD-1) | 6 | 20.00 | 61.30 | 20.80 | 17.90 | 77.60 | 16.30 |
| | 6 | 20.80 | 62.10 | 19.10 | 24.10 | 72.90 | 17.80 |
| | AVG | 21.18 | 59.13 | 21.53 | 16.80 | 69.00 | 23.73 |
| | STDV | 1.49 | 2.13 | 1.54 | 4.96 | 5.82 | 5.85 |
| Group 9 | 2 | 19.80 | 59.50 | 17.50 | 19.00 | 75.50 | 15.10 |
| Composition | 2 | 19.30 | 62.20 | 16.60 | 16.60 | 74.20 | 15.80 |
| 002 0.02 (20 | 4 | 23.00 | 58.10 | 17.20 | 21.30 | 75.50 | 16.50 |
| mg/Kg IT + | 4 | 23.80 | 57.10 | 18.00 | 21.60 | 70.20 | 21.90 |
| anti-PD-1) | 5 | 18.00 | 59.70 | 15.20 | 27.40 | 73.50 | 16.20 |
| | 5 | 18.10 | 62.00 | 14.90 | 28.70 | 75.90 | 17.30 |
| | AVG | 20.33 | 59.77 | 16.57 | 22.43 | 74.13 | 17.13 |
| | STDV | 2.49 | 2.04 | 1.26 | 4.73 | 2.13 | 2.45 |

TABLE 4B

FACS analysis data of spleens from the intratumor groups

| Group No | Mouse No | PD1+ Macro-phages (%) | NK cells (%) | Granulocytic MDSCs (%) | Monocytic MDSCs (%) | Regulatory T cells (%) |
|---|---|---|---|---|---|---|
| Group 1 | 4 | 5.54 | 1.60 | 60.80 | 19.90 | 9.01 |
| Control | 4 | 3.67 | 1.45 | 63.40 | 17.30 | 9.38 |
| (Saline IT) | 5 | 2.73 | 1.29 | 59.90 | 19.20 | 12.40 |
| | 5 | 5.35 | 1.52 | 59.70 | 18.30 | 14.90 |
| | 6 | 5.37 | 1.19 | 65.20 | 17.60 | 9.34 |
| | 6 | 5.16 | 1.01 | 64.90 | 17.50 | 10.10 |
| | AVG | 4.64 | 1.34 | 62.32 | 18.30 | 10.86 |
| | STDV | 1.16 | 0.22 | 2.28 | 0.96 | 2.13 |
| Group 3 | 1 | 10.60 | 1.70 | 76.30 | 12.50 | 8.96 |
| Composition | 1 | 8.02 | 2.20 | 73.70 | 13.90 | 10.10 |
| 002 (10 | 2 | 8.57 | 1.22 | 72.90 | 13.80 | 8.15 |
| mg/Kg IT) | 2 | 8.85 | 1.27 | 73.60 | 12.70 | 8.85 |
| | 4 | 8.60 | 2.40 | 65.70 | 17.70 | 9.85 |
| | 4 | 8.16 | 2.52 | 64.20 | 18.00 | 9.53 |
| | AVG | 8.80 | 1.89 | 71.07 | 14.77 | 9.24 |
| | STDV | 0.93 | 0.57 | 4.90 | 2.46 | 0.72 |
| Group 5 | 2 | 6.25 | 2.10 | 64.30 | 19.50 | 9.78 |
| Composition | 2 | 6.25 | 2.29 | 63.80 | 20.00 | 10.00 |
| 002 (20 | 5 | 9.26 | 1.24 | 67.00 | 17.70 | 8.47 |
| mg/Kg IT) | 5 | 7.91 | 1.09 | 69.00 | 16.40 | 8.54 |
| | 6 | 4.46 | 0.78 | 62.90 | 20.80 | 10.30 |
| | 6 | 5.43 | 0.76 | 65.10 | 18.20 | 9.35 |
| | AVG | 6.59 | 1.38 | 65.35 | 18.77 | 9.41 |
| | STDV | 1.73 | 0.66 | 2.26 | 1.63 | 0.76 |
| Group 7 | 1 | 5.08 | 1.06 | 58.90 | 22.90 | 12.00 |
| Composition | 1 | 5.17 | 0.97 | 63.80 | 18.80 | 12.50 |
| 002 0.02 (10 | 3 | 6.92 | 1.35 | 59.40 | 20.40 | 9.77 |
| mg/Kg IT + | 3 | 7.64 | 1.62 | 61.70 | 18.50 | 10.10 |
| anti-PD-1) | 6 | 7.34 | 1.75 | 51.40 | 26.20 | 9.51 |
| | 6 | 6.01 | 1.72 | 55.80 | 22.50 | 12.50 |
| | AVG | 6.36 | 1.41 | 58.50 | 21.55 | 11.06 |
| | STDV | 1.10 | 0.34 | 4.40 | 2.92 | 1.42 |
| Group 9 | 2 | 6.51 | 0.83 | 57.90 | 22.30 | 9.21 |
| Composition | 2 | 5.84 | 1.03 | 57.50 | 23.20 | 8.99 |
| 002 0.02 (20 | 4 | 5.36 | 1.18 | 45.20 | 27.00 | 10.00 |
| mg/Kg IT + | 4 | 4.90 | 1.02 | 46.30 | 26.40 | 9.42 |
| anti-PD-1) | 5 | 7.89 | 0.88 | 54.10 | 26.00 | 8.01 |
| | 5 | 6.98 | 0.84 | 55.90 | 24.90 | 8.15 |
| | AVG | 6.25 | 0.96 | 52.82 | 24.97 | 8.96 |
| | STDV | 1.10 | 0.14 | 5.65 | 1.87 | 0.76 |

TABLE 4C

FACS analysis data of spleens from the intratumor groups

| Group No | Mouse No | PD-L1 T Cells (%) | PD-L1 Macrophages (%) | M1/ M2 Ratio | Granulocytes MDSCs/ Monocytes MDSCs Ratio |
|---|---|---|---|---|---|
| Group 1 | 4 | 10.10 | 3.14 | 0.75 | 3.06 |
| Control | 4 | 7.35 | 2.10 | 0.77 | 3.66 |
| (Saline IT) | 5 | 7.84 | 2.64 | 0.50 | 3.12 |
| | 5 | 9.51 | 2.47 | 0.40 | 3.26 |
| | 6 | 7.99 | 1.72 | 0.37 | 3.70 |
| | 6 | 8.37 | 2.42 | 0.41 | 3.71 |
| | AVG | 8.53 | 2.42 | 0.51 | 3.41 |
| | STDV | 1.06 | 0.48 | 0.83 | 2.38 |
| Group 3 | 1 | 20.20 | 26.40 | 2.05 | 6.10 |
| Composition | 1 | 21.50 | 22.00 | 2.78 | 5.30 |
| 002 (10 | 2 | 18.20 | 17.80 | 2.72 | 5.28 |
| mg/Kg IT) | 2 | 18.40 | 17.90 | 2.98 | 5.80 |
| | 4 | 23.60 | 22.30 | 3.05 | 3.71 |
| | 4 | 25.90 | 26.90 | 3.52 | 3.57 |
| | AVG | 21.30 | 22.22 | 2.80 | 4.81 |
| | STDV | 3.02 | 3.94 | 1.15 | 2.00 |
| Group 5 | 2 | 14.50 | 10.40 | 4.61 | 3.30 |
| Composition | 2 | 15.10 | 8.12 | 4.49 | 3.19 |
| 002 (20 | 5 | 15.90 | 21.10 | 4.49 | 3.79 |
| mg/Kg IT) | 5 | 16.20 | 19.30 | 3.74 | 4.21 |
| | 6 | 12.40 | 12.00 | 4.21 | 3.02 |
| | 6 | 12.50 | 9.81 | 3.88 | 3.58 |
| | AVG | 14.43 | 13.46 | 4.21 | 3.48 |
| | STDV | 1.65 | 5.40 | 1.21 | 1.39 |
| Group 7 | 1 | 13.00 | 12.30 | 2.87 | 2.57 |
| Composition | 1 | 14.50 | 9.59 | 2.71 | 3.39 |
| 002 0.02 (10 | 3 | 11.60 | 9.82 | 1.92 | 2.91 |
| mg/Kg IT + | 3 | 17.80 | 14.90 | 2.39 | 3.34 |
| anti-PD-1) | 6 | 18.50 | 22.00 | 4.76 | 1.96 |
| | 6 | 20.60 | 18.60 | 4.10 | 2.48 |
| | AVG | 16.00 | 14.54 | 2.91 | 2.71 |
| | STDV | 3.50 | 4.98 | 0.99 | 1.51 |
| Group 9 | 2 | 16.30 | 13.60 | 5.00 | 2.60 |
| Composition | 2 | 14.80 | 16.30 | 4.70 | 2.48 |
| 002 0.02 (20 | 4 | 20.10 | 18.00 | 4.58 | 1.67 |
| mg/Kg IT + | 4 | 19.70 | 16.80 | 3.21 | 1.75 |
| anti-PD-1) | 5 | 18.90 | 13.80 | 4.54 | 2.08 |
| | 5 | 19.30 | 16.00 | 4.39 | 2.24 |
| | AVG | 18.18 | 15.75 | 4.33 | 2.12 |
| | STDV | 2.13 | 1.73 | 0.87 | 3.02 |

TABLE 5A

FACS analysis data of TILs from the intratumor groups (duplicated measures)

| Group No | Mouse No | T cells (%) | CD4+ T cells (%) | CD8+ T cells (%) | PD1+ T cells (%) | M1 Macro-phages (%) | M2 Macro-phages (%) |
|---|---|---|---|---|---|---|---|
| Group 1 | 4 | 23.80 | 38.50 | 10.40 | 7.72 | 32.40 | 55.30 |
| Control | 4 | 23.20 | 33.80 | 9.13 | 8.49 | 29.60 | 52.90 |
| (Saline | 5 | 32.20 | 76.00 | 10.70 | 5.58 | 23.10 | 57.40 |
| IT) | 5 | 32.70 | 77.70 | 10.10 | 4.81 | 21.70 | 60.20 |
| | 6 | 14.10 | 32.60 | 8.02 | 12.50 | 39.40 | 57.00 |
| | 6 | 15.70 | 36.80 | 3.59 | 12.20 | 41.40 | 55.20 |
| | AVG | 23.62 | 49.23 | 8.66 | 8.55 | 31.27 | 56.33 |
| | STDV | 7.87 | 21.50 | 2.67 | 3.24 | 8.14 | 2.48 |
| Group 3 | 1 | 51.80 | 75.50 | 15.50 | 7.97 | 56.20 | 32.90 |
| Com- | 1 | 52.10 | 76.10 | 15.90 | 10.60 | 58.60 | 27.60 |
| position | 2 | 16.40 | 71.40 | 11.00 | 13.80 | 57.90 | 33.30 |
| 002 (10 | 2 | 15.20 | 68.80 | 13.50 | 10.50 | 56.00 | 25.30 |
| mg/Kg | 4 | 31.20 | 40.30 | 8.99 | 17.40 | 51.30 | 33.30 |
| IT) | 4 | 32.20 | 40.10 | 8.74 | 15.90 | 55.70 | 29.90 |
| | AVG | 33.15 | 62.03 | 12.27 | 12.70 | 55.95 | 30.38 |
| | STDV | 16.21 | 17.12 | 3.16 | 3.61 | 2.55 | 3.38 |
| Group 5 | 2 | 43.00 | 74.20 | 16.80 | 12.10 | 50.80 | 34.90 |
| Com- | 2 | 43.10 | 74.70 | 17.70 | 14.80 | 59.40 | 28.00 |
| position | 5 | 41.40 | 49.20 | 15.10 | 13.60 | 63.20 | 26.40 |

TABLE 5A-continued

FACS analysis data of TILs from the intratumor groups (duplicated measures)

| Group No | Mouse No | T cells (%) | CD4+ T cells (%) | CD8+ T cells (%) | PD1+ T cells (%) | M1 Macro-phages (%) | M2 Macro-phages (%) |
|---|---|---|---|---|---|---|---|
| 002 (20 | 5 | 39.60 | 54.50 | 11.40 | 10.20 | 55.40 | 32.20 |
| mg/Kg | 6 | 11.30 | 32.70 | 13.50 | 11.80 | 54.30 | 40.00 |
| IT) | 6 | 18.20 | 31.10 | 8.11 | 13.70 | 44.40 | 47.20 |
| | AVG | 32.77 | 52.73 | 13.77 | 12.70 | 54.58 | 34.78 |
| | STDV | 14.18 | 19.12 | 3.58 | 1.65 | 6.58 | 7.80 |
| Group 7 | 1 | 21.30 | 66.80 | 17.60 | 12.60 | 53.40 | 37.70 |
| Com- | 1 | 21.60 | 66.30 | 18.60 | 12.90 | 51.60 | 39.40 |
| position | 3 | 20.00 | 67.70 | 18.00 | 12.20 | 64.40 | 30.30 |
| 002 0.02 | 3 | 26.40 | 67.80 | 18.30 | 13.60 | 61.60 | 30.80 |
| (10 mg/ | 6 | 38.60 | 79.40 | 15.10 | 14.60 | 43.70 | 48.50 |
| Kg IT + | 6 | 34.40 | 79.90 | 15.30 | 12.40 | 40.30 | 50.30 |
| anti- | AVG | 27.05 | 71.32 | 17.15 | 13.05 | 52.50 | 39.50 |
| PD-1) | STDV | 7.75 | 6.48 | 1.55 | 0.90 | 9.51 | 8.50 |
| Group 9 | 2 | 25.30 | 43.40 | 16.60 | 14.90 | 53.80 | 38.50 |
| Com- | 2 | 22.70 | 43.80 | 16.90 | 16.60 | 59.60 | 34.90 |
| position | 4 | 63.20 | 79.80 | 18.10 | 11.20 | 50.80 | 44.60 |
| 002 0.02 | 4 | 66.20 | 79.80 | 17.80 | 11.00 | 55.50 | 41.50 |
| (20 mg/ | 5 | 46.30 | 78.90 | 15.50 | 6.13 | 53.90 | 40.80 |
| Kg IT + | 5 | 46.30 | 77.50 | 16.20 | 7.65 | 52.50 | 40.80 |
| anti- | AVG | 45.00 | 67.20 | 16.85 | 11.25 | 54.35 | 40.18 |
| PD-1) | STDV | 18.27 | 18.30 | 0.98 | 4.03 | 3.01 | 3.25 |

TABLE 5B

FACS analysis data of TILs from the intratumor groups (duplicated measures)

| Group No | Mouse No | PD1+ Macro-phages (%) | NK cells (%) | Granu-locytic MDSCs (%) | Mono-cytic MDSCs (%) | Regu-latory T cells (%) |
|---|---|---|---|---|---|---|
| Group 1 | 4 | 10.10 | 3.82 | 11.10 | 22.90 | 5.34 |
| Control | 4 | 10.80 | 3.84 | 13.90 | 22.20 | 6.24 |
| (Saline IT) | 5 | 8.82 | 4.09 | 30.10 | 11.60 | 4.32 |
| | 5 | 12.00 | 7.38 | 28.90 | 7.15 | 4.81 |
| | 6 | 16.70 | 7.00 | 54.70 | 8.76 | 6.82 |
| | 6 | 13.30 | 6.06 | 50.60 | 6.88 | 4.78 |
| | AVG | 11.95 | 5.37 | 31.55 | 13.25 | 5.39 |
| | STDV | 2.79 | 1.65 | 18.10 | 7.40 | 0.96 |
| Group 3 | 1 | 7.69 | 5.84 | 16.70 | 12.50 | 1.49 |
| Composition | 1 | 7.64 | 5.87 | 17.90 | 12.40 | 1.82 |
| 002 (10 | 2 | 7.94 | 6.27 | 65.30 | 8.95 | 7.28 |
| mg/Kg IT) | 2 | 11.10 | 5.45 | 64.90 | 6.90 | 4.09 |
| | 4 | 20.10 | 12.30 | 10.70 | 23.60 | 10.80 |
| | 4 | 16.90 | 12.10 | 9.73 | 23.80 | 16.20 |
| | AVG | 11.90 | 7.97 | 30.87 | 14.69 | 6.95 |
| | STDV | 5.37 | 3.29 | 26.71 | 7.29 | 5.74 |
| Group 5 | 2 | 8.75 | 4.29 | 18.70 | 8.50 | 3.75 |
| Composition | 2 | 7.52 | 4.55 | 15.80 | 7.79 | 2.25 |
| 002 (20 | 5 | 14.30 | 4.72 | 57.70 | 9.62 | 5.00 |
| mg/Kg IT) | 5 | 16.70 | 4.05 | 69.40 | 4.96 | 1.90 |
| | 6 | 5.56 | 3.96 | 77.80 | 3.70 | 11.30 |
| | 6 | 20.00 | 3.48 | 67.40 | 8.14 | 5.00 |
| | AVG | 12.14 | 4.18 | 51.13 | 7.12 | 4.87 |
| | STDV | 5.72 | 0.45 | 27.03 | 2.28 | 3.42 |
| Group 7 | 1 | 15.00 | 2.90 | 31.90 | 11.60 | 8.96 |
| Composition | 1 | 6.77 | 3.19 | 50.50 | 13.90 | 3.23 |
| 002 0.02 (10 | 3 | 4.31 | 3.16 | 30.10 | 12.10 | 8.84 |
| mg/Kg IT + | 3 | 12.60 | 3.82 | 16.40 | 10.30 | 4.72 |
| anti-PD-1) | 6 | 8.79 | 4.78 | 14.90 | 9.68 | 5.15 |
| | 6 | 13.10 | 4.18 | 16.80 | 16.40 | 4.94 |
| | AVG | 10.10 | 3.67 | 26.77 | 12.33 | 5.97 |
| | STDV | 4.14 | 0.72 | 13.77 | 2.48 | 2.37 |
| Group 9 | 2 | 12.10 | 3.37 | 17.70 | 19.90 | 11.20 |
| Composition | 2 | 20.40 | 3.73 | 12.00 | 11.60 | 4.48 |
| 002 0.02 (20 | 4 | 6.67 | 5.43 | 10.30 | 12.00 | 3.37 |
| mg/Kg IT + | 4 | 5.88 | 5.54 | 12.00 | 12.10 | 3.19 |
| anti-PD-1) | 5 | 5.24 | 3.00 | 11.90 | 10.90 | 2.93 |

TABLE 5B-continued

FACS analysis data of TILs from the intratumor groups (duplicated measures)

| Group No | Mouse No | PD1+ Macro-phages (%) | NK cells (%) | Granu-locytic MDSCs (%) | Mono-cytic MDSCs (%) | Regu-latory T cells (%) |
|---|---|---|---|---|---|---|
| | 5 | 8.23 | 3.71 | 58.70 | 18.30 | 2.72 |
| | AVG | 9.75 | 4.13 | 20.43 | 14.13 | 4.65 |
| | STDV | 5.76 | 1.08 | 18.92 | 3.90 | 4.65 |

TABLE 5C

FACS analysis data of TILs from the intratumor groups (duplicated measures)

| Group No | Mouse No | PD-L1 T Cells (%) | PD-L1 Macrophages (%) | M1/M2 Ratio | Granulocytes MDSCs/ Monocytes MDSCs Ratio |
|---|---|---|---|---|---|
| Group 1 | 4 | 24.10 | 7.12 | 0.59 | 0.48 |
| Control | 4 | 24.40 | 8.01 | 0.56 | 0.63 |
| (Saline IT) | 5 | 30.80 | 8.82 | 0.40 | 2.59 |
| | 5 | 28.00 | 7.75 | 0.36 | 4.04 |
| | 6 | 44.90 | 4.17 | 0.69 | 6.24 |
| | 6 | 43.50 | 6.67 | 0.75 | 7.35 |
| | AVG | 32.62 | 7.09 | 0.56 | 2.38 |
| | STDV | 9.32 | 1.61 | 3.29 | 2.45 |
| Group 3 | 1 | 24.20 | 11.10 | 1.71 | 1.34 |
| Composition | 1 | 24.90 | 12.50 | 2.12 | 1.44 |
| 002 (10 | 2 | 48.70 | 9.52 | 1.74 | 7.30 |
| mg/Kg IT) | 2 | 54.20 | 27.80 | 2.21 | 9.41 |
| | 4 | 40.30 | 21.10 | 1.54 | 0.45 |
| | 4 | 39.50 | 20.20 | 1.86 | 0.41 |
| | AVG | 38.63 | 17.04 | 1.84 | 2.10 |
| | STDV | 12.20 | 7.14 | 0.75 | 3.66 |
| Group 5 | 2 | 25.40 | 11.20 | 1.46 | 2.20 |
| Composition | 2 | 26.90 | 7.52 | 2.12 | 2.03 |
| 002 (20 | 5 | 35.50 | 42.90 | 2.39 | 6.00 |
| mg/Kg IT) | 5 | 32.20 | 16.70 | 1.72 | 13.99 |
| | 6 | 32.70 | 17.20 | 1.36 | 21.03 |
| | 6 | 33.80 | 20.00 | 0.94 | 8.28 |
| | AVG | 31.08 | 19.25 | 1.57 | 7.18 |
| | STDV | 4.01 | 12.43 | 0.84 | 11.85 |
| Group 7 | 1 | 21.70 | 11.80 | 1.42 | 2.75 |
| Composition | 1 | 20.10 | 11.30 | 1.31 | 3.63 |
| 002 0.02 (10 | 3 | 22.50 | 19.80 | 2.13 | 2.49 |
| mg/Kg IT + | 3 | 29.70 | 11.80 | 2.00 | 1.59 |
| anti-PD-1) | 6 | 44.00 | 18.70 | 0.90 | 1.54 |
| | 6 | 43.00 | 21.20 | 0.80 | 1.02 |
| | AVG | 30.17 | 15.77 | 1.33 | 2.17 |
| | STDV | 10.85 | 4.60 | 1.12 | 5.55 |
| Group 9 | 2 | 31.60 | 15.50 | 1.40 | 0.89 |
| Composition | 2 | 29.20 | 18.40 | 1.71 | 1.03 |
| 002 0.02 (20 | 4 | 46.30 | 22.60 | 1.14 | 0.86 |
| mg/Kg IT + | 4 | 46.00 | 22.10 | 1.34 | 0.99 |
| anti-PD-1) | 5 | 18.50 | 11.40 | 1.32 | 1.09 |
| | 5 | 19.30 | 7.36 | 1.29 | 3.21 |
| | AVG | 31.82 | 16.23 | 1.35 | 1.45 |
| | STDV | 12.26 | 6.04 | 0.93 | 4.85 |

TABLE 6A

FACS analysis data of spleens from the intravenous groups

| Group No | Mouse No | T cells (%) | CD4+ T cells (%) | CD8+ T cells (%) | PD1+ T cells (%) | M1 Macro-phages (%) | M2 Macro-phages (%) |
|---|---|---|---|---|---|---|---|
| Group 2 | 3 | 24.30 | 63.80 | 23.50 | 7.21 | 20.10 | 75.80 |
| Control | 3 | 25.00 | 60.10 | 26.30 | 9.21 | 24.00 | 71.90 |
| IV | 5 | 20.10 | 62.70 | 22.60 | 10.90 | 16.90 | 79.50 |

TABLE 6A-continued

FACS analysis data of spleens from the intravenous groups

| Group No | Mouse No | T cells (%) | CD4+ T cells (%) | CD8+ T cells (%) | PD1+ T cells (%) | M1 Macro-phages (%) | M2 Macro-phages (%) |
|---|---|---|---|---|---|---|---|
| | 5 | 19.30 | 63.40 | 25.00 | 8.78 | 22.10 | 73.50 |
| | 6 | 20.90 | 63.50 | 23.00 | 9.94 | 21.10 | 74.80 |
| | 6 | 19.50 | 59.90 | 25.40 | 12.10 | 24.30 | 73.10 |
| | AVG | 21.52 | 62.23 | 24.30 | 9.69 | 21.42 | 74.77 |
| | STDV | 2.50 | 1.77 | 1.48 | 1.71 | 2.75 | 2.69 |
| Group 4 | 1 | 21.20 | 66.30 | 18.40 | 19.90 | 51.70 | 44.10 |
| Com- | 1 | 21.10 | 64.50 | 17.40 | 28.10 | 66.40 | 24.60 |
| position | 3 | 20.10 | 59.90 | 21.30 | 21.30 | 64.70 | 28.80 |
| 002 | 3 | 19.50 | 59.30 | 23.70 | 18.40 | 62.00 | 29.40 |
| 10 mg/ | 5 | 20.30 | 63.90 | 20.00 | 21.80 | 62.00 | 28.30 |
| Kg IV | 5 | 19.60 | 63.60 | 19.90 | 25.00 | 62.50 | 28.40 |
| | AVG | 20.30 | 62.92 | 20.12 | 22.42 | 61.55 | 30.60 |
| | STDV | 0.72 | 2.74 | 2.22 | 3.55 | 5.13 | 6.83% |
| Group 6 | 2 | 18.10 | 59.50 | 26.80 | 12.50 | 34.60 | 58.30 |
| Anti- | 2 | 19.80 | 58.20 | 27.70 | 11.30 | 27.60 | 68.30 |
| PD-1 | 3 | 18.00 | 58.20 | 24.30 | 14.60 | 23.80 | 72.10 |
| IP (200 | 3 | 17.10 | 56.00 | 26.10 | 15.30 | 27.60 | 69.60 |
| ug/ | 5 | 22.70 | 59.70 | 26.20 | 12.20 | 25.50 | 70.80 |
| mouse) | 5 | 21.40 | 60.90 | 27.00 | 11.10 | 24.60 | 71.50 |
| | AVG | 19.52 | 58.75 | 26.35 | 12.83 | 27.28 | 68.43 |
| | STDV | 2.19 | 1.69 | 1.16 | 1.74 | 3.91% | 5.15% |
| Group 8 | 3 | 17.10 | 61.40 | 21.00 | 19.80 | 65.80 | 28.00 |
| Com- | 3 | 15.20 | 61.00 | 17.30 | 23.60 | 62.60 | 28.60 |
| position | 4 | 22.20 | 66.00 | 17.90 | 24.70 | 71.30 | 19.90 |
| 002 | 4 | 23.20 | 65.10 | 18.00 | 22.90 | 67.40 | 24.10 |
| 10 | 5 | 21.80 | 66.00 | 17.50 | 25.60 | 67.30 | 23.70 |
| mg/Kg | 5 | 22.90 | 64.80 | 17.30 | 24.40 | 73.50 | 17.00 |
| IV + | AVG | 20.40 | 64.05 | 18.17 | 23.50 | 67.98 | 23.55 |
| anti- | STDV | 3.38 | 2.26 | 1.42 | 2.04 | 3.90 | 4.51 |
| PD1 | 2 | 24.60 | 69.90 | 16.40 | 21.30 | 67.10 | 26.50 |
| | 2 | 25.50 | 68.10 | 19.10 | 21.50 | 72.00 | 20.80 |
| | AVG | 25.05 | 69.00 | 17.75 | 21.40 | 69.55 | 23.65 |

TABLE 6B

FACS analysis data of spleens from the intravenous groups

| Group No | Mouse No | PD1+ Macro-phages (%) | NK cells (%) | Granu-locytic MDSCs (%) | Mono-cytic MDSCs (%) | Regu-latory T cells (%) |
|---|---|---|---|---|---|---|
| Group 2 | 3 | 9.32 | 1.33 | 53.80 | 20.30 | 12.30 |
| Control | 3 | 11.80 | 1.31 | 50.50 | 24.20 | 13.30 |
| IV | 5 | 12.00 | 1.68 | 44.30 | 26.10 | 14.70 |
| | 5 | 11.00 | 1.98 | 41.50 | 24.10 | 17.00 |
| | 6 | 12.70 | 2.24 | 41.00 | 26.80 | 15.70 |
| | 6 | 14.30 | 2.03 | 44.10 | 26.30 | 15.20 |
| | AVG | 11.85 | 1.76 | 45.87 | 24.63 | 14.70 |
| | STDV | 1.67 | 0.39 | 5.15 | 2.40 | 1.69 |
| Group 4 | 1 | 13.50 | 1.32 | 54.40 | 22.80 | 10.80 |
| Com- | 1 | 17.60 | 1.24 | 53.00 | 24.70 | 9.78 |
| position | 3 | 10.60 | 1.14 | 52.80 | 24.00 | 14.40 |
| 002 | 3 | 9.72 | 1.09 | 56.50 | 22.80 | 13.50 |
| 10 mg/Kg | 5 | 12.70 | 1.05 | 61.80 | 19.90 | 11.70 |
| IV | 5 | 15.50 | 1.00 | 65.50 | 18.80 | 11.60 |
| | AVG | 13.27 | 1.14 | 57.33 | 22.17 | 11.96 |
| | STDV | 2.96 | 0.12 | 5.20 | 2.33 | 1.71 |
| Group 6 | 2 | 12.10 | 1.21 | 60.70 | 18.70 | 11.80 |
| Anti-PD-1 | 2 | 8.39 | 1.39 | 60.80 | 19.70 | 12.20 |
| IP (200 | 3 | 10.90 | 1.36 | 58.00 | 21.50 | 17.10 |
| ug/mouse) | 3 | 11.30 | 1.47 | 59.10 | 21.10 | 16.10 |
| | 5 | 11.10 | 1.37 | 50.90 | 23.90 | 13.30 |
| | 5 | 9.35 | 1.36 | 59.70 | 17.70 | 13.90 |
| | AVG | 10.52 | 1.36 | 58.20 | 20.43 | 14.07 |
| | STDV | 1.38 | 0.08 | 3.73 | 2.22 | 2.12 |
| Group 8 | 3 | 14.20 | 1.16 | 66.20 | 17.90 | 11.00 |
| Com- | 3 | 12.70 | 0.93 | 61.80 | 16.90 | 11.30 |
| position | 4 | 13.50 | 0.88 | 61.30 | 19.30 | 8.80 |
| 002 | 4 | 13.70 | 1.10 | 59.00 | 20.10 | 7.96 |

TABLE 6B-continued

FACS analysis data of spleens from the intravenous groups

| Group No | Mouse No | PD1+ Macrophages (%) | NK cells (%) | Granulocytic MDSCs (%) | Monocytic MDSCs (%) | Regulatory T cells (%) |
|---|---|---|---|---|---|---|
| 10 mg/Kg | 5 | 14.30 | 0.77 | 59.70 | 18.90 | 7.47 |
| IV + anti- | 5 | 13.30 | 0.88 | 66.90 | 18.20 | 7.34 |
| PD1 | AVG | 13.62 | 0.95 | 62.48 | 18.55 | 8.98 |
| | STDV | 0.59 | 0.15 | 3.32 | 1.13 | 1.76 |
| | 2 | 14.00 | 1.03 | 49.80 | 18.80 | 6.01 |
| | 2 | 11.60 | 1.13 | 64.50 | 17.90 | 7.55 |
| | AVG | 12.80 | 1.08 | 57.15 | 18.35 | 6.78 |

TABLE 6C

FACS analysis data of spleens from the intravenous groups

| Group No | Mouse No | PD-L1 T Cells (%) | PD-L1 Macrophages (%) | M1/M2 Ratio | Granulocytes MDSCs/Monocytes MDSCs Ratio |
|---|---|---|---|---|---|
| Group 2 | 3 | 8.86 | 2.56 | 0.27 | 2.65 |
| Control IV | 3 | 7.89 | 2.60 | 0.33 | 2.09 |
| | 5 | 7.48 | 1.72 | 0.21 | 1.70 |
| | 5 | 5.74 | 2.95 | 0.30 | 1.72 |
| | 6 | 6.58 | 2.80 | 0.28 | 1.53 |
| | 6 | 8.42 | 3.99 | 0.33 | 1.68 |
| | AVG | 7.50 | 2.77 | 0.29 | 1.86 |
| | STDV | 1.17 | 0.73 | 1.02 | 2.14 |
| Group 4 | 1 | 18.70 | 21.50 | 1.17 | 2.39 |
| Composition | 1 | 25.00 | 33.60 | 2.70 | 2.15 |
| 002 | 3 | 19.30 | 25.80 | 2.25 | 2.20 |
| 10 mg/Kg IV | 3 | 18.20 | 20.70 | 2.11 | 2.48 |
| | 5 | 17.70 | 28.40 | 2.19 | 3.11 |
| | 5 | 18.70 | 27.60 | 2.20 | 3.48 |
| | AVG | 19.60 | 26.27 | 2.01 | 2.59 |
| | STDV | 2.70 | 4.78 | 0.75 | 2.24 |
| Group 6 | 2 | 11.20 | 6.06 | 0.59 | 3.25 |
| Anti-PD-1 IP | 2 | 5.71 | 1.19 | 0.40 | 3.09 |
| (200 | 3 | 10.10 | 2.21 | 0.33 | 2.70 |
| ug/mouse) | 3 | 9.03 | 1.46 | 0.40 | 2.80 |
| | 5 | 5.53 | 1.61 | 0.36 | 2.13 |
| | 5 | 8.27 | 2.56 | 0.34 | 3.37 |
| | AVG | 8.31 | 2.52 | 0.40 | 2.85 |
| | STDV | 2.30 | 1.81 | 0.76 | 1.68 |
| Group 8 | 3 | 16.10 | 10.80 | 2.35 | 3.70 |
| Composition | 3 | 18.00 | 15.90 | 2.19 | 3.66 |
| 002 | 4 | 28.70% | 31.60 | 3.58 | 3.18 |
| 10 mg/Kg | 4 | 26.60 | 32.20 | 2.80 | 2.94 |
| IV + | 5 | 27.40 | 34.80 | 2.84 | 3.16 |
| anti-PD1 | 5 | 27.40 | 36.50 | 4.32 | 3.68 |
| | AVG | 24.03 | 26.97 | 2.89 | 3.37 |
| | STDV | 5.48 | 10.82 | 0.86 | 2.94 |
| | 2 | 17.10 | 36.60 | 2.53 | 2.65 |
| | 2 | 15.50 | 33.30 | 3.46 | 3.60 |
| | AVG | 16.30 | 34.95 | 2.94 | 3.11 |

TABLE 7A

FACS analysis data of TILs from the intravenous groups (duplicate measures)

| Group No | Mouse No | T cells (%) | CD4+ T cells (%) | CD8+ T cells (%) | PD1+ T cells (%) | M1 Macrophages (%) | M2 Macrophages (%) |
|---|---|---|---|---|---|---|---|
| Group 2 | 3 | 32.70 | 39.30 | 10.90 | 10.30 | 34.10 | 62.90 |
| Control | 3 | 32.60 | 26.10 | 9.14 | 15.50 | 22.30 | 69.10 |
| IV | 5 | 34.10 | 47.70 | 11.70 | 19.70 | 12.50 | 83.40 |
| | 5 | 36.20 | 45.70 | 13.70 | 26.80 | 11.70 | 84.70 |
| | 6 | 52.20 | 12.60 | 2.36 | 23.60 | 39.20 | 51.90 |
| | 6 | 48.90 | 15.30 | 2.23 | 20.90 | 34.30 | 57.60 |
| | AVG | 39.45 | 31.12 | 8.34 | 19.47 | 25.68 | 68.27 |
| | STDV | 8.76 | 15.32 | 4.91 | 5.88 | 11.90 | 13.49 |
| Group 4 | 1 | 59.60 | 4.32 | 0.94 | 34.50 | 35.80 | 63.00 |
| Com- | 1 | 48.20 | 9.34 | 2.71 | 31.70 | 38.30 | 61.40 |
| position | 3 | 59.10 | 6.22 | 2.72 | 19.80 | 53.20 | 43.50 |
| 002 | 3 | 71.80 | 1.85 | 0.92 | 19.80 | 56.30 | 40.10 |
| 10 mg/ | 5 | 40.10 | 8.89 | 5.23 | 56.40 | 42.50 | 50.00 |
| Kg IV | 5 | 42.50 | 11.10 | 5.79 | 60.60 | 46.50 | 48.80 |
| | AVG | 53.55 | 6.95 | 3.05 | 37.13 | 45.43 | 51.13 |
| | STDV | 12.10 | 3.47 | 2.07 | 17.66 | 8.15 | 9.31 |
| Group 6 | 2 | 32.00 | 42.10 | 9.78 | 18.50 | 22.00 | 80.50 |
| Anti- | 2 | 31.60 | 43.60 | 10.50 | 13.60 | 37.00 | 61.10 |
| PD-1 | 3 | 56.50 | 80.20 | 16.30 | 5.24 | 31.00 | 69.00 |
| IP (200 | 3 | 53.00 | 78.80 | 13.80 | 10.10 | 28.90 | 64.40 |
| ug/ | 5 | 32.50 | 69.80 | 12.10 | 7.38 | 29.10 | 68.60 |
| mouse) | 5 | 36.00 | 66.40 | 13.80 | 10.70 | 26.20 | 71.80 |
| | AVG | 40.27 | 63.48 | 12.71 | 10.92 | 29.03 | 69.23 |
| | STDV | 11.38 | 16.82 | 2.41 | 4.69 | 5.00 | 6.69 |
| Group 8 | 3 | 34.10 | 40.80 | 14.40 | 23.00 | 41.00 | 54.10 |
| Com- | 3 | 29.50 | 52.30 | 17.20 | 29.10 | 41.80 | 57.50 |
| position | 4 | 35.40 | 27.80 | 7.55 | 17.30 | 36.20 | 57.80 |
| 002 | 4 | 41.60 | 22.10 | 5.68 | 8.33 | 41.10 | 53.90 |
| 10 mg/ | 5 | 57.80 | 4.98 | 1.36 | 36.40 | 49.30 | 40.80 |
| Kg IV + | 5 | 42.90 | 10.90 | 4.01 | 44.40 | 45.40 | 44.50 |
| anti- | AVG | 40.22 | 26.48 | 8.37 | 26.42 | 42.47 | 51.43 |
| PD1 | STDV | 9.94 | 17.88 | 6.17 | 13.06 | 4.45 | 7.09 |

TABLE 7B

FACS analysis data of TILs from the intravenous groups (duplicate measures)

| Group No | Mouse No | PD1+ Macrophages (%) | NK cells (%) | Granulocytic MDSCs (%) | Monocytic MDSCs (%) | Regulatory T cells (%) |
|---|---|---|---|---|---|---|
| Group 2 | 3 | 19.40 | 1.03 | 66.90 | 4.95 | 8.09 |
| Control | 3 | 12.80 | 1.08 | 71.40 | 2.96 | 5.36 |
| IV | 5 | 19.60 | 2.15 | 67.50 | 4.24 | 7.41 |
| | 5 | 17.10 | 1.70 | 71.90 | 3.06 | 5.38 |
| | 6 | 17.30 | 0.94 | 68.00 | 3.43 | 3.45 |
| | 6 | 14.50 | 1.08 | 68.70 | 3.63 | 5.86 |
| | AVG | 16.78 | 1.33 | 69.07 | 3.71 | 5.93 |
| | STDV | 2.69 | 0.49 | 2.09 | 0.76 | 1.75 |
| Group 4 | 1 | 26.10 | 1.26 | 67.90 | 4.16 | 11.14 |
| Com- | 1 | 26.90 | 1.86 | 66.50 | 4.02 | 18.50 |
| position | 3 | 20.40 | 0.94 | 62.30 | 4.20 | 7.14 |
| 002 | 3 | 23.40 | 1.31 | 62.80 | 4.27 | 9.38 |
| 10 mg/ | 5 | 18.30 | 1.51 | 64.30 | 8.98 | 15.50 |
| Kg IV | 5 | 17.10 | 1.50 | 64.90 | 8.88 | 11.10 |
| | AVG | 22.03 | 1.40 | 64.78 | 5.75 | 12.13 |
| | STDV | 4.08 | 0.31 | 2.15 | 2.46 | 4.16 |
| Group 6 | 2 | 8.54 | 0.94 | 65.10 | 1.64 | 2.70 |
| Anti-PD- | 2 | 5.56 | 1.09 | 64.30 | 1.93 | 2.46 |
| 1 IP | 3 | 6.90 | 1.02 | 79.40 | 2.19 | 2.89 |
| (200 ug/ | 3 | 8.89 | 0.96 | 76.30 | 2.74 | 2.84 |
| mouse) | 5 | 9.30 | 0.77 | 79.90 | 2.27 | 2.07 |
| | 5 | 11.70 | 0.83 | 79.20 | 1.82 | 2.93 |
| | AVG | 8.48 | 0.94 | 74.03 | 2.10 | 2.65 |
| | STDV | 2.11 | 0.12 | 7.34 | 0.39 | 0.33 |
| Group 8 | 3 | 10.70 | 3.47 | 29.90 | 9.10 | 6.46 |
| Com- | 3 | 10.30 | 3.51 | 30.20 | 8.35 | 8.12 |
| position | 4 | 16.10 | 2.02 | 52.70 | 5.00 | 8.18 |
| 002 | 4 | 13.70 | 1.72 | 51.20 | 4.85 | 9.09 |
| 10 mg/ | 5 | 12.50 | 3.94 | 47.20 | 13.60 | 16.90 |
| Kg IV + | 5 | 13.40 | 3.13 | 49.80 | 12.20 | 15.40 |

TABLE 7B-continued

FACS analysis data of TILs from the intravenous groups (duplicate measures)

| Group No | Mouse No | PD1+ Macro-phages (%) | NK cells (%) | Granu-locytic MDSCs (%) | Mono-cytic MDSCs (%) | Regu-latory T cells (%) |
|---|---|---|---|---|---|---|
| anti- | AVG | 12.78 | 2.97 | 43.50 | 8.85 | 10.69 |
| PD1 | STDV | 2.14 | 0.89 | 10.58 | 3.60 | 4.34 |

TABLE 7C

FACS analysis data of TILs from the intravenous groups (duplicate measures)

| Group No | Mouse No | PD-L1 T Cells (%) | PD-L1 Macro-phages (%) | M1/ M2 Ratio | Granulocytes MDSCs/ Monocytes MDSCs Ratio |
|---|---|---|---|---|---|
| Group 2 | 3 | 14.40 | 5.36 | 0.54 | 13.52 |
| Control IV | 3 | 10.30 | 4.15 | 0.32 | 24.12 |
| | 5 | 45.90 | 4.15 | 0.15 | 15.92 |
| | 5 | 46.30 | 3.20 | 0.14 | 23.50 |
| | 6 | 12.50 | 5.30 | 0.76 | 19.83 |
| | 6 | 10.40 | 4.71 | 0.60 | 18.93 |
| | AVG | 23.30 | 4.48 | 0.38 | 18.61 |
| | STDV | 17.73 | 0.82 | 0.88 | 2.75 |
| Group 4 | 1 | 27.60 | 6.06 | 0.57 | 16.32 |
| Composition | 1 | 24.40 | 4.48 | 0.62 | 16.54 |
| 002 | 3 | 18.50 | 8.60 | 1.22 | 14.83 |
| 10 mg/Kg IV | 3 | 14.30 | 10.20 | 1.40 | 14.71 |
| | 5 | 30.80 | 30.00 | 0.85 | 7.16 |
| | 5 | 15.20 | 24.80 | 0.95 | 7.31 |
| | AVG | 21.80 | 14.02 | 0.89 | 11.26 |
| | STDV | 6.81 | 10.68 | 0.88 | 0.87 |
| Group 6 | 2 | 14.80 | 1.22 | 0.27 | 39.70 |
| Anti-PD-1 IP | 2 | 10.60 | 1.85 | 0.61 | 33.32 |
| (200 | 3 | 11.00 | 3.45 | 0.45 | 36.26 |
| ug/mouse) | 3 | 6.47 | 6.67 | 0.45 | 27.85 |
| | 5 | 9.02 | 4.65 | 0.42 | 35.20 |
| | 5 | 15.70 | 3.88 | 0.36 | 43.52 |
| | AVG | 11.27 | 3.62 | 0.42 | 35.28 |
| | STDV | 3.48 | 1.97 | 0.75 | 18.77 |
| Group 8 | 3 | 39.00 | 22.40 | 0.75 | 3.29 |
| Composition | 3 | 44.20 | 20.50 | 0.73 | 3.62 |
| 002 | 4 | 40.70 | 4.59 | 0.63 | 10.54 |
| 10 mg/Kg | 4 | 30.60 | 5.81 | 0.76 | 10.56 |
| IV + anti-PD1 | 5 | 40.90 | 23.00 | 1.21 | 3.47 |
| | 5 | 33.30 | 21.00 | 1.02 | 4.08 |
| | AVG | 38.12 | 16.22 | 0.83 | 4.92 |
| | STDV | 5.14 | 8.59 | 0.63 | 2.93 |

The graphic representations of the immune cells percent data, displayed in scatter plots, are shown in FIGS. 9-19. These results compare the two delivery routes of Composition 002 at the dose of 10 mg/Kg dose. The statistical analysis to determine significant differences in the expression of the selected markers between the groups was performed using the unpaired t-test and one-way ANOVA using GraphPad Prism 9.

Figure 9A:
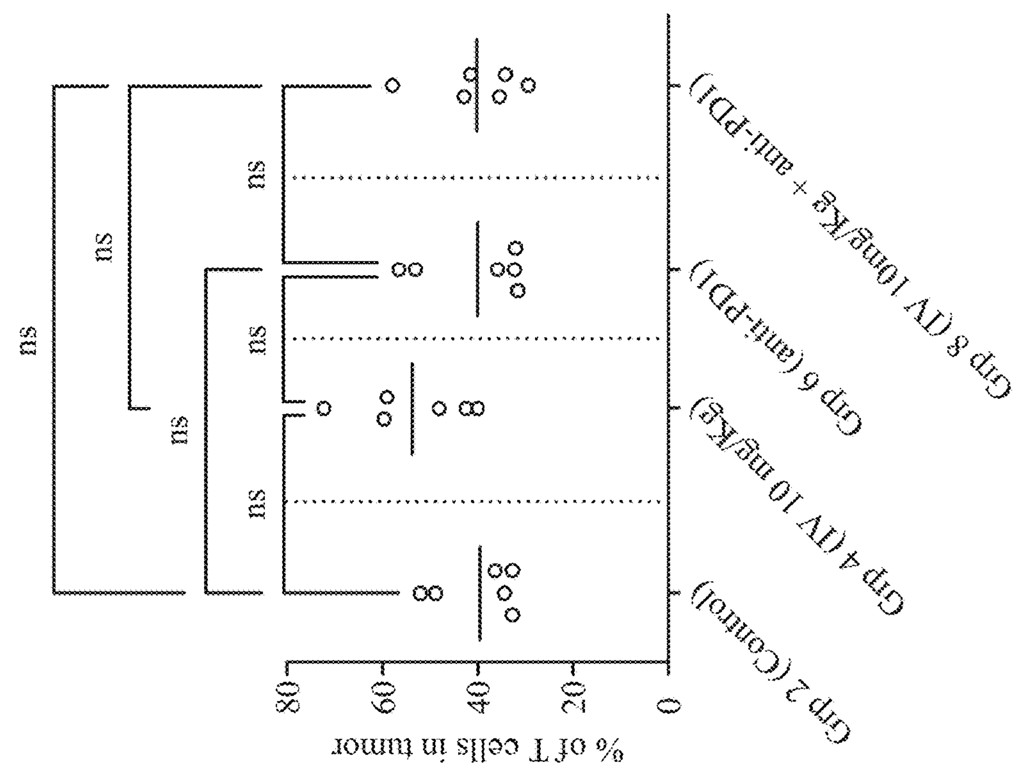
FIGS. 9A-9B: Analysis of % $CD3^+$ T cells (gated on $CD45^+$ $CD3^+$) in spleen (Left) and tumors-TILs (Right) of the intravenous treatment groups (FIG. 9A) and intratumor groups (FIG. 9B).
Figure 9A:
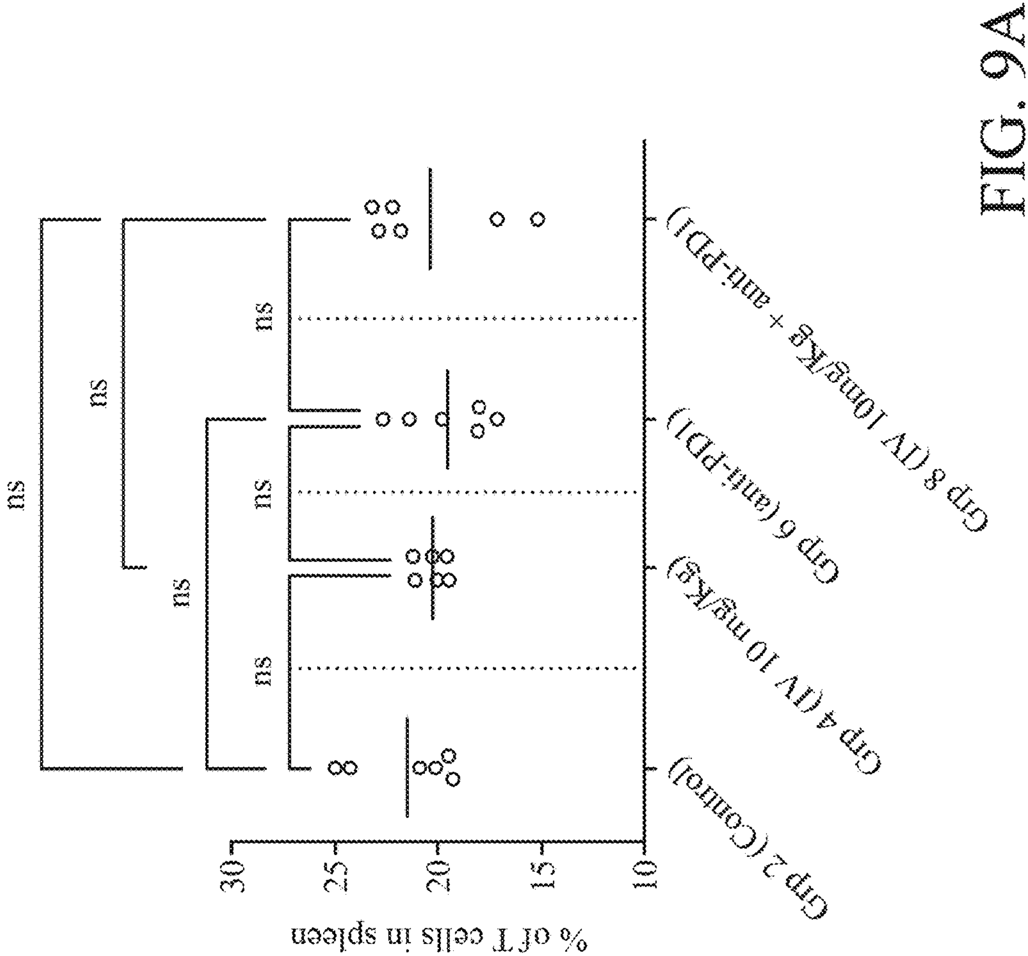
Figure 9B:
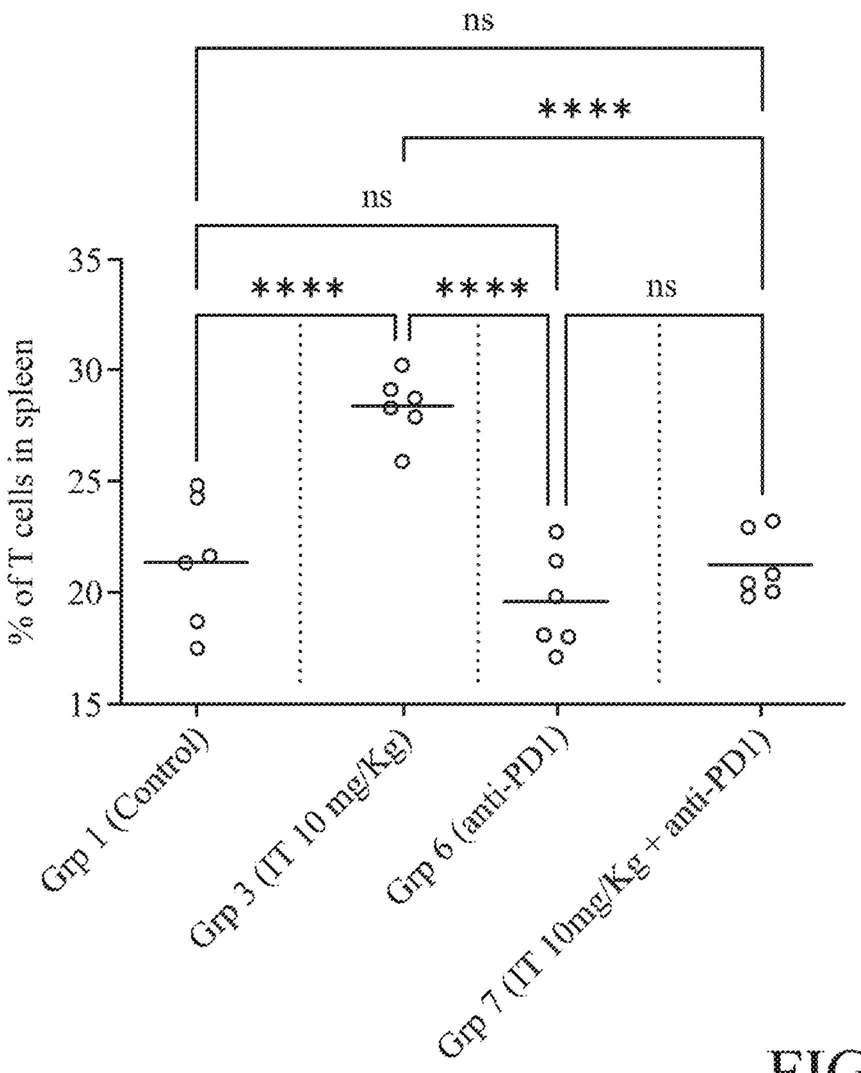
Figure 9B:
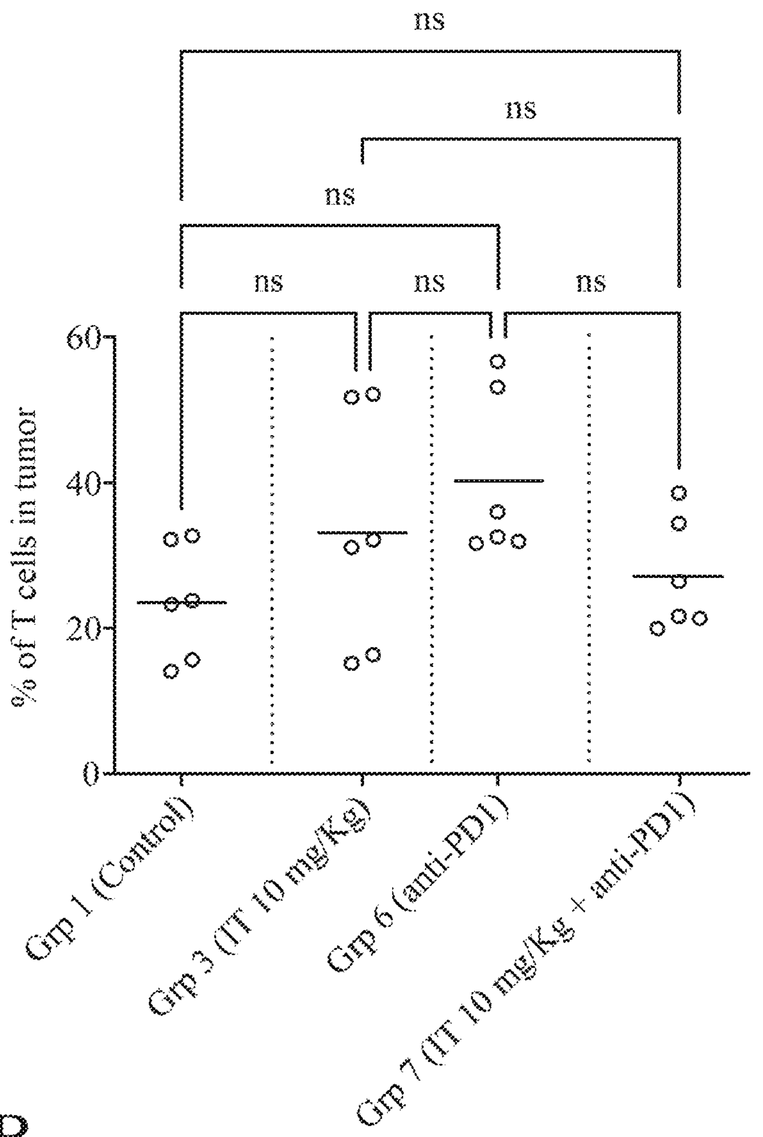

The results shown in FIGS. 9A-9B are similar to the data from our earlier study, which demonstrate that in both splenocytes and tumor TILs of mice treated intravenously with Composition 002 there was only a minimal or not a statistically significant change in the percent of CD3+ T cells in all the groups as well as in the tumors of mice treated with the drug intratumorally. However, this time there was a consistent and significant increase of T cells in the spleens of mice that received Composition 002 intratumorally. Interestingly, this increase however returned to the baseline level when Composition 002 was combined with anti-PD-1 antibody. Composition 002 delivered intratumorally at the high dose of 20 mg/Kg had no such effect.

Figure 10A:
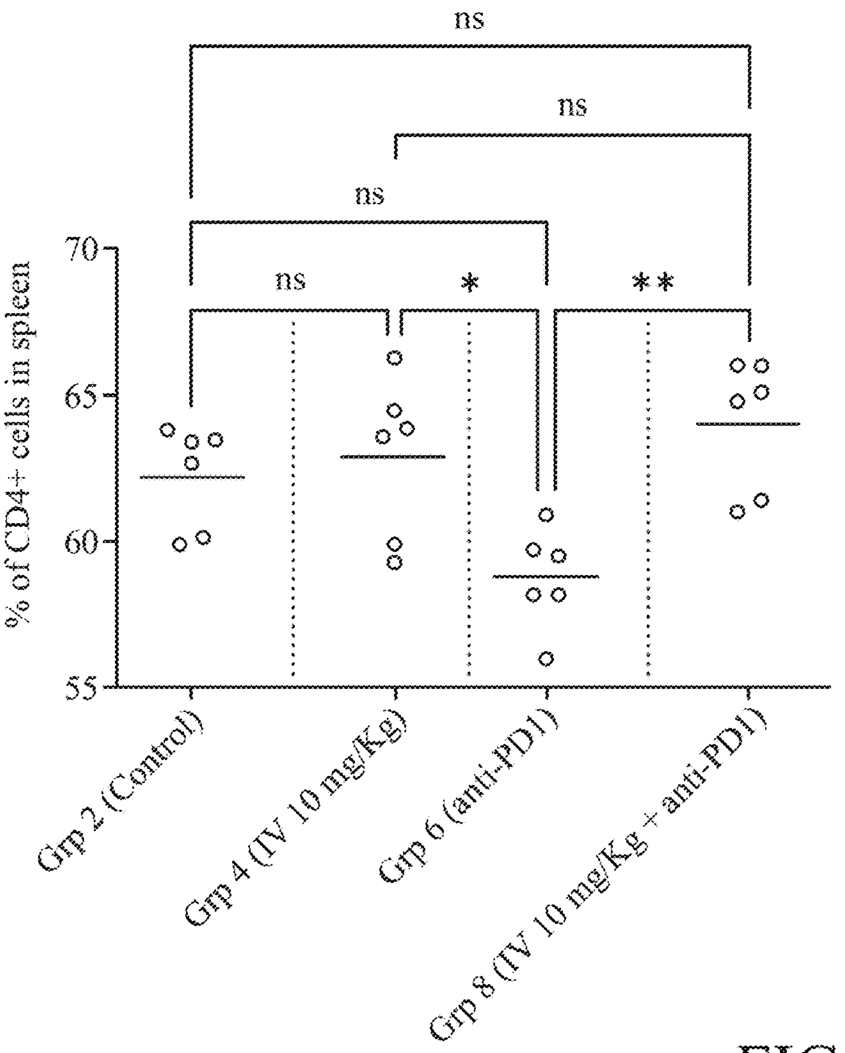
FIGS. 10A-10B: Analysis of $CD4^+$ T cells (gated on $CD45^+$ $CD3^+$ $CD8^-$ $CD4^+$) in spleen (Left) and tumors-TILs (Right) of the intravenous treatment groups (FIG. 10A) and intratumor groups (FIG. 10B).
Figure 10A:
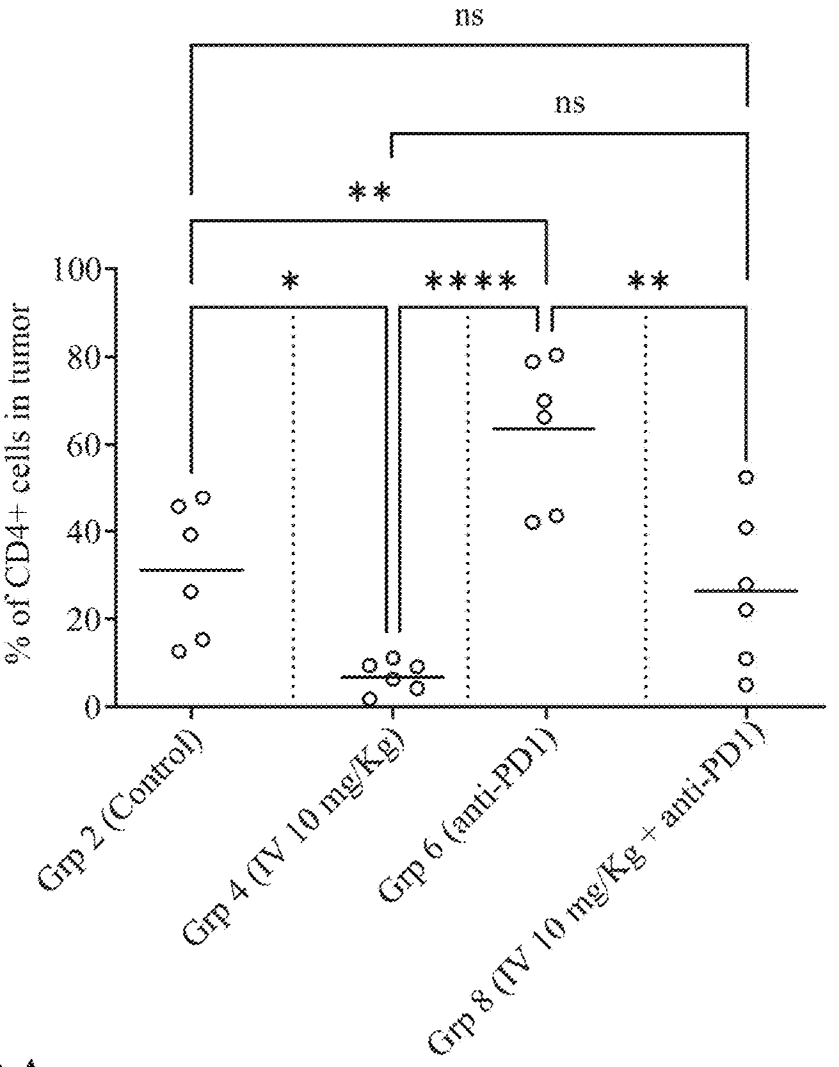
Figure 10B:
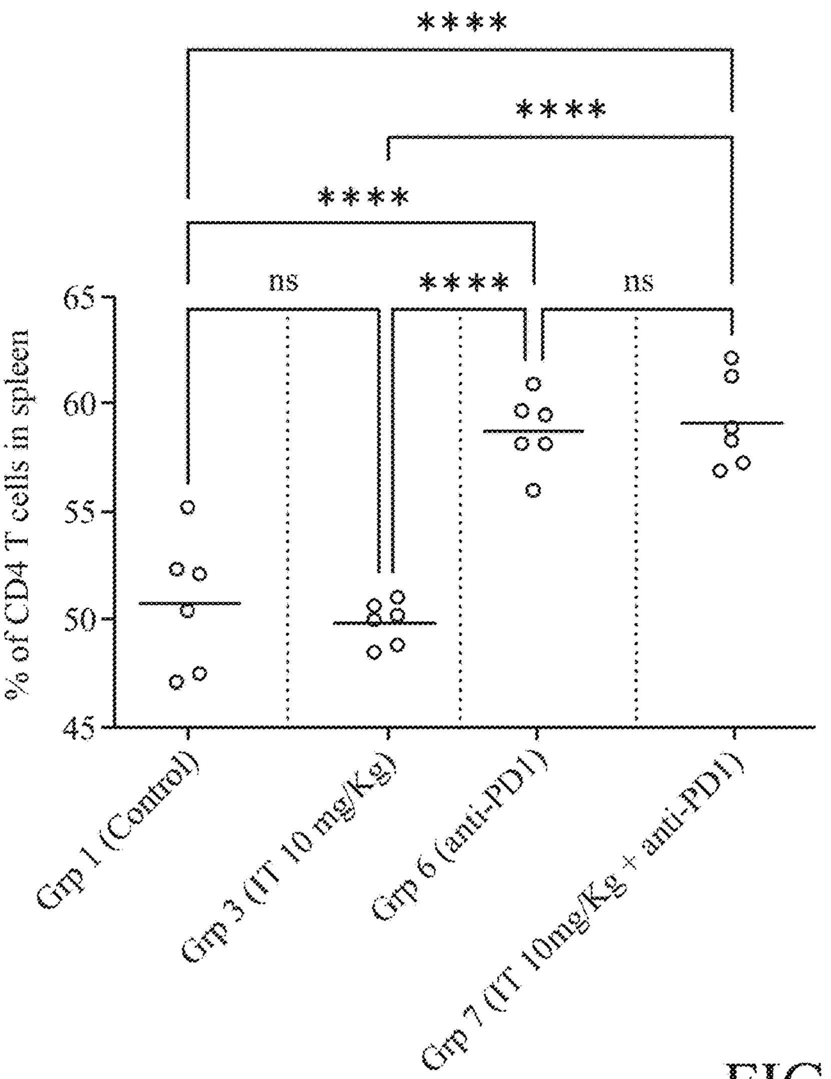
Figure 10B:
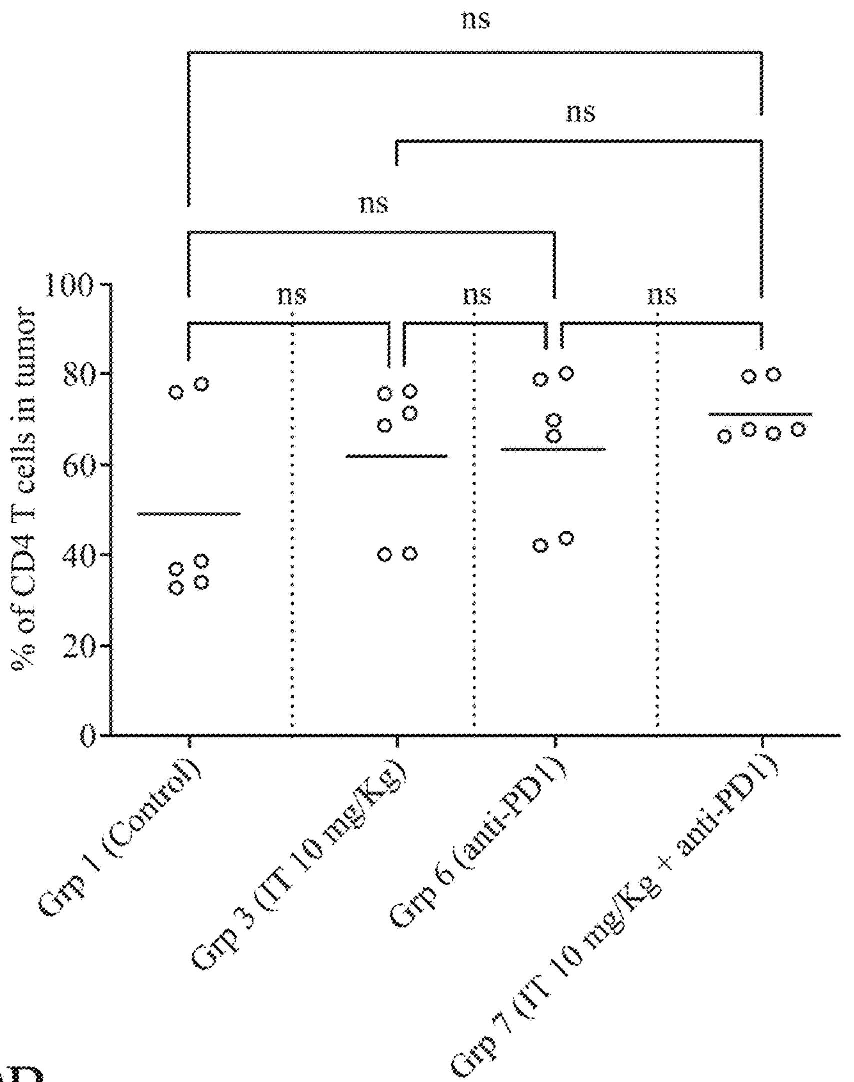

The results shown in FIGS. 10A-10B, which illustrate the effects of Composition 002 on the spleens and tumors, are relatively consistent with our earlier observations: there was effect in the spleen after drug delivery by the either route as single agent or in combination with anti-PD-1, and only a trend of about 40-50% reduction of CD4+ T cells induced in the tumors by intravenous administration of the drug. In this study the data demonstrate less variable, better and statistically significant inhibition of CD4+ T cells in the tumors after intravenous administration of Composition 002, which was sufficient to compensate for the increase caused by anti-PD1 in the combination treatment.

Figure 11A:
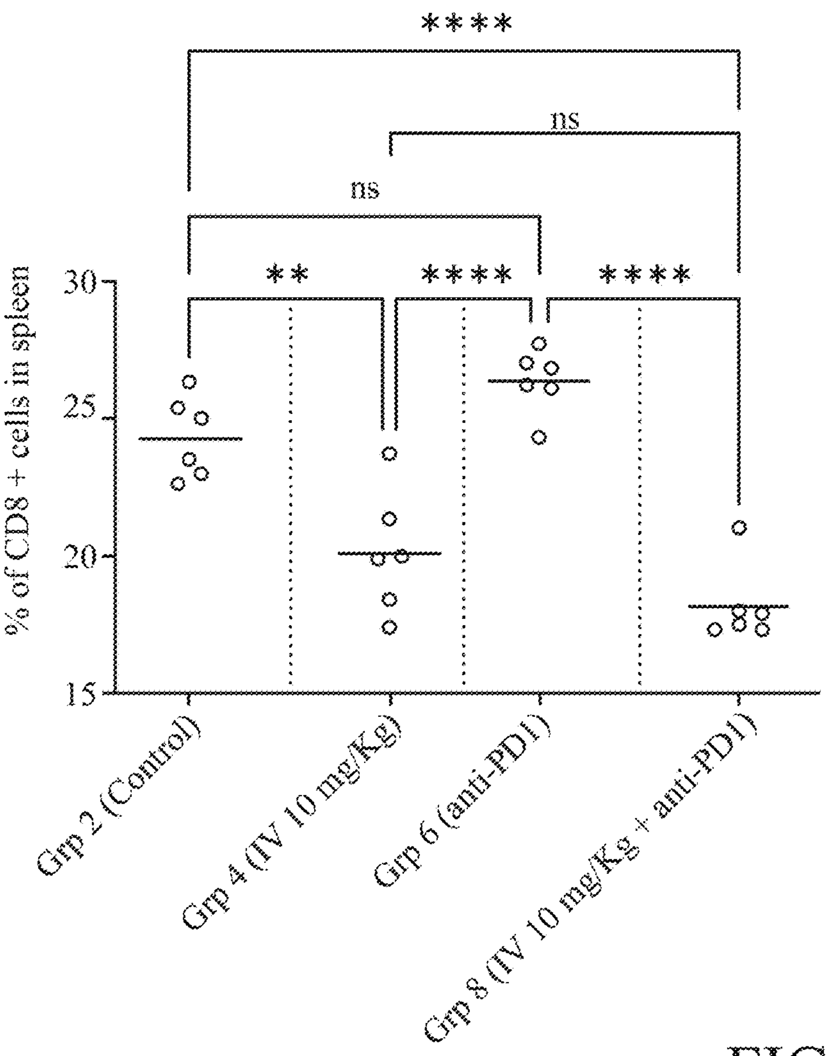
FIGS. 11A-11B: Analysis of $CD8^+$ T cells (gated on $CD45^+$ $CD3^+$ $CD4^-$ $CD8^+$) in spleen (Left) and tumors-TILs (Right) of the intravenous treatment groups (FIG. 11A) and intratumor groups (FIG. 11B).
Figure 11A:
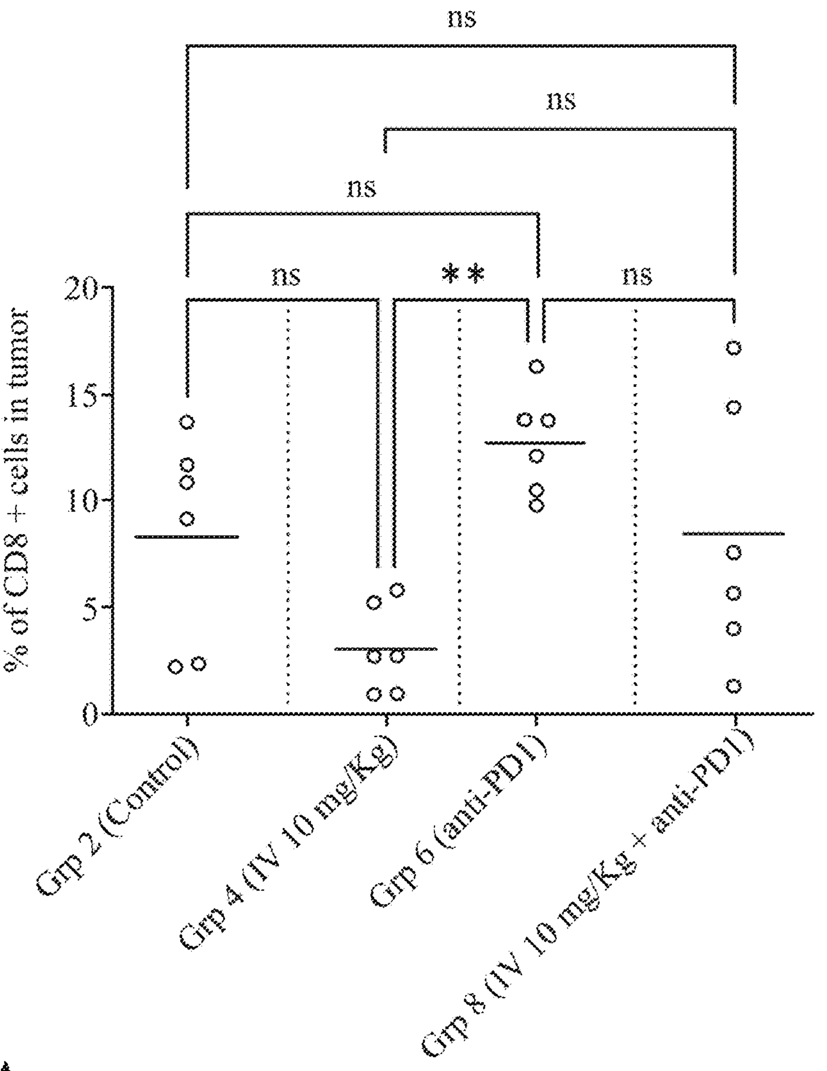
Figure 11B:
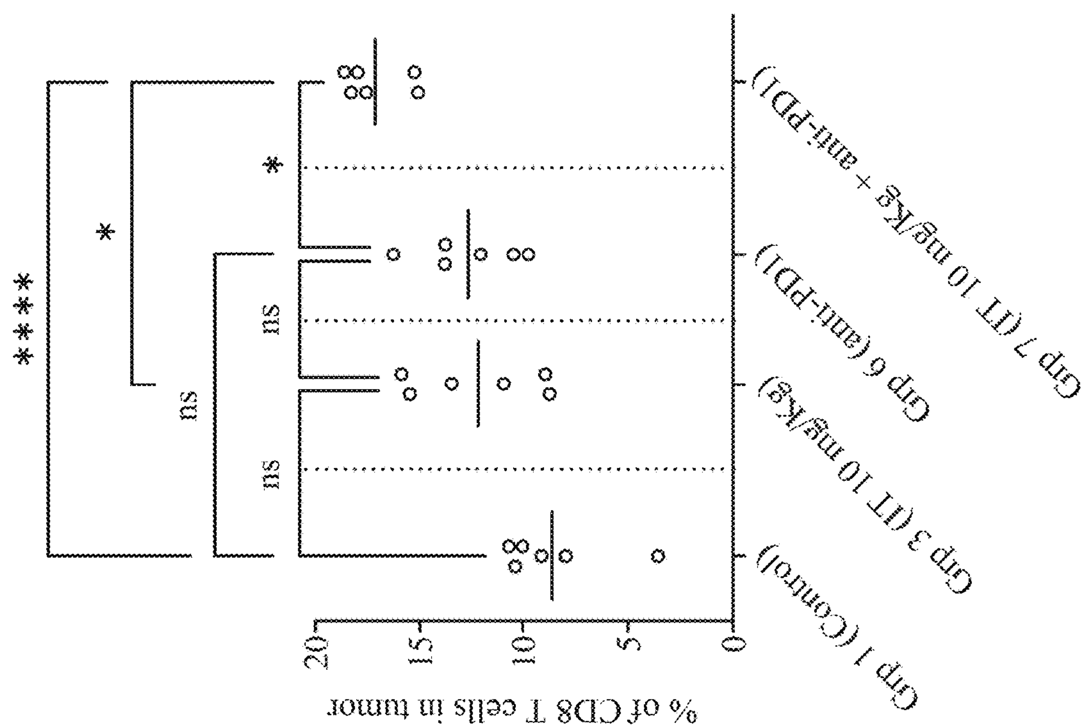
Figure 11B:
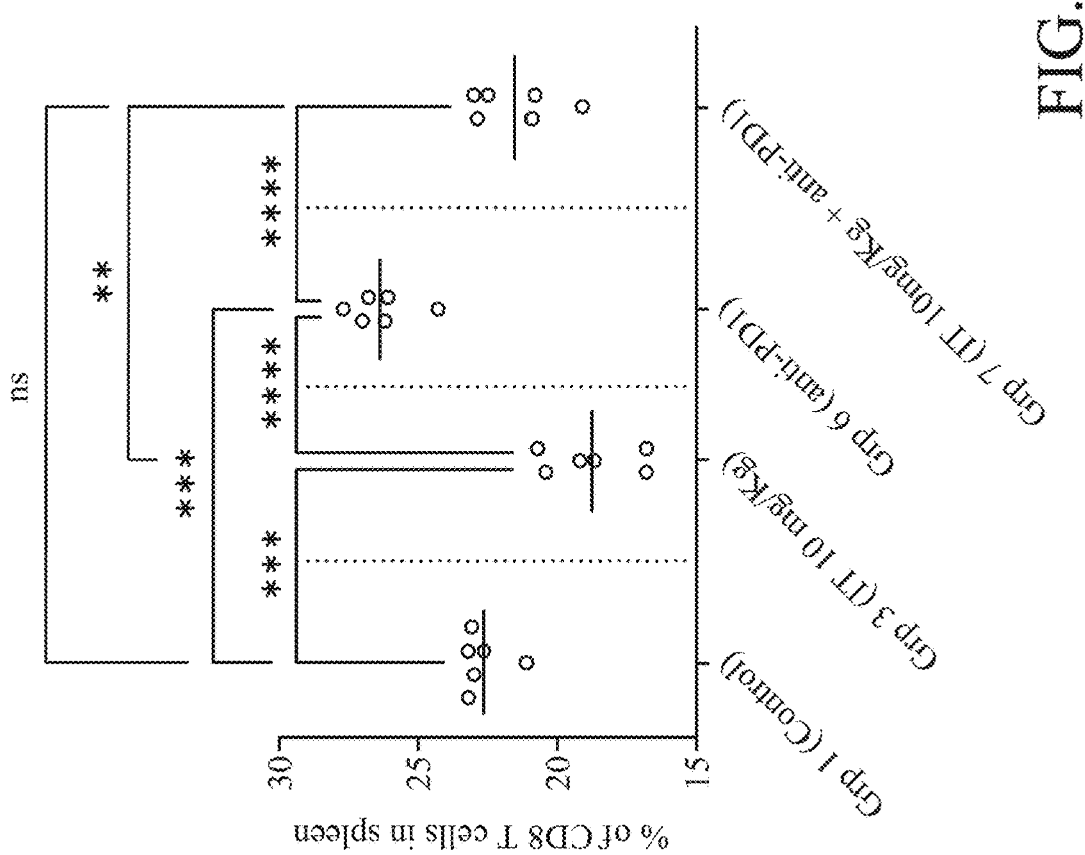

As shown in FIGS. 11A-11B, the percent of CD8+ T cells [with CD45+ CD3+ CD4− CD8+ phenotype] was reduced in the spleens and tumors by Composition 002 administered intravenously with the reduction in the spleen being statistically significant when compared with both controls and anti-PD-1 treatment. In the combination group with Composition 002 delivered intravenously, the increasing effect by anti-PD-1 as single agent on the CD8+ T cells was significantly attenuated by Composition 002 resulting in the lower level of immune cells with this phenotype; this low level was comparable to that measured after Composition 002 treatment as single agent. In the tumors of mice treated with Composition 002 intratumorally, there was no such sharp inhibitory effect by Composition 002 single agent but there was a synergism by combined Composition 002 and anti-PD-1 that was statistically significant in comparison to each single agent and the controls.

Figure 12A:
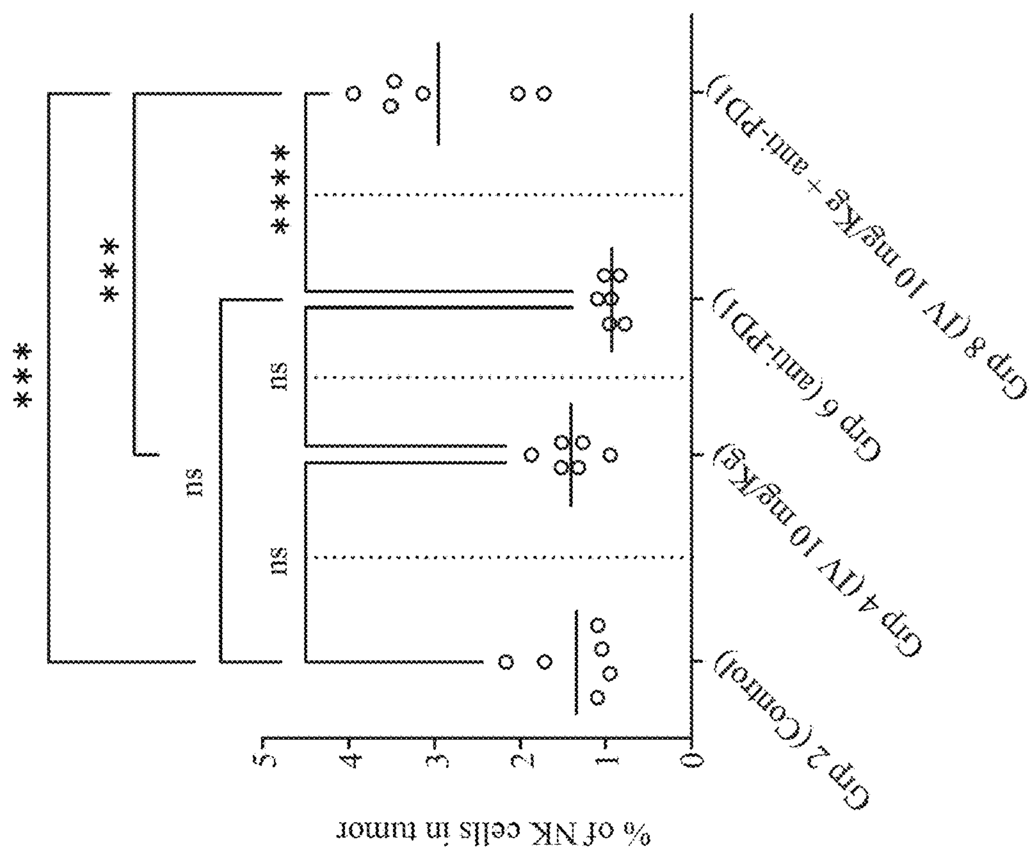
FIGS. 12A-12B: Analysis of $NK^+$ cells (gated on $CD45^+$ $CD3^-$ $CD49b^+$-$CD335^+$) in spleen (Left) and tumors-TILs (Right) of the intravenous treatment groups (FIG. 12A) and intratumor groups (FIG. 12B).
Figure 12A:
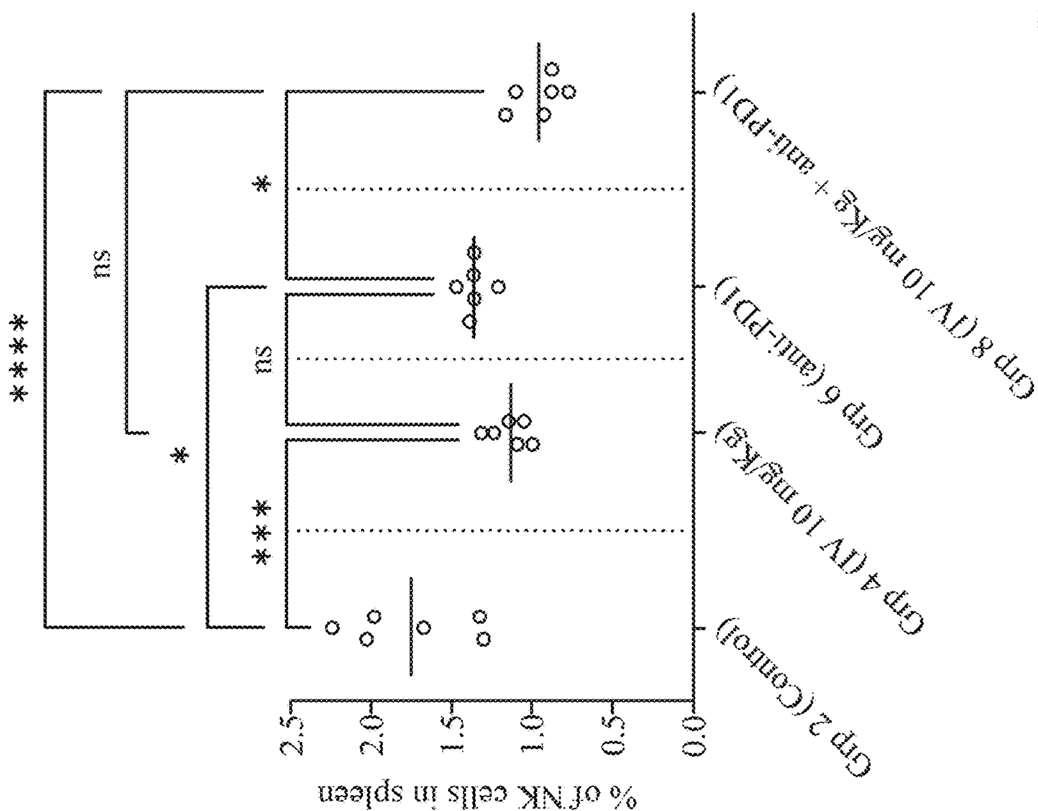
Figure 12B:
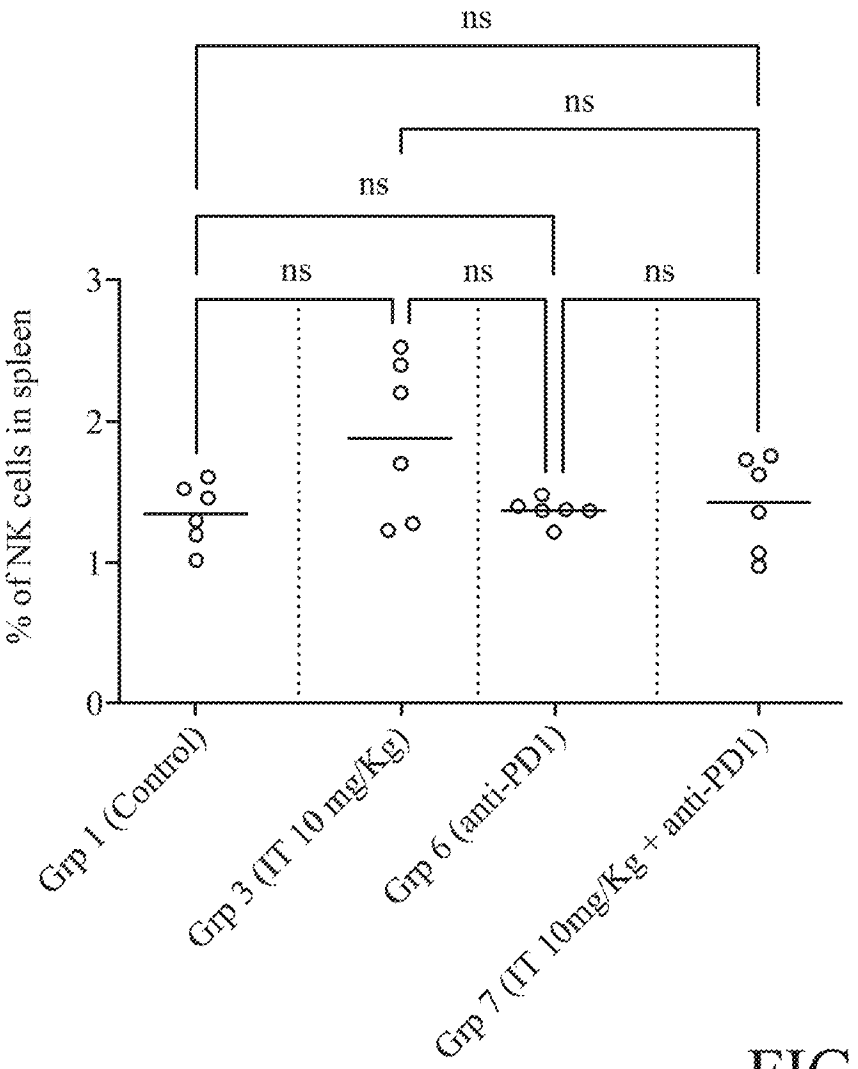
Figure 12B:
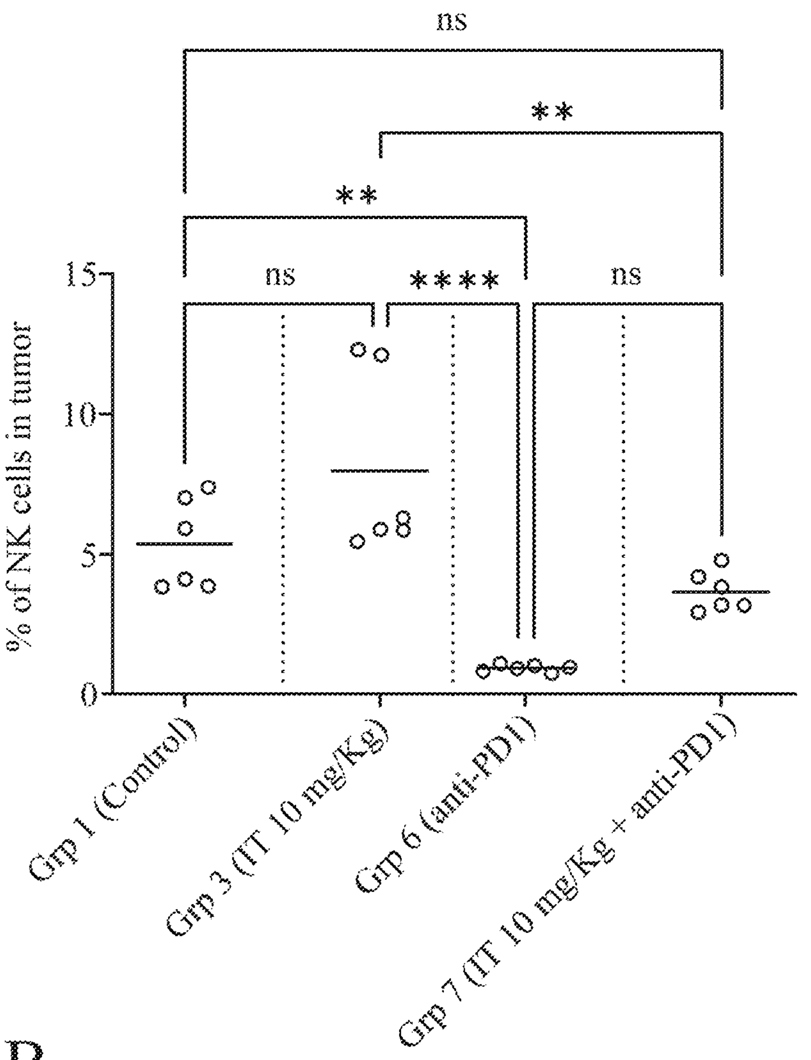
Figure 13A:
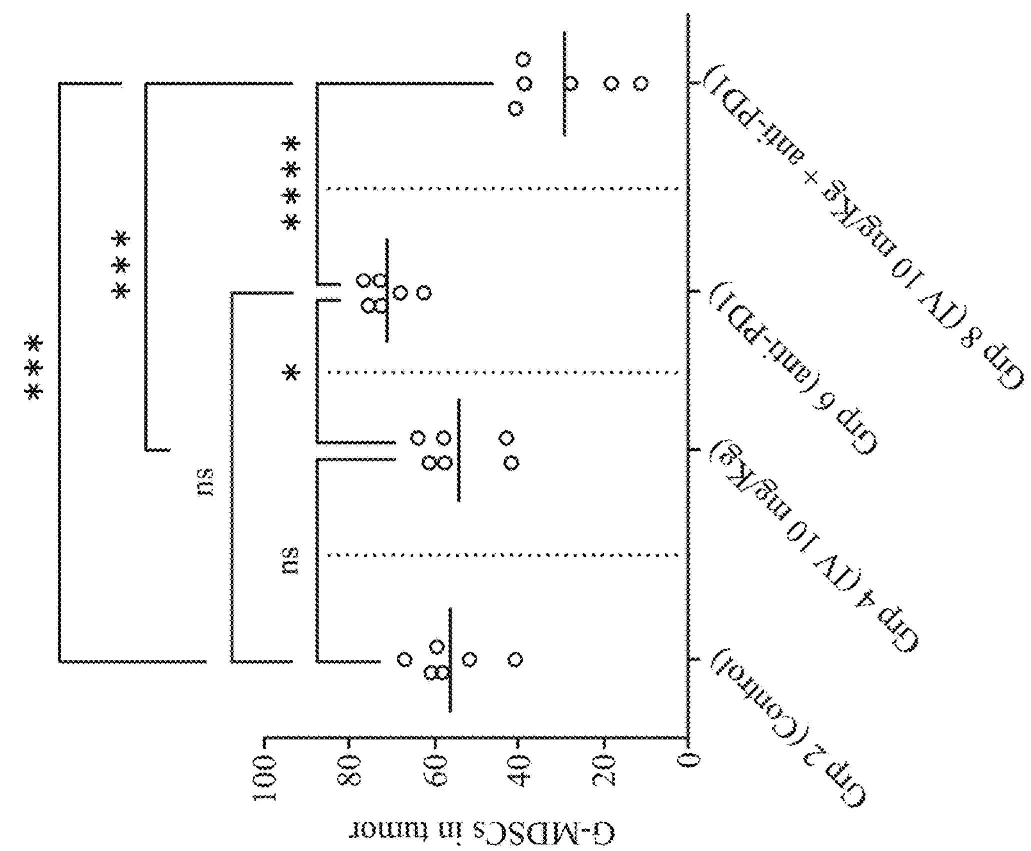
FIGS. 13A-13B: Analysis of percent granulocytes MDSCs cells (gated on $CD45^+$ $CD3^-$ $^{CD}11^{+-}$b-$Ly6G^+$ $Ly6C^{low}$) and Monocytes MDSCs in spleen (Left) and tumors-TILs (Right) of the intravenous treatment groups (FIG. 13A) and intratumor groups (FIG. 13B).
Figure 13A:
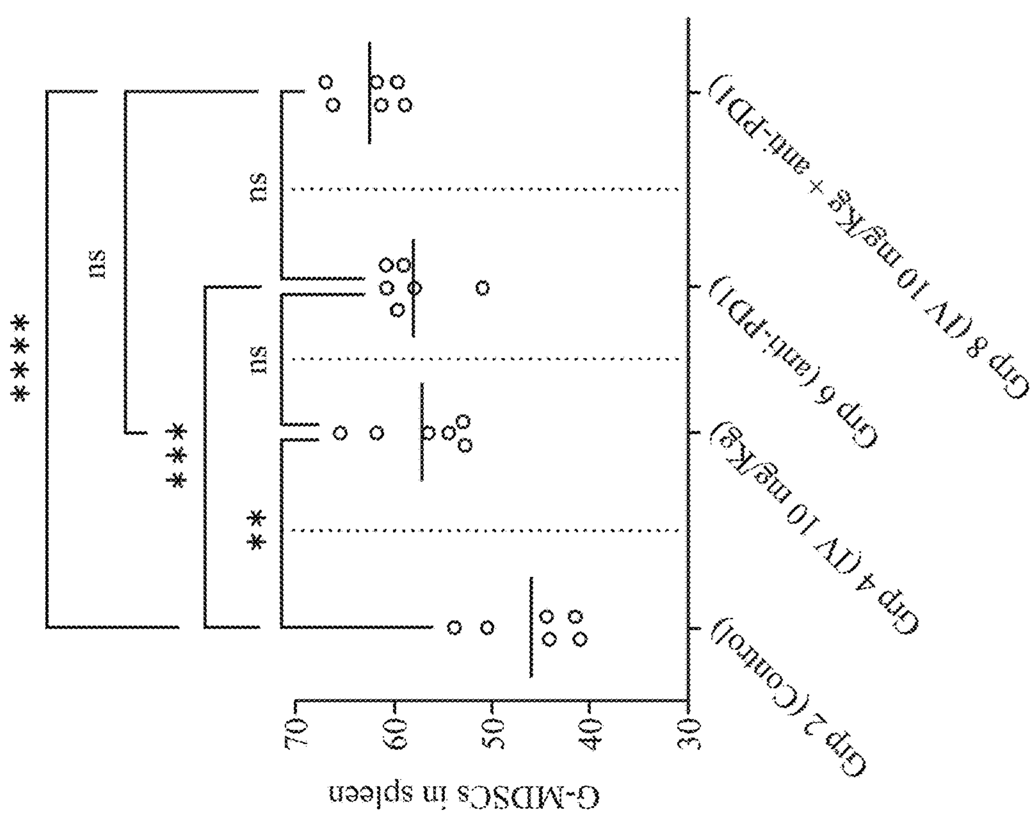
Figure 13B:
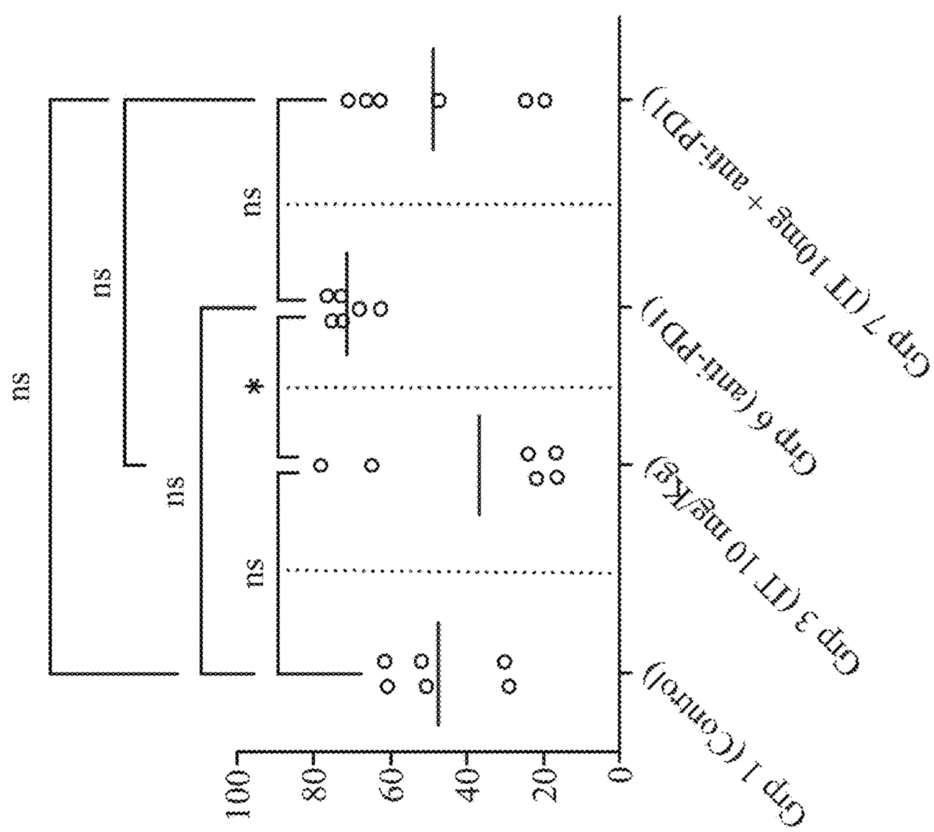
Figure 13B:
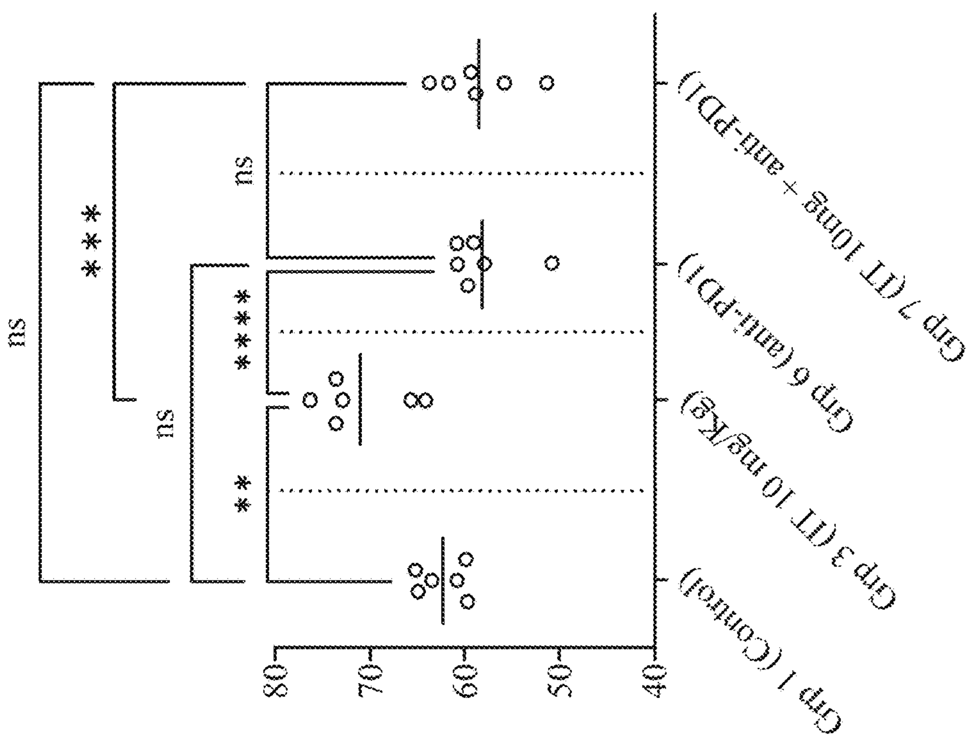
Figure 14A:
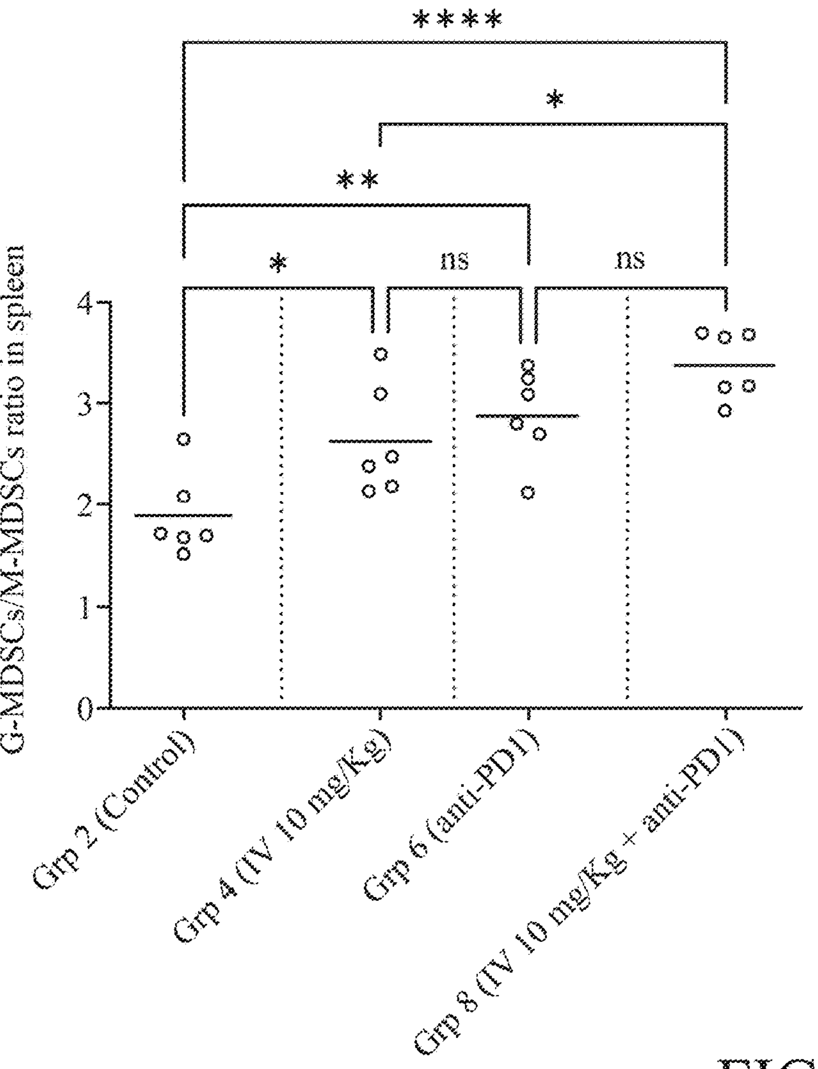
FIGS. 14A-14B: Analysis of the ratio granulocytes MDSCs cells (gated on $CD45^+$ $CD3^-$ $CD11b^{+-}$$Ly6G^+$ $Ly6C^{low}$) vs. Monocytes MDSCs in spleen (Left) and tumors-TTLs (Right) of the intravenous treatment groups (FIG. 14A) and intratumor groups (FIG. 14B).
Figure 14A:
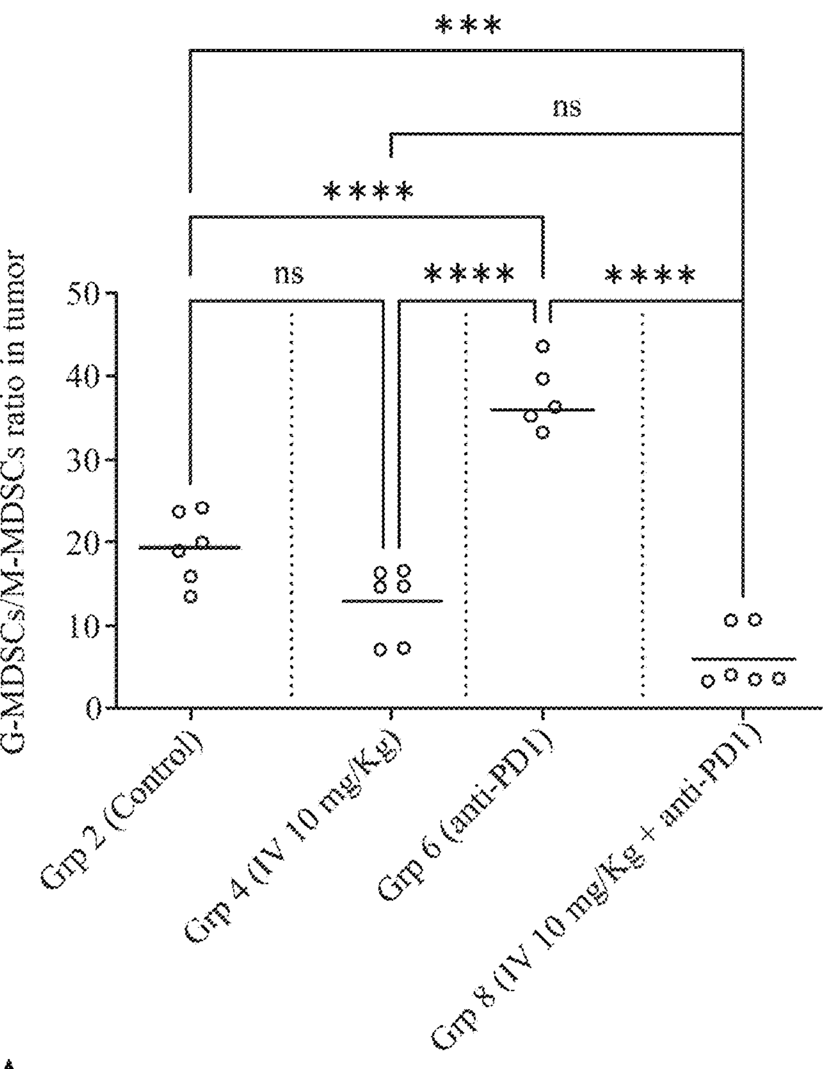
Figure 14B:
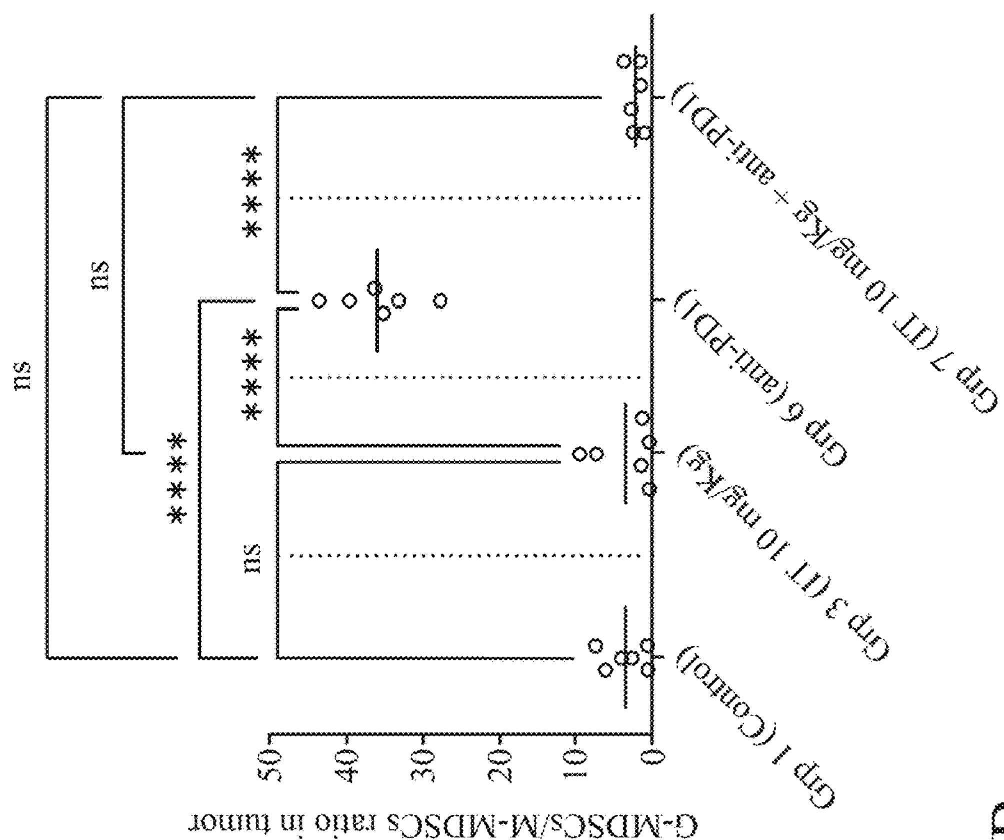
Figure 14B:
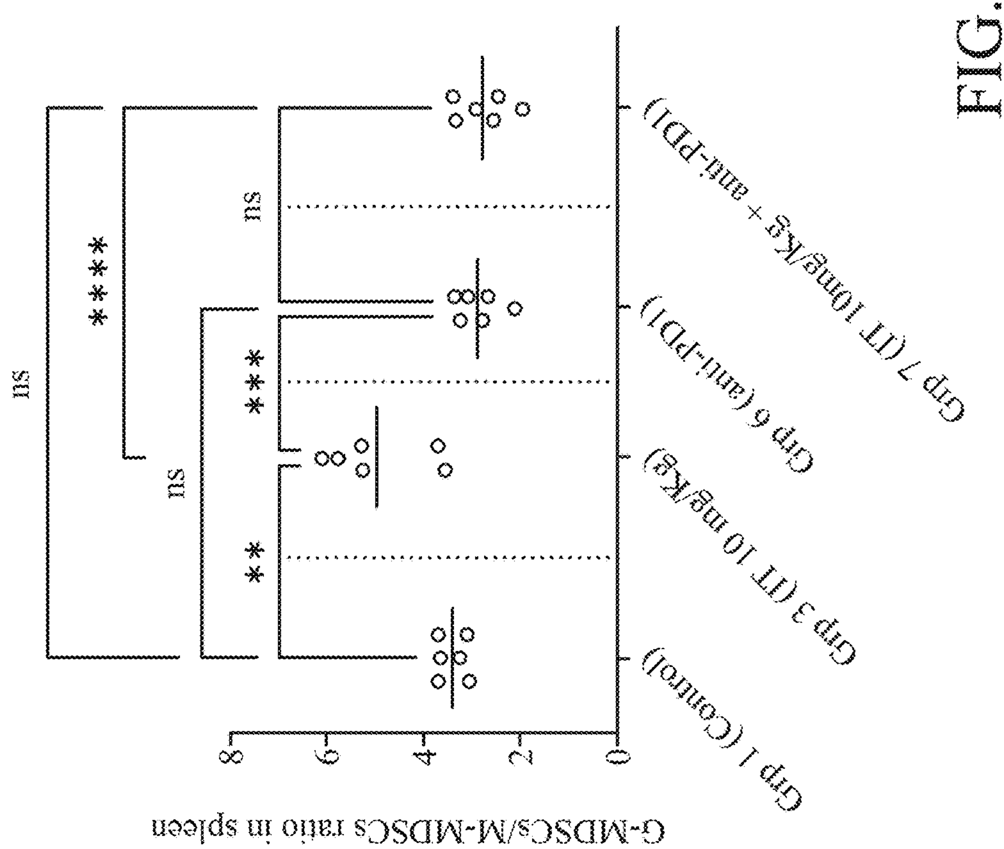

When the percent of NK cells (gated on CD45+CD3− CD49b+CD335+) was examined in the splenocytes or TILs within all intravenous groups, no significant changes were observed except for a significant decrease by Composition 002 or anti-PD-1 as single agent in the spleen compared to the controls, which was further decreased in the combination group, as shown in FIGS. 12A-12B. In the tumors there was no difference between Composition 002 given intravenously or PD-1 as single agent and the controls but there was a statistically significant increase of NK cells in the combination group.

There was no difference in the percent of NK cells in the spleen between the groups in the intratumor arm but there was a statistically significant reduction by anti-PD1 in the tumors in both single agent and combination groups.

To evaluate the effect of treatments on the immunosuppressive microenvironment of EMT6 tumors, both the separate percent of Granulocytes MDSCs and Monocytes MDSCs and the ratio Granulocytes MDSCs vs. Monocytes MDSCs were calculated from the analysis of the myeloid-derived suppressor cell subpopulations granulocytes and monocytes and the data are shown in FIGS. 13A-13B and FIGS. 14A-14B, respectively. These results demonstrate that in the tumors this ratio was not affected by Composition 002 and was elevated by anti-PD-1 antibody, which correlated with the lack of efficacy by PD-1 inhibitor; however, in the combination groups the ratio decreased dramatically likely due some indirect effect of Composition 002 delivered either intravenously or intratumorally. On the contrary, these effects were not evident in the spleen, in particular Composition 002, given to mice as single by either of the routes, increased the MDSC/Monocytes ratio but it did not when combined with anti-PD-1.

Figure 15A:
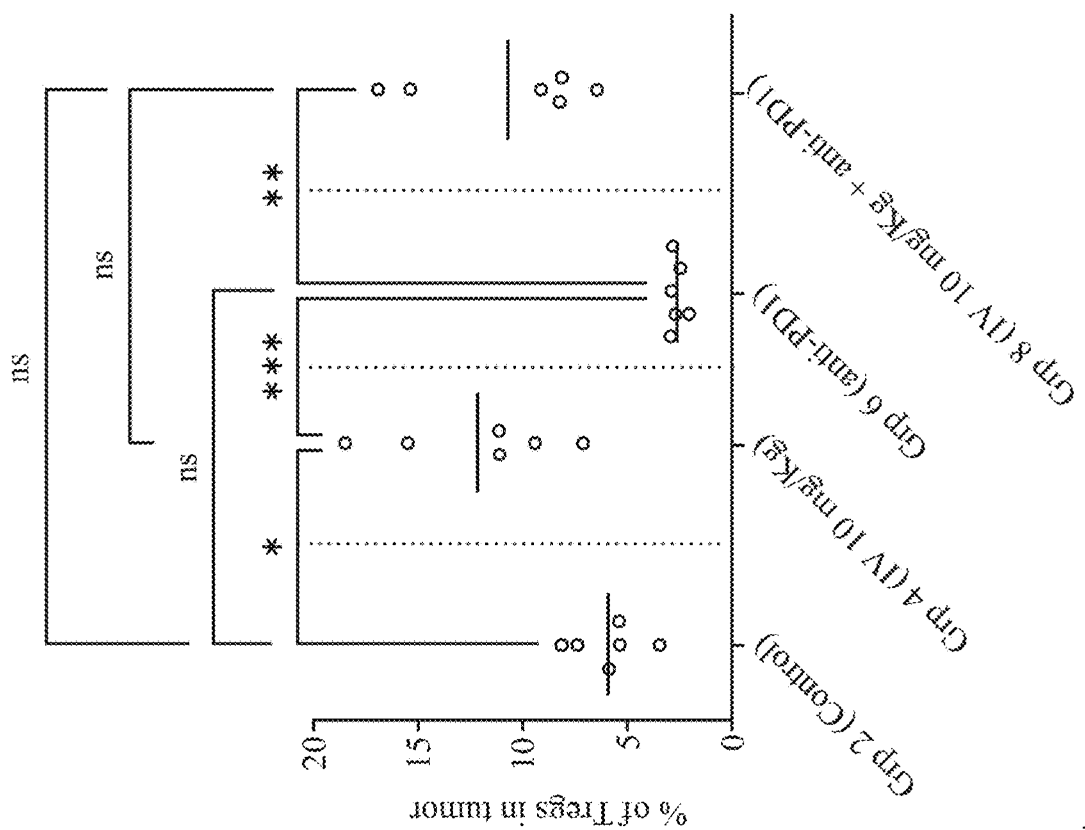
FIGS. 15A-15B: Analysis of regulatory T cells (gated on $CD45^+$ $CD3^+$$CD4^+$ $CD25^+$$Fox3^+$) in spleen (Left) and tumors-TTLs (Right) of the intravenous treatment groups (FIG. 15A) and intratumor groups (FIG. 15B).
Figure 15A:
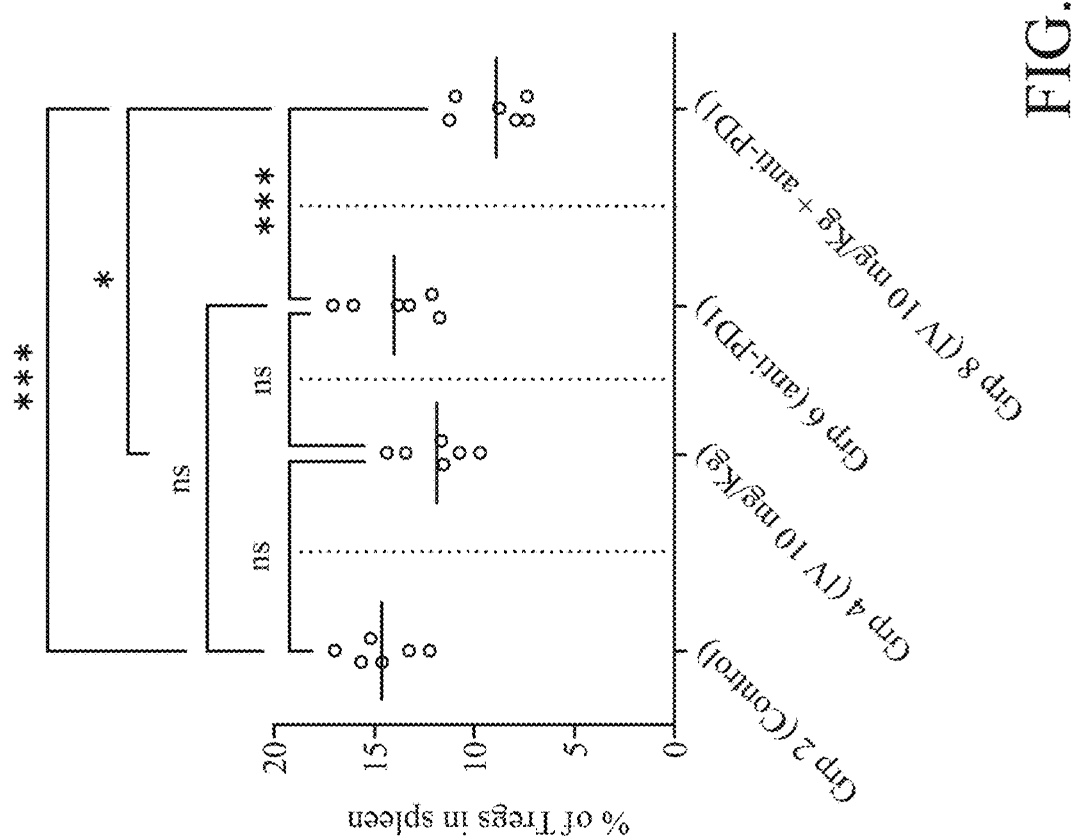
Figure 15B:
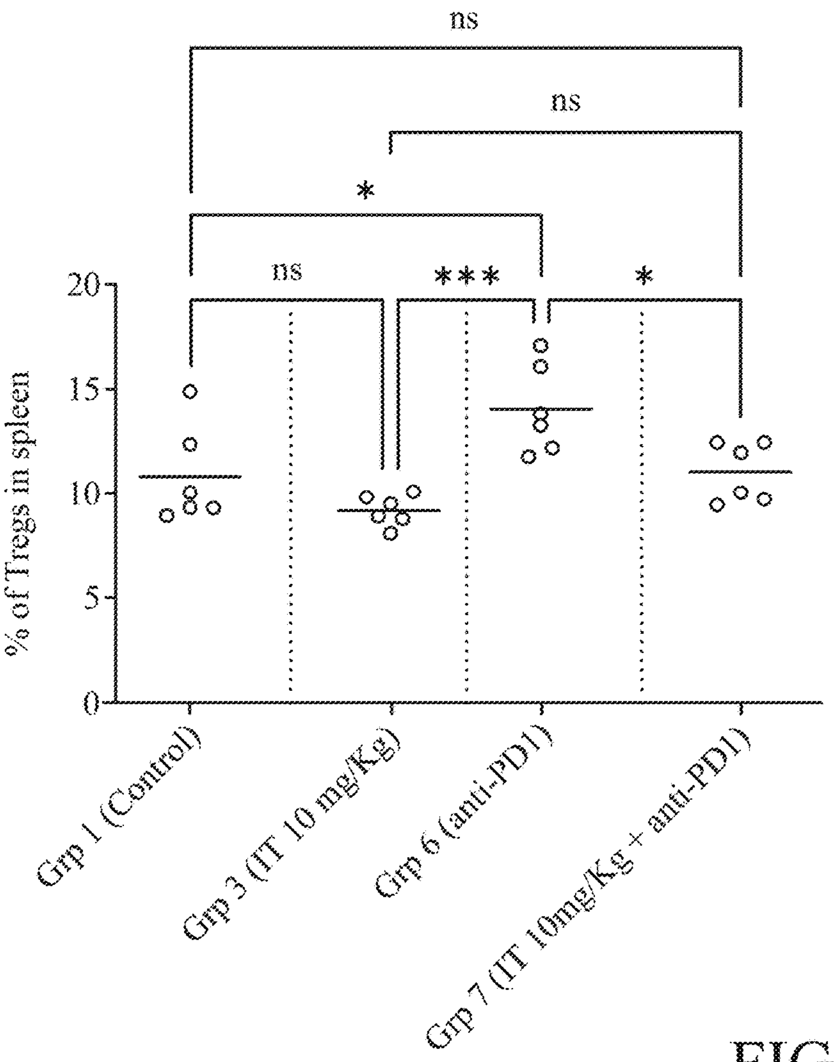
Figure 15B:
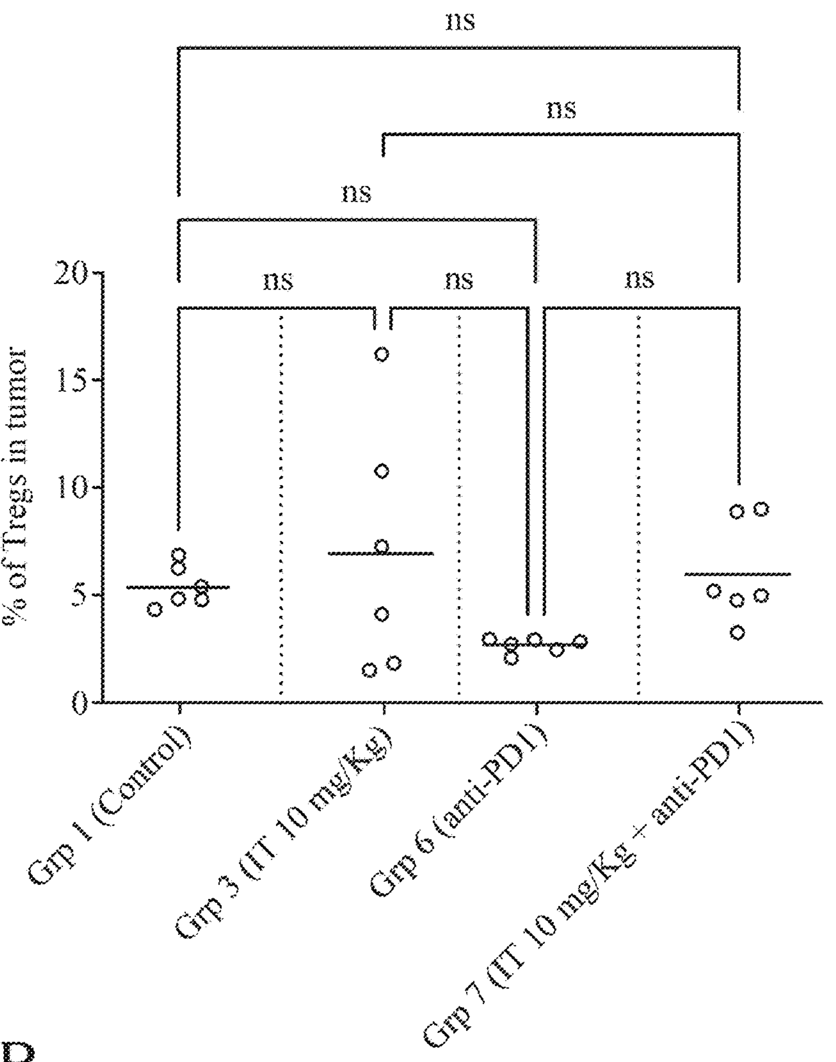
Figure 16A:
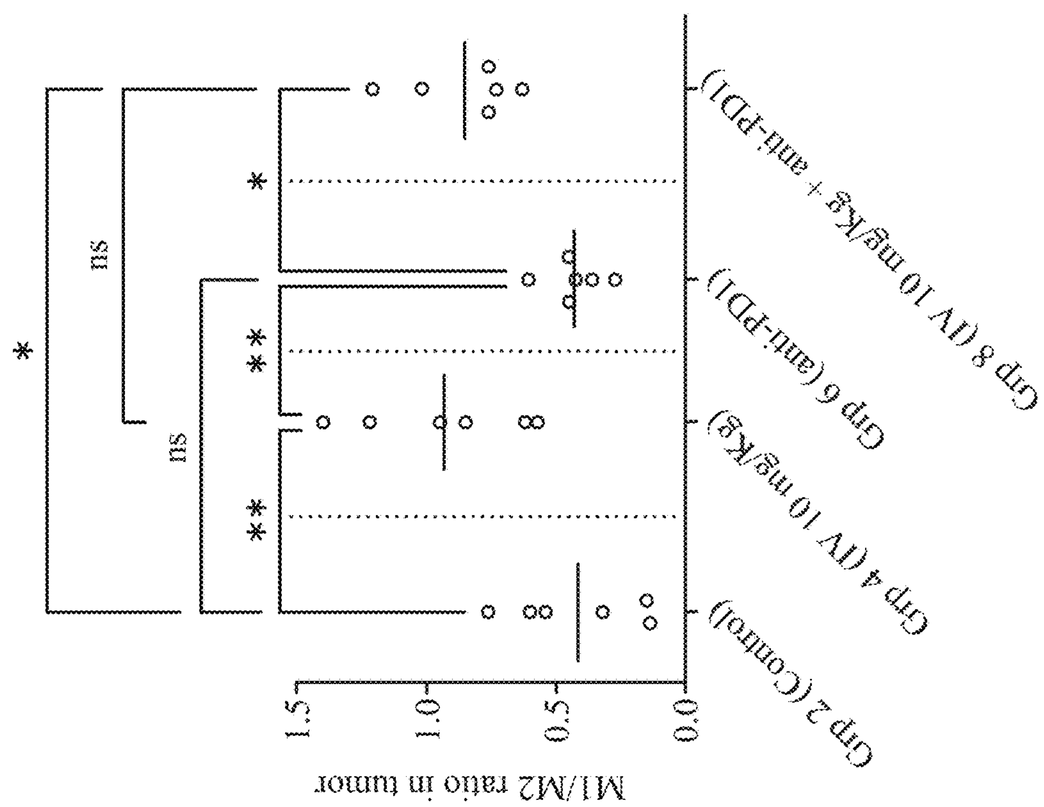
FIGS. 16A-16B: Analysis of TAMs (M1/M2 ratio): gated on $CD45^+$ $CD3^-$ $F4/80^+$ $CD206^-$ (M1) or $CD45^+$ $CD3^-$ $F4/80^+$ $CD206^+$ (M2) in spleen (Left) and tumors-TILs (Right) of the intravenous treatment groups (FIG. 16A) and intratumor groups (FIG. 16B).
Figure 16A:
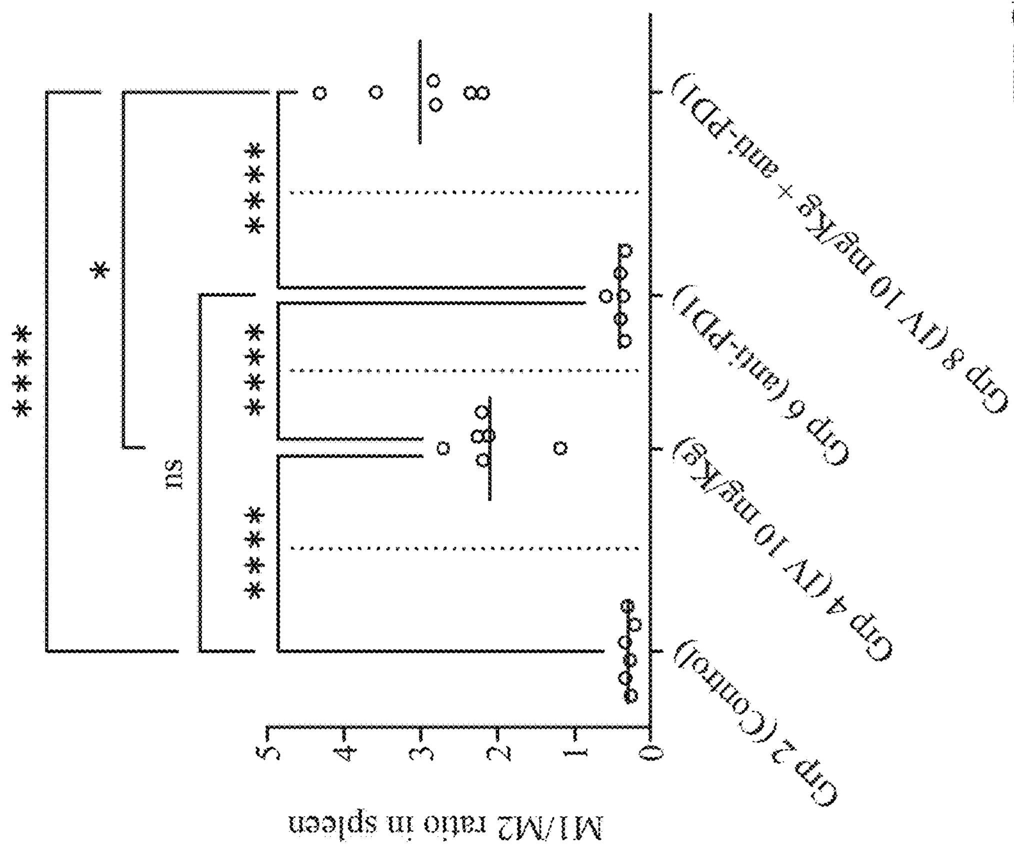
Figure 16B:
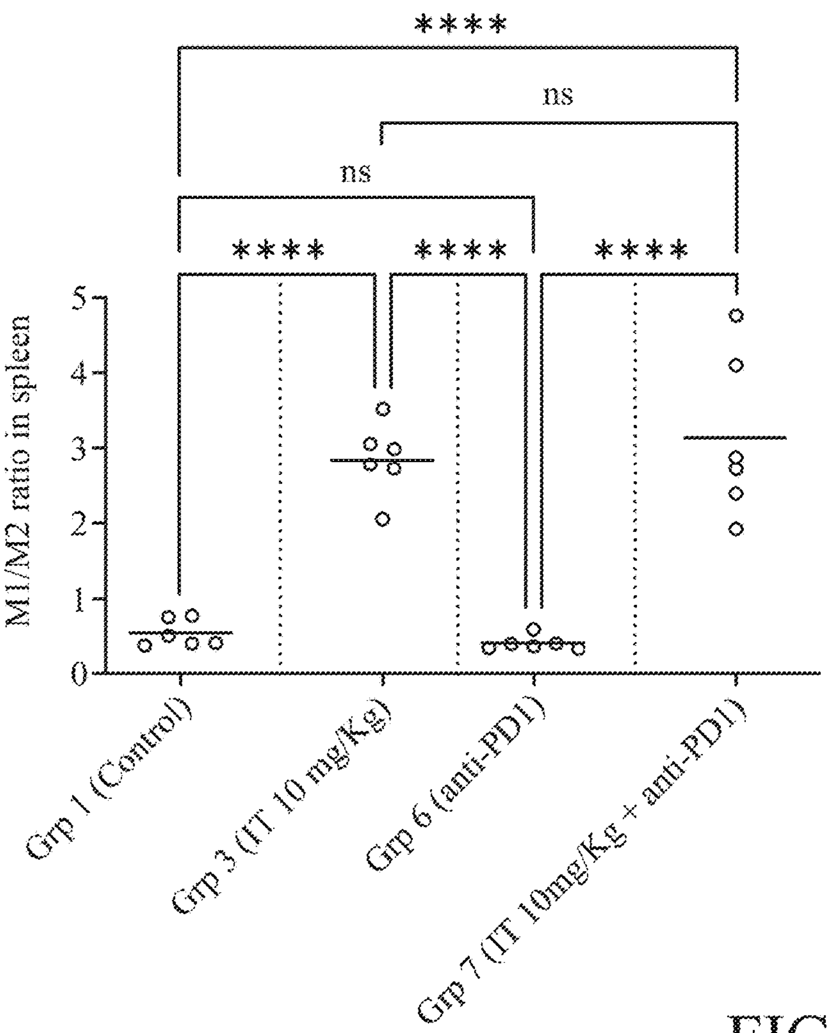
Figure 16B:
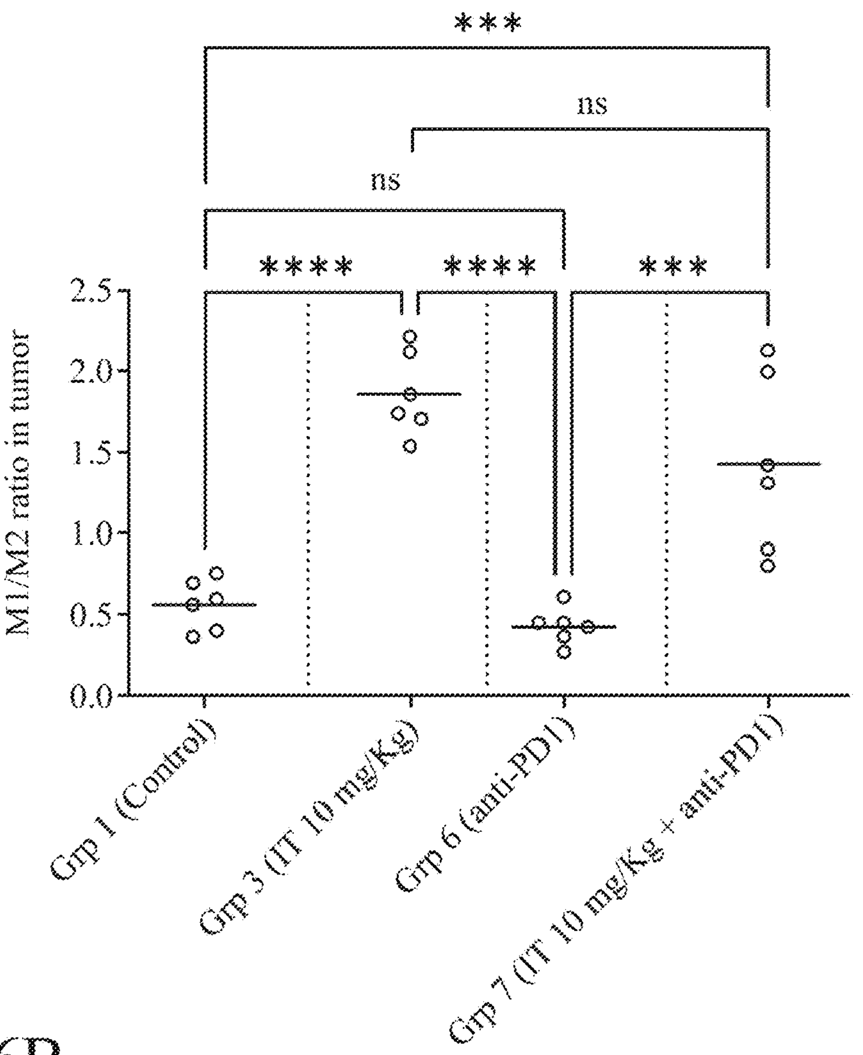

The data analysis of regulatory T cells (Treg) with the phenotype CD45+ CD3−CD4$^{+}$ CD25$^{+}$Foxp3$^{+}$, graphically represented in FIGS. 15A-15B, demonstrate no significant changes in the spleens by Composition 002 upon either the intravenous or intratumor administration but a statistically significant increase in the tumors after the intravenous delivery, and a decrease by ant-PD-1 treatment. The anti-PD-1-induced decrease was reversed by combination with Composition 002.

Next, the tumor associated macrophages (TAMs), gated on $CD45^+$ $CD3^-$ $F4/F80^+$ $CD206^-$ (M1) or $CD206^+$(M2), were evaluated in the subsets of 3 tumors from all groups. The data represented graphically in FIGS. 16A-16B, describe similar findings derived from our previous study. There was again a consistently significant increase of M1 and decrease of M2 macrophages caused by treatment with Composition 002, in both tumors and spleens, leading to high M1/M2 ratio across all the Composition 002 treatment groups in both the IV and IT arms. This ratio was not altered by inhibition of PD-1 remaining elevated in the combination groups, which resulted in a more effective antitumor activity.

Figure 17A:
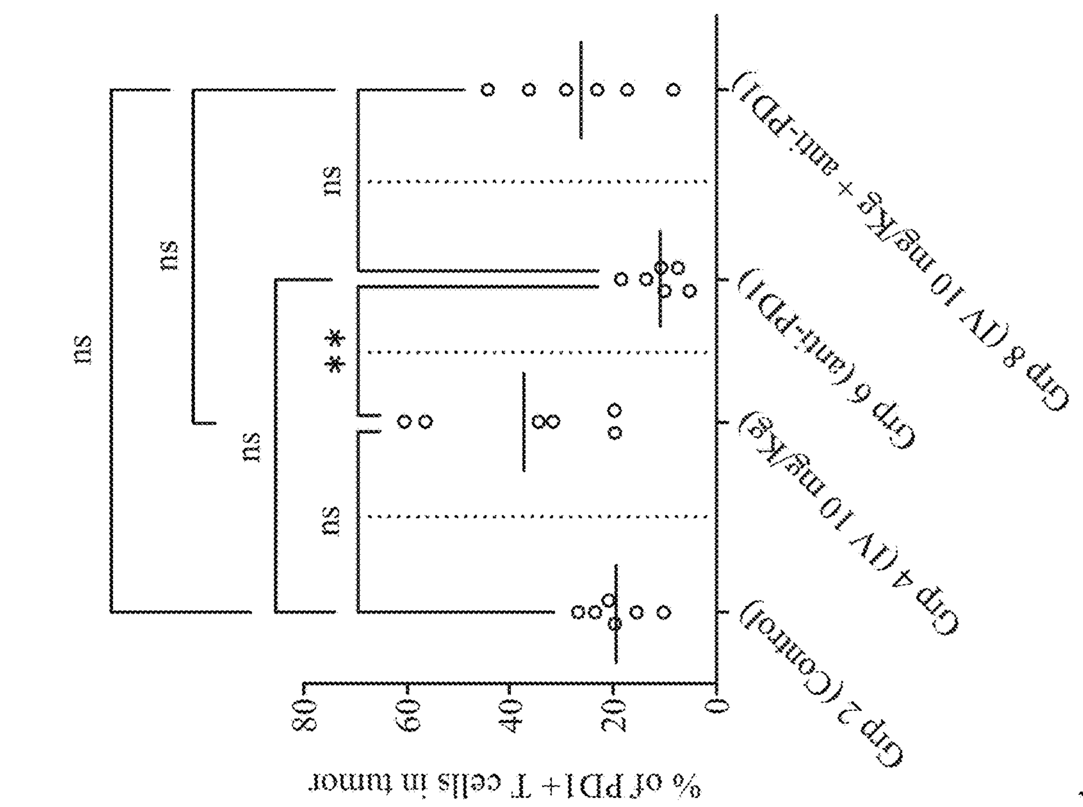
Figure 17A:
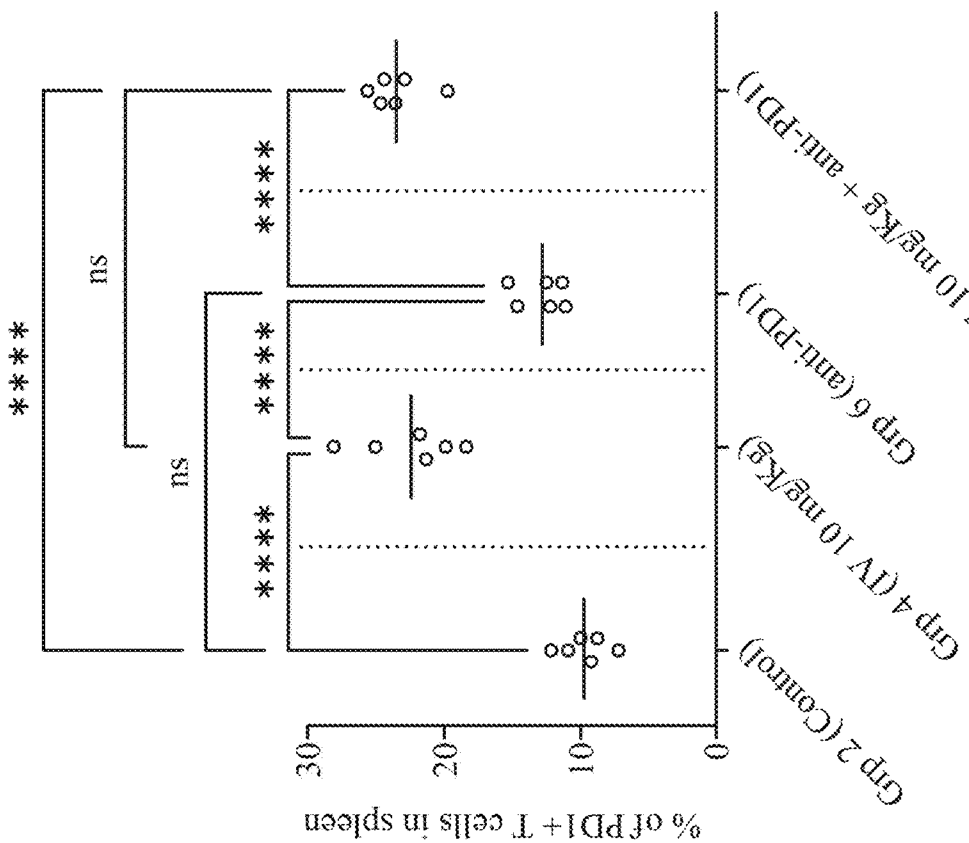

The FACS analysis data of the immune-checkpoint PD-1 expressed in T cells (gated on $CD45^+$ $CD3^+$) are shown in FIGS. 17A-17B. The expression level of PD-1 in T cells was increased by Composition 002 treatment in both splenocytes and TILs upon either the intravenous or intratumor treatment compared to the controls, however it was superior and statistically significant in the spleens compared to the tumors and more robust in the intravenous delivery group. The percent of PD-1 remained significantly lower in either spleens or tumors of mice treated with anti-PD-1 compared to those given Composition 002 although the reduction induced by anti-PD-1 antibody was only statistically significant in the spleen when compared to controls. In the combination groups the expression of PD-1 remained elevated compared to that measured in the single agent groups likely because of the increasing effect of Composition 002.

Figure 18A:
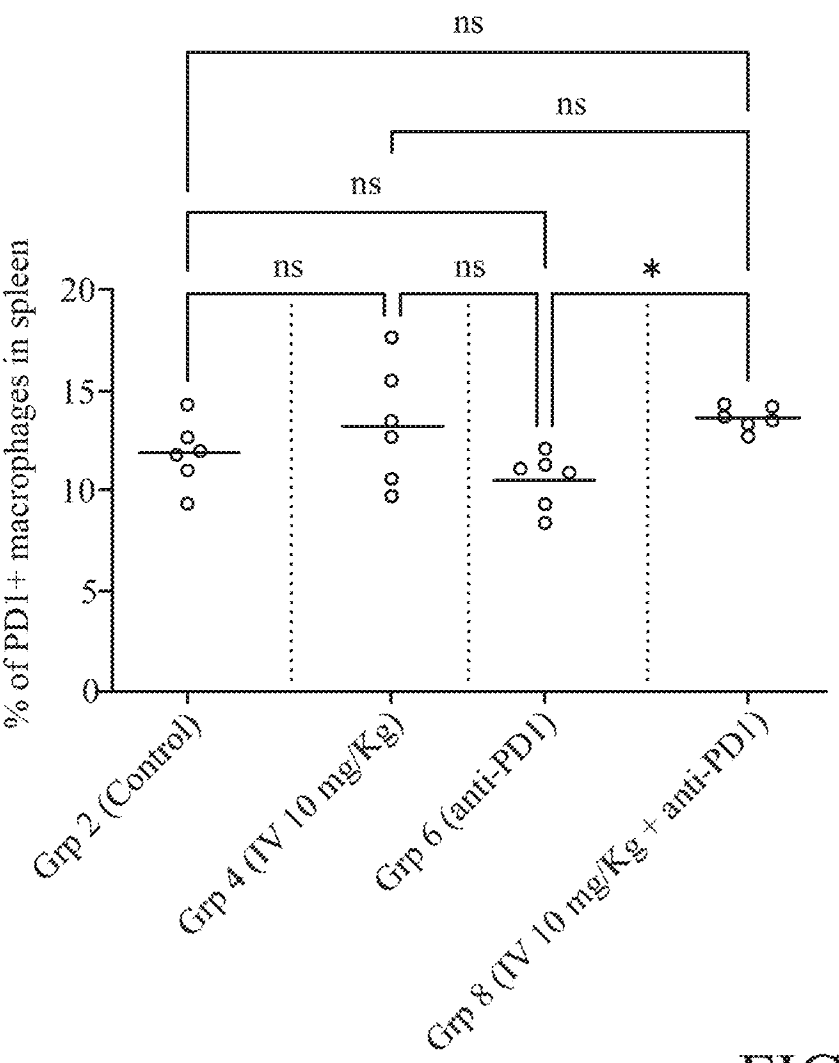
FIGS. 18A-18B: Analysis of $PD1^{+/high}$ macrophages (gated on $CD45^+$ $CD3^-$ $F4/80^+$)$^+$) in spleen (Left) and tumors-TILs (Right) of the intravenous treatment groups (FIG. 18A) and intratumor groups (FIG. 18B).
Figure 18A:
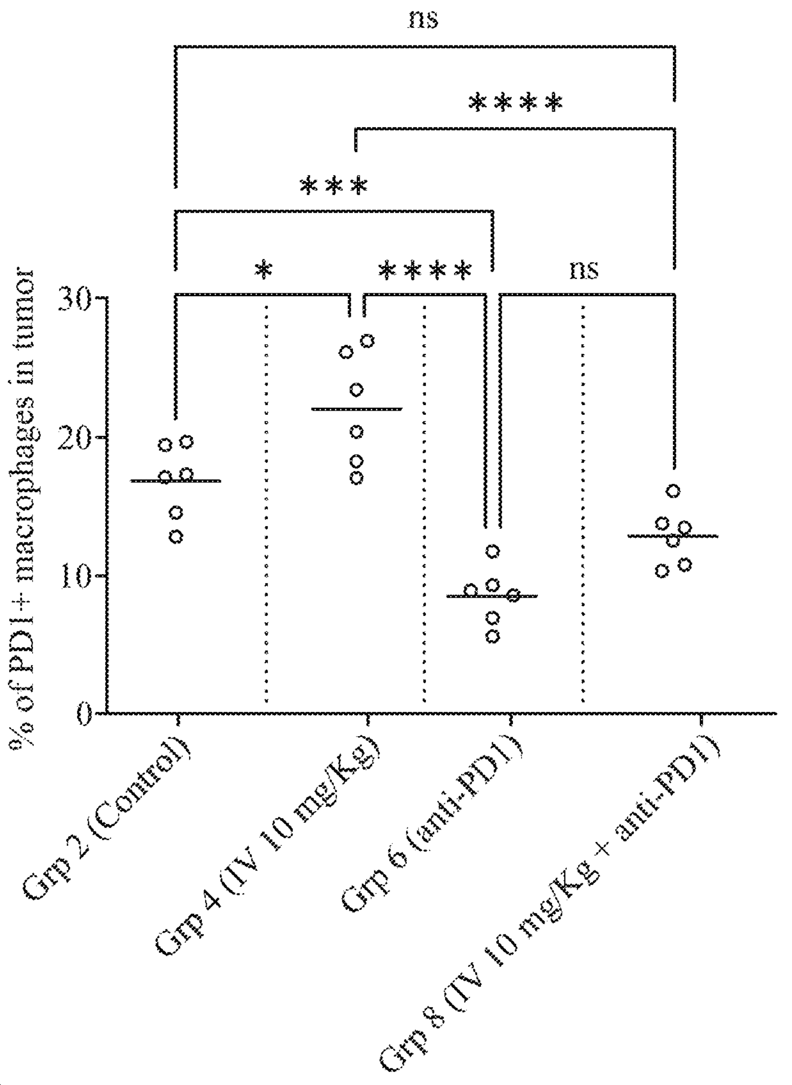
Figure 18B:
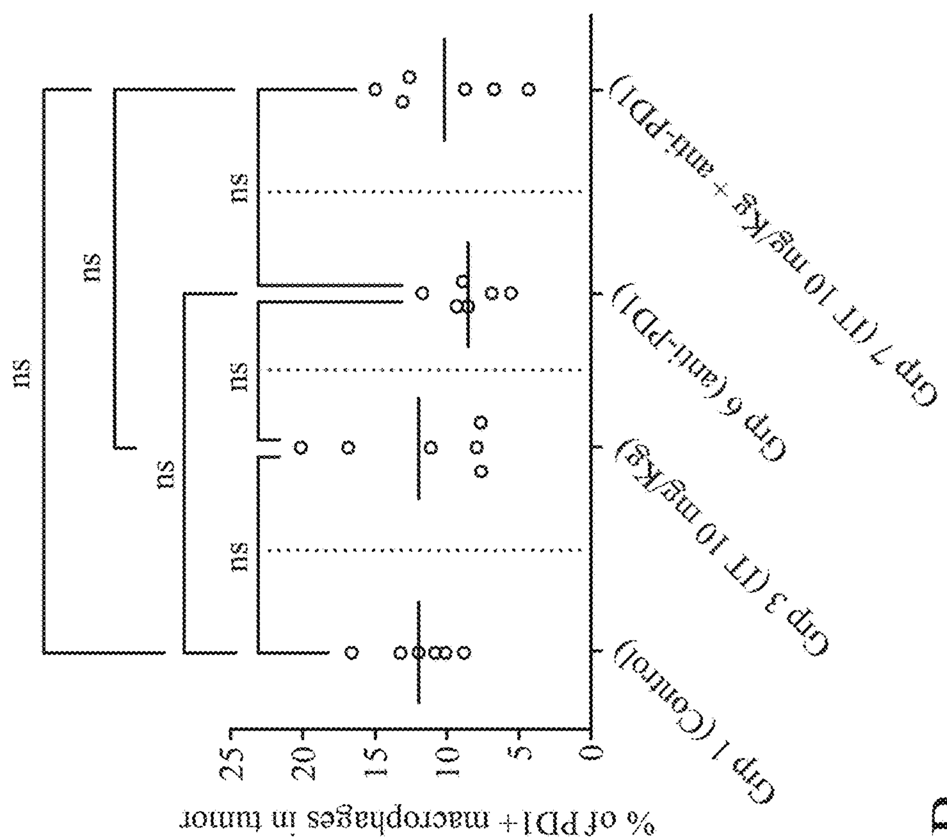
Figure 18B:
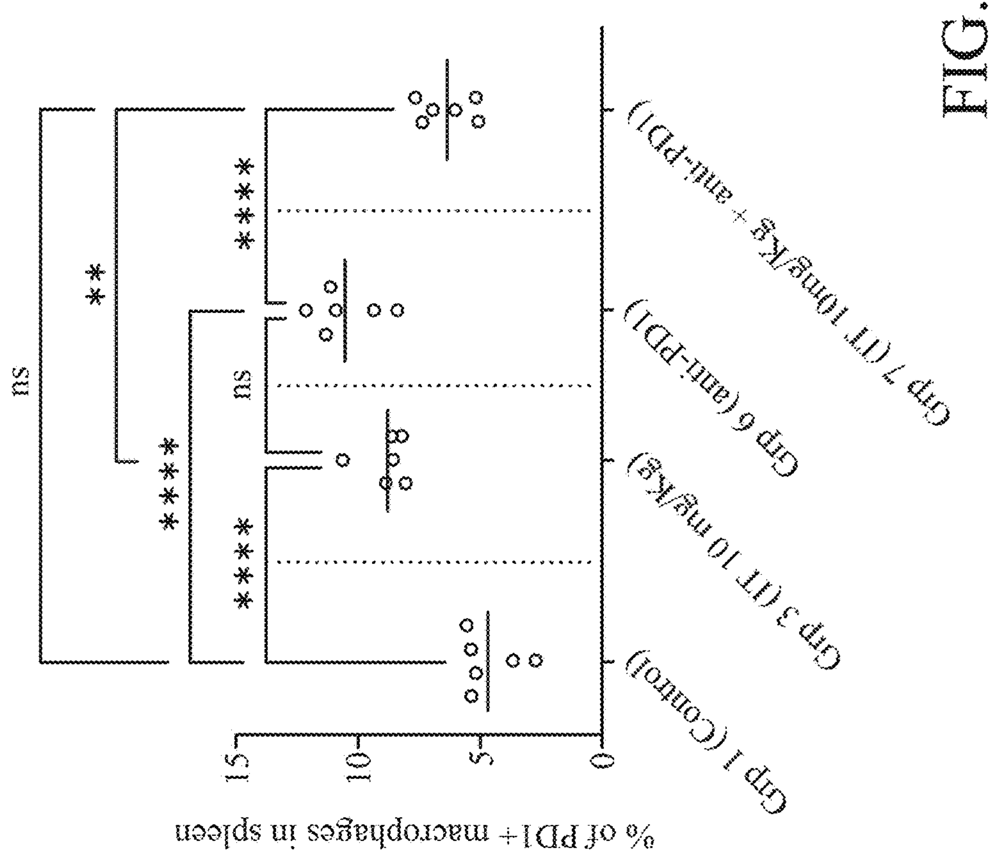

As shown in FIGS. 18A-18B, the intravenous but not the intratumor delivery of Composition 002 increased the percent of $PD1^+$ macrophages (gated on CD45*, $CD3^-$ $F4/80^+$) to a greater extent in the tumors than in the spleen. While the anti-PD-1 antibody had no effect on the percent of PD1 macrophages in the spleens, it reduced it in the tumors with a statistically significance compared to the control baseline in the intravenous arm. If the effects by Composition 002 and anti-PD-1 antibody are not consistent across the arms it might just be because of some differences in the baseline level of $PD1^+$ macrophages in only 3 selected samples between the two delivery arms.

In the combination group of the intravenous arm, the level of $PD1^+$ macrophages remained low in the tumors and statistically different compared to the value measured upon treatment with Composition 002.

Figure 19A:
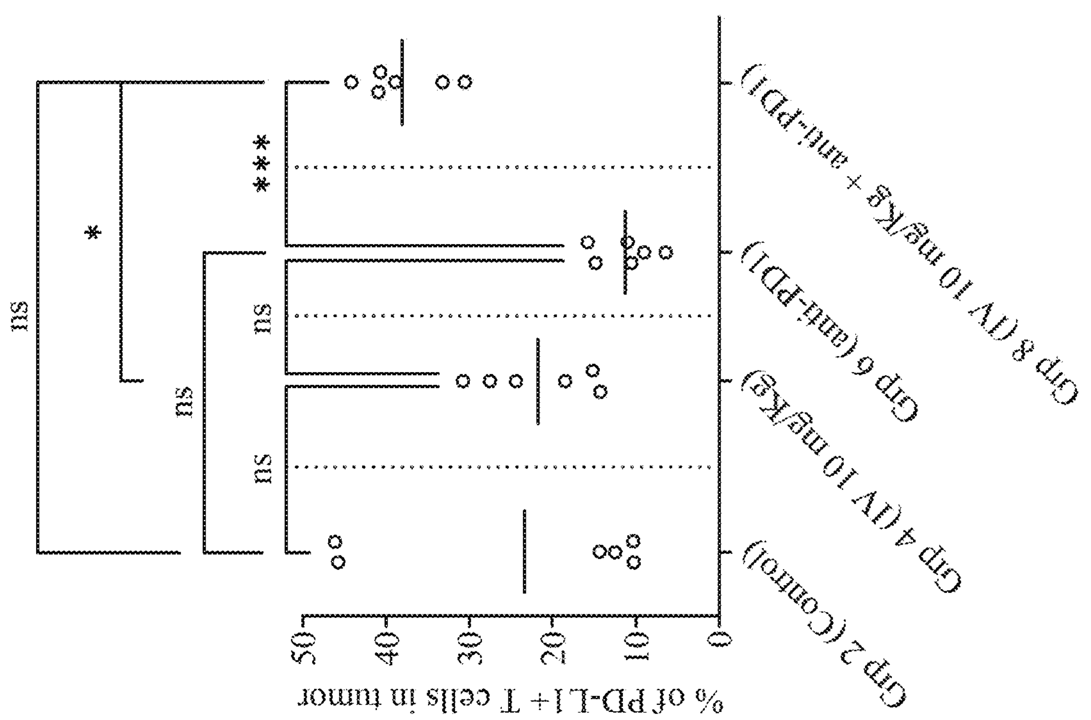
FIGS. 19A-19B: Analysis of PD-$L1^{+/high}$ T cells (gated on $CD45^+$ $CD3^+$) in spleen (Left) and tumors-TILs (Right) of the intravenous treatment groups (FIG. 19A) and intratumor groups (FIG. 19B).
Figure 19A:
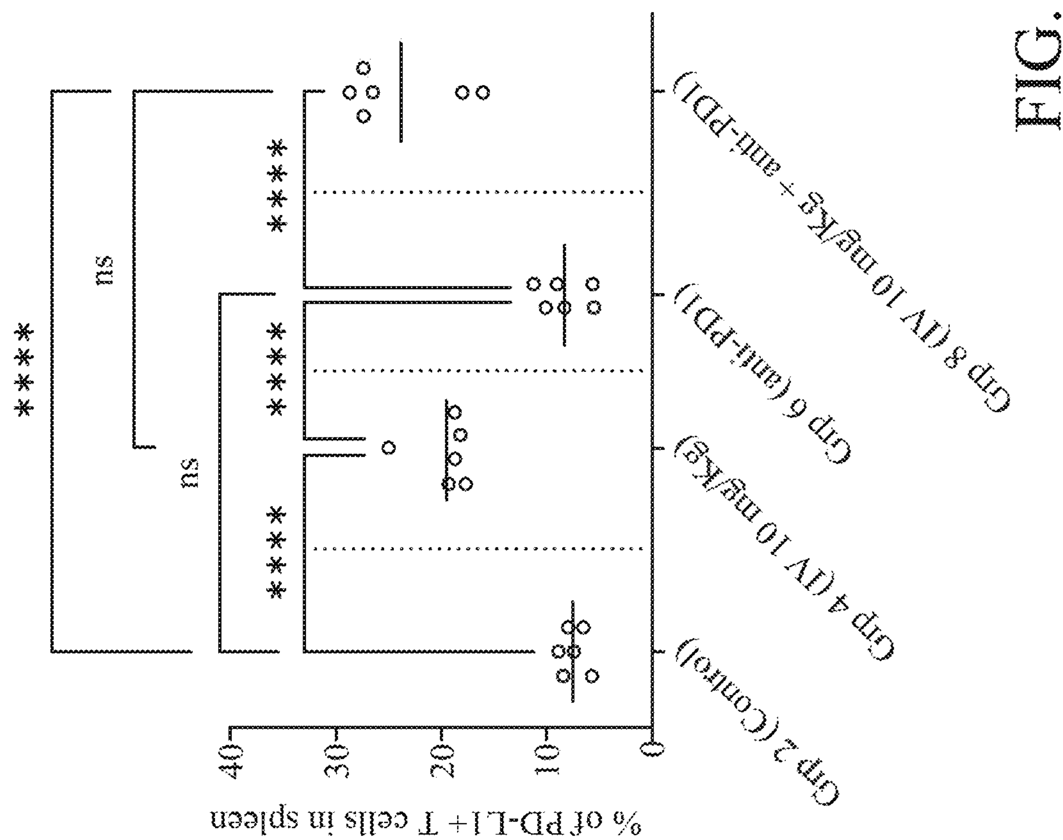
Figure 19B:
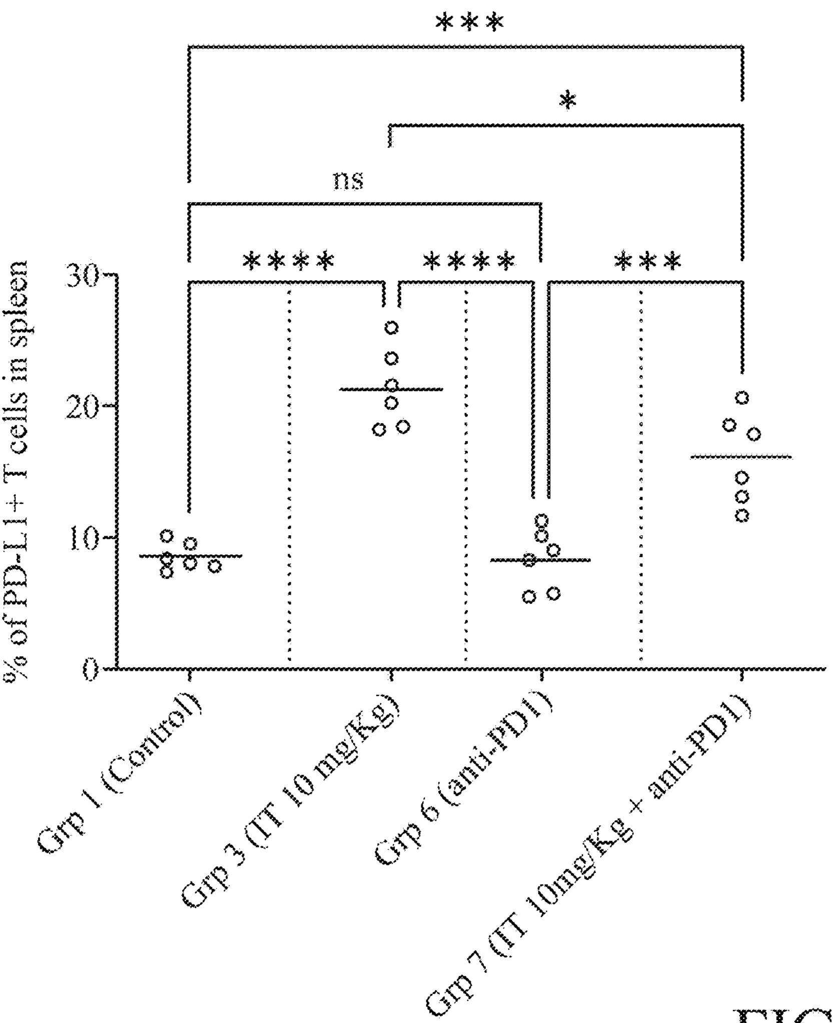
Figure 19B:
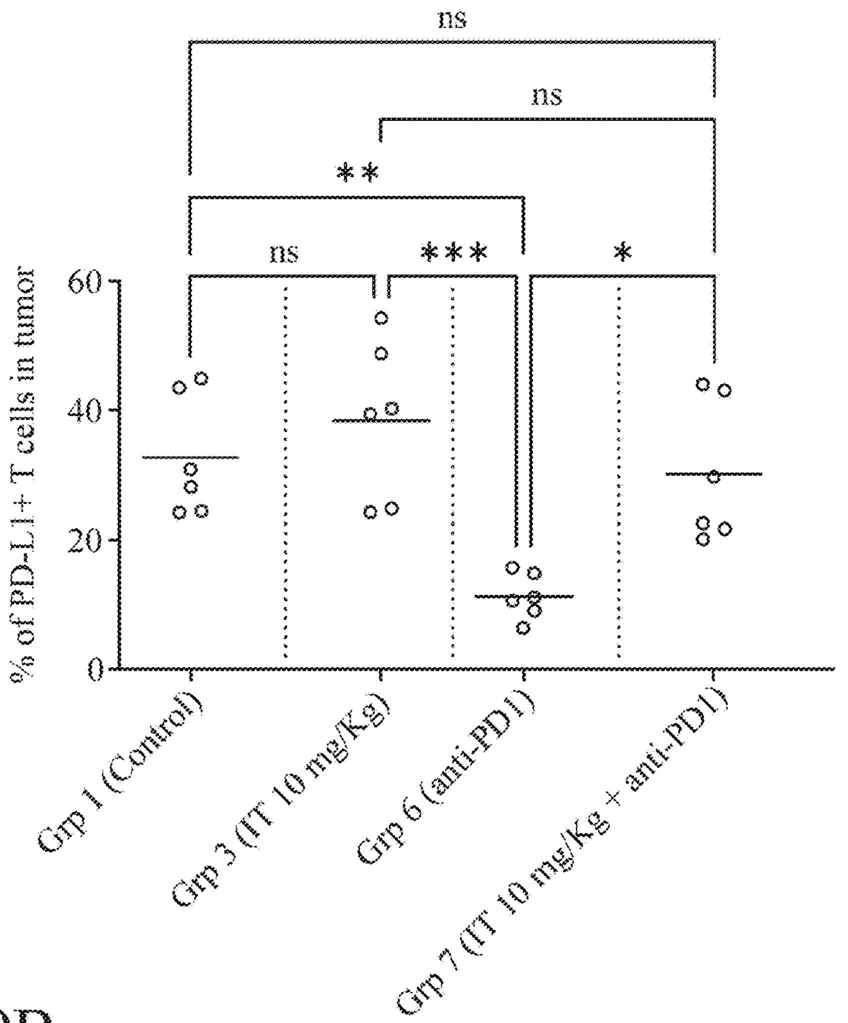

The expression of PD-L1 on T-cells (gated on $CD45^+$ $CD3^+$) in the tumors, shown in FIGS. 19A-19B, is higher in the spleen of mice treated intravenously with Composition 002 compared to controls and is not affected by anti-PD-1 antibody. There is a statistically significant difference between controls and anti-PD-1 treated tumors in the intratumor arm.

In the groups treated with Composition 002 and anti-PD-1 in combination, the percentage of $PD\text{-}L1^+$ T cells remained higher because of the increasing effect of Composition 002, similarly to the PD-1 expression results in T cells.

Figure 20A:
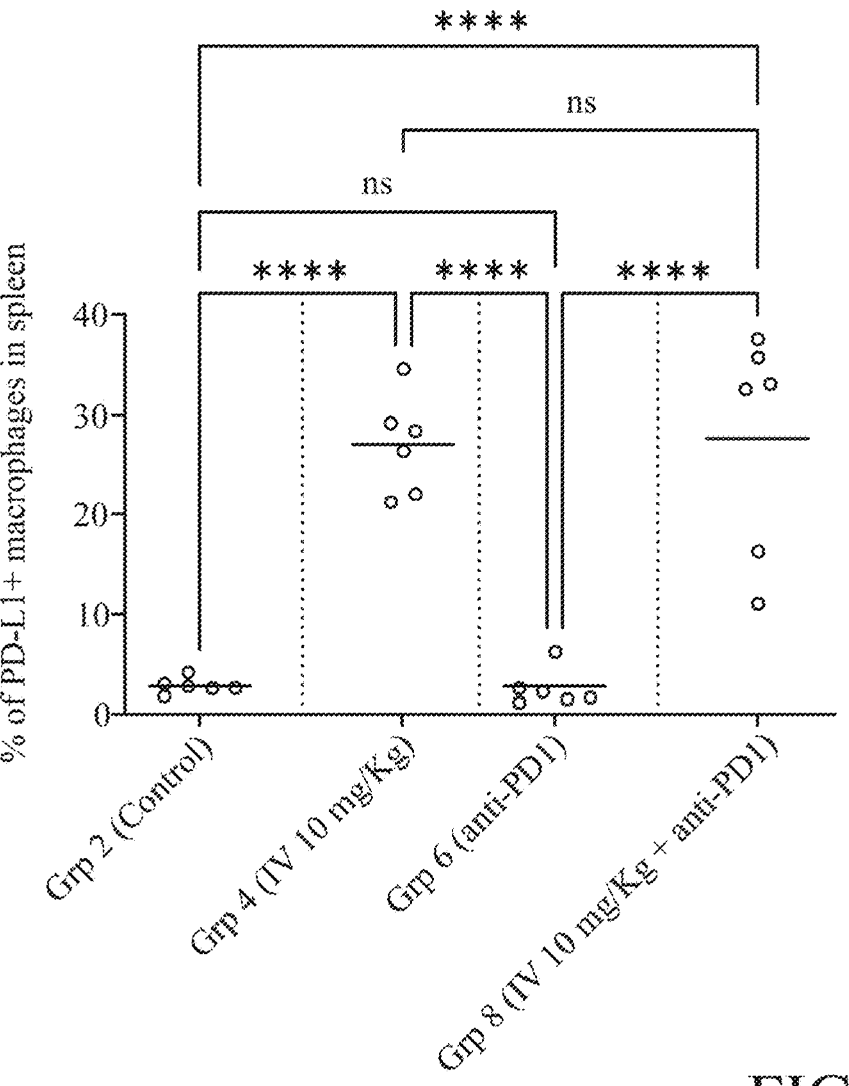
FIGS. 20A-20B: Analysis of PD-L1+/high macrophages (gated on $CD45^+$ $CD3^-$ $F4/80^+$) in spleen (Left) and tumors-TILs (Right) of the intravenous treatment groups (FIG. 20A) and intratumor groups (FIG. 20B).
Figure 20A:
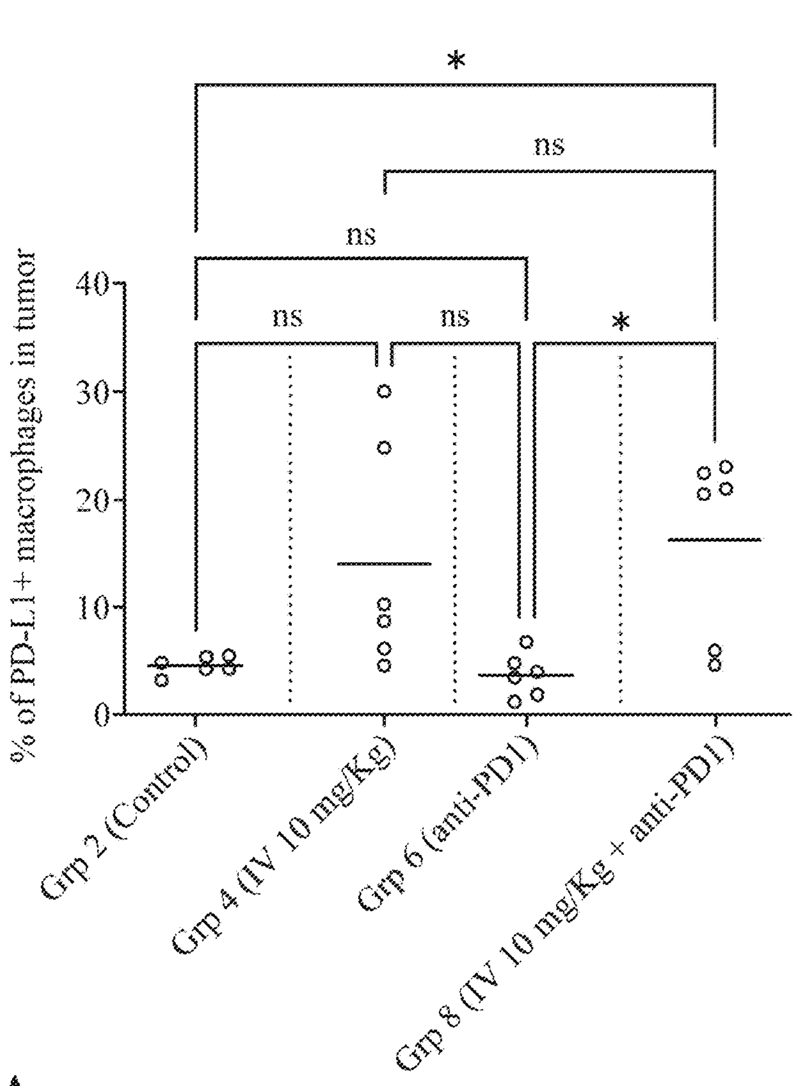
Figure 20B:
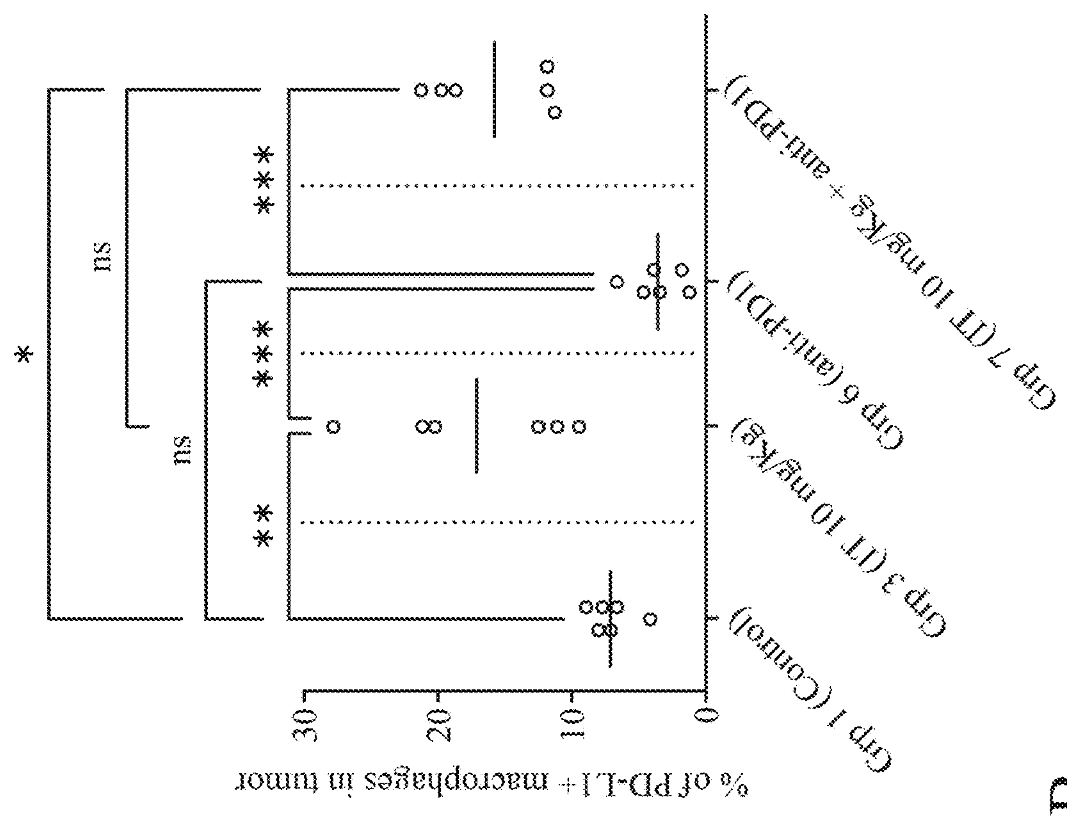
Figure 20B:
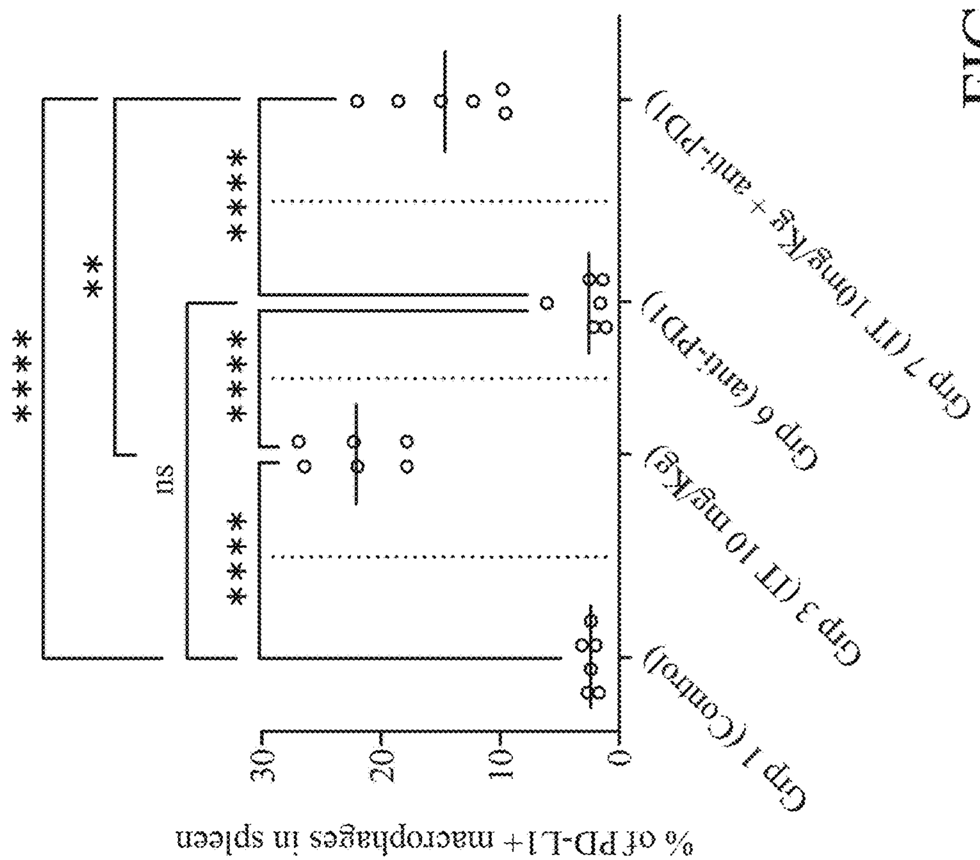
Figure 21A:
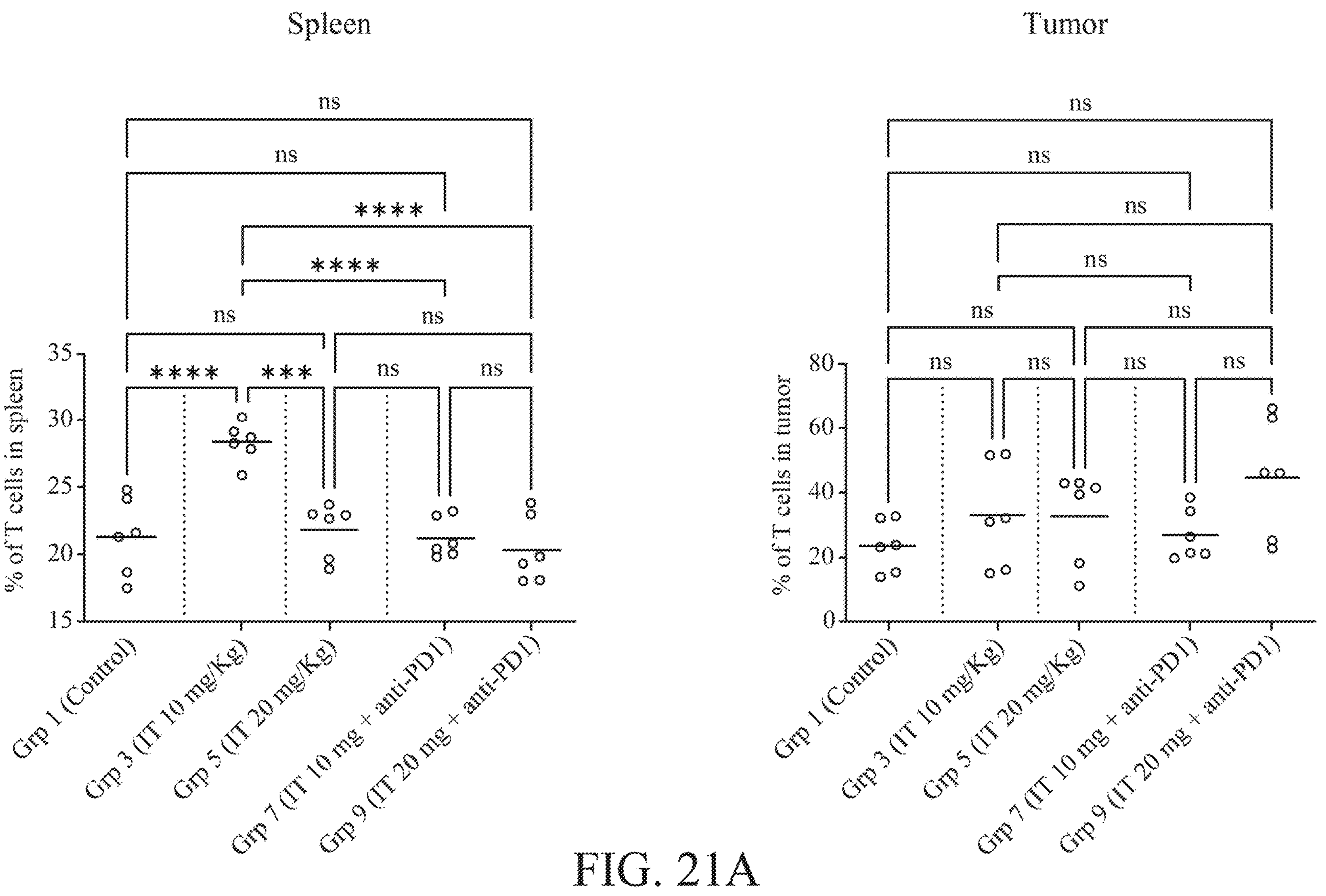
Figure 21B:
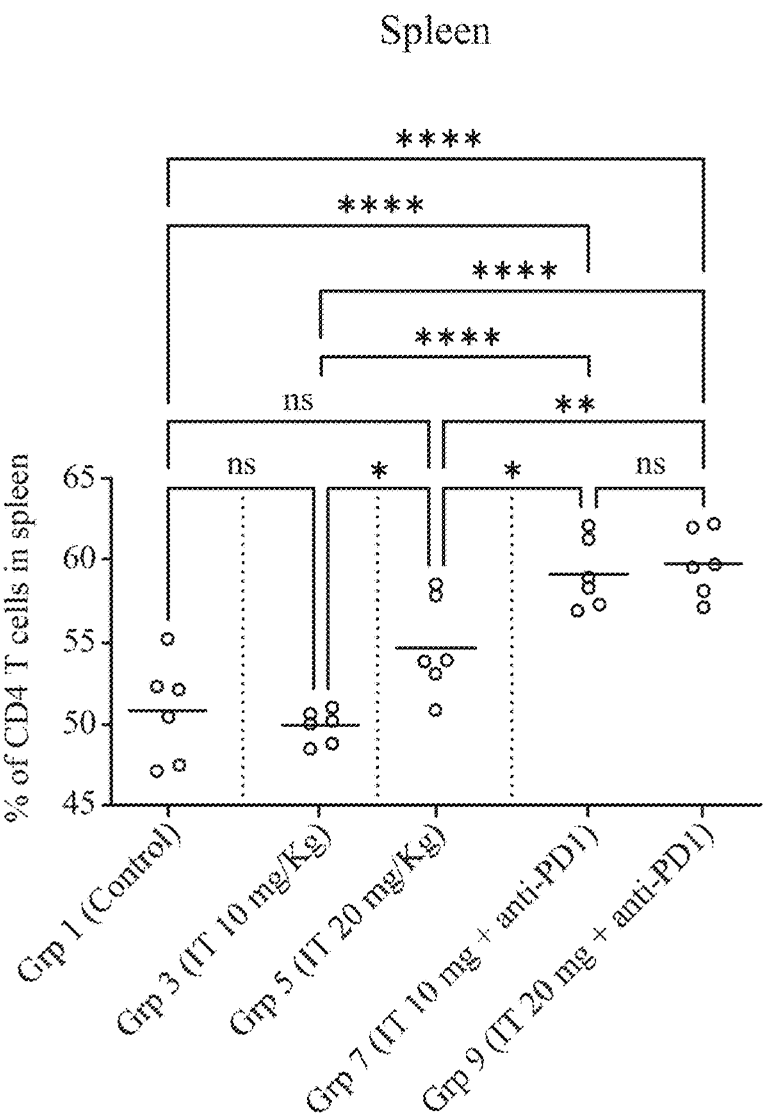
Figure 21B:
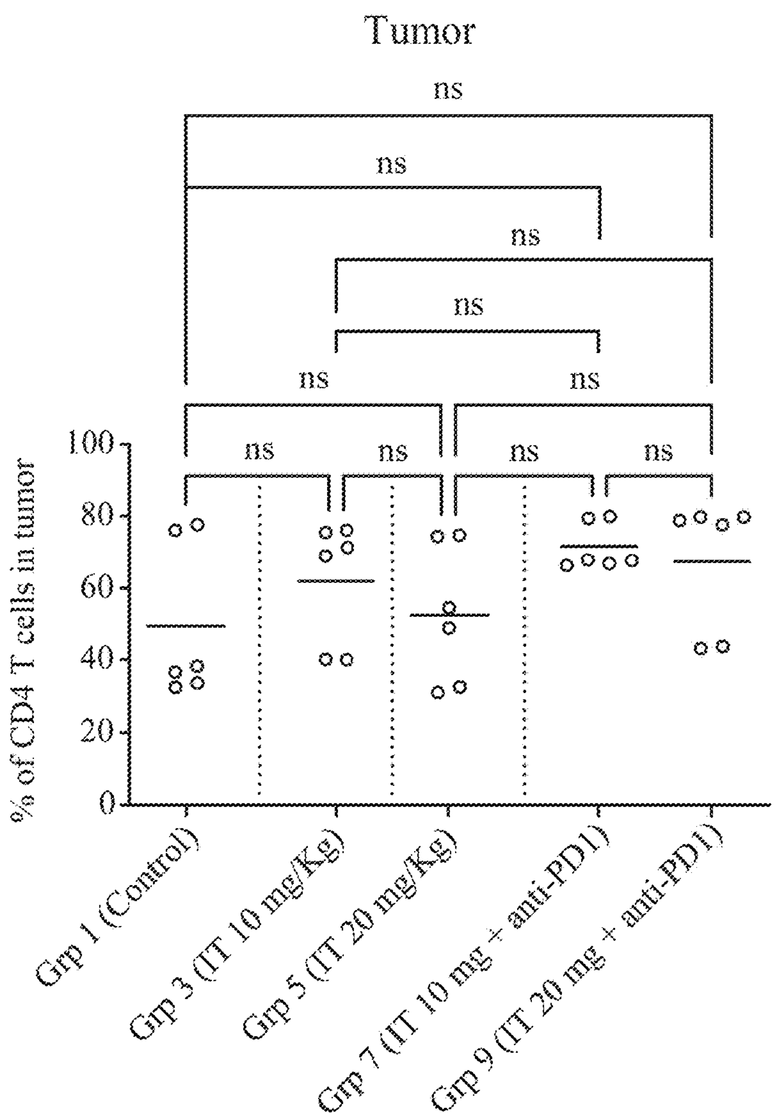
Figure 21C:
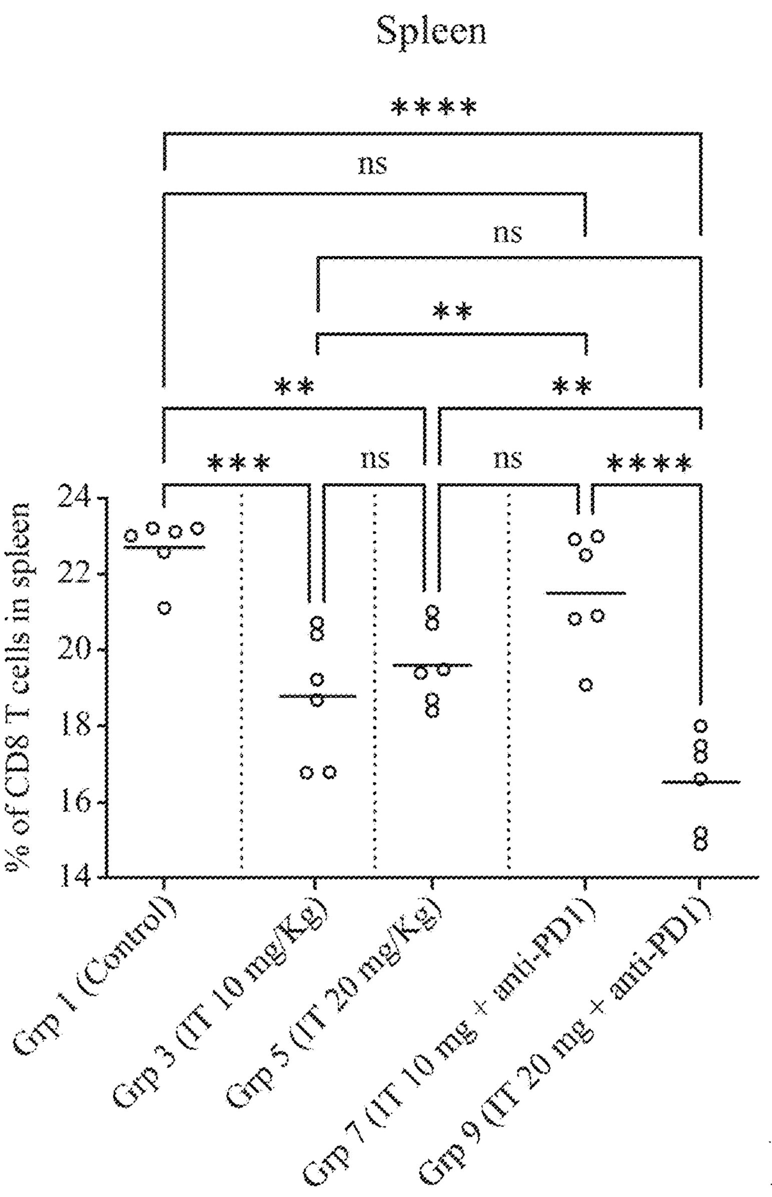
Figure 21C:
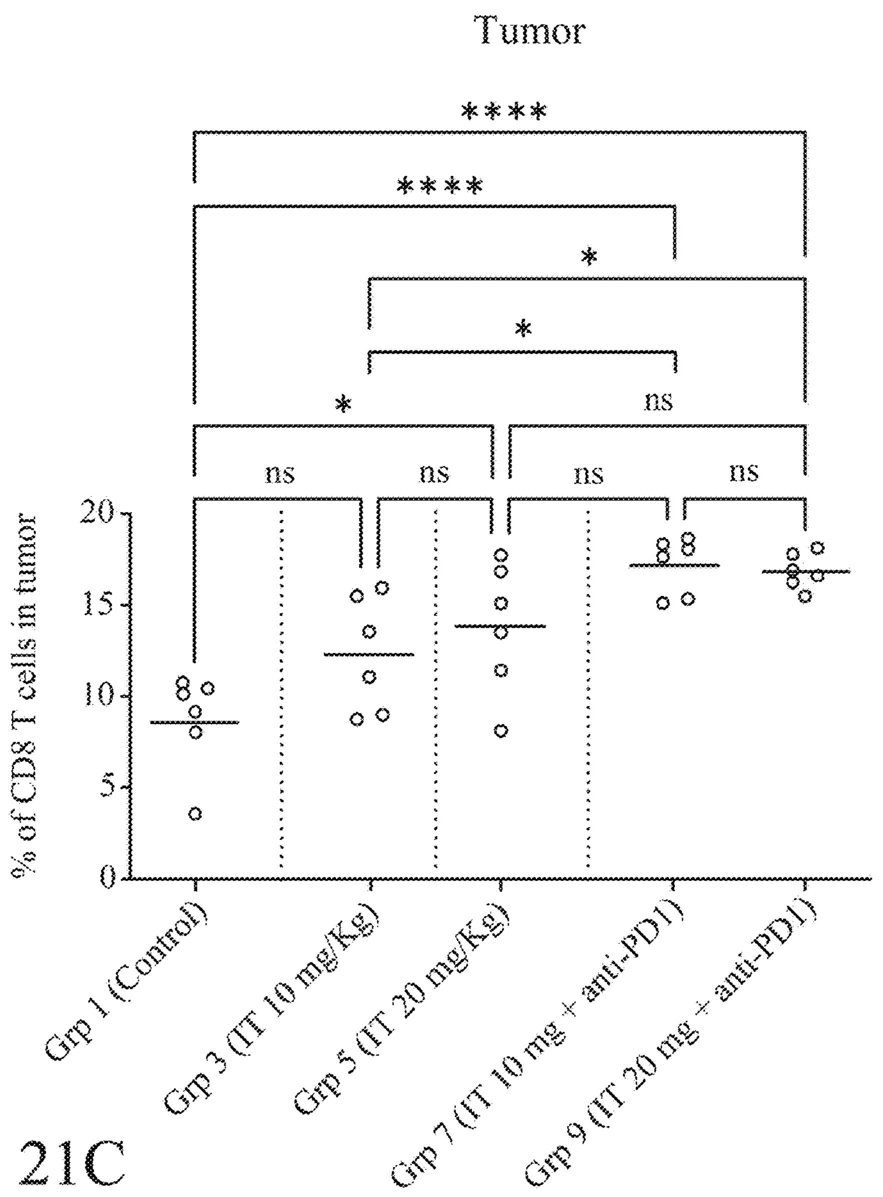
Figure 21D:
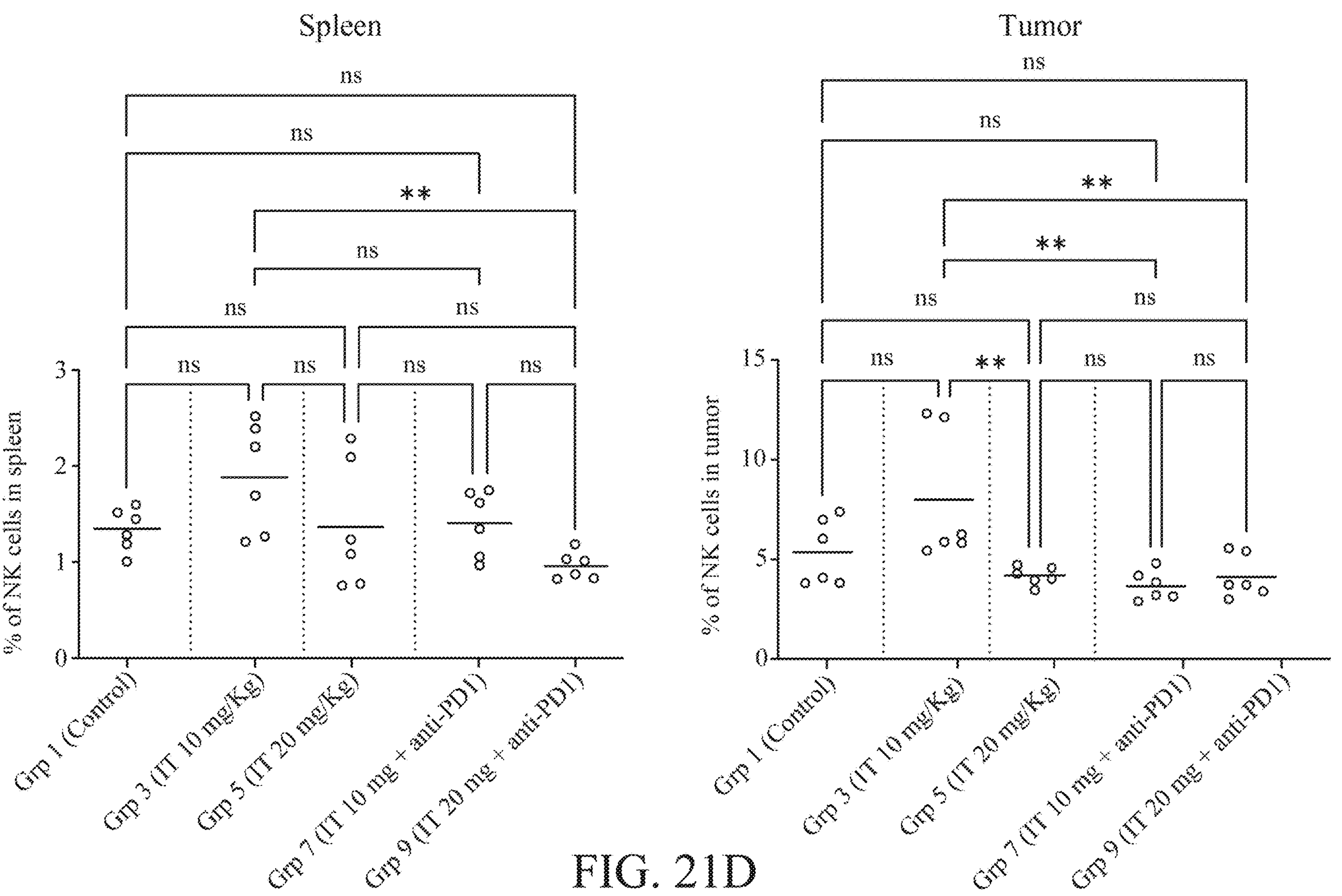
Figure 21E:
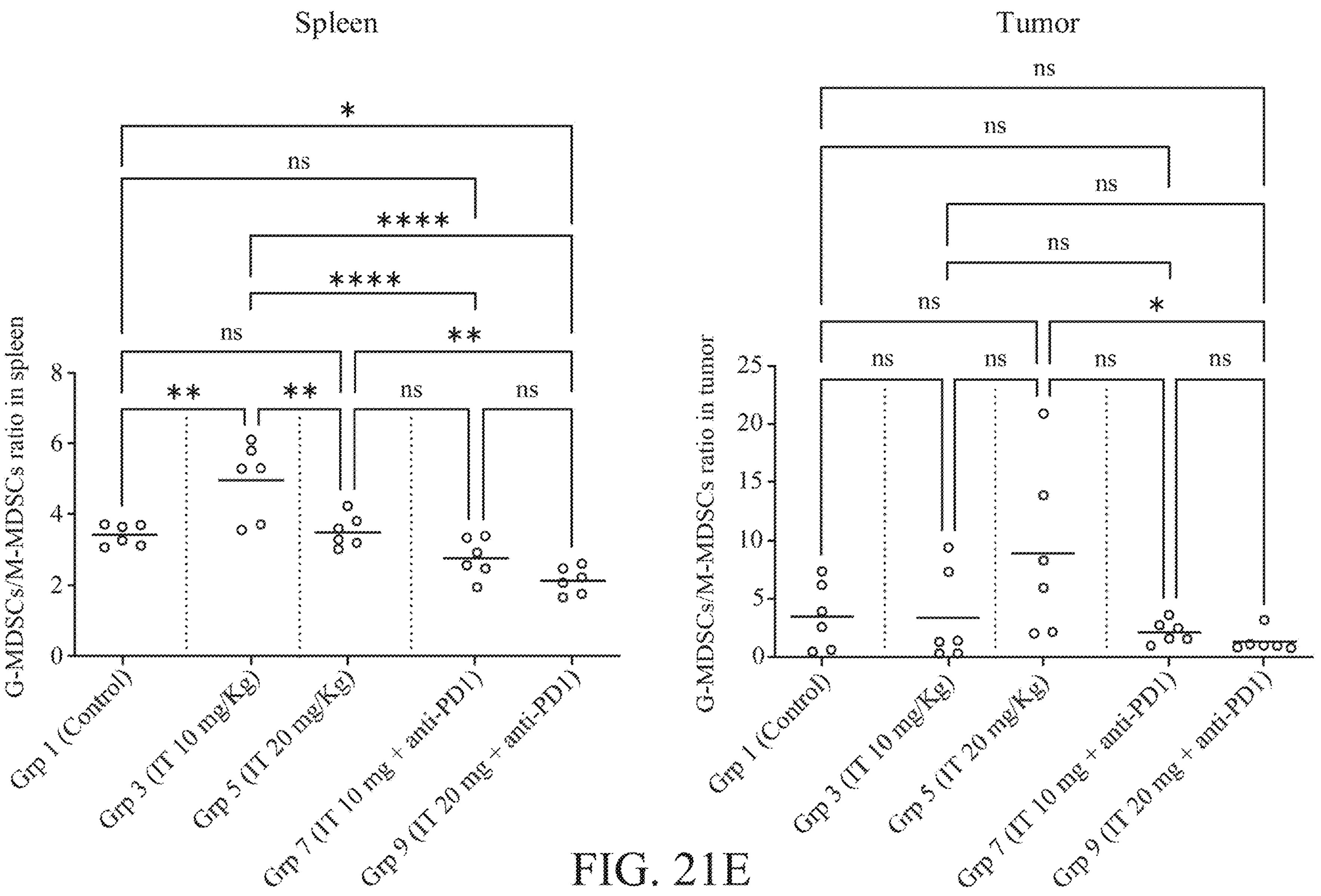
Figure 21F:
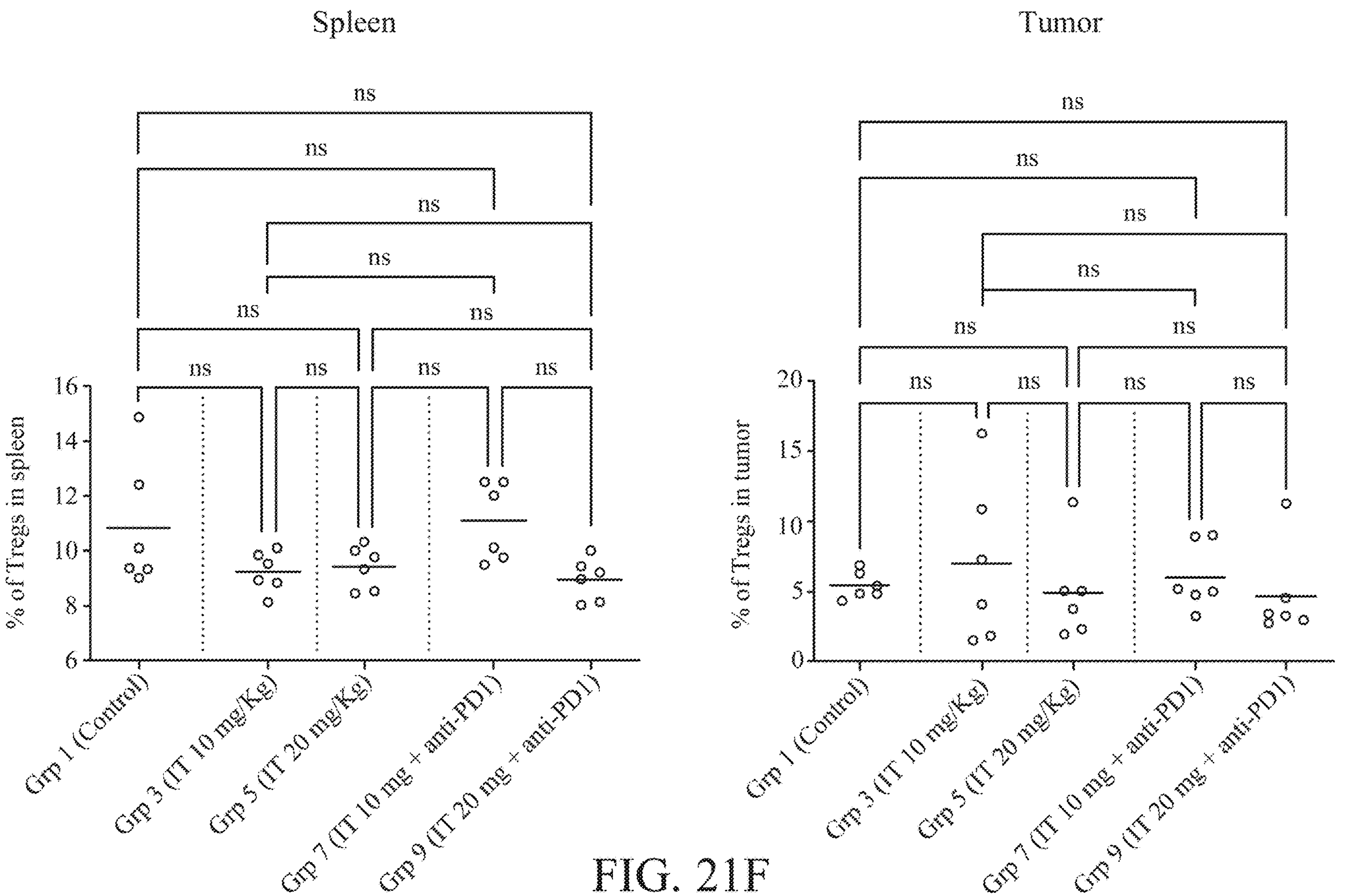
Figure 21H:
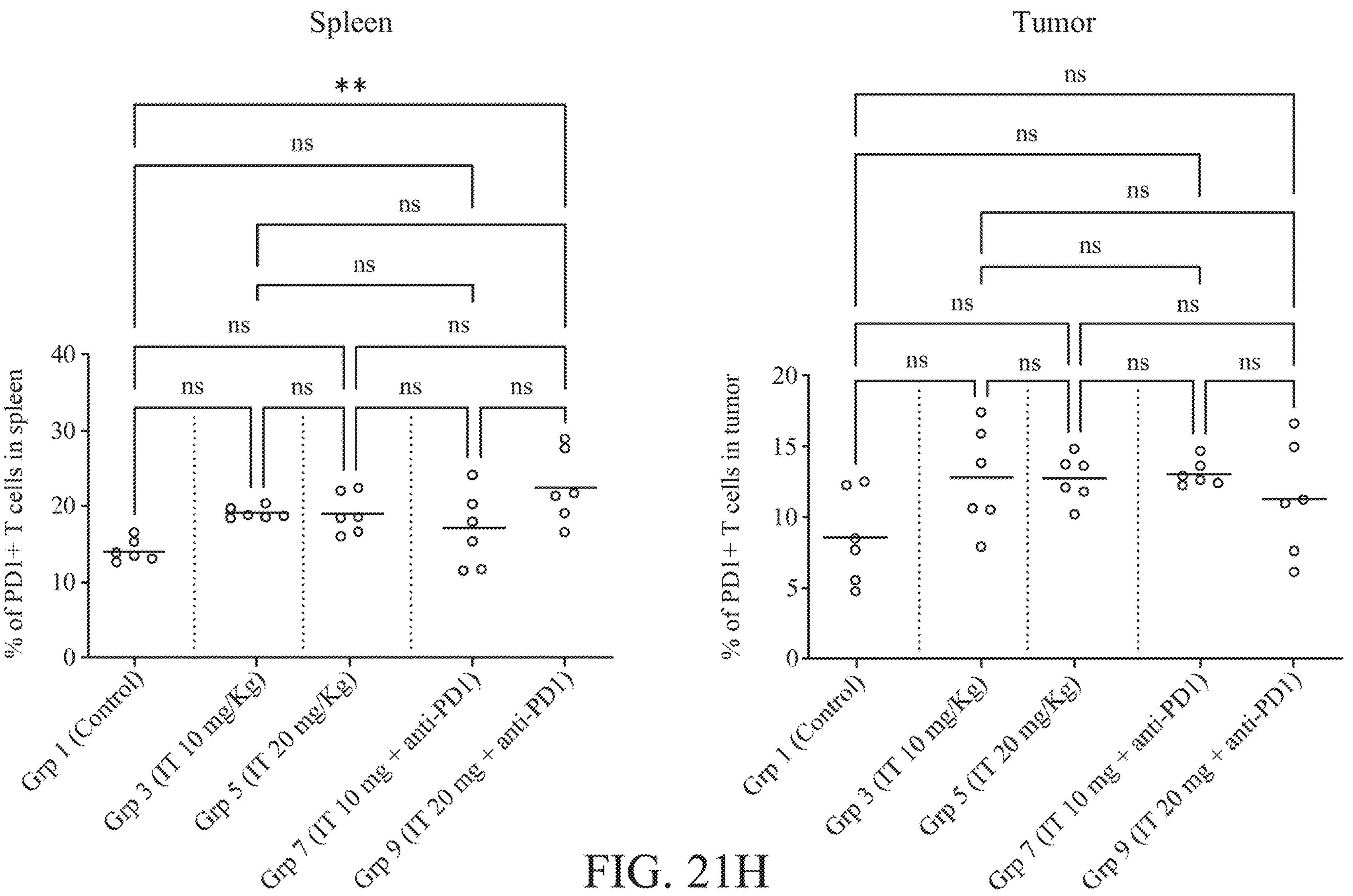
Figure 21I:
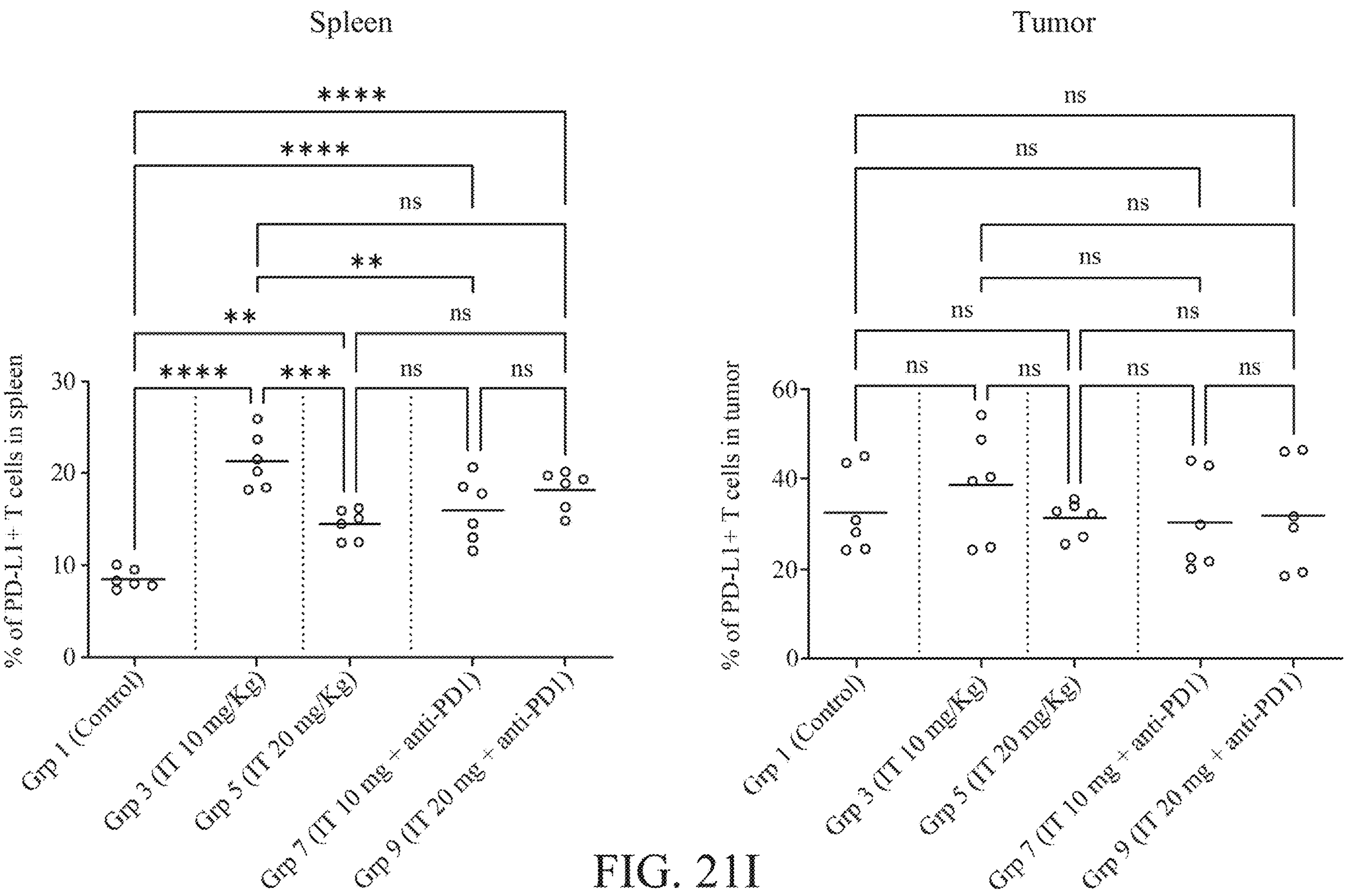
Figure 21J:
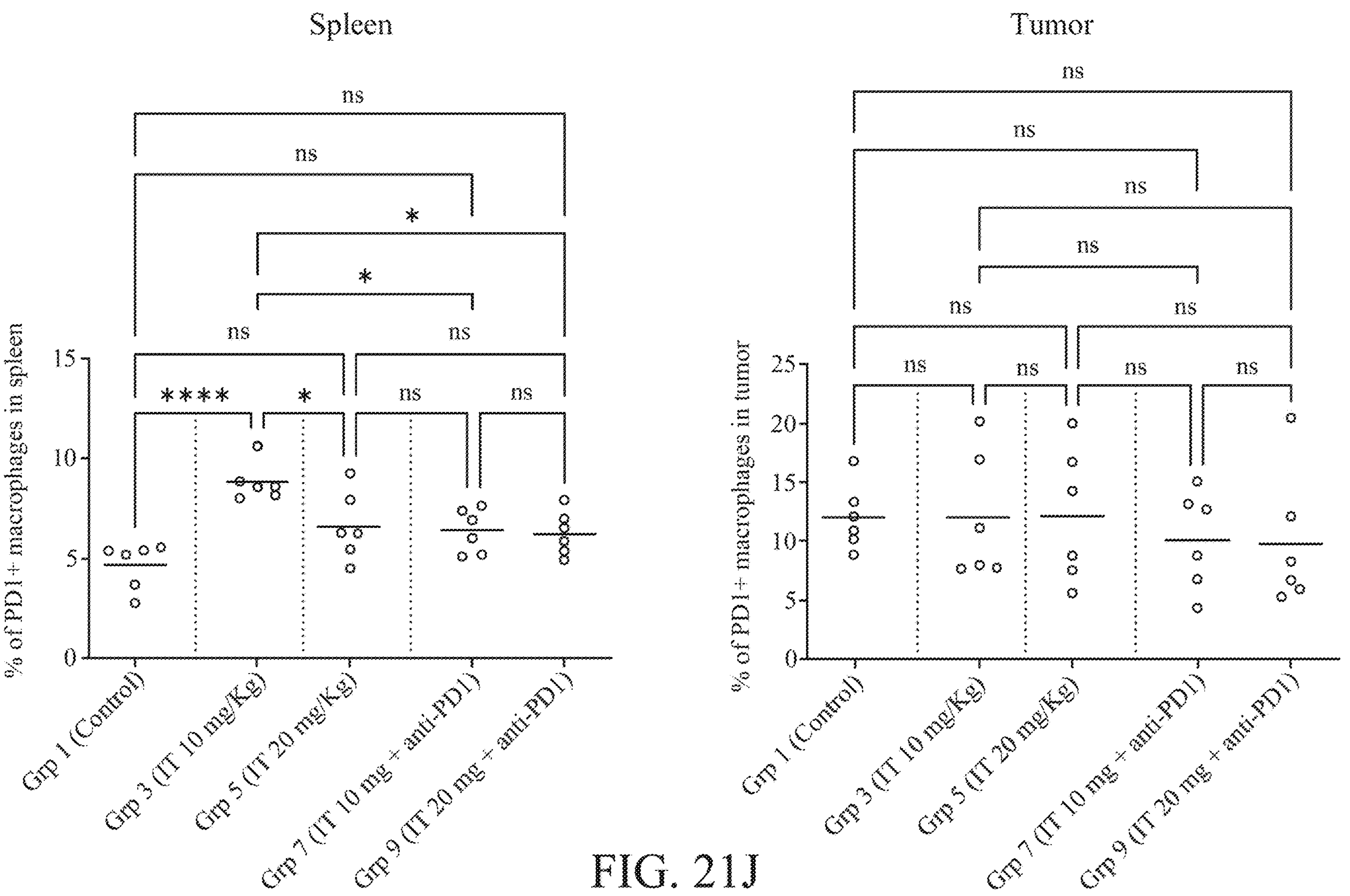
Figure 21K:
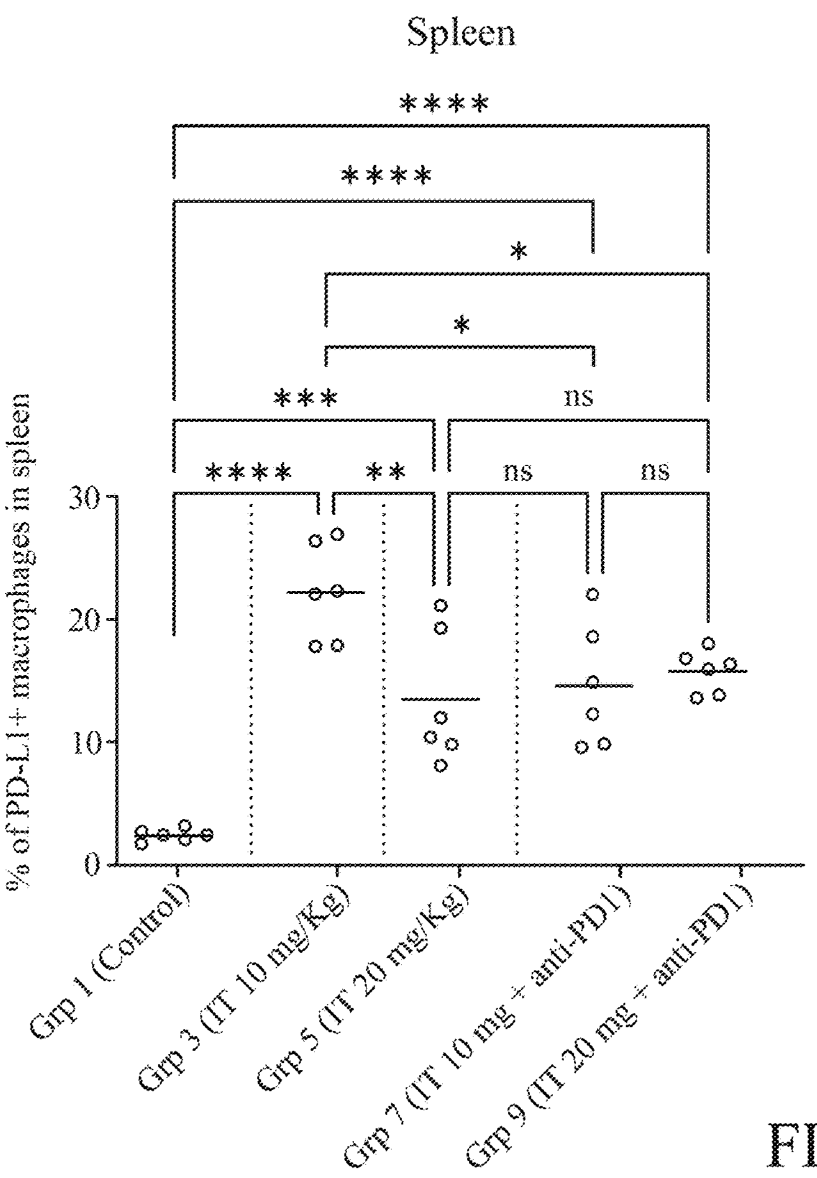
Figure 21K:
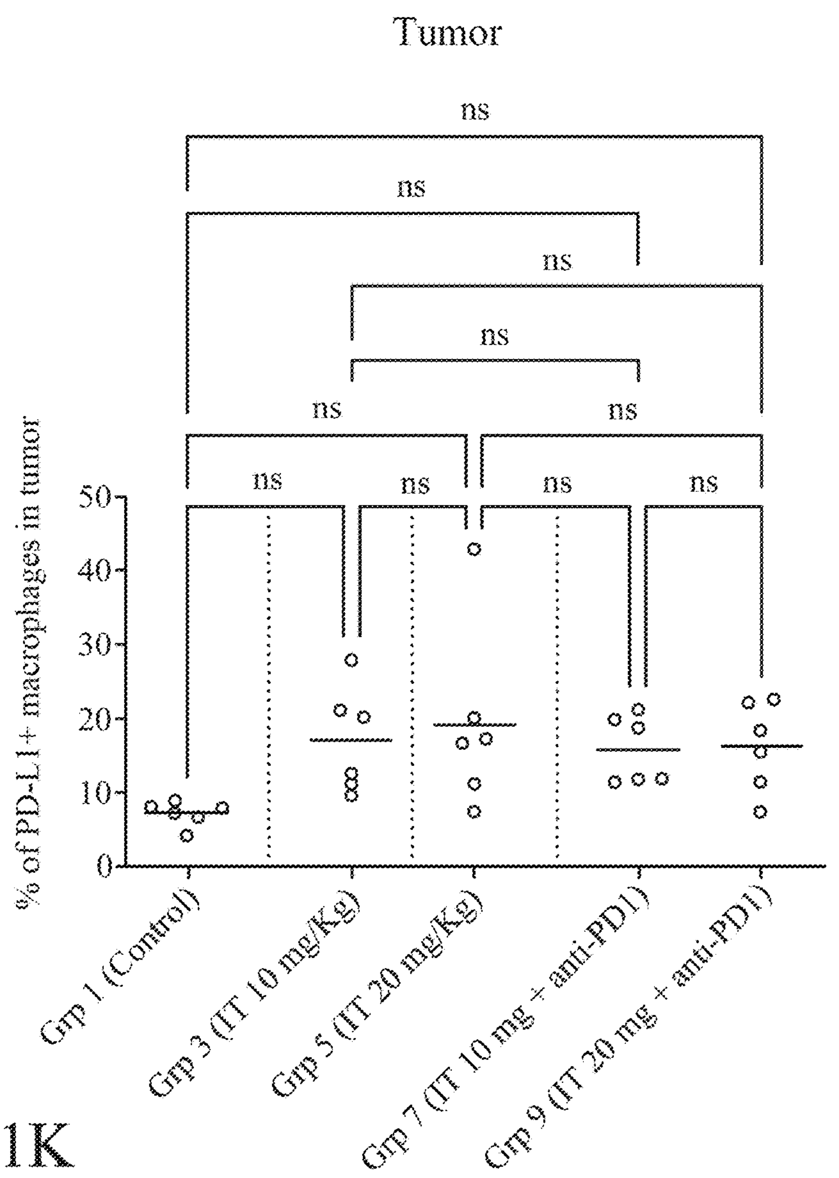

Finally, the data analysis of PD-L1 macrophages reported in FIGS. 20A-20B, demonstrates a consistent increase induced by Composition 002 in the spleens and tumors of both the intravenous and intratumor groups and no change by anti-PD-1 antibody. This increase is more robust and statistically significant in the spleens than in the tumors and is maintained in the combination treatment with Composition 002 and anti-PD-1 antibody.

All the flow cytometry analysis data described above are focused on the comparison of one dose of Composition 002 (10 mg/Kg) administered to mice intravenously or intratumorally as single agent and in combination with anti-PD-1 antibody.

In this study, the higher dose of Composition 002 (20 mg/Kg) was also tested by the intratumor route and the data are reported in FIGS. 21A-21K. Mostly, the higher dose of Composition 002 did not have a greater impact on the immune phenotypes analyzed compared to the lower dose, except for inducing a slight increase (~1.5 fold) of M1/M2 ratio in the T cells in the spleens, which was also statistically significant. Also, the combination of Composition 002 at the dose of 20 mg/Kg with anti-PD-1 was more effective in increasing the M1 macrophages than the combination of Composition 002 at the dose of 10 mg/Kg and anti-PD-1. Similarly, the high dose Composition 002 combined with anti-PD-1 caused a slightly higher increase of the percent PD-1 in T cells in the spleen (statistically significant vs. Control Group 1) compared to the lower dose combined with anti-PD-1. There was no such effect was seen in the tumors by any of the two doses of Composition 002 delivered intratumorally.

CONCLUSION

The findings from this study have demonstrated a significant inhibition of EMT6 tumor growth by Composition 002 as a single agent, which recapitulates the results from our earlier, unpublished study, and a superior anti-tumor activity by combination of Composition 002 and anti-PD-1 antibody.

In agreement with our earlier observations, the intravenous drug delivery in this study was more efficacious than the intratumor administration. Composition 002 given to mice intratumorally at the doses of 10 and 20 mg/Kg did not cause a dose-response effect. The high dose of 20 mg/Kg could not be tested by the intravenous route because it demonstrated to be unsafe. Therefore, unless the penetration and distribution of the drug through the tumor tissue is improved, it remains unknown whether increasing the exposure of the tumors to a higher drug regimen could result in increased efficacy.

The most significant and consistent changes induced by Composition 002 were on tumor associated macrophages (TAMs), with an increase of M1 and decrease of M2 cell types in concomitance with a higher percent of $PD\text{-}1^+/PD\text{-}L1^+$ T cells and $PD1^+/PD\text{-}L1^+$ macrophages. The increase of M1/M2 ratio, consistent with the paradigm that M1 represents anti-tumor activity while M2 leads to tumor progression, explains one of the mechanisms of anti-tumor activity. As it is reported in the literature, the EMT6 breast tumor model has a weak response to anti-PD-1 antibody, and in this study, it demonstrated to be completely resistant to this immune checkpoint inhibitor. Interestingly, despite the lack of efficacy by anti-PD-1 as a single agent, the combination of Composition 002 and anti-PD-1 antibody further reduced tumor growth compared to single therapies.

The higher expression of PD-1 on T cells in the treatment groups is probably due to the high immune activity stimulated by Composition 002 and a favorable immune microenvironment. However, the anti-PD-1 treatment of EMT6 tumors is not sufficient to block the immunosuppressive microenvironment; therefore Composition 002 might have the potential to be a promising drug for targeting the MDSCs to overcome the resistance to anti-PD-1.

In addition, targeting PD-L1, in addition to PD-1, in combination with Composition 002 might be an even better therapy for EMT6 and ultimately for the triple negative breast cancer in the clinic.

Example 2: In Vivo Efficacy of Non-Viable Cells of *Streptococcus pyogenes* in Monotherapy And in Combination with Anti-mPD-1 in the Syngeneic Bladder Cancer Model MBT-2 Implanted Subcutaneously in C3H/HeN Mice The antitumor efficacy of Composition 002, a lyophilized preparation of penicillin-treated *Streptococcus pyogenes* (group A, type 3, substrain), was evaluated alone and in combination with an antibody that targets programmed cell death protein 1 (PD-1) in the mouse bladder tumor model MBT-2 implanted subcutaneously (s.c.) in immunocompetent C3H/HeN mice. The efficacy experiment was initiated with eight groups of 15 mice each for treatment with lyophilized *Streptococcus pyogenes* at 2, 1 and 0.5 mg/kg given s.c. daily, either alone or in combination with 5 mg/kg anti-mPD-1 given intraperitoneally (i.p.) twice a week. One group received 5 mg/kg anti-mPD-1 alone and one group received the vehicle for lyophilized *Streptococcus pyogenes* as a control for reference. Tumor volumes at the beginning of the experiment were in the range of 50-150 $mm^3$. The endpoint of the experiment was reached when the termination criteria of tumor volume exceeding 1,500 $mm^3$ was reached in the first animals. The experiment was ended in two cohorts, such that Groups 2-7 ended on Day 8 and Groups 1 and 8 on Day 10.

Antitumor efficacy of all groups was assessed using the vehicle control group as a reference. Tumor samples taken at termination were used for the downstream analysis of tumor-infiltrating leukocytes (TIL). Using two predefined marker panels, $CD4^+$ and $CD8^+$ T cells, Tregs, granulocytic MDSC, monocytic MDSC, NK cells, and M1/M2 macrophage populations in the tumors of 10 animals per group were assessed by FC analysis. EDTA plasma samples taken during and at the end of the experiment and tumor samples were analyzed to assess changes in various cytokines using the Procarta 36-Plex Mouse Cytokine & Chemokine Panel 1A. These data have been reported separately.

Composition 002 at 0.5, 1 and 2 mg/kg in monotherapy and anti-mPD-1 at 5 mg/kg in monotherapy did not display antitumor activity against the MBT-2 tumor model in this study. Combination of 0.5, 1 or 2 mg/kg Composition 002 with anti-mPD-1 was also not efficacious against the MBT-2 tumor model in this study and no statistically significant differences in tumor volume were observed between any of the test groups and the vehicle control group (Kruskal-Wallis combined with Dunn's post test).

FC analysis of cells isolated from the MBT-2 tumors at the end timepoint showed that the percentage of $CD45^+$ cells was lower in the tumors of all test groups than in the control group. The intragroup variability of the percentage of $CD4^+$ and $CD8^+$ cells was very high. Tregs were significantly increased in the three Composition 002 monotherapy groups and the anti-mPD-1 monotherapy group as well as the 1 mg/kg Composition 002/anti-mPD-1 group compared to the control group (Kruskal-Wallis combined with Dunn's post test). The percentage of granulocytic MDSC was significantly lower while the percentage of monocytic MDSC was significantly higher in all test groups except the 2 mg/kg Composition 002 monotherapy and the 0.5 mg/kg Composition 002/anti-mPD-1 groups compared to the control. No significant differences between test and control groups were observed for NK cells. The frequency of M1 macrophages was significantly higher while the frequency of M2 macrophages was significantly lower in all test groups except the 0.5 mg/kg Composition 002/anti-mPD-1 group compared to the control.

Minor group mean body weight loss and survival rates of 87-100% after adjustment for animals that exited for tumor-related reasons were observed in this study indicating a good tolerability of the test articles.

The efficacy experiment was set up with eight groups of 15 mice each for treatment with Composition 002 at three dose levels either alone or in combination with anti-mPD-1 as outlined in Table 8. Tumor volumes at the beginning of the experiment were in the range of 50-150 $mm^3$.

TABLE 8

Deisgn of In Vivo Efficacy Experiment

| Group ID | Treatment | Total Daily Dose [mg/kg/day] | Schedule [Dosing days] | Route | No. of Animals |
|---|---|---|---|---|---|
| 1 | Control Vehicle | 10 ml/kg | 0-9 | s.c. | 15 |
| 2 | Composition 002 | 2 | 0-7 | s.c. | 15 |
| 3 | Composition N 002 | 1 | 0-7 | s.c. | 15 |
| 4 | Composition N 002 | 0.5 | 0-7 | s.c. | 15 |
| 5 | Anti-mPD-1 | 5 | 0,3,7 | i.p. | 15 |
| 6 | Composition 002 // Anti-mPD-1 | 2//5 | 0-7//0, 3, 7 | s.c.//i.p. | 15 |
| 7 | Composition 002 // Anti-mPD-1 | 1//5 | 0-7//0, 3, 7 | s.c.//i.p. | 15 |
| 8 | Composition 002 // Anti-mPD-1 | 0.5//5 | 0-9//0, 3, 7 | s.c.//i.p. | 15 |

Vehicle for Composition 002: 0.9% NaCl; vehicle for anti-mPD-1: PBS

The endpoint of the experiment was reached when the termination criteria of tumor volume exceeding 1,500 $mm^3$ was reached in the first animals. The experiment was ended in two cohorts, such that Groups 2-7 ended on Day 8 and Groups 1 and 8 on Day 10.

Tumor samples taken at termination were used for the downstream analysis of tumor-infiltrating leukocytes (TIL). Using two predefined marker panels, $CD3^+/CD4^+$ and $CD3^+/CD8^+$ T cells, Tregs, granulocytic MDSC, monocytic MDSC, NIK cells, and M1/M2 macrophage populations in the tumors of 10 animals per group were assessed by FC analysis.

EDTA plasma samples taken three days after the initiation of therapy and at termination as well as tumor samples were analyzed to assess changes in various cytokines using the Procarta 36-Plex Mouse Cytokine & Chemokine Panel 1A.

Table 9 is a summary of samples collected in this study.

TABLE 9

Sample Collection

| Group ID | No. of Animals to be Sampled | Type of Sample, Fixation | Time or Time Frame After Last Treatment | Sample Amount |
|---|---|---|---|---|
| All | 10 | EDTA Plasma (live bleed) | Exp. Day 3 after administration of therapy | 150 µl blood |
| All | 10 | Tumor for FC analysis | At the end of the treatment period | 1/3 |
| All | 10 | Tumors SF (cytokine analysis) | | 1/3 |

TABLE 9-continued

| Sample Collection | | | | |
|---|---|---|---|---|
| Group ID | No. of Animals to be Sampled | Type of Sample, Fixation | Time or Time Frame After Last Treatment | Sample Amount |
| All | 10 | Tumor FFPE | | 1/3 |
| All | 10 | EDTA Plasma | | Max amount |

Terminal plasma samples were split into a 70-μl aliquot and remainder

Antitumor efficacy of all groups was assessed using the vehicle control group as a reference. Tumor growth inhibition was determined by the comparison of RTVs of the test groups with the vehicle control group and is expressed as minimum TIC value in percent.

Figure 22A:
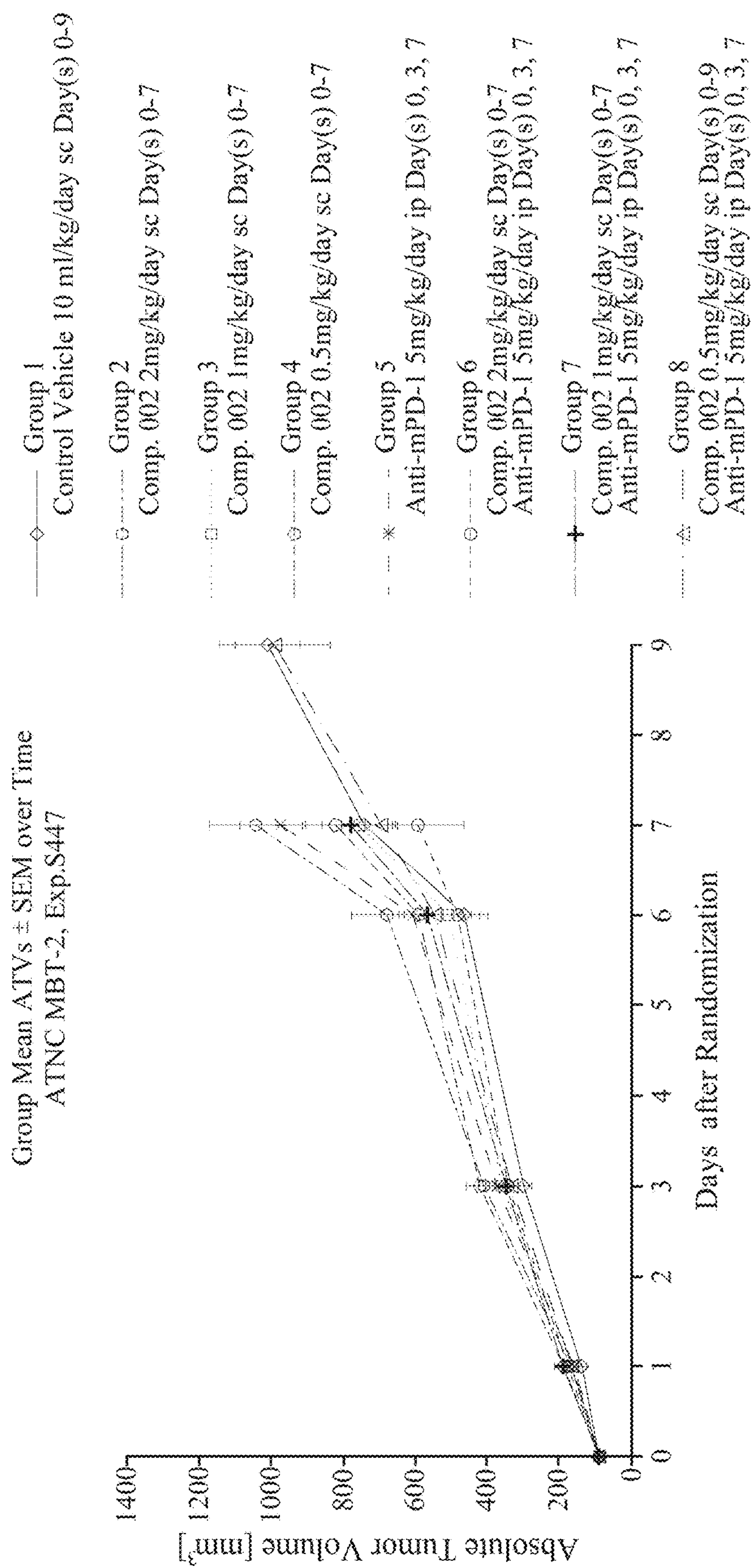
FIGS. 22A-22B: Antitumor Efficacy of Composition 002 and Anti-mPD-1 in Mono- and Combination Therapy in the MBT-2 Tumor Model.
Figure 22B:
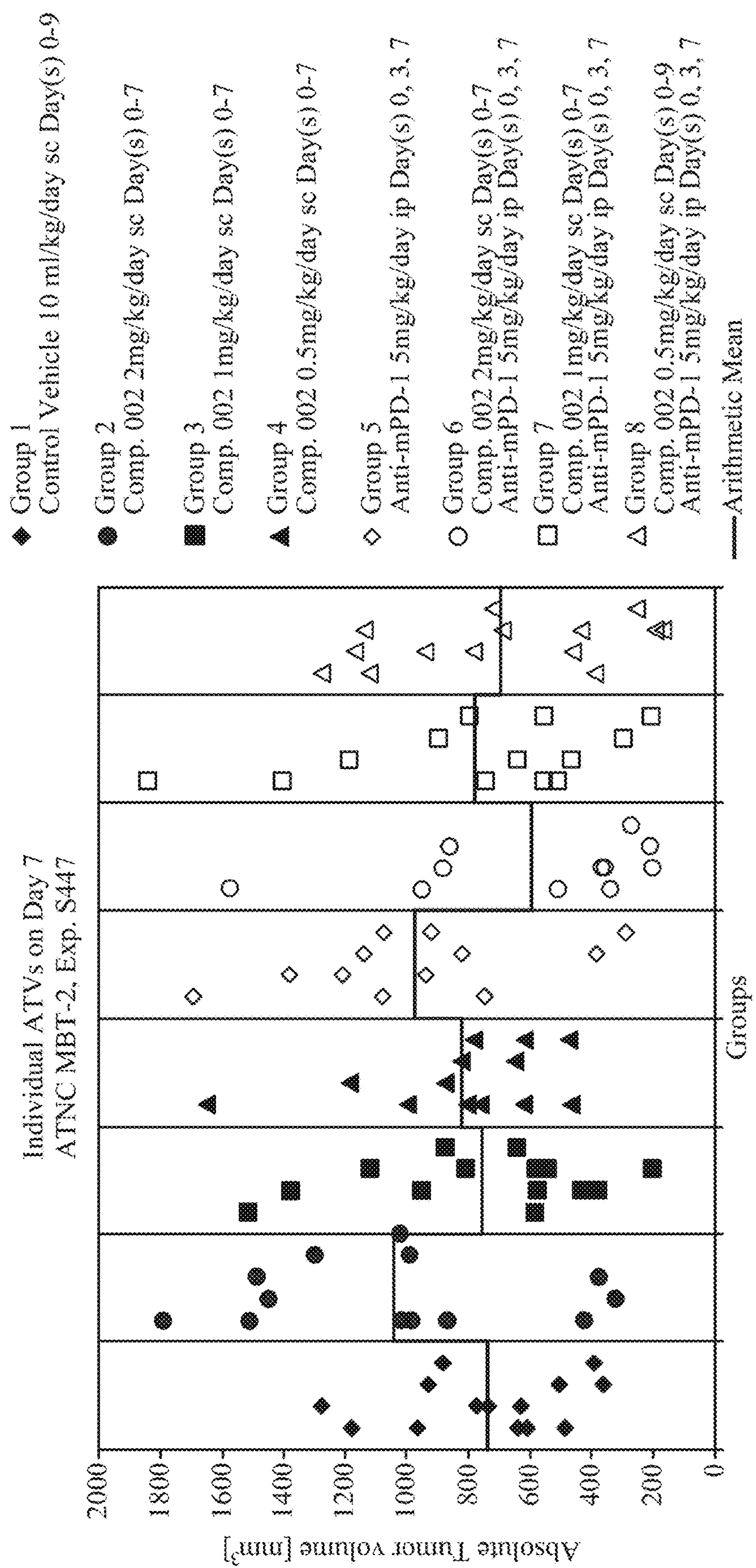

An overview of the implantation and randomization data is given in Table 10. Individual dosing schedules, efficacy, body weight and survival data are presented in Table 11 and Table 12. Tumor growth curves and FC data are presented in FIGS. 22-24.

TABLE 10

| Overview of Experiment | | | | | | | | |
|---|---|---|---|---|---|---|---|---|
| Tumor Designation/ Passage | Exp. No. | Date of Tumor Im- plantation | Number (Gender) of Animals | Tumors Impl. per Animal | Date of Random- ization (Day 0) | Number of Random- ized Animals | Group Median Tumor Volume[1] | Group Mean Tumor Volume[1] |
| MBT-2 | S447 | 29 Jan. 2021 | 239/ female | 1 | 9 Feb. 2021 | 120 | 77.6- 87.5 | 87.6 89.6 |

[1]Range at randomization [$mm^3$]

TABLE 11

| Antitumor Efficacy | | | | | | | | |
|---|---|---|---|---|---|---|---|---|
| Group ID | Treatment [1] | Dose Level [mg/kg/ day] | Schedule [Day] | Route | Minimum T/C [%] (Day)[2] | Ef- ficacy Rating | Td [Days] | Tq [Days] |
| Tumor Model MBT-2 | | | | | | | | |
| 1 | Control Vehicle | 10 ml/kg | 0-9 | s.c. | n/a | n/a | 1.5 | 4.3 |
| 2 | COMPOSITION 002 | 2 | 0-7 | s.c. | 100.0 (0) | – | 1.3 | 2.4 |
| 3 | COMPOSITION 002 | 1 | 0-7 | s.c. | 100.0 (0) | – | 1.2 | 2.8 |
| 4 | COMPOSITION 002 | 0.5 | 0-7 | s.c. | 100.0 (0) | – | 0.9 | 2.5 |
| 5 | Anti-mPD-1 | 5 | 0, 3, 7 | i.p. | 100.0 (0) | – | 1.2 | 3.0 |
| 6 | COMPOSITION 002//Anti- mPD-1 | 2//5 | 0-7// 0, 3, 7 | s.c.// i.p. | 71.6 (7) | – | 1.1 | 3.5 |
| 7 | COMPOSITION 002//Anti- mPD-1 | 1//5 | 0-7// 0, 3, 7 | s.c.// i.p. | 98.2 (7) | – | 0.9 | 3.7 |
| 8 | COMPOSITION 002//Anti- mPD-1 | 0.5//5 | 0-9// 0, 3, 7 | s.c.// i.p. | 94.9 (9) | – | 1.4 | 3.9 |

n/a = not applicable;

n.r. = not reached (i.e. group median RTVs always <200%/400%)

Efficacy rating:

+ + + +: T/C <5%;

+ + +: 5% ≤ T/C < 10%;

+ +: 10% ≤ T/C < 25%;

+: 25% ≤ T/C < 50%;

+/–: 50% ≤ T/C ≤ 65%;

–: T/C >65%

[1] Vehicle for COMPOSITION 002: 0.9% NaCl; vehicle for anti-mPD-1: PBS

[2]Minimum T/C values are calculated from mean RTV values.

TABLE 12

| Body Weight Loss and Survival Rates | | | | | | | | | |
|---|---|---|---|---|---|---|---|---|---|
| Group ID | Treatment | Dose Level [mg/kg/day] | Schedule [Day] | Last Day of Group | Maximum Mean BWL [%] (Day)[1] | Overall Survival Rate[2] | Euthanasia for Tumor-Related Reasons (Day) | Adjusted Survival Rate[3] | Other Deaths/ Euthanasia (Day) |
| Tumor Model MBT-2 | | | | | | | | | |
| 1 | Control Vehicle | 10 ml/kg | 0-9 | 10 | 0.9 (6) | 11/15 (73%) | 1 × ATV >1500 $mm^3$ (10) 3 × ulcerating tumor (6, 7, 9) | 15/15 (100%) | — |
| 2 | COMPOSITION 002 | 2 | 0-7 | 8 | 2.0 (3) | 11/15 (73%) | 2 × ATV >1500 $mm^3$ (8, 8) 2 × ulcerating tumor (6, 7) | 15/15 (100%) | — |
| 3 | COMPOSITION 002 | 1 | 0-7 | 8 | 2.5 (3) | 13/15 (87%) | 1 × ATV >1500 $mm^3$ (8) 1 × ulcerating tumor (6) | 15/15 (100%) | — |
| 4 | COMPOSITION 002 | 0.5 | 0-7 | 8 | 3.9 (3) | 11/15 (73%) | 1 × ATV >1500 $mm^3$ (8) 1 × ulcerating tumor (5) | 13/15 (87%) | 2 × found dead (8, 8) |
| 5 | Anti-mPD-1 | 5 | 0, 3, 7 | 8 | 1.6 (3) | 11/15 (73%) | 1 × ATV >1500 $mm^3$ (8) 3 × ulcerating tumor (6, 6, 7) | 15/15 (100%) | — |
| 6 | COMPOSITION 002// Anti-mPD-1 | 2//5 | 0-7// 0, 3, 7 | 8 | 1.7 (3) | 9/15 (60%) | 1 × ATV >1500 $mm^3$ (8) 4 × ulcerating tumor (6, 6, 7, 7) | 14/15 (93%) | 1 × found dead (6) |
| 7 | COMPOSITION 002// Anti-mPD-1 | 1//5 | 0-7// 0, 3, 7 | 8 | 2.6 (3) | 12/15 (80%) | 1 × ATV >1500 $mm^3$ (8) 1 × ulcerating tumor (3) | 14/15 (93%) | 1 × found dead (5) |
| 8 | COMPOSITION 002// Anti-mPD-1 | 0.5//5 | 0-9// 0, 3, 7 | 10 | 3.0 (3) | 8/15 (53%) | 3 × ATV >1500 $mm^3$ (10, 10, 10) 2 × ulcerating tumor (9, 10) | 13/15 (87%) | 2 × found dead (7, 10) |

Vehicle for COMPOSITION 002: 0.9% NaCl; vehicle for anti-mPD-1: PBS

[1]Day on which the minimum mean body weight was recorded when at least 50% remained in the group;

n.r.: not relevant, no body weight loss recorded (i.e. group mean RBWs always >100%).

[2]Number of animals that would have survived beyond the last experimental day over total number of animals in the group.

[3]Survival rate adjusted for (i.e. including) all animals that were euthanized for tumor-related reasons and for sample collection.

Materials and Methods

| Test Reagents | | |
|---|---|---|
| Test Reagent | Total Amount [mg][1] | Concentration [mg/ml] |
| Anti-mPD-1 | 81.66 | 8.78 |
| COMPOSITION 002 | 84 | — |

[1]Amount active pharmaceutical ingredient delivered unless stated otherwise

| Handling | | | | |
|---|---|---|---|---|
| Test Article | Delivery Form | Shipping | Storage Temperature | Comments |
| Anti-mPD-1 | Solution | 4° C. | 4° C. | Protected from light- |
| COMPOSITION 002 | Powder | 4° C. | 4° C. | — |

Formulation

Vehicle for anti-mPD-1: PBS

Vehicle for COMPOSITION 002: 0.900 NaCl

Test reagents were dissolved in or diluted with the appropriate vehicle on dosing days as indicated in the Table below.

| Test Article | Concentration Stock Solution [mg/mg] | Amount Stock Solution [μl] | Amount Vehicle [μl] | Concentration Dosing Solution [mg/ml] |
|---|---|---|---|---|
| Anti-mPD-1 | 8.78 | 854 | 14 146 | 0.5 |

| Test Article | Amount Test Article [mg] | Amount Vehicle [μl] | Concentration Dosing Solution [mg/ml] | Test Article |
|---|---|---|---|---|
| COMPOSITION 002 | — | 1 | 5 000 | 0.2 |
| | — | 1 | 10 000 | 0.1 |
| | — | 1 | 20 000 | 0.05 |

All dosing solutions were administered in a dose volume of 10 ml/kg.

Animals

The animals (female C3H/HeNCrl mice) were shipped from Charles River at the standard age of four to six weeks and an acclimatization period of a minimum of one week was applied on arrival prior to use. Animals were arbitrarily numbered using radio frequency identification transponders (Planet TD) during tumor implantation. Each cage was labeled with a record card indicating all relevant experimental details.

Animals were housed in individually ventilated cages (TECNIPLAST Sealsafe-IVC-System, TECNIPLAST, Hohenpeissenberg, Germany), depending on group size, either in type III or type II long cages. They were kept under a 14 L:10 D artificial light cycle. The temperature inside the cages was maintained at 22±1° C. with a relative humidity of 40-70% and 60-65 air changes/hour in the cage. Dust-free bedding consisting of aspen wood chips with approximate dimensions of 5 mm×5 mm×1 mm (ABEDD, LAB & VET Service GmbH, Vienna, Austria, product code: LTE E-001) and additional nesting material were used. The cages including the bedding and the nesting material were changed weekly. The animals were fed autoclaved Teklad Global Extruded 19% Protein Rodent Diet from Envigo RMS SARL and had access to sterile filtered and acidified (pH 2.5) tap water that was changed twice weekly. Feed and water were provided ad libitum. All materials were autoclaved prior to use.

Where necessary, a nutrient fortified water gel (DietGel Recovery from Clear$H_2O$, Maine, USA) was provided to animal cages and changed every other day.

Tumor Cell Cultivation and Implantation

The bladder tumor xenograft used in this study was derived from a commercially available cell line MBT-2.

Cells were grown at 37° C. in a humidified atmosphere with 5% $CO_2$ in EMEM medium (CLS #820100a) supplemented with 10% (v/v) fetal bovine serum (Sigma #F9665) and 0.05 mg/ml gentamicin (Life Technologies, Karlsruhe, Germany) and passaged at 40-60% using TrypLE Express (Thermo Fisher, #12605-010). Recipient animals were anesthetized by inhalation of isoflurane and received $1\times10^6$ tumor cells (100 μl of a suspension in PBS) by subcutaneous (s.c.) injection into the right flank. Cell viability in the cell suspension was determined before and after tumor implantation using the CASY TT Cell Counter (OLS OMNI Life Science GmbH & Co. KG, Bremen, Germany).

Enrollment/Initiation of Experiments

Animals were monitored until the tumor implants reached the study volume criteria of 50-150 $mm^3$ in a sufficient number of animals. Mice were assigned to groups aiming at comparable group median and mean tumor volumes. The process of the assignment to groups (enrollment, stratified randomization) is referred to as randomization in this report. The day of randomization was designated as Day 0 of the experiment.

The time from implantation to randomization at the required tumor volume is expressed in days as Induction time (IT).

Animal Monitoring

Animals were routinely monitored at least twice daily on working days and at least once daily on weekends and public holidays. Routine monitoring included inspections for dead animals, assessment of animal welfare and tumor growth by observation, control of feed and water supply and of technical housing conditions. Any observed or suspected impairment of animal welfare was documented. Observations and possible consequences, e.g. application of euthanasia criteria or measures of veterinary care, are reported with the experimental data in Table 12. Where deemed necessary, a post mortem examination of animals was performed.

Body Weights

Animals were weighed daily for the first week, then three times a week, or daily if body weight loss in excess of 10% was recorded. Relative body weights of individual animals were calculated by dividing the individual body weight on Day x ($BW_x$) by the individual body weight on the day of randomization ($BW_0$) multiplied by 100:

$$RBW_x[\%] = \frac{BW_x|[g]}{BW_o[g]} \times 100$$

Group mean relative body weights (RBW) were calculated for evaluation purposes. Group mean RBW values were used to populate graphs for as long as at least 50% of the animals in a group remained alive.

Individual body weight changes in % were calculated by dividing the body weight change from the day of randomization to Day, ($BW_x$–$BW_0$) by the body weight on the day of randomization ($BW_0$) multiplied by 100.

$$\text{Body weight change}(\text{Day}_x)[\%] = \frac{BW_x - BW_o}{BW_o} \times 100$$

Tumor Volumes

The absolute tumor volumes (ATVs) were determined by two-dimensional measurement with a digital caliper (S_Cal EVO Bluetooth, Switzerland) on the day of randomization and then three times weekly. Tumor volumes were calculated according to the formula $$\text{Tumor volume} = (1 \times w^2) \times 0.5$$

where 1=largest diameter and w=width (perpendicular diameter) of the tumor (in mm).

Relative volumes of individual tumors (individual RTVs) for Day x were calculated by dividing the absolute individual tumor volume on Day x ($T_x$) by the absolute individual tumor volume of the same tumor on the day of randomization ($T_0$) multiplied by 100:

$$RTV_x[\%] = \frac{T_x}{T_o} \times 100$$

Group mean RTV values were used for drawing growth curves and for treatment evaluation for as long as at least 50% of the animals in a group remained alive.

For calculation of the group mean tumor volumes, the values from all animals that were alive on the day in question were included.

Administration of Therapy

Dosing was performed as described in Table 11. The s.c. therapy was administered into a fold of loose skin over the flank instead of the usual loose skin over the neck to facilitate blood collection after therapy.

The first day of dosing was the day of randomization (Day 0).

Dosing Adjustments

When considerable body weight loss is recorded in efficacy studies the following measures are taken:

- Daily body weight measurements of individual animals with body weight loss >10%
- No therapy for individual animals with body weight loss >15%
- Facilitated access to feed and water for animals with body weight loss >10%
- Resumption of dosing when individual animals have regained a RBW of ≥90%

Note, DietGel is supplied to all animals in the group/cage if one of them requires facilitated access to feed and water. Dosing omissions may also be applied under the direction of the responsible veterinarian for any other impairment of animal welfare.

Euthanasia Criteria

According to animal welfare regulations and the relevant SOP of Charles River Discovery Research Services Germany, the following humane endpoints apply to individual animals, irrespective of the experimental status:

- Tumor volume >1500 $mm^3$ (1200 $mm^3$ before weekends)
- Ulcerating, skin-penetrating tumor
- Dermal necrosis at tumor site >5-8 mm diameter
- Body weight loss >30% on any one measuring day
- Continued body weight loss >20% for more than two days
- Rapid recorded decrease in body weight >20% within two days
- Severe impairment of general condition (apathy, pain, markedly reduced feed and water intake, dyspnea, abnormal habitus or behavior)

Where individual animals fulfilled euthanasia criteria, sampling was performed ahead of the scheduled time and, if feasible, at the correct time interval after administration of the last applicable dose.

Tumor Samples

Tumors were collected immediately after euthanasia and divided into three parts where possible. The first third was prepared for FC analysis. The second part was snap frozen in liquid nitrogen for cytokine analysis and the third section was transferred to fixative (FFPE samples).

The fixation was performed in 10% neutral buffered formalin for approximately 24 h. The fixative was then replaced by submerging the samples in 70% ethanol for up to seven days. Thereafter, samples were dehydrated by sequentially incubating them in the following solutions: 70% ethanol (two times 0.5 h), 80% ethanol (two times 1 h), 100% ethanol (two times 0.5 h), 100% isopropanol (1.5 h), xylene (two times: 1 h; 1.5 h). Finally, samples were infiltrated by and embedded in paraffin.

Tumor samples were not collected in cases of complete tumor remission or severe ulceration at the tumor site.

For FC analysis, the tumors were cut into 2-4 mm pieces and treated with the Miltenyi mouse tumor dissociation kit following the manufacturer's instructions. Briefly, tumor pieces were incubated with the provided enzyme mix on a gentleMACS Dissociator, the resulting cell suspension was strained though a MACS SmartStrainer (100 μm; Miltenyi, #130-110-917), the strainer was washed, the cells were centrifuged at 300×g for 5 min and the supernatant was discarded.

Cells were resuspended in 1×ACK lysis buffer (150 mM ammonium chloride, 10 mM potassium bicarbonate, 0.1 mM EDTA, pH 7.2-7.4) and incubated for 1-3 min at room temperature. Cells were pelleted by centrifugation at 300×g for 5 min and the supernatant was removed. The cells were washed by resuspension in FC buffer (2% FBS in PBS) and centrifugation at 300×g for 5 min. The supernatant was removed, and the cells were resuspended in FC buffer, counted and processed for FC analysis with $5\times10^5$ cells per well.

Blood Samples

Blood was collected by retrobulbar sinus puncture under isoflurane anesthesia.

Plasma was prepared by collecting the blood in standard plasma vials containing EDTA as anticoagulant on ice directly followed by two centrifugations at 2000×g for 5 min at 4° C. Plasma was transferred to a new tube on ice, and samples were stored at −80° C. prior to analysis or shipment.

Flow Cytometry

| Antibody Panel A | | | | | | | |
|---|---|---|---|---|---|---|---|
| Target | Fluorochrome | Channel | Isotype | Clone | Catalogue No. | Supplier | Target |
| mCD3e | FITC | BL1 | Hamster IgG1, κ | 145-2C11 | 553062 | BD | mCD3e |
| mLy-6G | PerCp-Cy5.5 | BL3 | Rat IgG2a, κ | 1A8 | 127615 | BioLegend | mLy-6G |
| mCD45 | AF700 | RL2 | Rat IgG2b, κ | 30-F11 | 103127 | BioLegend | mCD45 |
| mCD11b | APC Cy7 | RL3 | Rat IgG2b, κ | M1/70 | 561039 | BD | mCD11b |
| mCD4 | eF450 | VL1 | Rat/ IgG2a, kappa | RM4-5 | 48-0042-82 | Thermo Fisher | mCD4 |
| mLy-6C | BV 605 | VL3 | Rat IgM, κ | AL-21 | 563011 | BD | mLy-6C |
| mCD8 | BV650 | VL4 | Rat IgG2a, κ | 53-6.7 | 100741 | BioLegend | mCD8 |
| mCD25 | PE | YL1 | Rat IgG1, λ | PC61 | 553866 | BD | mCD25 |
| mFoxP3[1] | APC | RL1 | Rat IgG2a, kappa | FJK-16 | 17-5773-82 | eBioscience | mFoxP3[1] |
| LD | Zombie Aqua | VL2 | — | — | 423102 | BioLegend | LD |

[1]Intracellular marker

| Antibody Panel B | | | | | | |
|---|---|---|---|---|---|---|
| Target | Fluorochrome | Channel | Isotype | Clone | Catalogue No. | Supplier |
| mCD3e | FITC | BL1 | Hamster IgG1, κ | 145-2C11 | 553061 | BD |
| mCD45 | AF700 | RL2 | Rat IgG2b, κ | 30-F11 | 103127 | BioLegend |
| mCD11b | APC/Cy7 | RL3 | Rat (DA) IgG2b, κ | M1/70 | 561039 | BD |
| mF4/80 | BV421 | VL1 | Rat IgG2a, κ | BM8 | 123137 | BioLegend |
| mCD335 | BV605 | VL3 | Rat IgG2a, κ | 29A1.4 | 137619 | BioLegend |
| mCD49b | PE | YL1 | Rat/IgM, kappa | DX5 | 12-5971-82 | Thermo Fisher |
| mCD206[1] | APC/Cy7 | RL1 | Rat/ IgG2b, kappa | MR6F3 | 17-2061-82 | Thermo Fisher |
| LD | Zombie Aqua | VL2 | — | — | 423102 | BioLegend |

[1]Intracellular marker

Flow cytometry (FC) buffer used was 2% FBS in PBS. Fc-block antibody used was CD16/32 purified (2.4G2), 0.5 mg/ml (#553142—BD Biosciences).

Cells were transferred to a 96-well plate ($5\times10^5$ cells/well). Cells were pelleted by centrifugation of the plates at 400×g for 5 min and the supernatant was removed. Fc-block antibody (10 μl/well of a 1:100 dilution in FC buffer) was added to each well and the plates were incubated for 5 min at room temperature. Then specific antibodies targeting cell surface markers (see Section 5.3.10.1 for antibodies used; antibody panels A and B were stained separately) were added as recommended by the manufacturer in Zombie Aqua Fixable Viability stain (diluted 1:100 in PBS buffer) and the plates were incubated at 4° C. protected from light for 30 min. Cells were washed by the addition of 200 μl FC buffer followed by centrifugation of the plates at 400×g for 5 min, and the supernatant was removed.

For staining of intracellular mouse FoxP3, 200 μl fixation solution (BD Pharmingen #51 9006124) was added to the relevant wells and plates were incubated for 30 min at 4° C. protected from light. Cells were pelleted by centrifugation of the plates at 400×g for 5 min at room temperature and the fixation solution was removed. Cells were washed by resuspension in 200 μl permeabilization solution (BD Pharmingen #51 9006125) prewarmed to 37° C. and centrifugation of the plates at 400×g for 5 min and the permeabilization solution was carefully removed. Fresh permeabilization solution (200 μl) was added to the relevant wells and plates were incubated for 30 min at 37° C. protected from light. Cells were pelleted by centrifugation of the plates at 400×g for 5 min and the permeabilization solution was discarded. Cells were washed once in 200 μl FC buffer and incubated with FoxP3 antibody in 40 μl FC buffer per well. After incubation for 20 min at room temperature in the dark, 200

μl FC buffer was added, the plate was centrifuged at 400×g for 5 min and the FC buffer was removed.

Finally, the cells were resuspended in 200 μl FC buffer, transferred to deep well plates where 200 μl FC buffer was added for analysis with the Attune NXT Acoustic Focusing Cytometer (violet (405 nm)/blue (488 nm)/yellow (561 nm)/red (638 nm) laser configuration).

Data Evaluation

Survival Rates

The survival rate (Table 12) was calculated by counting the number of animals that would have survived beyond the last experimental day of each group and dividing them by the total number of animals in the group. Animals that died or were euthanized on the last day of the group for any other reason than sample collection or termination of the group were not counted as survivors. The adjusted survival rate in Table 2 was calculated by counting all surviving animals including those that were euthanized for tumor-related reasons and dividing them by the total number of animals in the group. The following reasons for euthanasia are classed as tumor-related: 1) tumors fulfilling volume-related euthanasia criteria including accessory tumors and 2) ulcerating tumors. Euthanasia of animals due to symptoms of tumor-induced cachexia is not counted as tumor-related.

Tumor Volume Doubling/Quadrupling Time

Tumor volume doubling and quadrupling time (Td, Tq) for test and control groups is defined as the time interval (in days) required for a group to reach a median RTV of 200% or 400%. Data are presented in Table 11.

Inhibition of Tumor Growth, Test/Control Value in % (Min. T/C Value)

The test versus control value for a particular day ($T/C_{mean}$ in %) was calculated from the ratio of the mean RTV values of test versus control groups on Day x multiplied by 100.

$$T/C_x[\%] = \frac{\text{mean } RTV_x \text{ treated group}}{\text{mean } RTV_x \text{ control group}} \times 100$$

The minimum (or optimal) $T/C_{mean}$ value recorded for a test group during an experiment represents the maximum antitumor efficacy for the respective treatment. Please note that minimum $T/C_{mean}$ values were calculated including any values generated by using the LOCF methodology.

| Group minimum $T/C_{mean}$ values were used for efficacy rating as follows: | | |
|---|---|---|
| − | Inactive | $T/C_{mean} > 65\%$ |
| ± | Borderline efficacy | $50\% \le T/C_{mean} \le 65\%$ |
| + | Moderate efficacy | $25\% \le T/C_{mean} < 50\%$ |
| ++ | High efficacy | $10\% \le T/C_{mean} < 25\%$ |
| +++ | Very high efficacy | $5\% \le T/C_{mean} < 10\%$ |
| ++++ | Regression | $T/C_{mean} < 5\%$ |

Flow Cytometry Analysis

Flow cytometry data were analyzed with the FlowJo Data Analysis Software. The software automatically determined the frequency of subpopulations in percent relative to the parent population. FC results are presented as percentage of the corresponding parent population and as total counts for each population. Doublet exclusion was performed according to forward scatter height versus forward scatter area to include only single cells, followed by forward/sideward scatter to determine the leukocyte gate and live/dead discrimination. Fluorescence Minus One (FMO) controls were used to establish correct gating. Further gating was performed as required to assess the populations specified. Information on populations analyzed is illustrated in the tables below.

| Panel A T Cells, MDSC | |
|---|---|
| Cell Population | Phenotypic markers |
| T cells | $CD45^+CD3^+$ |
| $CD4_+$ T cells | $CD45^+CD3^+CD4^+$ |
| $CD8_+$ T cells | $CD45^+CD3^+CD8^+$ |
| $CD8_+$ T cells | $CD45^+CD3^+CD4^-CD8^+$ |
| Tregs | $CD3^+CD4^+Foxp3^+CD25^+$ |
| Granulocytic MDSC | $CD45^+CD3^-CD11b^+Ly6G^+Ly6C_{low}$ |
| Monocytic MDSC | $CD45^+CD3^-CD11b^+Ly6G^-Ly6C_{high}$ |

| Panel B NK Cells, Macrophages | |
|---|---|
| Cell Population | Phenotypic markers |
| NK cells | $CD45+CD3^-CD49b+CD335+$ |
| M1 macrophages | $CD45+CD3^-F4/80+CD206^-$ |
| M2 macrophages | $CD45+CD3^-F4/80+CD206+$ |

Statistical Analysis

For the evaluation of the statistical significance of anti-tumor efficacy, the non-parametric Kruskal-Wallis test [1] followed by Dunn's method for multiple comparisons [2] was performed.

Individual ATVs of test and control groups were compared on the final day of the study on which all groups were available. Statistical analysis was only carried out if at least 50% of the initially randomized animals still remained in the relevant group. No statistically significant differences in tumor volume between the control group and the test groups were observed.

For the FC data, the Kruskal-Wallis test/Dunn's post test was carried out on the different cell populations comparing the percentages of test groups with the control group. Statistically significant differences between test and control groups are marked in FIGS. 23A-23B.

All p-values <0.05 were considered statistically significant. Statistical calculations were per-formed using R (version 3.1.0; https://www.r-project.org/), where Kruskal-Wallis and Dunn's post-test were implemented according to Hollander and Wolfe [3] or GraphPad Prism bioanalytic software (version 9.0 for Microsoft Windows, GraphPad Software, San Diego, California, USA, https://www.graphpad.com/).

Results and Discussion

Antitumor Efficacy

In this study, the antitumor efficacy of COMPOSITION 002 and anti-mPD-1 was assessed in the syngeneic MBT-2 tumor model implanted in C3H mice. An overview of the experiment is given in Table 10. The efficacy results are summarized in Table 11 and in FIGS. 22A-22B.

COMPOSITION 002 at 0.5, 1 and 2 mg/kg in monotherapy did not display antitumor activity against the MBT-2 tumor model in this study (all min. T/C values=100%).

Anti-mPD-1 at 5 mg/kg in monotherapy did not display antitumor activity against the MBT-2 tumor model in this study (min. T/C value 100%).

Combination of 0.5, 1 or 2 mg/kg COMPOSITION 002 with anti-mPD-1 was also not efficacious against the MBT-2 tumor model in this study (min. T/C values ≥71.6%).

No statistically significant differences in tumor volume were observed between the test groups and the vehicle control group on exp. Day 7, the final day on which all groups were in the study.

Flow Cytometry Analysis

FC analysis of cells isolated from the MBT-2 tumors at the end timepoint on Day 10 (Groups 1 and 8) or Day 8 (Groups 2-7) was carried out. The FC results are presented in FIGS. 23A-23F (percentages) and FIGS. 24A-24F (cell counts). The main observations are listed below.

Figure 23A:
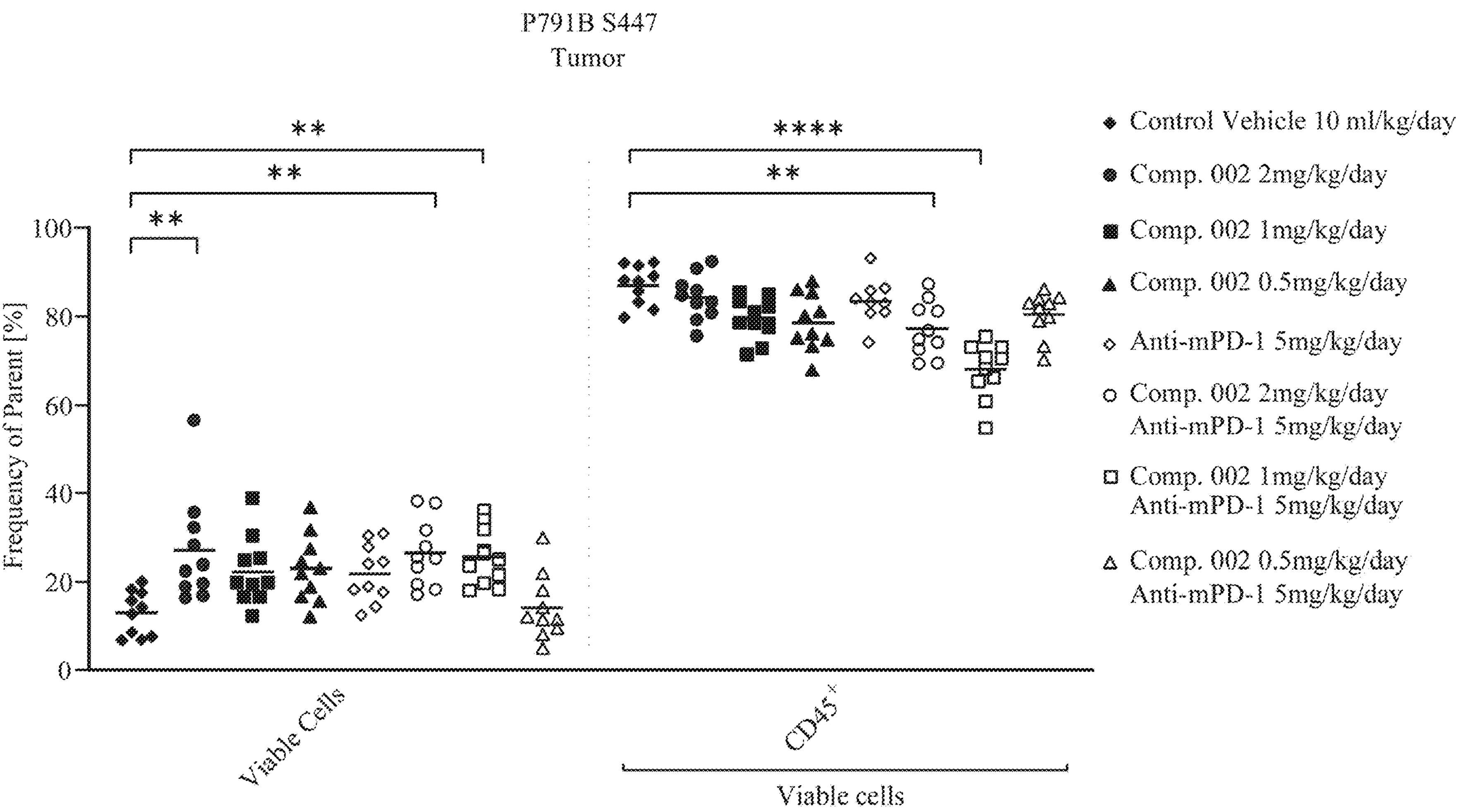
FIGS. 23A-23F: Effect of Composition 002 and Anti-mPD-1 Treatment on Leukocyte Populations in MBT-2 Tumors Implanted subcutaneously (s.c.) in C3H Mice—Cell Percentages. FC analysis of cells isolated from the MBT-2 tumors from 10 mice per group at the end timepoint on Day 10 (Groups 1 and 8) or Day 8 (Groups 2-7). Cells were stained with the antibody panels A and B as described in Example 2. The X-axis indicates the population of interest which is presented for each individual animal as the percentage of the parent population indicated in the red text underneath the X-axis label. The horizontal bar in each data set indicates the group mean value.

The percentage of $CD45^+$ cells was lower in the tumors of all test groups than in the control group (FIG. 23A). This difference was statistically significant for the 2 mg/kg COMPOSITION 002/anti-mPD-1 and 1 mg/kg COMPOSITION 002/anti-mPD-1 groups when analyzed with panel A antibodies. Analysis with panel B antibodies gave similar results but also showed significant differences for the 1 mg/kg and 0.5 mg COMPOSITION 002 monotherapy groups.

Figure 23B:
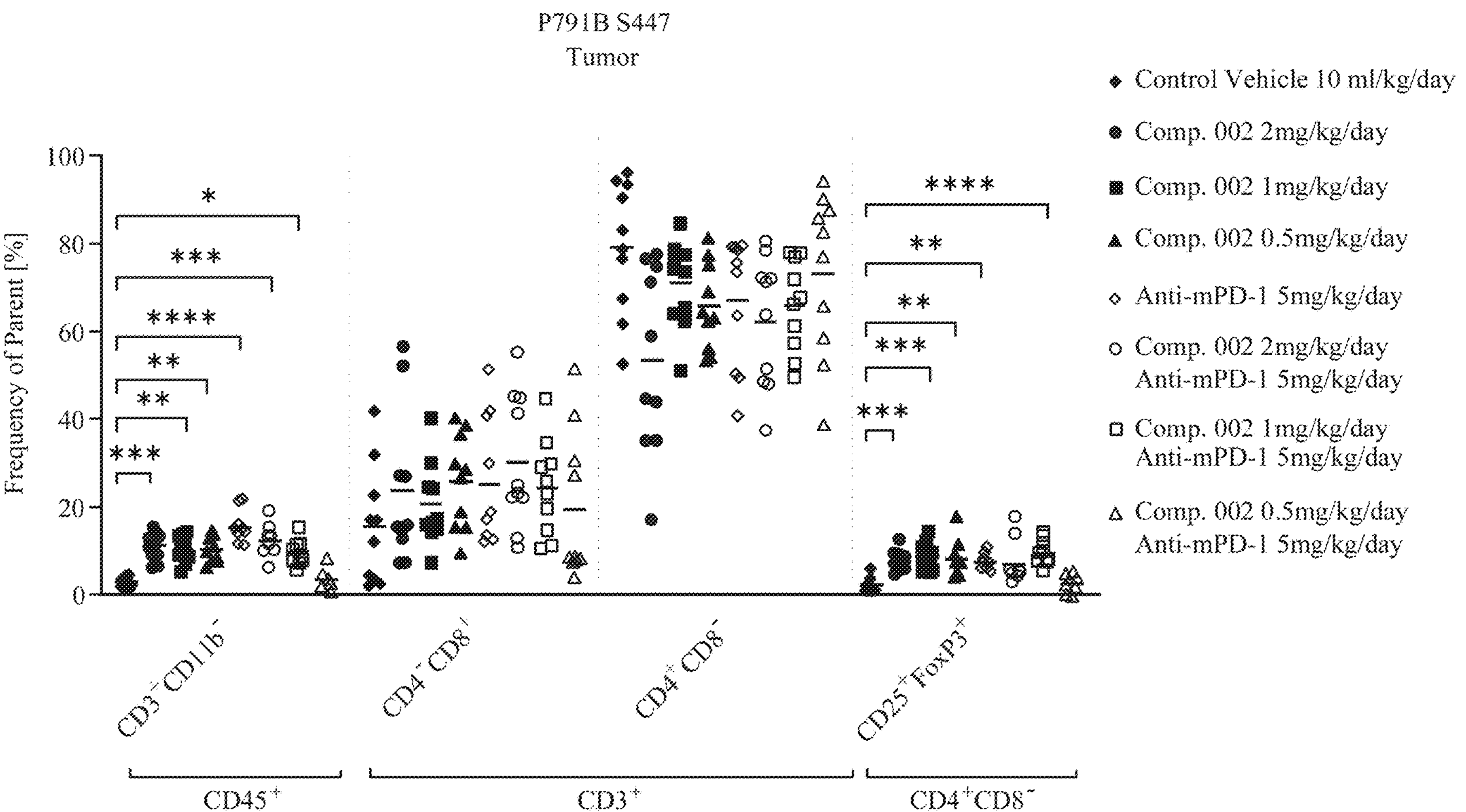

The frequency of the $CD3^+$ $CD11b^-$ T cell population was significantly elevated in all test groups apart from the 0.5 mg/kg COMPOSITION 002/anti-mPD-1 group compared to the control group. The intragroup variability of the percentage of $CD4^+$ and $CD8^+$ cells was very high and significant differences were only observed for $CD4^+$ cells in the 2 mg/kg COMPOSITION 002 monotherapy group where the frequency was statistically significantly lower compared to the control. Tregs were significantly increased in the three COMPOSITION 002 monotherapy groups and the anti-mPD-1 monotherapy group as well as the 1 mg/kg COMPOSITION 002/anti-mPD-1 group (FIG. 23B).

Figure 23C:
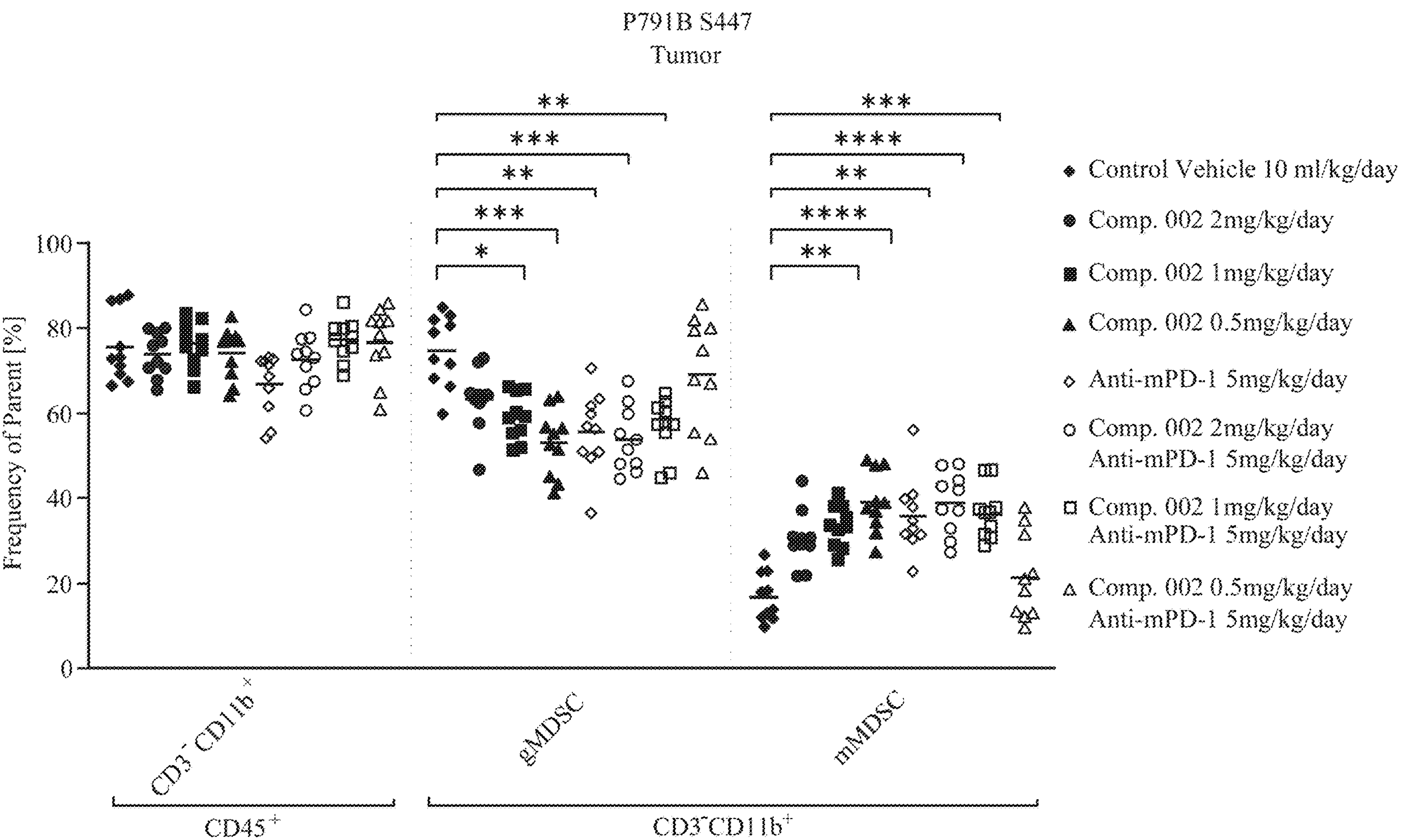
Figure 23D:
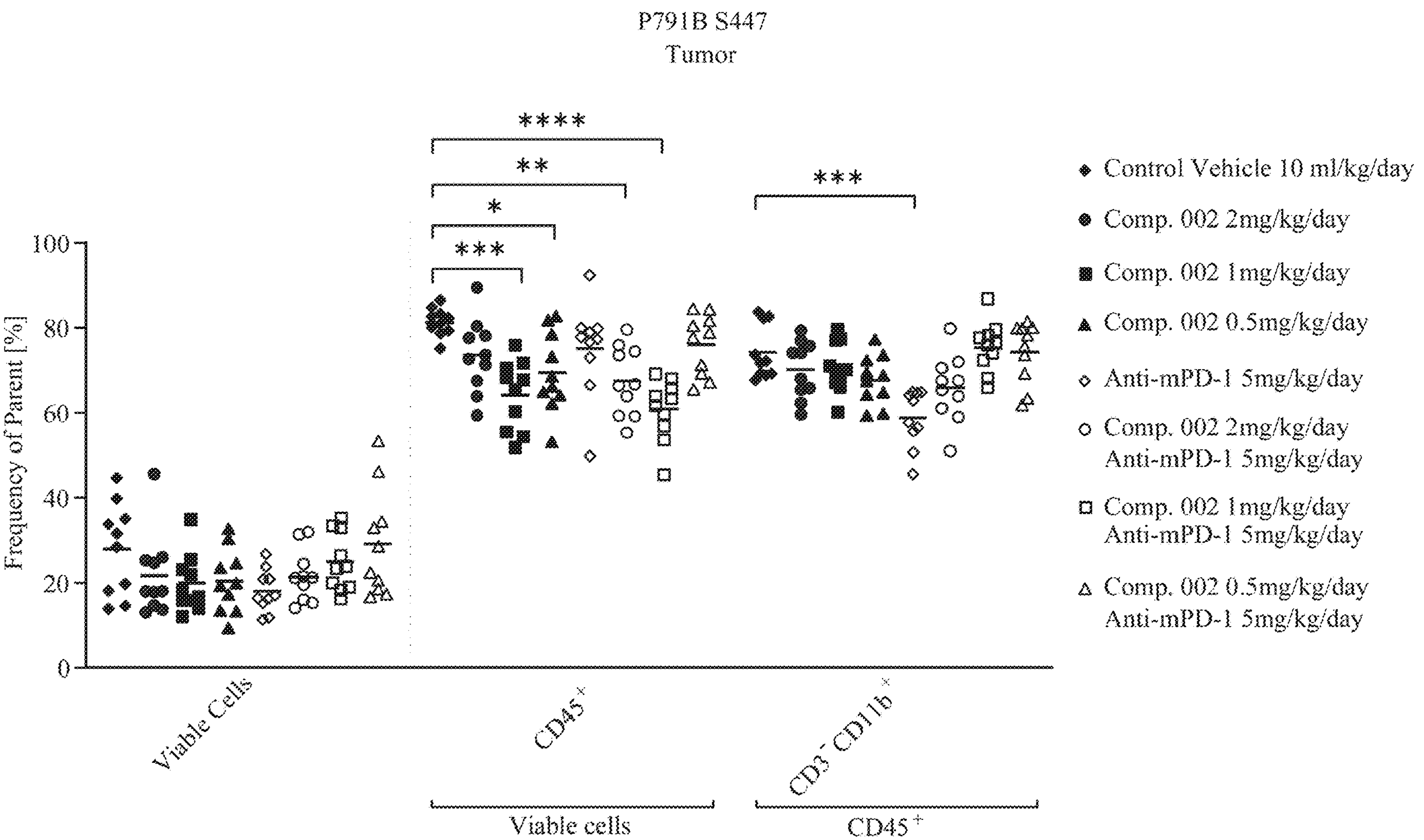

The percentage of granulocytic MDSC was significantly lower in all test groups except the 2 mg/kg COMPOSITION 002 monotherapy and the 0.5 mg/kg COMPOSITION 002/anti-mPD-1 groups while the percentage of monocytic MDSC was significantly higher in all test groups except the 2 mg/kg COMPOSITION 002 monotherapy and the 0.5 mg/kg COMPOSITION 002/anti-mPD-1 groups (FIG. 23C).

Figure 23E:
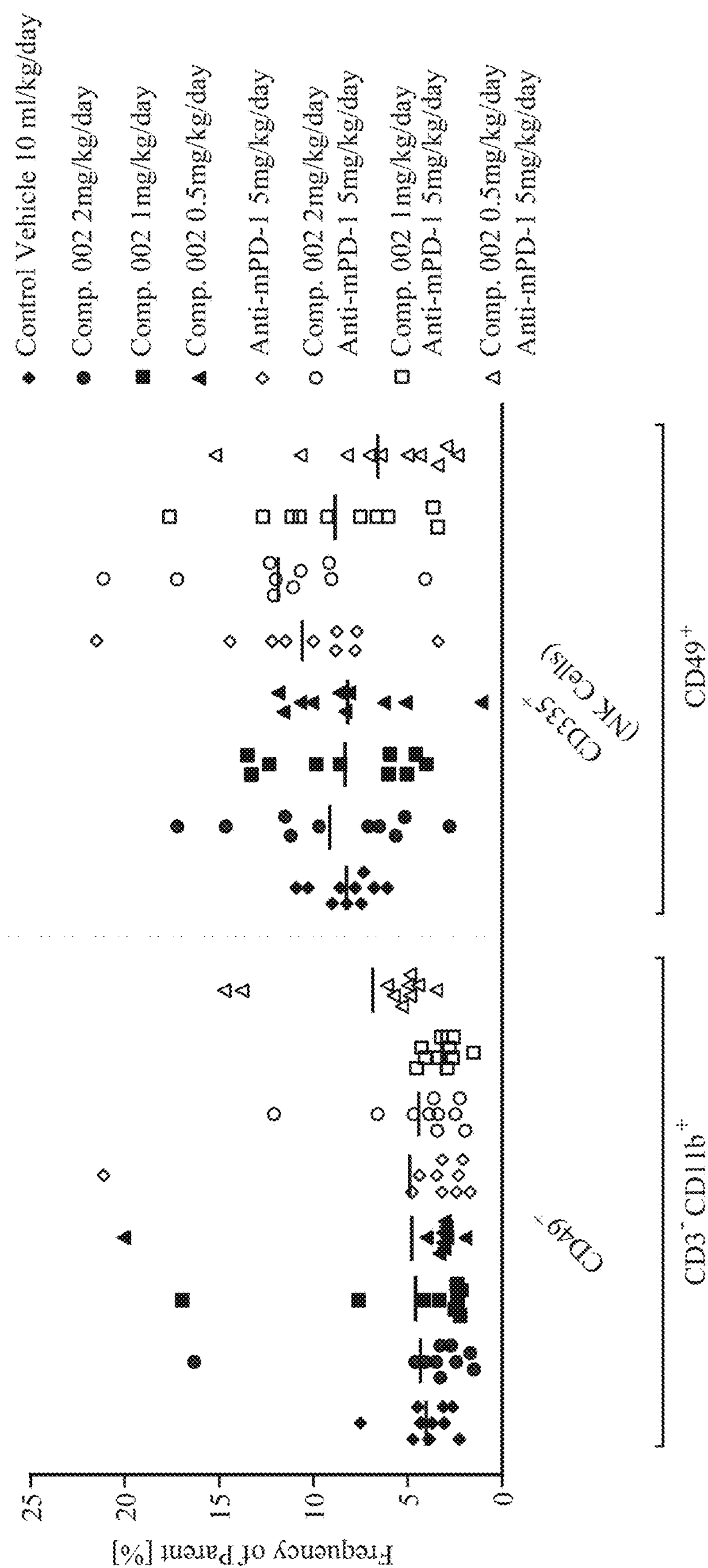

No significant differences between test and control groups were observed for NK cells (FIG. 23E). The intragroup variability was higher in the test groups than in the control group.

Figure 23F:
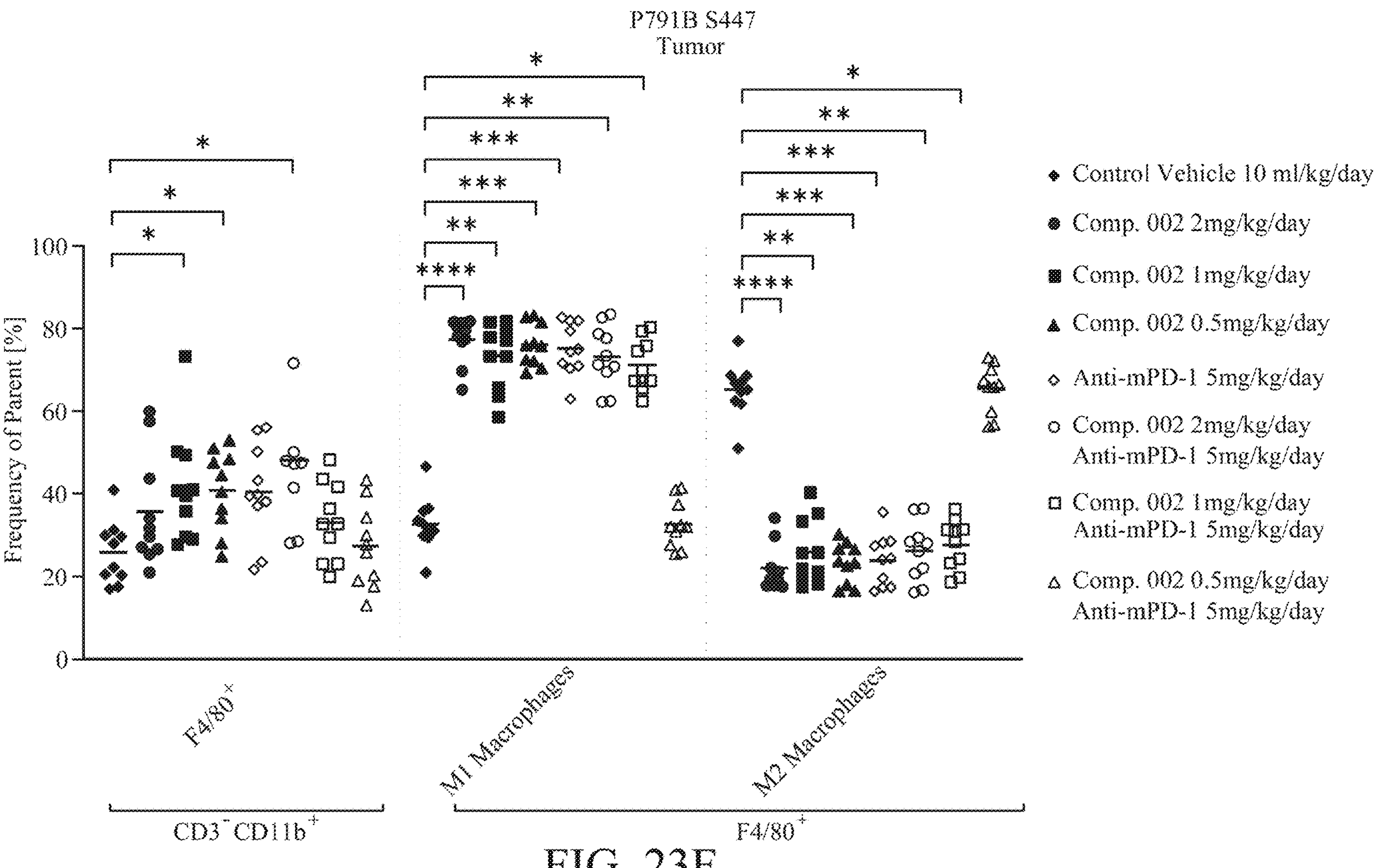
Figure 24A:
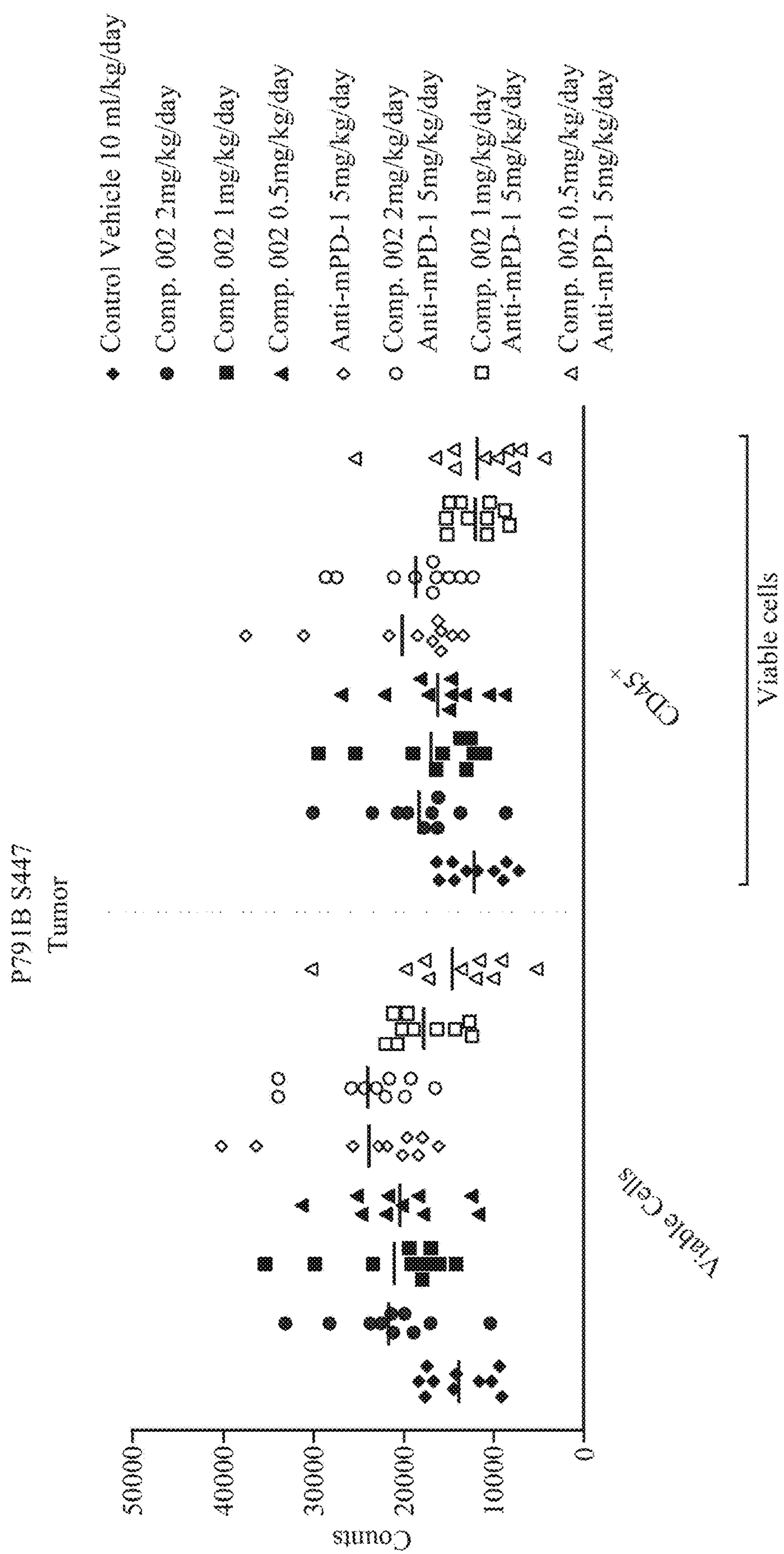
FIGS. 24A-24F: Effect of Composition 002 and Anti-mPD-1 Treatment on Leukocyte Populations in MBT-2 Tumors Implanted subcutaneously (s.c.) in C3H Mice—Cell Counts. FC analysis of cells isolated from the MBT-2 tumors from 10 mice per group at the end timepoint on Day 10 (Groups 1 and 8) or Day 8 (Groups 2-7). Cells were stained with the antibody panels A and B given under as described in Example 2. The X-axis indicates the population of interest which is presented for each individual animal as the cell counts within the population indicated in the red text below the X-axis label. The horizontal bar in each data set indicates the group mean value.
Figure 24B:
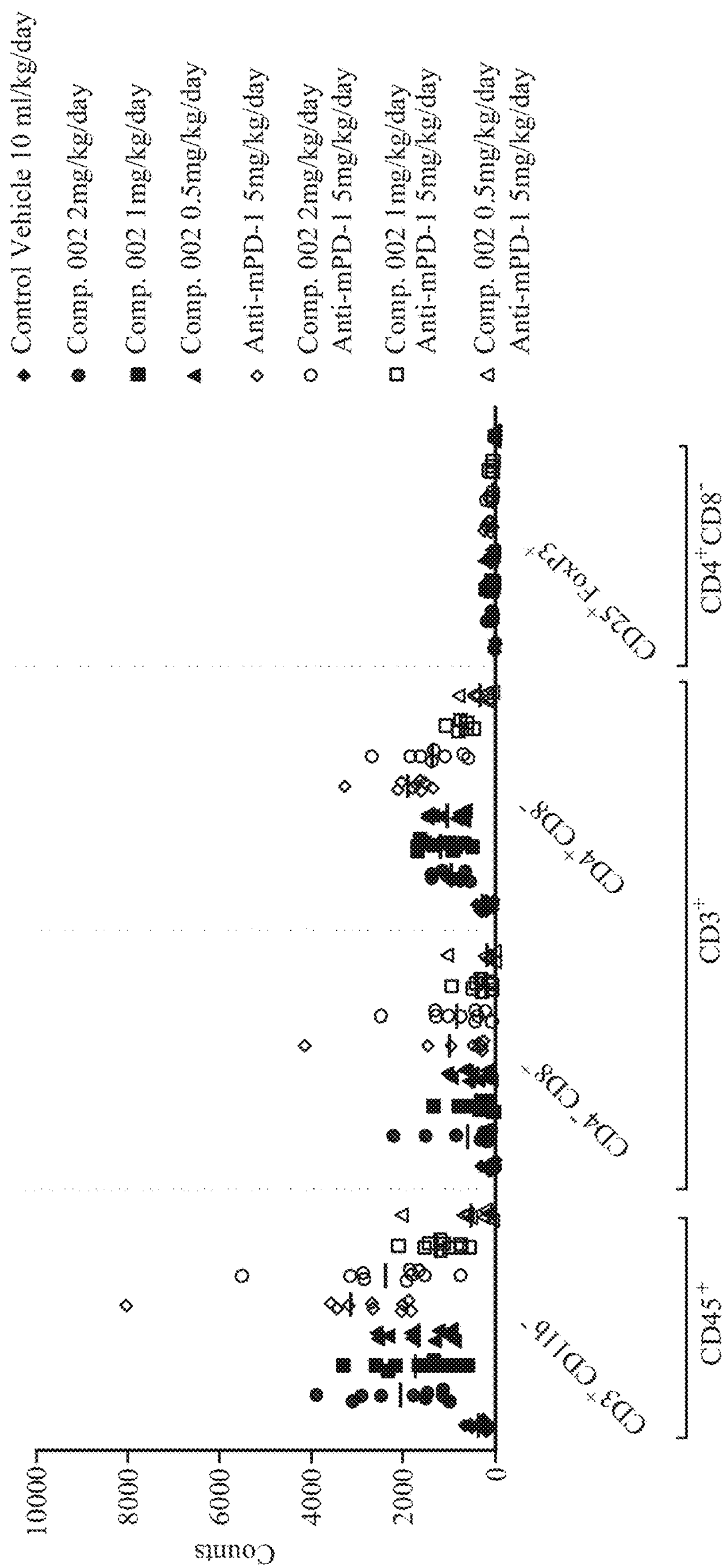
Figure 24C:
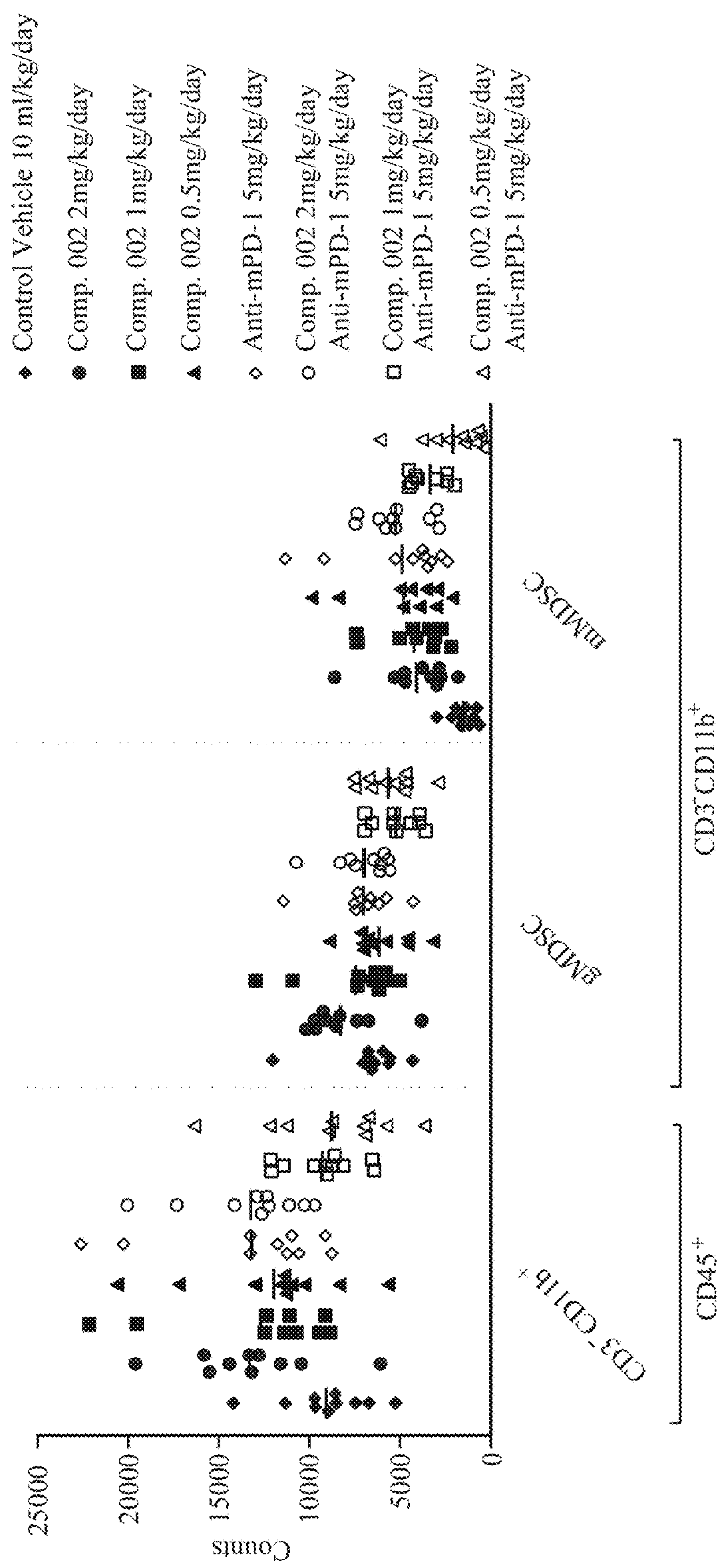
Figure 24D:
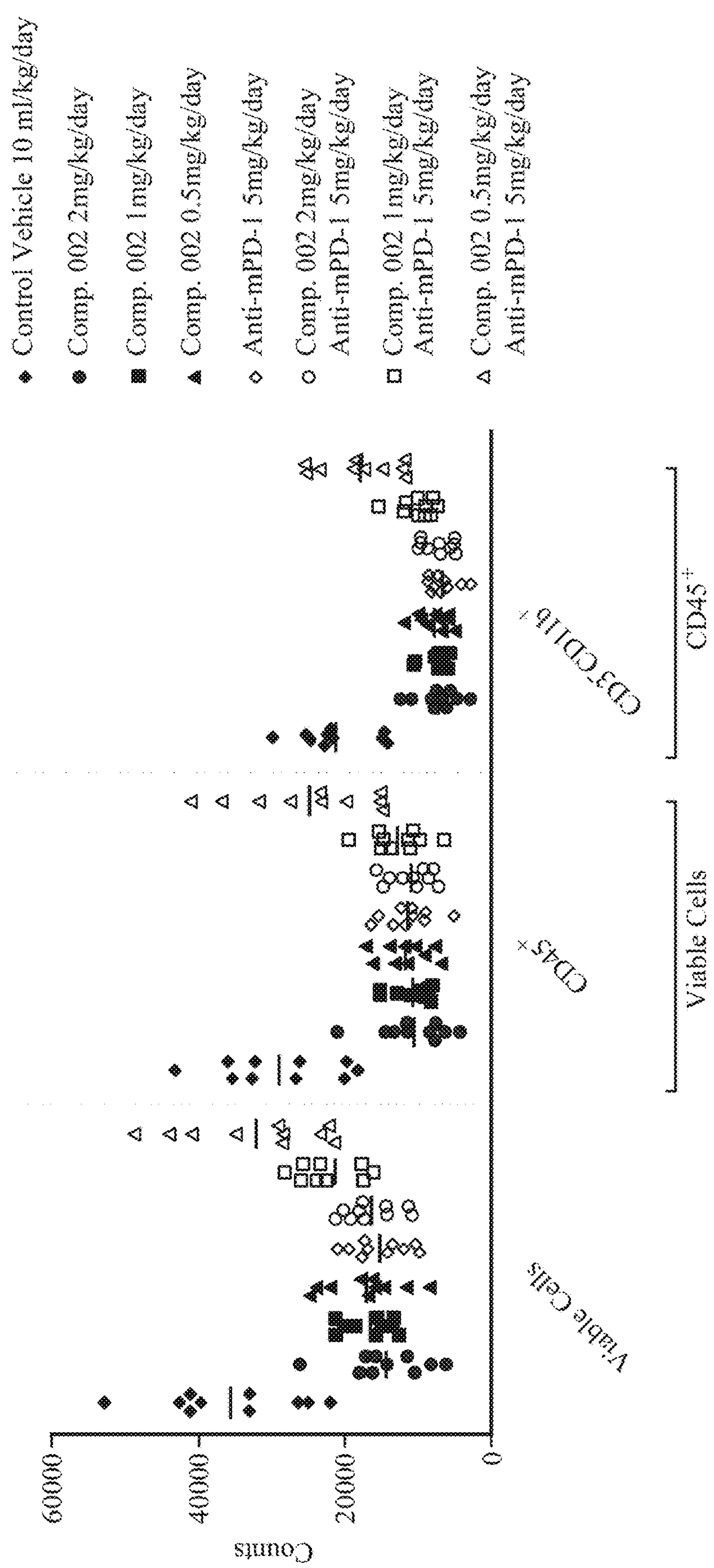
Figure 24E:
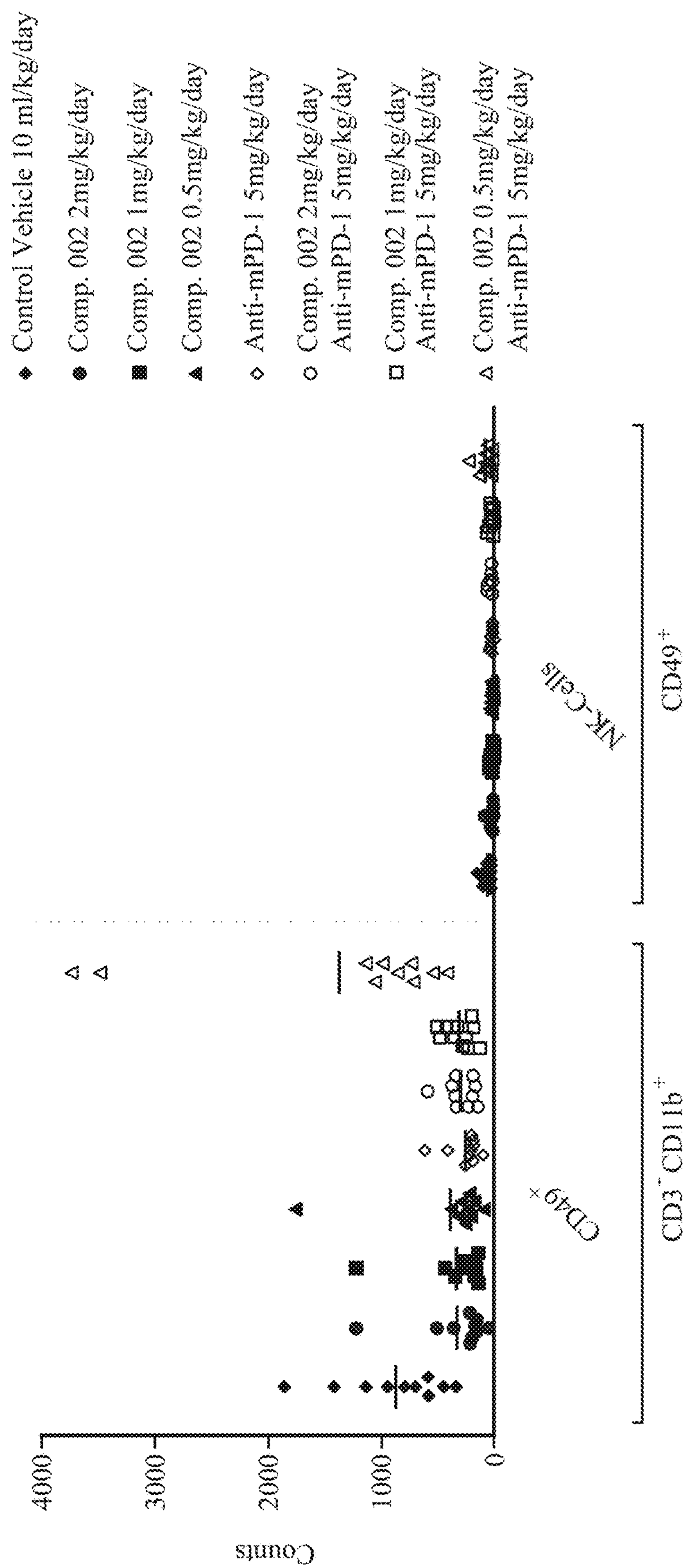
Figure 24F:
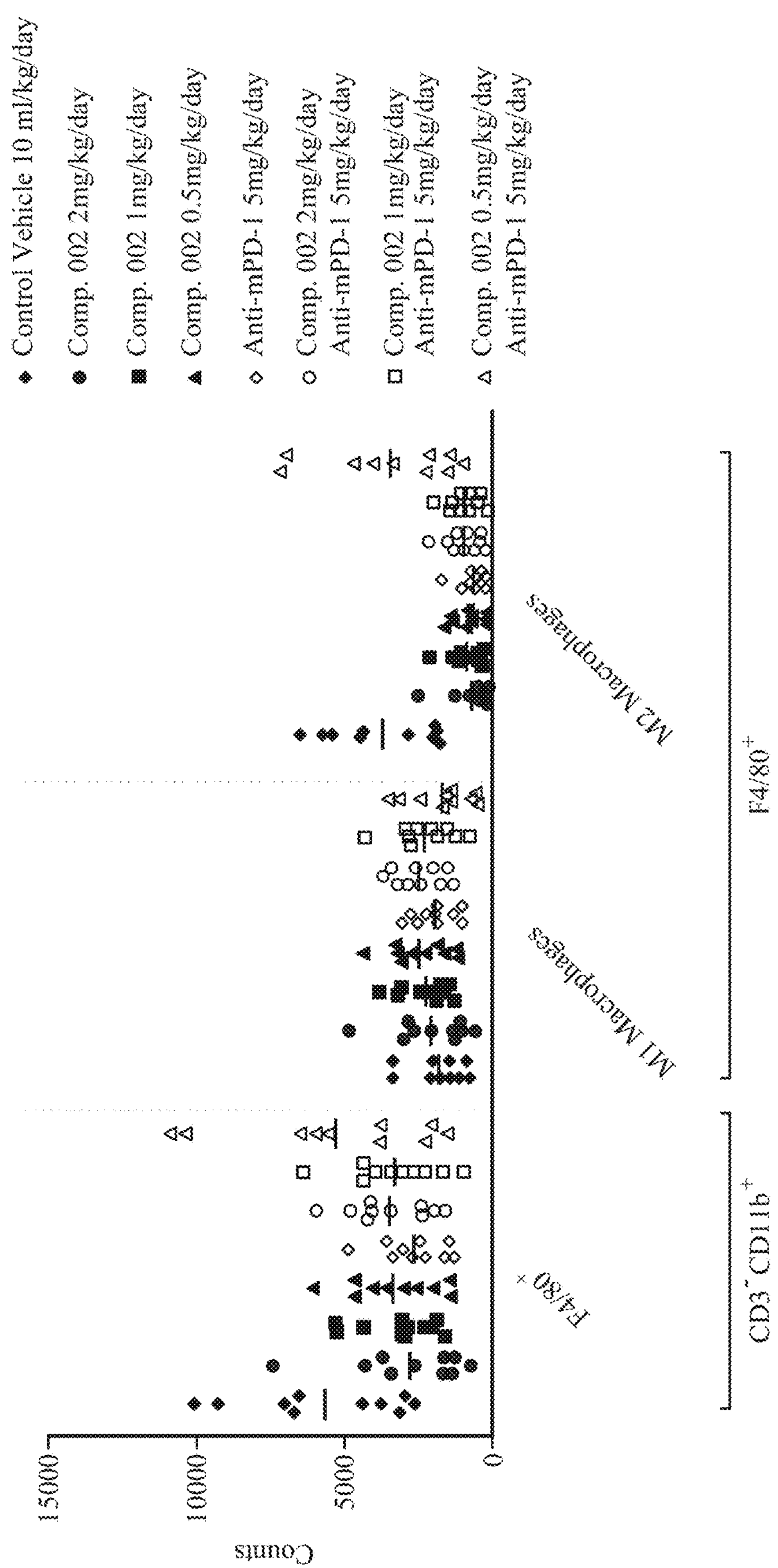

The frequency of M1 macrophages among $F4/80^+$ cells was significantly higher in all test groups except the 0.5 mg/kg COMPOSITION 002/anti-mPD-1 group while the frequency of M2 macrophages among $F4/80^+$ cells was significantly lower in all test groups except the 0.5 mg/kg COMPOSITION 002/anti-mPD-1 group (FIG. 23F).

Body Weight Change, Survival and Observations

Figure 25:
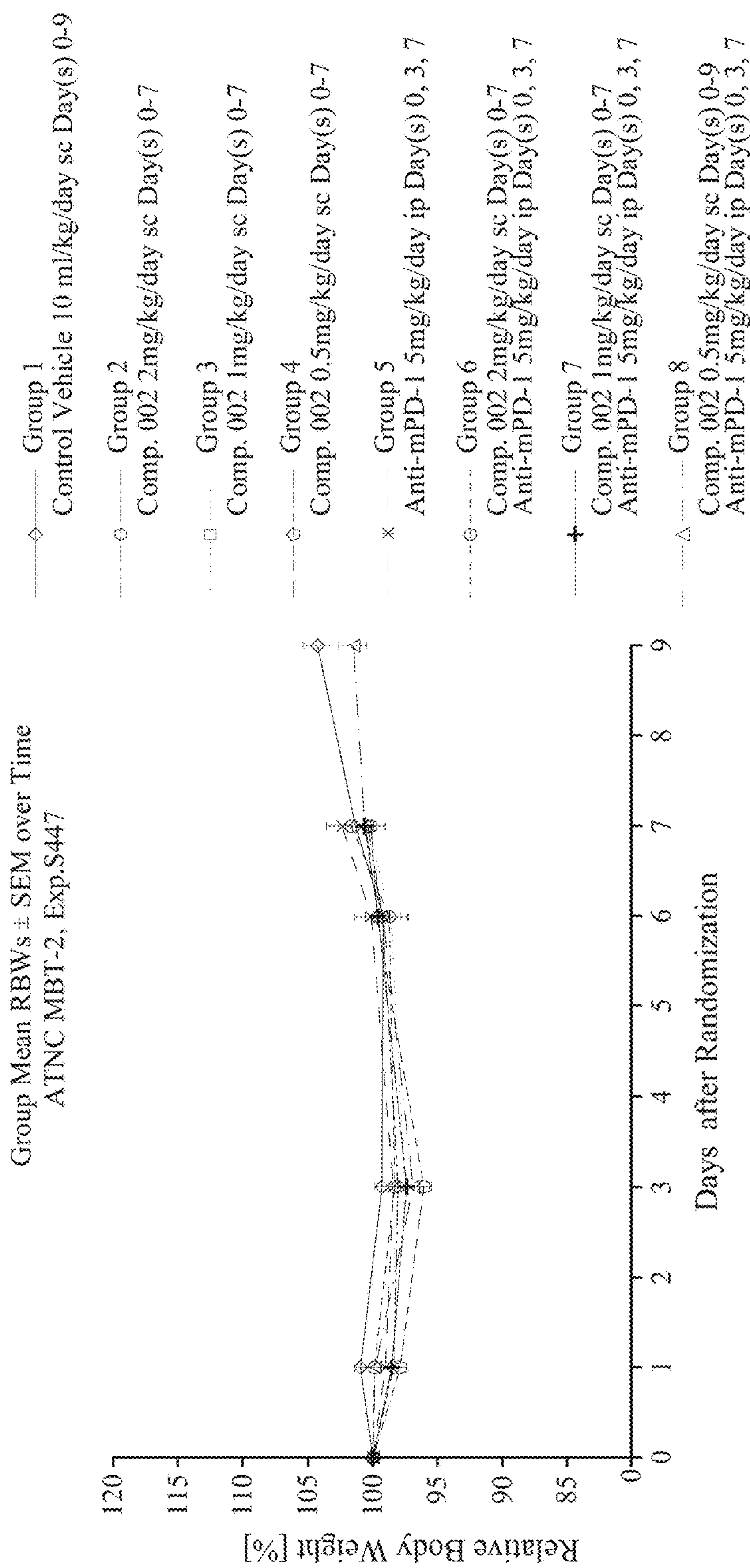
FIG. 25: Impact of Treatment on Body Weights of Mice. The group mean relative body weights over time of all groups are shown.

The results are summarized in Table 12 and in FIG. 25.

Minimal body weight loss (BWL) was observed in this study indicating a good tolerability of the test articles. The maximum group mean BWL of 3.9% was observed in the 0.5 mg/kg COMPOSITION 002 monotherapy group compared to 0.9% in the control group. Two animals were found dead in the 0.5 mg/kg COMPOSITION 002 monotherapy group on Day 8 and two in the 0.5 mg/kg COMPOSITION 002/anti-mPD-1 group on Days 7 and 10 resulting in survival rates of 87% after adjustment for animals euthanized for tumor-related reasons. One animal was found dead in the other two combination groups, the 2 mg/kg COMPOSITION 002/anti-mPD-1 and the 1 mg/kg COMPOSITION 002/anti-mPD-1 groups on Days 6 and 5 respectively giving an adjusted survival rate of 93%. Survival was 100% in all remaining groups.

REFERENCES

[1] Kruskal W H, Wallis W A: Use of Ranks in One-criterion Variance Analysis. J. Am. Stat. Assoc. 1952, 47: 583-621.

[2] Dunn O J: Multiple Comparisons Using Rank Sums. Technometrics, 1964, 6(3), pp. 241-252.

[3] Hollander M, Wolfe D A: Nonparametric Statistical Methods. New York: John Wiley & Sons, 1973, Pages 115-120.

ACRONYMS AND ABBREVIATIONS

AT Animal tumor
ATV Absolute tumor volume
BW Body weight
BWL Body weight loss
FC Flow cytometry
FFPE Formalin-fixed, paraffin embedded
i.p. Intraperitoneally
MDSC Myeloid-derived suppressor cells
M Mouse/murine/monocytic depending on context
NK Natural killer cells
PBS Phosphate-buffered saline
PD-1 Programmed death 1 receptor
RBW Relative body weight
RTV Relative tumor volume
s.c. Subcutaneously
SF Snap frozen
SOP Standard operating procedure
T/C Test versus control value
Td Tumor volume doubling time
TIL Tumor-infiltrating leukocytes
Tq Tumor volume quadrupling time

Example 3: Preparation of Lyophilized Composition Comprising Non-Viable *Streptococcus pyogenes* for Injection

*Streptococcus pyogenes* (A Group, Type 3, Su strain) are cultured in appropriate culture media. After appropriate cultivation period the bacteria are collected by centrifugation, washed, resuspended, and treated with hydrogen peroxide to kill the bacteria. The killed bacteria are centrifuged, washed, and resuspended in suspension medium, such as Berheimers basal medium (BBM) and filtered. The bacterial suspension is treated with benzylpenicillin and heated at 37° C. for ~10-45 min and at 45° C. for ~20-60 min. The final bulk suspension is prepared. Vials are filled with the final bulk suspension and lyophilized. The quantitative formulae for different proposed dosage strengths of an exemplary composition comprising non-viable *Streptococcus pyogenes* are presented in Table 13A. These compositions are based on the lyophilized product. All vial strengths are filled with the same volume (0.41 mL) of suspension before lyophilization.

TABLE 13A

Quantitative Formula for Different Dosage Strengths for Exemplary Composition 002

| Composition | Content per Vial at Different Dosage Strengths 0.02 mg (0.2 KE) | 0.05 mg (0.5 KE) | 0.1 mg (1 KE) | 0.3 mg (3 KE) | 0.5 mg (5 KE) | 0.7 mg (7 KE) |
|---|---|---|---|---|---|---|
| Non-viable *Streptococcus pyogenes* (dried cell mass basis) | 0.02 mg (0.21%) | 0.05 mg (0.49%) | 0.1 mg (0.88%) | 0.3 mg (1.93%) | 0.5 mg (2.54%) | 0.7 mg (2.93%) |
| Maltose | 9.10 mg (94.31%) | 8.90 mg (86.65%) | 8.58 mg (75.77%) | 7.28 mg (46.95%) | 5.99 mg (30.39%) | 4.69 mg (19.63%) |
| Magnesium sulfate | 0.02 mg (0.20%) | 0.05 mg (0.48%) | 0.10 mg (0.86%) | 0.29 mg (1.89%) | 0.49 mg (2.48%) | 0.68 mg (2.86%) |
| Potassium dihydrogen phosphate | 0.10 mg (1.01%) | 0.24 mg (2.38%) | 0.49 mg (4.31%) | 1.46 mg (9.44%) | 2.44 mg (12.39%) | 3.42 mg (14.30%) |
| Sodium chloride 0.9% (normal saline) | 0.006 mg (0.06%) | 0.015 mg (0.15%) | 0.03 mg (0.26%) | 0.09 mg (0.58%) | 0.15 mg (0.76%) | 0.21 mg (0.88%) |
| Methionine | 0.04 mg (0.42%) | 0.10 mg (1.00%) | 0.20 mg (1.81%) | 0.61 mg (3.96%) | 1.02 mg (5.20%) | 1.43 mg (6.00%) |
| Penicillin G Potassium (Benzylpenicillin)[a] | 0.36 mg (3.78%) | 0.91 mg (8.87%) | 1.82 mg (16.09%) | 5.47 mg (35.24%) | 9.11 mg (46.24%) | 12.75 mg (53.39%) |

[a]Based on 1667 penicillin units/mg

KE = klinische einheit, defined as clinical unit, corresponding to 0.1 mg non-viable *Streptococcus pyogenes* dried cell mass For dosing, the lyophilized powder is suspended in an isotonic sodium chloride solution to prepare a suspension at a concentration of 0.005-0.01 mg/mL. The volume of product delivered to a subject at this concentration may vary.

TABLE 13B

Example of Exemplary Composition Excipients After Suspension with 0.9% Saline

| Component | Quantity per vial[a] (mg) | Quantity per 0.2 mg Dose (mg) | 0.2 mg Suspension in 0.9% saline at 0.01 mg/mL (% w/v) |
|---|---|---|---|
| Non-viable *Streptococcus pyogenes* (dried cell mass) | 0.1 | 0.2 | 0.002% |
| Benzyl penicillin potassium[b] (Penicillin G potassium) | 1.82 mg (3034 units) | 3.64 mg (6068 units) | 0.036% |
| Methionine | 0.20 | 0.40 | 0.004% |
| Maltose | 8.58 | 17.16 | 0.17% |
| Magnesium sulfate | 0.10 | 0.20 | 0.002% |
| Potassium dihydrogen phosphate[c] | 0.49 | 0.98 | 0.01% |
| Sodium Chloride | 0.03 | 0.06 | 0.90% |
| Water | NA | NA | q.s. to 100% |

[a]Based on a 0.1 mg (1 KE) vial

[b]For penicillin, there are 1667 units per mg

[c]The IID name is monobasic potassium phosphate

KE = klinische einheit, defined as clinical unit, corresponding to 0.1 mg non-viable *Streptococcus pyogenes*;

NA = not applicable;

q.s. = quantity sufficient;

For dosing, the lyophilized powder is suspended in an isotonic sodium chloride solution to prepare a suspension at a concentration of 0.005-0.01 mg/mL. The volume of product delivered to a subject at this concentration may vary.

Example 4: T Cell Activation By Composition Comprising Non-Viable *Streptococcus Pyogenes*

T-cells were isolated from Peripheral *Blood* Mononuclear Cell (PBMC-two healthy donors) using RapidSheres magnetic beads. T-cells (500,000) were seeded in 96-well plates. T-cells were treated with 0.2 and 0.8 KE/mL of Composition 002 for 72 hours. T-cells and supernatant were collected for analyses of immune checkpoint biomarkers and cytokines (see table below) by FACS and ELISA, respectively.

| Targets | Fluorophore |
|---|---|
| hCD4 | BUV395 |
| hCD8 | FITC |
| hPD-1 | PE-Cy7 |
| hCTLA-4 | BV421 |
| hTIGIT | BV711 |
| hTIM-3 | BV605 |
| hLAG-3 | APC |
| hKi67 | efluor506 |
| hFoxP3 | PE |
| Live/Dead dye | efluor780 |

Figure 26:
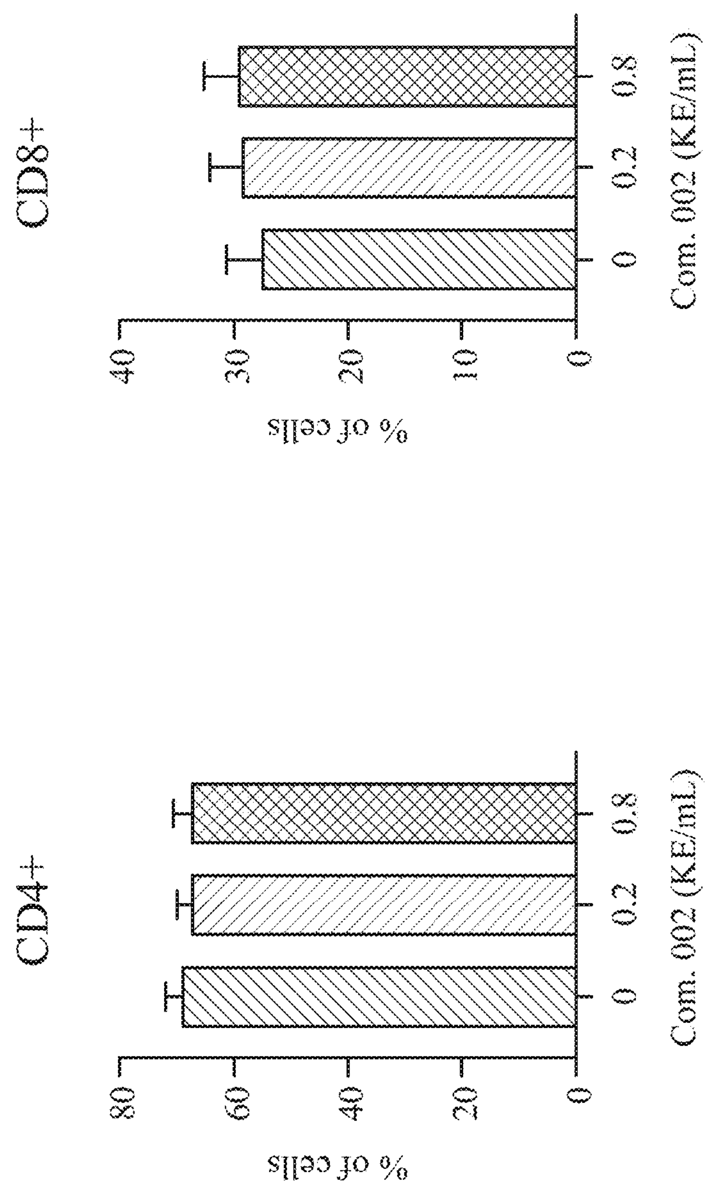
FIG. 26: Composition 002 treatment does not change the number of $CD4^+$ and $CD8^+$ T cells.
Figure 27A:
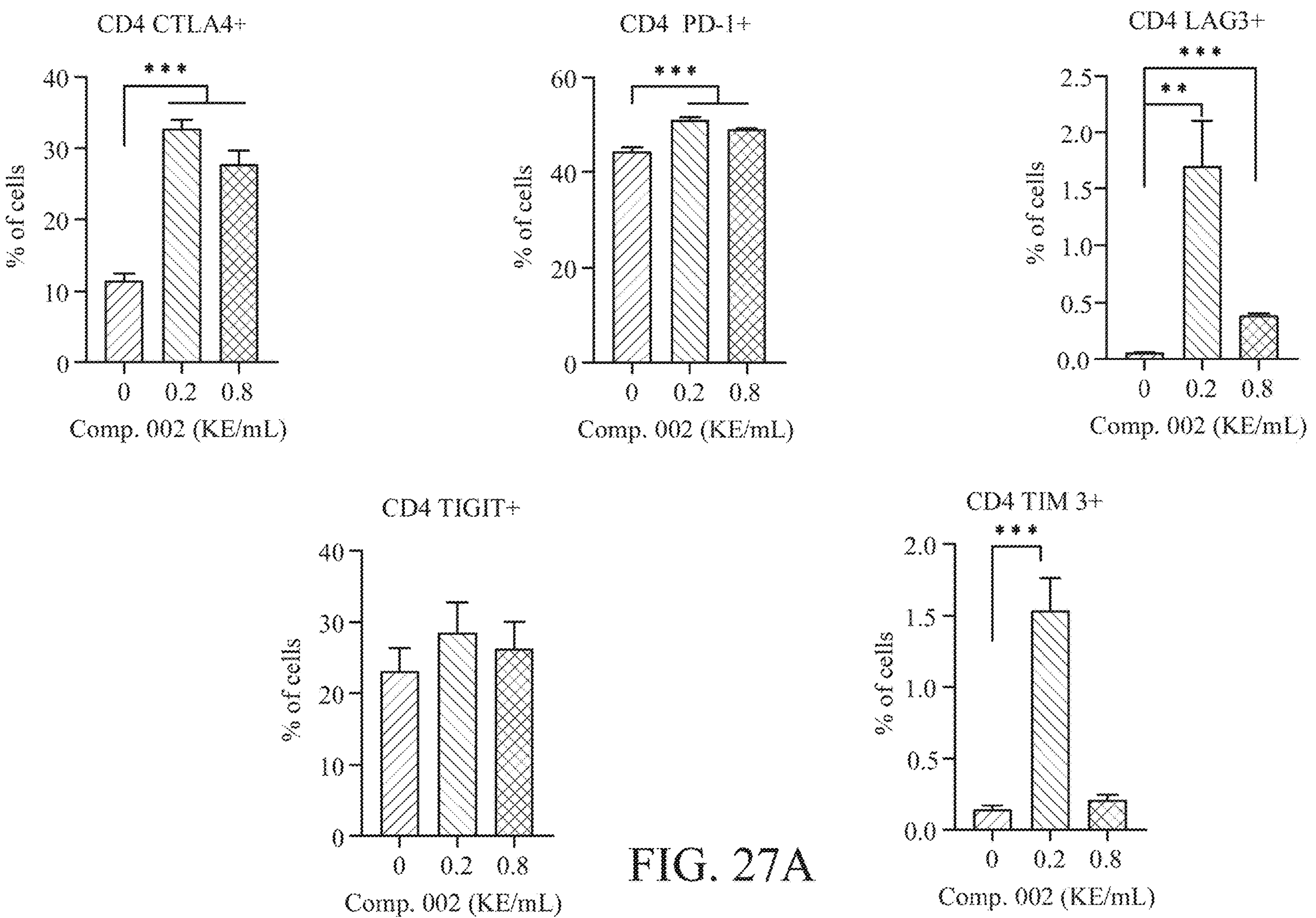
FIGS. 27A-27B: Expression of Immune Checkpoint Molecules in Composition 002 treated (FIG. 27A) CD4+ T cells and (FIG. 27B) CD8+ T cells (average of two donors). Data are expressed as mean (two donors/triplicate)±SD. **=P<0.01. * * *=P<0.001.
Figure 27B:
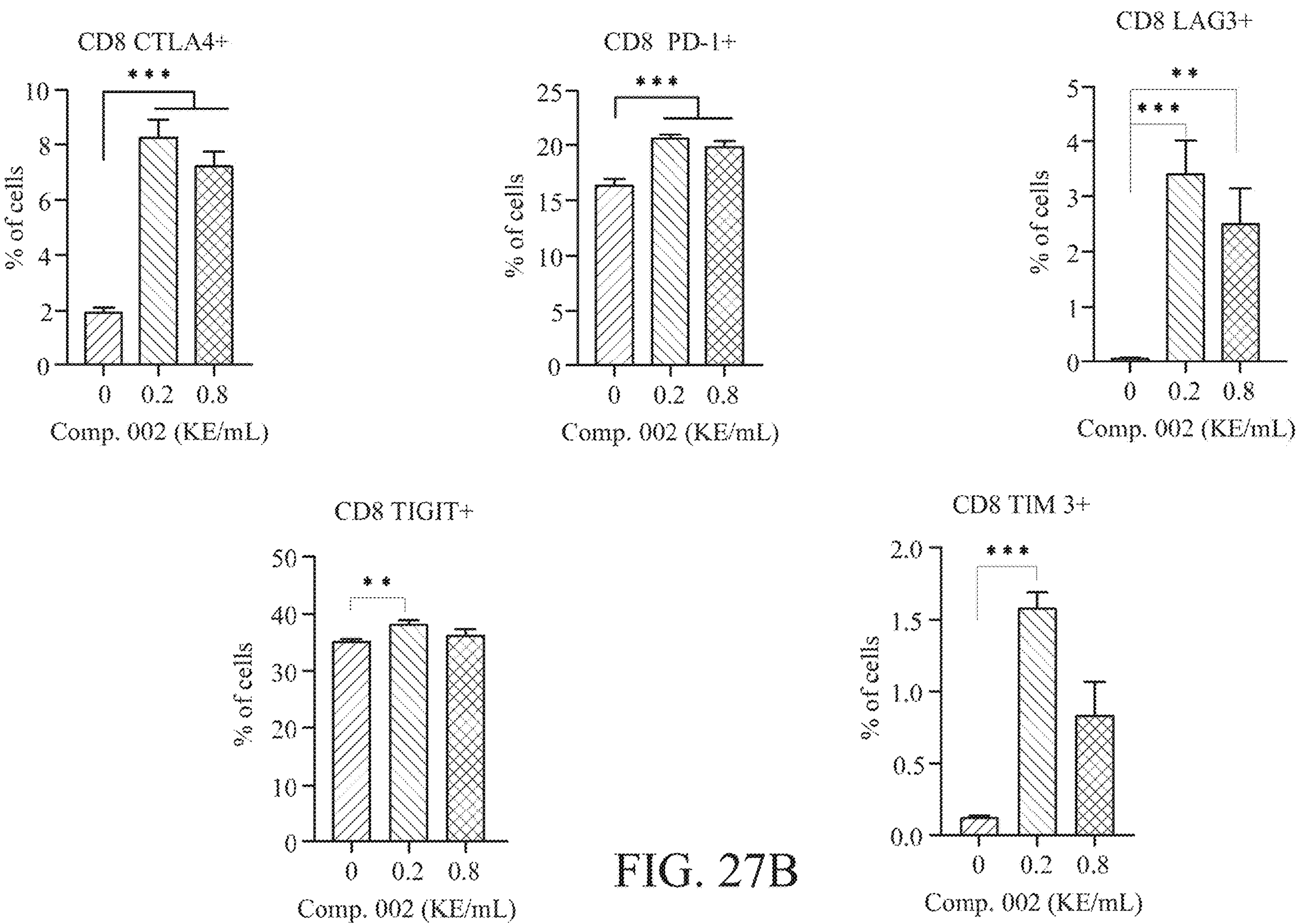

As shown in FIG. 26, COMPOSITION 002 treatment does not change the number of CD4+ and CD8+ T cells. COMPOSITION 002 induces expression of immune checkpoint molecules CTLA4, PD-1, LAG3, TIM3, and TIGIT in CD4+ T cells (FIG. 27A) and CD8+ T cells (FIG. 27B).

Example 5: In Vivo Efficacy of Non-Viable Cells of *Streptococcus pyogenes* in Monotherapy And in Combination with Anti-mPD-1 in the Orthotopic Bladder Model (MB49 Bladder Cancer Cells)

The antitumor efficacy of a lyophilized preparation of penicillin-treated *Streptococcus pyogenes* (group A, type 3, substrain), is evaluated alone and in combination with an antibody that targets programmed cell death protein 1 (PD- 1) in the mouse orthotopic bladder tumor model (MB49 bladder cancer cells). The study design for monotherapy is shown in Table 6 below. Animals are randomized into study groups by tumor associated bioluminiescence. The lyophilized preparation of penicillin-treated *Streptococcus pyogenes* composition is dosed once a week for 4 weeks. The mice are observed post-treatment for 1 week. Mice are examined daily, 5 days a week. Body weight is measured twice a week. Bioluminescent imaging (BLI) is obtained 1-2 times weekly for 4 weeks during in-life phase. Optimal dose of lyophilized preparation of penicillin-treated *Streptococcus pyogenes* for combination study with anti-PD-1 antibody is selected.

TABLE 14

Study Design for mouse orthotopic bladder tumor model (MB49) treated with preparation of penicillin-treated *Streptococcus pyogenes*

| Group | Treatment | Dose (KE/ml) | Dosing Schedule (post-implantation) | Group Size | Route of Administration | Endpoints |
|---|---|---|---|---|---|---|
| 1 | No treatment | NA | NA | 10 | NA | Body weights |
| 2 | Vehicle (saline) | 0 | Day 7, 14, 21, 28 | 10 | Intrabladder | Survival rate |
| 3 | Treatment dose 1 | 0.8 | Day 7, 14, 21, 28 | 10 | Intrabladder | BLI of primary tumor |
| 4 | Treatment dose 2 | 1.6 | Day 7, 14, 21, 28 | 10 | Intrabladder | (2x/week; last measurement |
| 5 | Treatment dose 3 | 3.2 | Day 7, 14, 21, 28 | 10 | Intrabladder | right before takedown) Bladder measurements, digital pictures, bladder weights Keep bladder samples in 10% formalin at takedown 4-5 days after last treatment (Day 29 or 30) for further biomarker analysis |

The study design for combination therapy is shown in Table 15 below. Animals are randomized into study groups by tumor associated bioluminiescence. The lyophilized preparation of penicillin-treated *Streptococcus pyogenes* composition is dosed once a week for 4 weeks. Nice receive anti-PD-1 antibody twice a week. The mice are observed post-treatment for 1 week. Mice are examined daily, 5 days a week. Body weight is measured twice a week. Bioluminescent imaging (BLI) is obtained 1-2 times weekly for 4 weeks during in-life phase.

TABLE 15

Study Design for mouse orthotopic bladder tumor model (MB49) treated with lyophilized preparation of penicillin-treated Streptococcus pyogenes and anti-PD-1 antibody

| Group | Treatment | *S. pyogenes* Dose (KE/ml) | Dosing Schedule (post implantation) | Anti-PD-1 IgG dose (mg/mouse) | Dosing Schedule (post implantation) | Group Size | Endpoints |
|---|---|---|---|---|---|---|---|
| 1 | No treatment | NA | NA | 0 | Biweekly | 10 | Body weights Survival rate BLI of primary tumor |
| 2 | IgG control | 0 | Day 7, 14, 21, 28 | 0.2 | Biweekly | 10 | (2x/week; last measurement right before takedown) |
| 3 | *S. pyogenes* | Optimal dose | Day 7, 14, 21, 28 | 0 | Biweekly | 10 | Bladder measurements, digital pictures, |

TABLE 15-continued

| Study Design for mouse orthotopic bladder tumor model (MB49) treated with lyophilized preparation of penicillin-treated Streptococcus pyogenes and anti-PD-1 antibody | | | | | | | |
|---|---|---|---|---|---|---|---|
| Group | Treatment | *S. pyogenes* Dose (KE/ml) | Dosing Schedule (post implantation) | Anti-PD-1 IgG dose (mg/mouse) | Dosing Schedule (post implantation) | Group Size | Endpoints |
| 4 | Anti-PD-1 | NA | Day 7, 14, 21, 28 | 0.2 | Biweekly | 10 | bladder weights Keep bladder samples in |
| 5 | *S. pyogenes* + Anti-PD-1 | Optimal dose | Day 7, 14, 21, 28 | 0.2 | Biweekly | 10 | 10% formalin at takedown 4-5 days after last treatment (Day 29 or 30) for further biomarker analysis |

Example 6: Preparation of Lyophilized Composition Comprising Non-Viable *Streptococcus pyogenes* for Injection

*Streptococcus pyogenes* (A Group, Type 3, Su strain) are cultured in appropriate culture media. After appropriate cultivation period the bacteria are collected by centrifugation, washed, resuspended, and treated with hydrogen peroxide to kill the bacteria. The killed bacteria are centrifuged, washed, and resuspended in suspension medium, such as Berheimers basal medium (BBM) and filtered. The bacterial suspension is treated with benzylpenicillin and heated at 37° C. for ~10-45 min and at 45° C. for ~20-60 min. The final bulk suspension is prepared. Vials are filled with the final bulk suspension and lyophilized. The quantitative formulae for different proposed dosage strengths of an exemplary composition comprising non-viable *Streptococcus pyogenes* are presented in Table 16. These compositions are based on the lyophilized product. All vial strengths are filled with the same volume (0.41 mL) of suspension before lyophilization.

TABLE 16

| Quantitative Formula for Different Dosage Strengths for Exemplary Composition | | | | | | |
|---|---|---|---|---|---|---|
| | Content per Vial at Different Dosage Strengths | | | | | |
| Composition | 0.02 mg (0.2 KE) | 0.05 mg (0.5 KE) | 0.1 mg (1 KE) | 0.3 mg (3 KE) | 0.5 mg (5 KE) | 0.7 mg (7 KE) |
| Non-viable *Streptococcus pyogenes* (dried cell mass basis) | 0.02 mg (0.21%) | 0.05 mg (0.49%) | 0.1 mg (0.88%) | 0.3 mg (1.93%) | 0.5 mg (2.54%) | 0.7 mg (2.93%) |
| Maltose | 9.10 mg (94.31%) | 8.90 mg (86.65%) | 8.58 mg (75.77%) | 7.28 mg (46.95%) | 5.99 mg (30.39%) | 4.69 mg (19.63%) |
| Magnesium sulfate | 0.02 mg (0.20%) | 0.05 mg (0.48%) | 0.10 mg (0.86%) | 0.29 mg (1.89%) | 0.49 mg (2.48%) | 0.68 mg (2.86%) |
| Potassium dihydrogen phosphate | 0.10 mg (1.01%) | 0.24 mg (2.38%) | 0.49 mg (4.31%) | 1.46 mg (9.44%) | 2.44 mg (12.39%) | 3.42 mg (14.30%) |
| Sodium chloride 0.9% (normal saline) | 0.006 mg (0.06%) | 0.015 mg (0.15%) | 0.03 mg (0.26%) | 0.09 mg (0.58%) | 0.15 mg (0.76%) | 0.21 mg (0.88%) |
| Methionine | 0.04 mg (0.42%) | 0.10 mg (1.00%) | 0.20 mg (1.81%) | 0.61 mg (3.96%) | 1.02 mg (5.20%) | 1.43 mg (6.00%) |
| Penicillin G Potassium (Benzylpenicillin)[a] | 0.36 mg (3.78%) | 0.91 mg (8.87%) | 1.82 mg (16.09%) | 5.47 mg (35.24%) | 9.11 mg (46.24%) | 12.75 mg (53.39%) |

[a]Based on 1667 penicillin units/mg

KE = klinische einheit, defined as clinical unit, corresponding to 0.1 mg non-viable *Streptococcus pyogenes* dried cell mass For dosing, the lyophilized powder is suspended in an isotonic sodium chloride solution to prepare a suspension at a concentration of 0.005-0.01 mg/mL. The volume of product delivered to a subject at this concentration may vary. Table 17 provides a quantitative formulation of the exemplary composition suspended in 0.9% saline at a final cell concentration of 0.01 mg/mL.

TABLE 17

Example of Exemplary Composition Excipients After Suspension with 0.9% Saline

| Component | Quantity per vial[a] (mg) | Quantity per 0.2 mg Dose (mg) | 0.2 mg Suspension in 0.9% saline at 0.01 mg/mL (% w/v) |
|---|---|---|---|
| Non-viable *Streptococcus pyogenes* (dried cell mass) | 0.1 | 0.2 | 0.002% |
| Benzyl penicillin potassium[b] (Penicillin G potassium) | 1.82 mg (3034 units) | 3.64 mg (6068 units) | 0.036% |
| Methionine | 0.20 | 0.40 | 0.004% |
| Maltose | 8.58 | 17.16 | 0.17% |
| Magnesium sulfate | 0.10 | 0.20 | 0.002% |
| Potassium dihydrogen phosphate[c] | 0.49 | 0.98 | 0.01% |
| Sodium Chloride | 0.03 | 0.06 | 0.90% |
| Water | NA | NA | q.s. to 100% |

[a]Based on a 0.1 mg (1 KE) vial

[b]For penicillin, there are 1667 units per mg

[c]The IID name is monobasic potassium phosphate

KE = klinische einheit, defined as clinical unit, corresponding to 0.1 mg non-viable *Streptococcus pyogenes*;
NA = not applicable;
q.s. = quantity sufficient;

For dosing, the lyophilized powder is suspended in an isotonic sodium chloride solution to prepare a suspension at a concentration of 0.005-0.01 mg/mL. The volume of product delivered to a subject at this concentration may vary.

Example 7: In Vitro and In Vivo Efficacy Non-Viable Cells of *Streptococcus pyogenes* in Monotherapy and in Combination with Immune Checkpoint Inhibitors

Materials and Methods

Immunogenic Cell Death

To evaluate release of damage associated molecular patterns molecules (DAMPs), Bladder tumor MB49 cells were seeded in 96 well plate ($2\times10^4$ cells/well) in triplicate for each experimental point and incubated in DMEM High Glucose phenol red-free medium with HEPES (Thermostat, Cat. No. 21063029), 10% Heat inactivated Fetal bovine Serum (HI FBS) (Seradigm Avantor, Cat. No. 1500-500H), and 1% of Penicillin/Streptomycin (P/S) (Gibco-Thermofisher, Cat. No. 15140-122), for 24 h at 37° C., 5% CO2.

Cells were treated with Composition-002 at 0, 0.2, 0.8, 3.2 and 12.8 KE/mL (1 KE=0.1 mg) for 24 hr or 1 μM of Mitoxantrone (Sigma, Cat. No. M6545) as a positive control. After treatment, the plate was centrifuged for 5 min at 400 g and supernatant was collected for HMGB1 quantification while cells were collected for Flow Cytometry analysis.

HMGB1 was quantified using Promega Lumit Immunoassay (Promega, Cat. No. W6110) kit according to the manufacturer's instructions. The average value of the appropriate background control RLU (media only, or media only with drug treatment at the corresponding concentration) was subtracted from each triplicate of treated cell sample data. The fold induction of treated samples was calculated according to the following equation: treated cells RLU−cell−free media+drug RLU)/(average of untreated cells RLU−cell−free media RLU).

Annexin V-FITC (Abcam, Cat. No. Ab14085) and Calreticulin-AF700 (R&D Systems, Cat. No. IC38981N) markers were quantified by Flow Cytometry. Briefly cells were stained with calreticulin-AF700 for 30 min at 4° C., washed and resuspended with 1× binding buffer from Annexin V kit (Abcam, Cat. No. Ab14085). Annexin V and 50 μg/mL of propidium iodide (Abcam Cat. No. Ab14085) were added in the solution and incubated for 5 min 25° C. in the dark.

For external ATP analysis (eATP), RealTimeGlo eATP Assay Reagent (Promega, Cat. No. GA5010) was added to the medium prior to COMPOSITION-002 treatment and eATP luminescent measurement was taken after 24 h of treatment. After final measurement was taken, 400 μg/mL of Digitonin (Promega, Cat. No. G9441) was added to the media to assess total ATP and general cell health as assay control. eATP was calculated using the formula [(average of triplicate cellstreated RLU−average of cell−free media+drug RLU)/(average of cells untreated RLU−cell−free media RLU)×100−100], where RLU represents Background-subtracted luminescence.

Dendritic Cell Activation and Phagocytosis Assay

Bone marrow cells were collected by flushing femurs with RPMI 1640 media (ATCC, Cat. No. 30-2001). Disaggregate cells were filtered through a 70-μM pre-wetted filter twice to remove cell clumps and counted with 3% acetic acid with methylene blue (StemCell Technologies, Cat. No. 07060). Bone Marrow cells were then resuspended in RPMI 1640 media supplemented with 2 mM GlutaMax (ThermoFisher, Cat. No. 30-2001), 10% HI FBS (Avantor, Cat. No. 1500-500H), 1% P/S (Gibco, Cat. No. 15140-122), 50 ng/ml GM-CSF (PeproTech, Cat. No. 300-03), 25 ng/mL of IL-4 (PrepoTech, Cat. No. 200-04) and cultured in 96 well plate ($3\times10^4$ cells/well) at 37° C. with 5% CO2 for 48 h. Dendritic cells (DCs) differentiation continued after refreshing half of the media for 24 h. Next, cell media was completely refreshed, and cells were cultured for another 72 h to complete DCs differentiation.

MB49 cells ($2.5\times10^6$ cells) were cultured in DMEM High Glucose medium with HEPES (ThermoFisher, Cat. No. 12430054), 10% HI FBS, and 1% P/S in T-25 flasks and treated with COMPOSITION-002 (0, 0.05, 0.2, 0.8, 1.6, and 3.2 KE/mL) for 24 h. Dinaciclib (1 μM) (Tocris R&D, Cat. No. 7336) was used as positive control. After treatment, cells were resuspended, washed to remove COMPOSITION-002, and stained with Vybrant™ DiO Cell-Labeling Solution (ThermoFisher, Cat. No. V22886) for 20 min at 37° C.

Pre-labeled MB49 cells and DCs were co-cultured in 96 well plates at 2:1 ratio ($3\times10^4$ DCs: $1.5\times10^4$ MB49 cells) for 24 h using DC medium: MB49 medium ratio at 1:1. CD80-PE (BioLegend, Cat. No. 305207), CD86-BV421 (BioLegend, Cat. No. 305425), CD11c-AP (BioLegend, Cat. No. 337207), HLA-DR-BUV395 (BD Bioscience, Cat. No. 565972) were used to identify DCs, DiO-FITC was used to identify pre-labeled MB49 cells, and overall cell viability was analyzed by APC-eFluor780 (eBioscience, Cat. No. 65-0865-14) by Flow Cytometry.

COMPOSITION-002 Cytotoxicity and Cytokine Release

Bladder cancer RT112 cells were cultured in EMEM media (ATCC, Cat. No. 30-2003) supplemented with 2 mM GlutaMax (ThermoFisher, Cat. No. 35050061), 1% NEAA (ThermoFisher, Cat. No. 11140050), 10% HI FBS and 1%

P/S. 5637 cells were cultured in RPMI 1640 media (ATCC, Cat. No. 30-2001) supplemented with 2 mM Glutamax, 10% HI FBS and 1% P/S. Both cell lines were pre-labeled using CellTracker Red solution (1 uM) (Invitrogen, Cat. No. C34552) for 30 min at 37° C. Next, cells were washed and plated in 96 well plate ($2.5\times10^4$ cells/well cell/well) for 24 h at 37° C. 5% $CO_2$.

Fresh Peripheral blood mononuclear cells (PBMC) were isolated from whole blood using EasySep Direct Human PBMC isolation kit (Stem Cell Technologies, Cat. No. 19654) according to manufacturer's instructions and supplemented with 6 mM of EDTA (ThermoFisher, Cat. No. 15575-038). PBMC were resuspended in RPMI-1640 supplemented with 10% HI FBS and 1% P/S.

COMPOSITION-002 treatment (0.2 KE/mL) was carried out in the context of tumor cells alone ($2.5\times10^4$ cells/well) or in co-culture with PBMC ($1.65\times10^5$ cells/well) using a ratio of 6.6:1 effector: target cells in the presence of 1.25 μg/mL Anti-CD3 (eBioscience, Cat No. 16-0037) for 72 h in 37° C., 5% $CO_2$. After treatment, the plate was spun at 400 g for 5 min and supernatants were collected. Inflammatory cytokines were stained using the V-Plex Proinflammatory Panel 1 Human (Meso Scale, Cat. No. K15049 D-1) and detected using a plate reader. Next, cells were washed and trypsinized for Flow Cytometry analysis. CellTracker Red-PE (Invitrogen, Cat. No. C34552), Live/Dead Dye-efluor780 (eBioscience, Cat. No. 65-0865-14) and CD45-BUV395 (BD, Cat. No. 563792) were used to quantify tumor cells viability and exclude PBMCs from the analysis.

T Cell Activation

Frozen PBMC were thaw and cells were gently disassociated by resuspending them in RPMI-1640 Medium supplemented with 10% HI FBS and 1% P/S with 100 ug/mL of DNase I (StemCell Technologies, Cat. No. 17951) and incubating for 15 min at 25° C. EasySep buffer (StemCell Technologies, Cat. No. 20144) was added to the mixture and cells were filtered through 37 μM cell strainer (StemCell Technologies, Cat. No. 07900). T cells were isolated using EasySep Human T Cell isolation Kit (StemCell, Cat. No. 17951) according to the manufacturer's instructions.

Cells were plated in 96-well plate ($5\times10^5$/well) and treated with COMPOSITION-002 (0.2 KE/mL) for 72 h in 37° C., 5% $CO_2$. Plate was spun and supernatant was collected for IFN-g (Invitrogen, Cat. No. BMS228) and Granzyme B (Invitrogen, Cat. No. BMS2027-2) quantification by ELISA. T cells were collected and stained for the following markers: CD4-BUV395 (BD, Cat. No. 564724), FoxP3-PE (BD, Cat. No. 560852); CD8-FITC (BioLegend Cat. No. 344704), PD-1-PE-Cy7 (BioLegend, Cat. No. 329918), CTLA-4-BV421 (BioLegend, Cat. No. 369606), TIGIT-BV711 (BioLegend Cat. No. 372742), TIM3-BV605 (BioLegend Cat. No. 345018), LAG3-APC (BioLegend Cat. No. 369212), Ki67-efluor506 (eBioscience Cat. No. 69-5698-82), Live/Dead dye-efluor708 (eBioscience, Cat. No. 65-0865-14). Data were acquired by Flow Cytometry.

PD-L1 Analysis in Tumor Cells

Bladder cancer 5637 cells cultured in RPMI-1640 media supplemented with 2 mM Glutamax, 10% HI FBS and 1% P/S are pre-labelled with Cell Tracker Red and plated in 96-well plate $2.5\times10^4$cells/well) to grow overnight.

Frozen PBMC were thaw and cells were gently disassociated by resuspending them in RPMI-1640 Medium supplemented with 10% HI FBS and 1% P/S with 100 μg/mL of DNase I and incubating for 15 min at 25° C. EasySep buffer was added to the mixture and cells were filtered through 37 μM cell strainer. T cells were isolated using EasySep Human T Cell isolation Kit (StemCell, Cat. No. 17951) according to the manufacturer's instructions and kept in RPMI-1640 Medium supplemented with 10% HI FBS and 1% P/S.

T cells were added to appropriate co-culture wells following the 6.6:1 ratio ($1.65\times10^5$ cells cell/well) with media ratio for 5637:T cells of 1:1. 5637 cells alone and in co-culture with T cells were treated with COMPOSITION-002 (0.2 and 0.8 KE/mL) for 72 h at 37° C., 5% $CO_2$. After treatment, supernatant was washed and PD-L1 (BioLegend, Cat. No. 374510) marker was analyzed in pre-labeled tumor cells by flow cytometry.

In Vitro Cytotoxicity Analysis Using xCELLigence Real-Time Cell Analyzer (RTCA)

Fresh Peripheral blood mononuclear cells (PBMC) were isolated from whole blood using 2× EasySep Direct Human PBMC isolation kit (Stem Cell Technologies, Cat. No. 19654) according to manufacturer's instructions and supplemented with 6 mM of EDTA (ThermoFisher, Cat. No. 15575-038). PBMC were resuspended in RPMI-1640 supplemented with 10% HI FBS and 1% P/S. 5637 cells cultured in RPMI-1640 media supplemented with 10% HI FBS and 1% P/S are seeded in 96-well E-Plate (Agilent, Cat. No. 300600910) ($5\times10^5$) cells per well) for 30 min for the cells to adhere. After ~78 hours, the effector cells (human PBMCs; effector/target ratio 6.6:1) and treatments were added. COMPOSITION-002 treatment (0.8 KE/mL) was carried out for −65 hours in the co-culture setting (Tumor cells+PBMC) alone or in combination with the following antibodies: Anti-PD-1 (10 μg/mL-Bioxcell, Cat. No. SIM0010), Anti-PD-L1 (10 μg/mL-Bioxcell, Cat. No. SIM0009), Anti-CTLA-4 (10 μg/mL-Selleckchem, Cat. No. A20001). RecombiMAb IgG4 (Bioxcell, Cat. No. CP147) (10 μg/mL), and RecombiMAb IgG1 (Bioxcell, Cat. No. CP147) (10 μg/mL) were used as isotype controls. Cell Index measurements were collected by xCelligence RTCA eSight (Agilent) every 15 min for a total of 143.5 hours (~78 hours cancer cells alone+~65 hours in co-culture). For each well, the % cytolysis was calculated utilizing the normalized sample cell index and the normalized average target alone control according to the following equation:

$$\%\ \text{Cytolysis} = \frac{(\text{Cell Index}_{no\ effector} - \text{Cell Index}_{effector})}{\text{Cell Index}_{no\ effector}} \times 100$$

MB49 Subcutaneous Mouse Model

For the dose finding study, 14-week-old Female C57BL/6 mice were implanted subcutaneously with MB49 bladder cancer cells ($2.0\times10^5$ cells/mouse) and 10 mice per group were randomized after 8 days (80-130 $mm^3$ tumor size for enrolment). Mice were dosed individually once a week for 4 weeks with COMPOSITION-002 intravenously (0.08, 0.4 and 2 KE/mouse). Tumor measurements were done twice a week using calipers. Animals that did not reach humane endpoint (weight loss >20%, tumor burden >2000 $mm^3$, open weeping tumor ulceration, severe respiratory distress, severely impaired movement, or loss of righting reflex) were monitored for a maximum of 35 days.

For combination study, 14 weeks old female mice were implanted subcutaneously with MB49 cells ($2.0\times10^5$ cells/mouse) and 10 mice per group were randomized after 6 days (75-130 $mm^3$ of tumor size for enrolment). Mice were dosed individually once a week for 4 weeks (0.4 KE/mouse of COMPOSITION-002) intravenously and/or anti-PD-1 twice a week for 2 weeks (10 mg/Kg) (BioXcell, Cat No. BP0146). Isotype Control (2A3) were used as negative control (BioxCell, Cat. No. BP0089). Animals that did not reach humane endpoint were kept for 5 days after the last dose of COMPOSITION-002 before being euthanized and have tumors collected and processed for immunohistochemistry.

EMT6 Orthotopic Mouse Model.

For the dose finding study, 14-weeks old female Balb/c mice were implanted with $5\times10^5$ EMT6 triple negative breast cancer cells on their left $4^{th}$ mammary fat pad. After 7 days, six mice were randomized per group (50-150 $mm^3$ of tumor size for enrollment) and were dosed with COMPOSITION-002 twice a week (0.4, 1 and 2 KE/mouse) intravenously. Tumor growth and mice body weight were measured twice a week for 3 weeks. Mice that did not reach humane endpoint were euthanized on day 35 of the study. Tumors of 3 mice from each group were collected and after mechanical dissociation, were treated with collagenase D (2.5 mg/mL) for chemical separation. Cells were filtered through 70 μm cell strainer and stained for FACS analysis of tumor infiltrated immune cell populations (Table 18).

TABLE 18

FACS Analysis of Tumor Infiltrated Immune Cell Populations

| Immune Cell Population | Phenotypic Markers |
|---|---|
| T cells | $CD45^+CD3^+$ |
| CD4+ T cells | $CD45^+CD3^+CD4^+$ |
| CD8+ T cells | $CD45^+CD3^+CD8^+$ |
| CD8+ T cells | $CD45^+CD3^+CD4^-CD8^+$ |
| Tregs | $CD3^+CD4^+Foxp3^+CD25^+$ |
| Granulocytic MDSC | $CD45^+CD3$ $CD11b^+Ly6G^+Ly6C^{low}$ |
| Monocytic MDSC | $CD45^+CD3$ $CD11b^+Ly6G^-Ly6C^{high}$ |
| NK cells | $CD45^+CD3^-CD49b^+CD335^+$ |
| M1 macrophages | $CD45^+CD3^-F4/80^+CD206^-$ |
| M2 macrophages | $CD45^+CD3^-F4/80^+CD206^+$ |
| PD1 positive | $PD1^+$ |

Figure 28A:
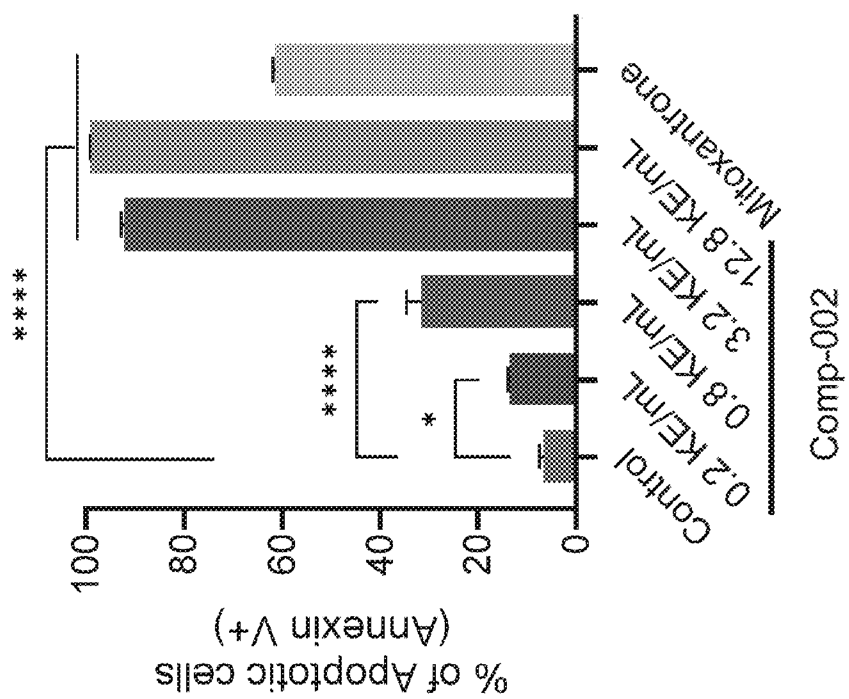
FIGS. 28A-28D: COMPOSITION-002 treatment leads to tumor apoptosis and release of Damage-associated molecular pattern molecules (DAMPs). MB49 cells were treated with different concentrations of COMPOSITION-002 for 24 hrs. Mitoxantrone (1 uM) was used as positive control.
Figure 28B:
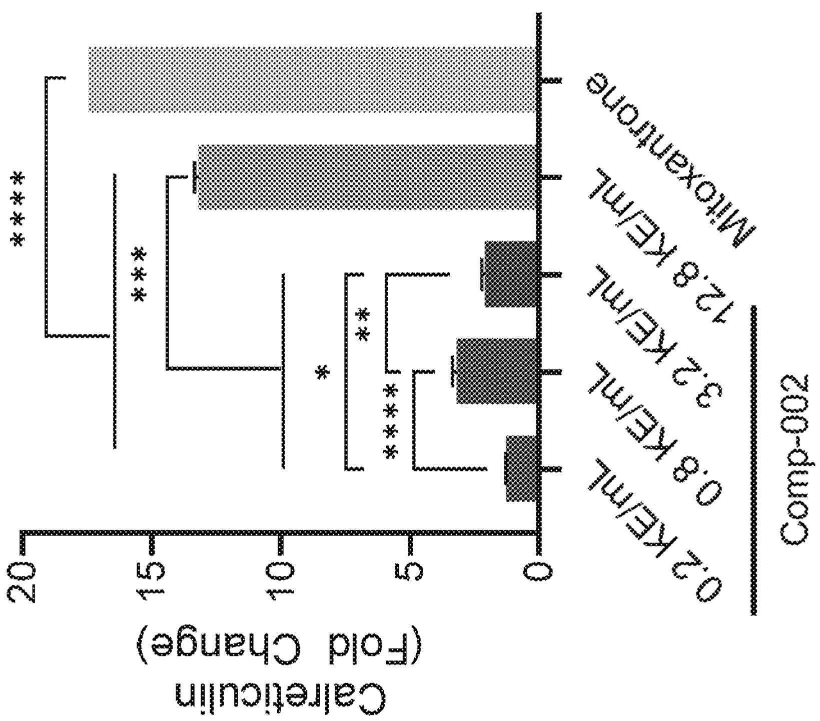
Figures 28C, 28D:
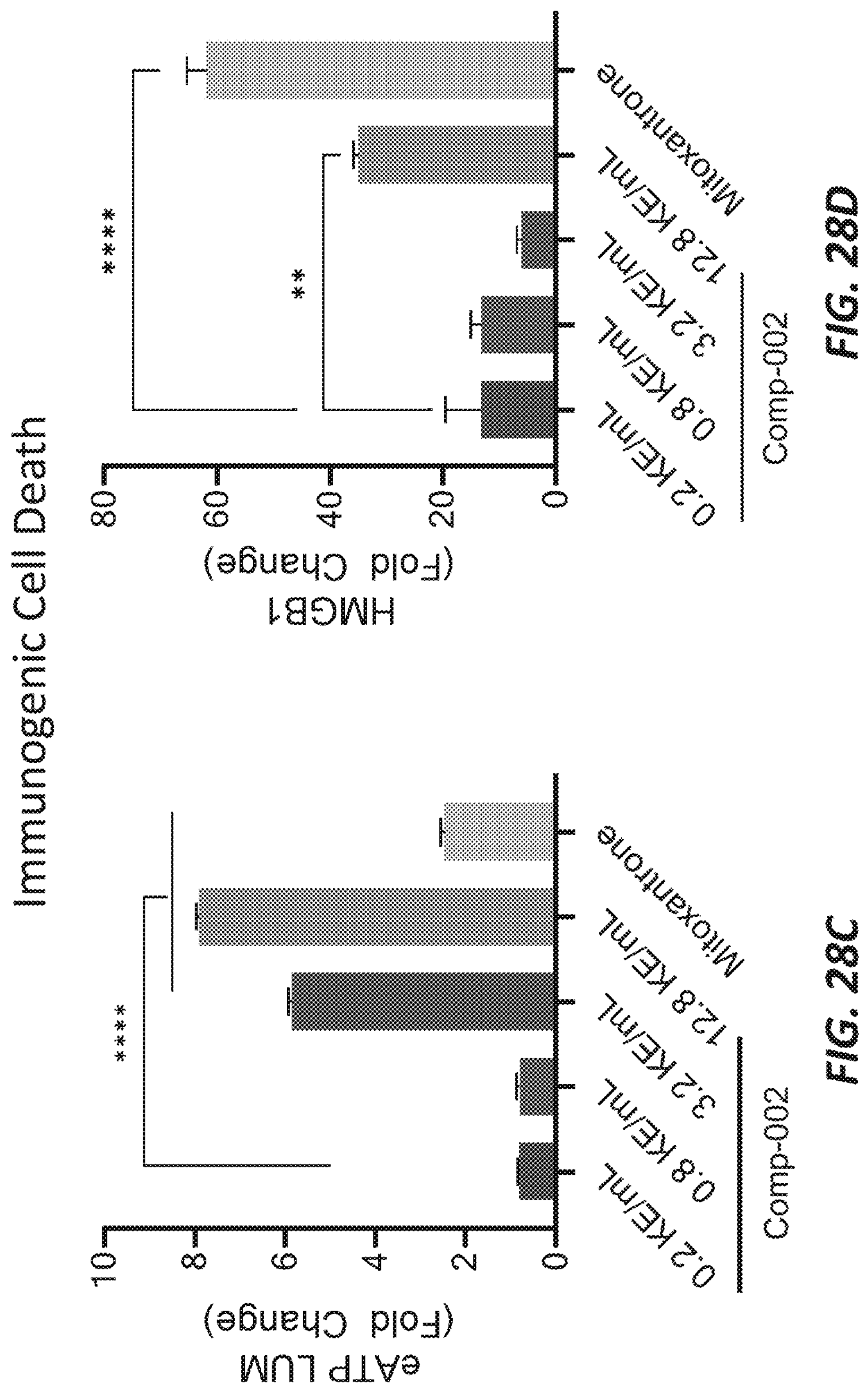
Figures 29A, 29B:
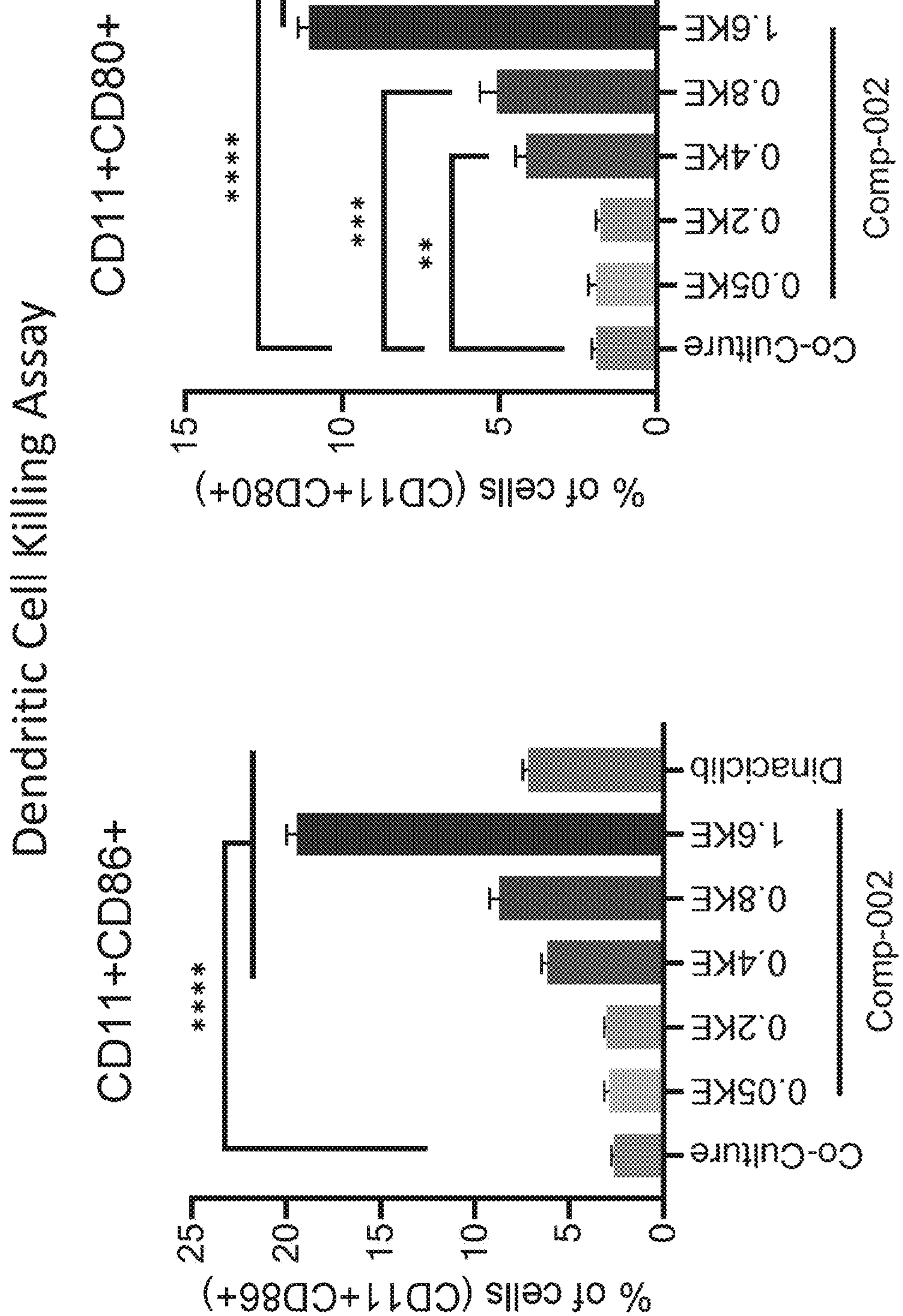
FIGS. 29A-29D: MB49 cells previously exposed to COMPOSITION-002, leads to Dendritic Cells (DCs) maturation and higher phagocytosis rate. MB49 cells were previously treated with different concentrations of COMPOSITION-002 for 24 hrs. The drug was removed, and the tumor cells were co-cultured for an additional 24 hrs with DCs isolated from C57bl/6 mouse bone marrow. CD86-positive (FIG. 29A), CD80-positive (FIG. 29B) and HLA-DR-positive (FIG. 29C) Dendritic cells (CD11+) were quantified by Flow Cytometry as markers of cell maturation.
Figure 29D:
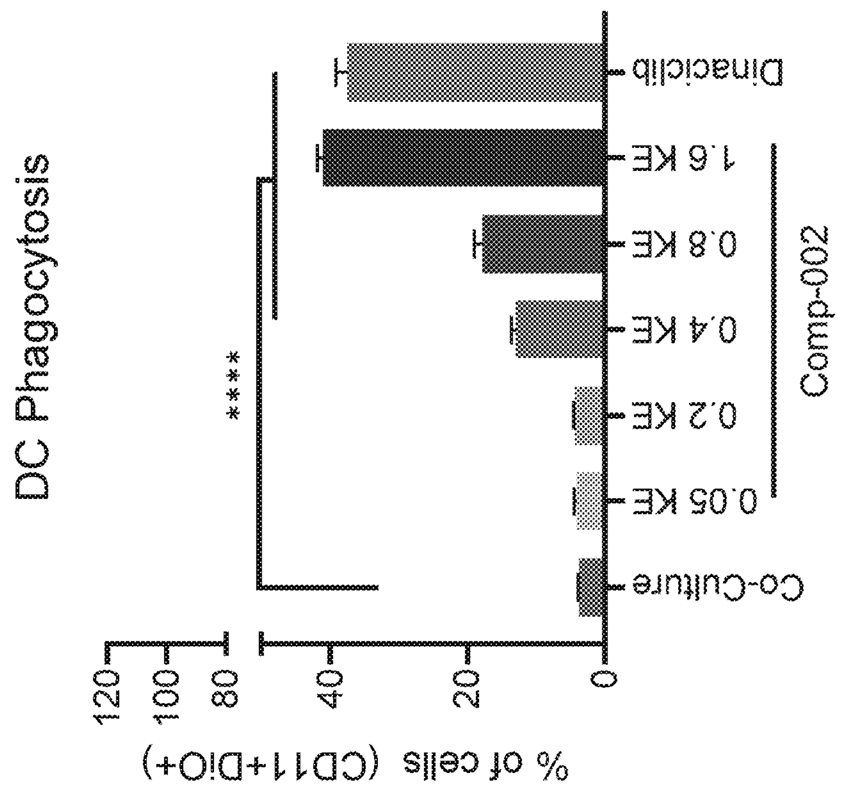
Figure 29C:
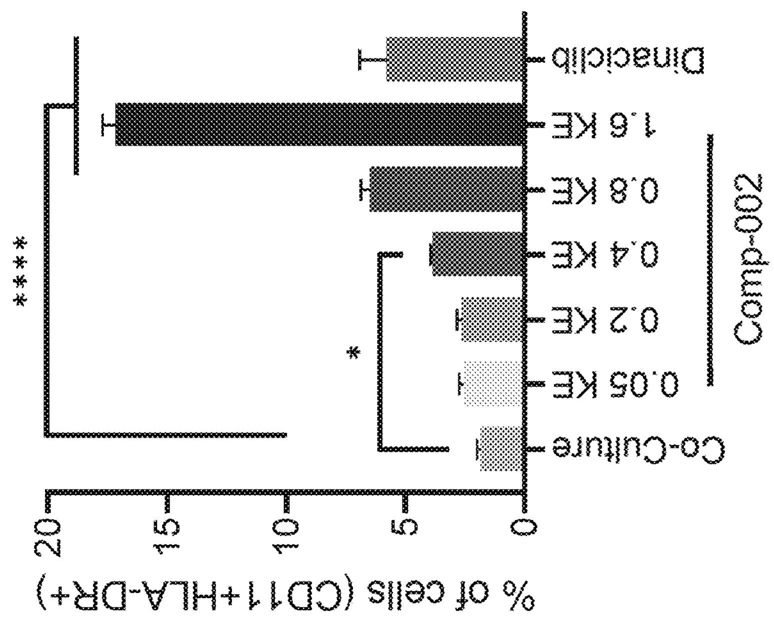
Figure 30B:
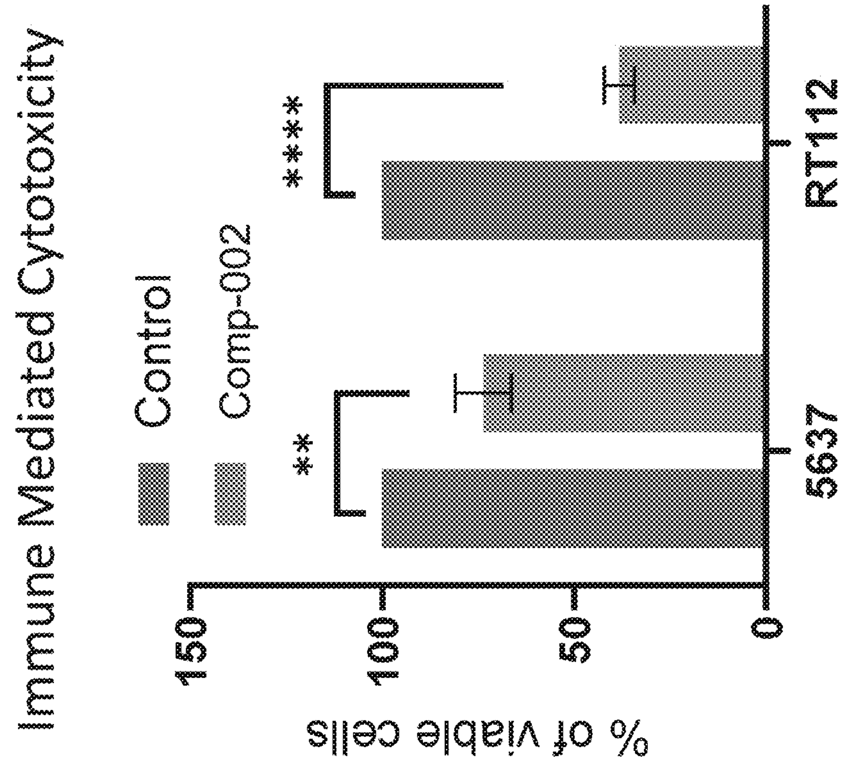
FIGS. 30A-30B: COMPOSITION-002 was effective in promoting immune mediated killing of tumor cells. Untreated cells (left bar); COMPOSITION-002 treated cells (right bar).
Figure 30A:
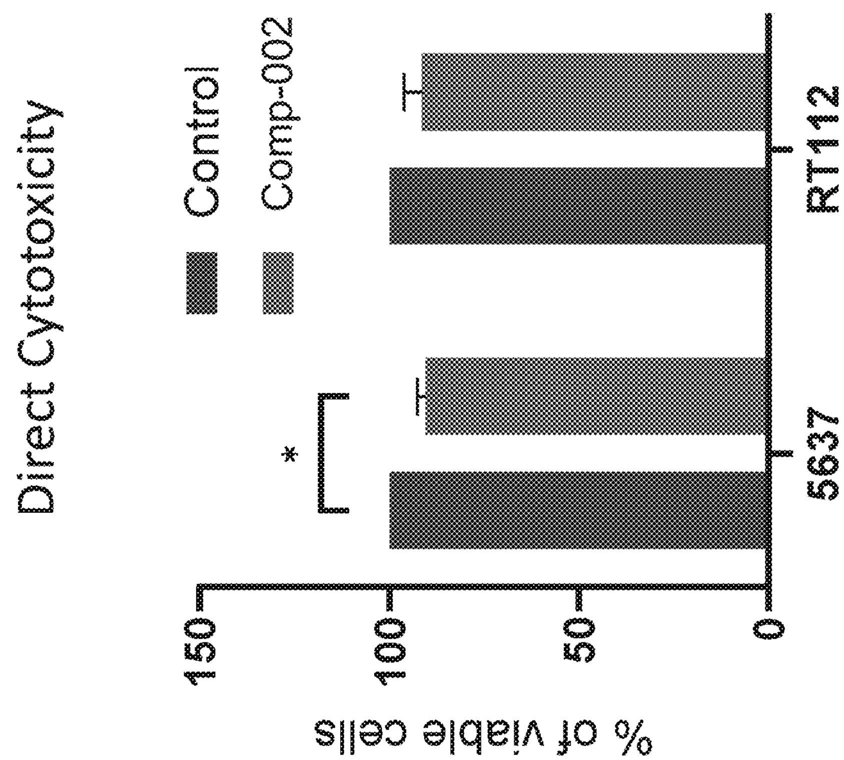
Figure 31A:
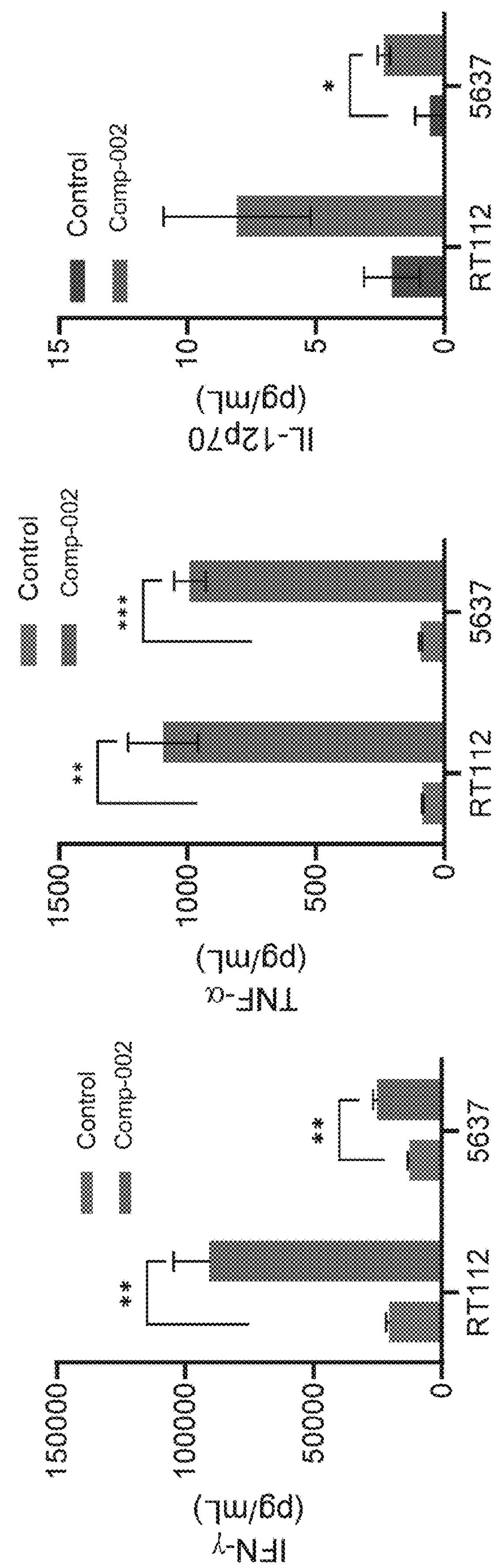
FIGS. 31A-31B: COMPOSITION-002 treatment induced Th1 and reduced Th2 cytokines release. Human bladder cancer cells 5637 and RT112 were co-cultured with PBMCs and COMPOSITION-002 (0.2 KE/mL) for 72 hs. Supernatant was collected, and a panel of pro-inflammatory cytokines were measured by electrochemiluminescence detection (MSD assay). Untreated cells (left bar); COMPOSITION-002 treated cells (right bar).
Figure 31B:
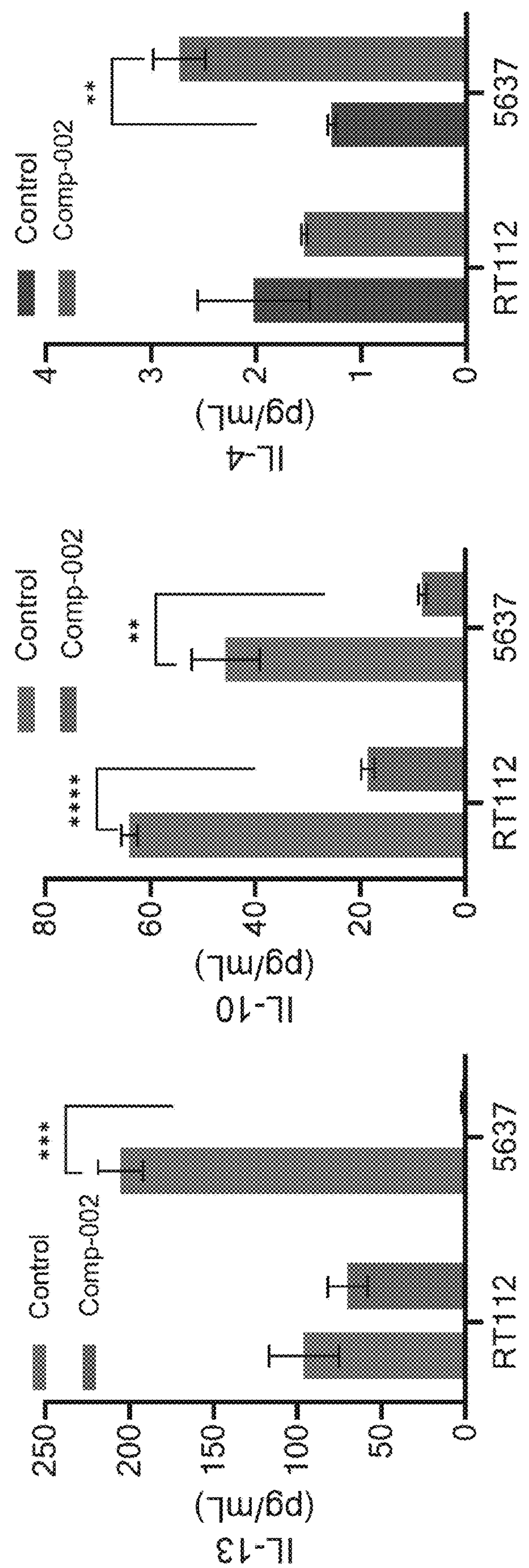

Results:

MB49 bladder cancer exposed to COMPOSITION-002 undergo apoptosis (FIG. 28A) with production of hallmarks of immunogenic cell death such as HMGB1, extracellular ATP (eATP) and expression Calreticulin on the cell surface (FIGS. 28B-28D). These damage-associated molecular patterns (DAMPS) serve as signals to attract and activate antigen-presenting cells (APCs) such as macrophages and dendritic cells (DCs) which in turn can effectively activate naïve T cells. As DCs play the key role in the recognition of DAMPs associated with immunogenic cell death and the subsequent uptake and presentation of tumor antigens, the phagocytosis of COMPOSITION-002-treated tumor cells by DCs was examined. MB49 cells were treated with COMPOSITION-002 and then cultured with mouse bone marrow-derived DCs. COMPOSITION-002-treated MB49 bladder cancer cells increased dendritic cell phagocytosis (FIG. 29A) and phenotypic maturation, as indicated by the upregulated surface expression of CD80, CD86, and HLA-DR increased (FIGS. 291B-291D). Using an in vitro co-culture approach of bladder cancer cells (5637 and RT112) and PBMCs, COMPOSITION-002 was found to enhance immune-mediated bladder cancer cell killing (FIGS. 30A-30B). Of note, cytokine analyses showed that COMPOSITION-002 increased the release of pro-inflammatory Th1 cytokines (FIG. 31A) creating a favorable environment for the induction of cellular and humoral anti-tumor immunity. Additionally, COMPOSITION-002 also promoted reduction of Th2 cytokines (FIG. 31B), which are correlated with tumor growth. For example, COMPOSITION-002 reduced IL-10 release, which is known to inhibit the secretion of various Th1 cytokines by macrophages and dendritic cells.

Figure 32A:
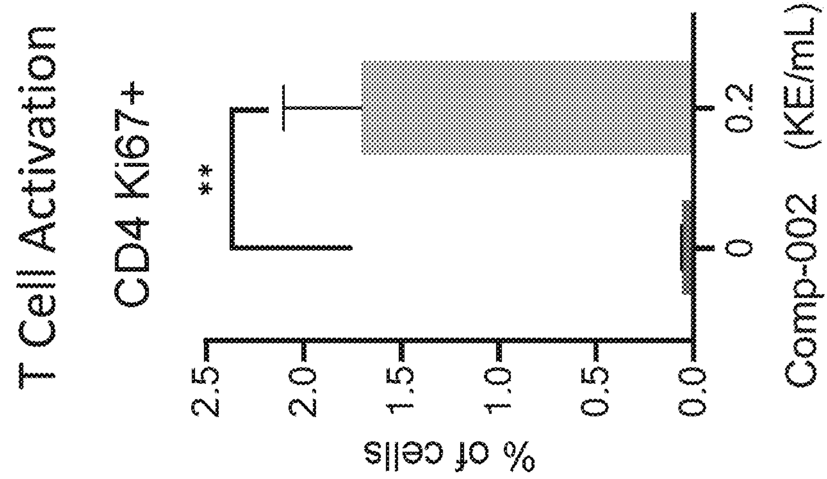
FIGS. 32A-32M: COMPOSITION-002 induced T cell proliferation and activation, however it also increased markers of exhausted phenotype. T cells isolated from PBMC were treated with COMPOSITION-002 (0.2 KE/mL) for 72 hs. CD4+ T cells were analyzed for the proliferation marker Ki67 (FIG. 32A), as well as the LAG3 (FIG. 32B), CTLA4 (FIG. 32C), PD-1 (FIG. 32D), TIGIT (FIG. 32E), TIM3 (FIG. 32F) and FOXP3 (FIG. 32G) markers.
Figures 32B, 32C, 32D, 32E:
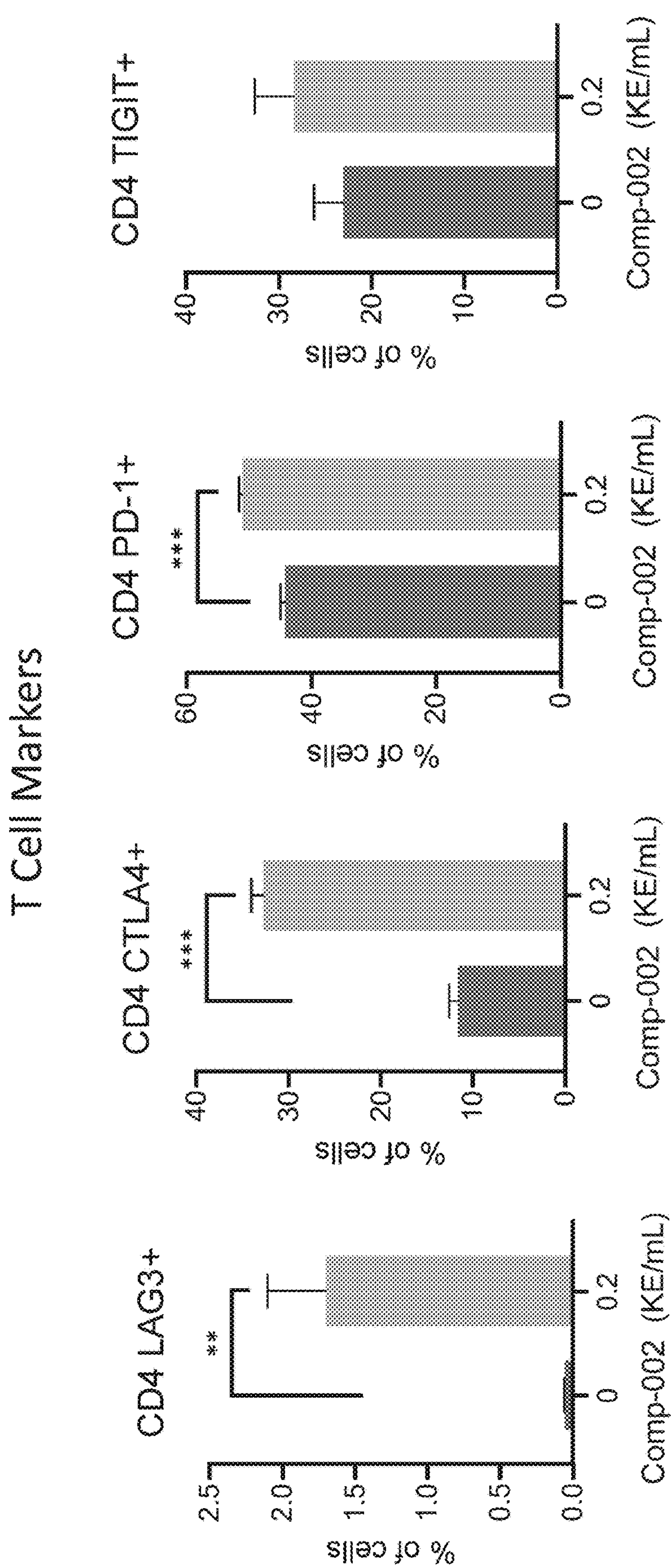
Figures 32F, 32G:
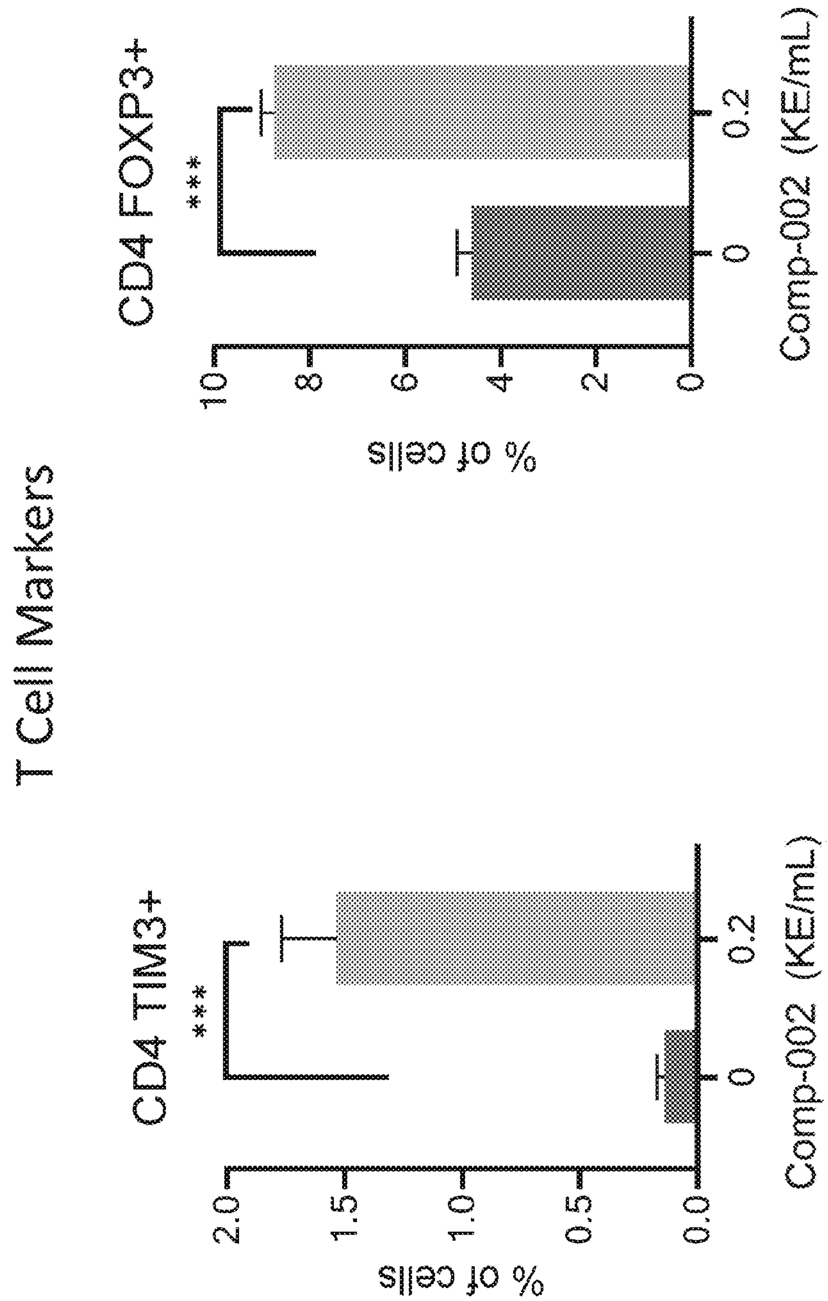
Figure 32J:
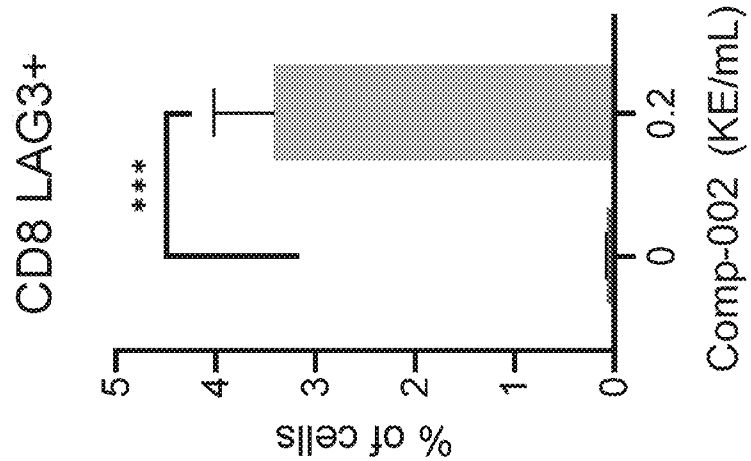
Figure 32I:
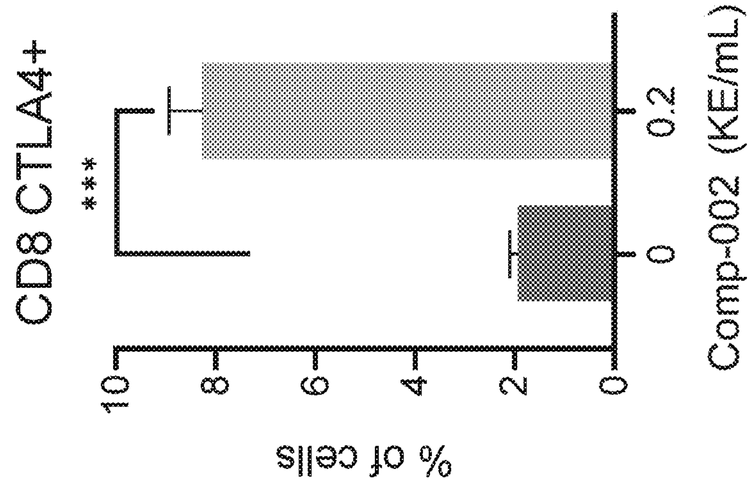
Figure 32H:
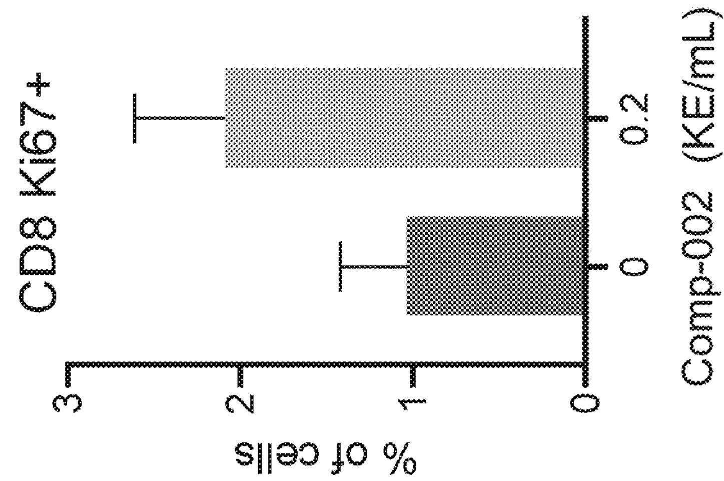
Figures 32K, 32L, 32M:
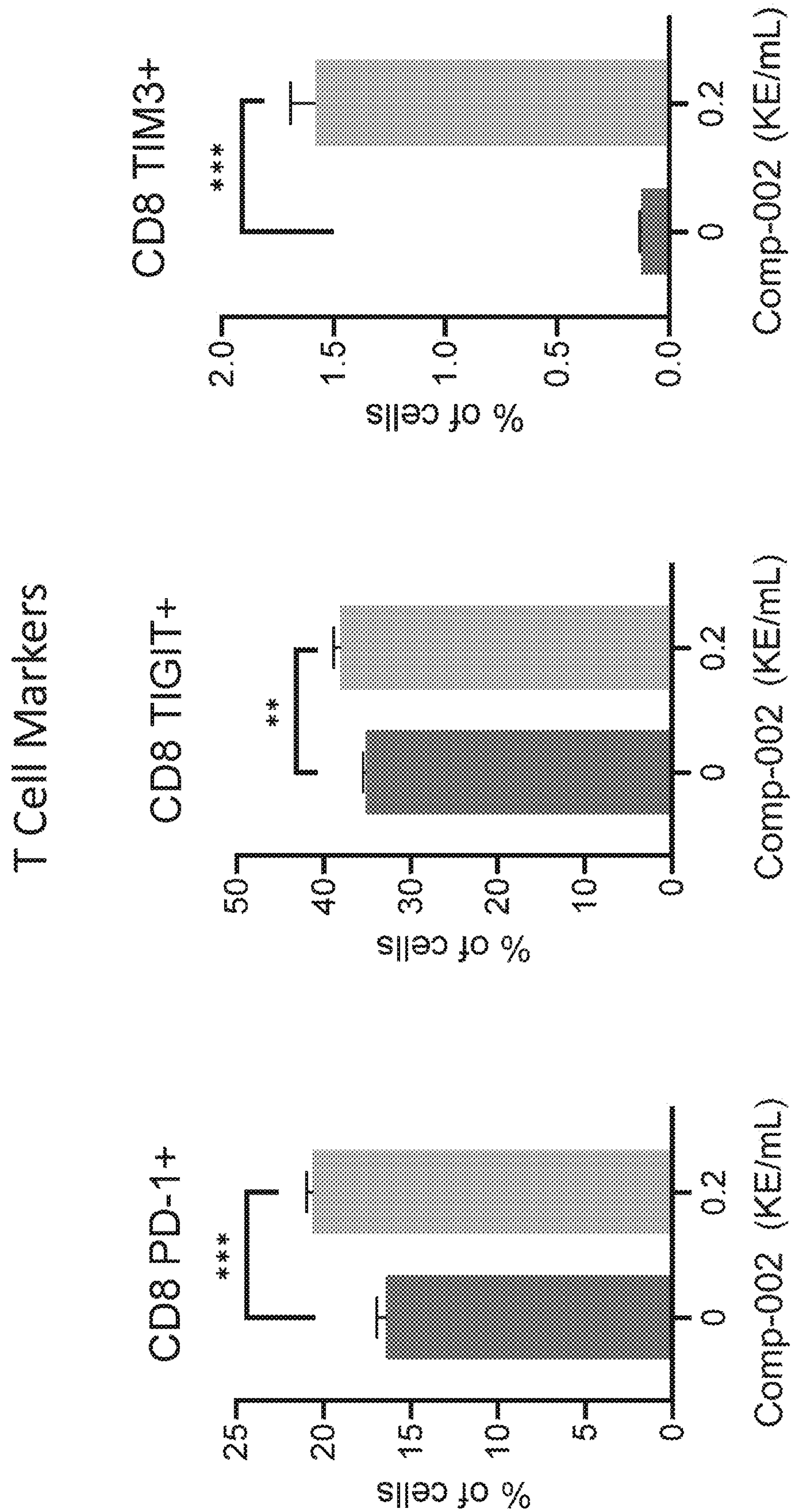
Figures 33A, 33B:
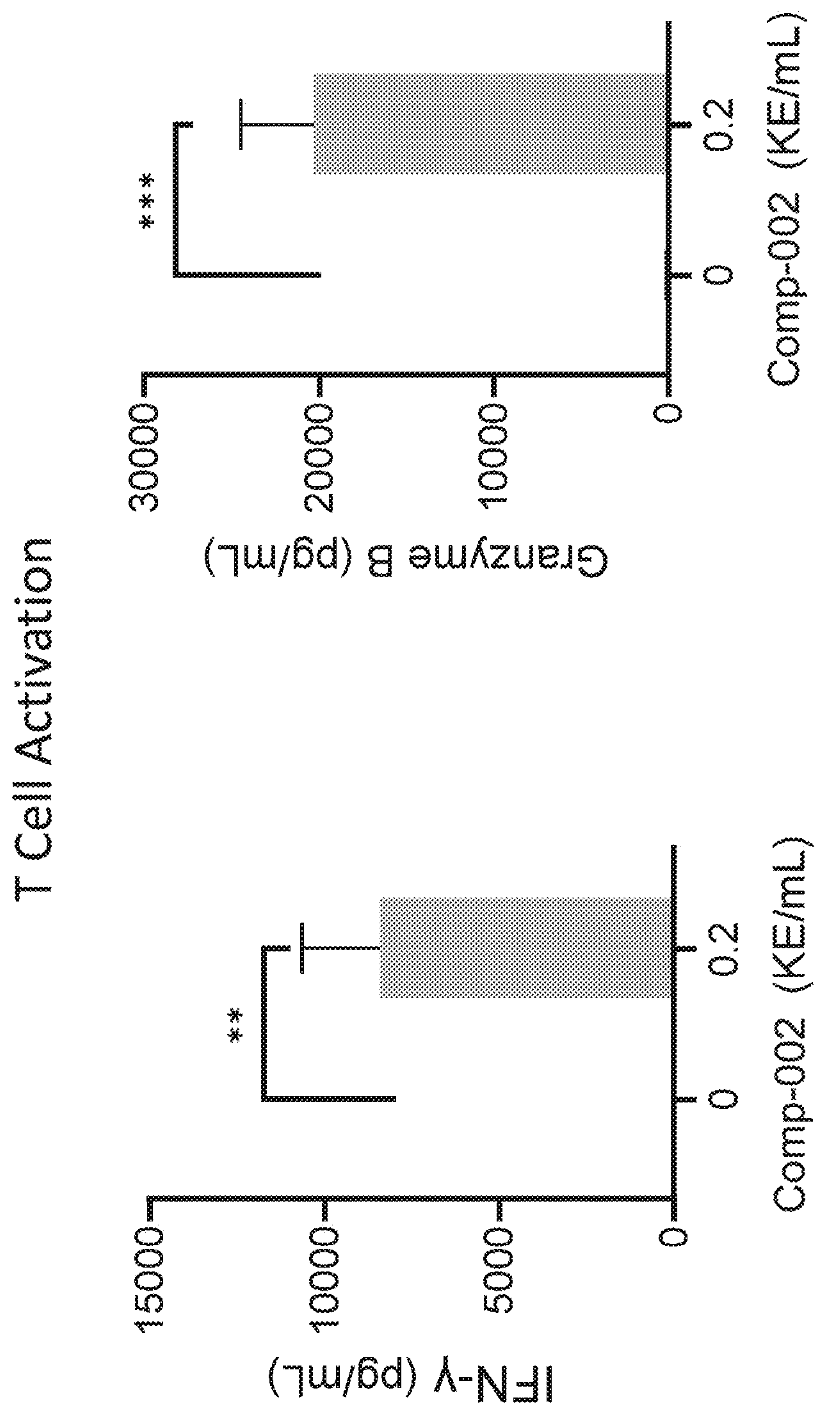
FIGS. 33A-33B: COMPOSITION-002 activates T cells by increasing IFN-7 and Granzyme B release. T cells isolated from PBMC were treated with COMPOSITION-002 (0.2 KE/mL) for 72 hs.
Figure 34:
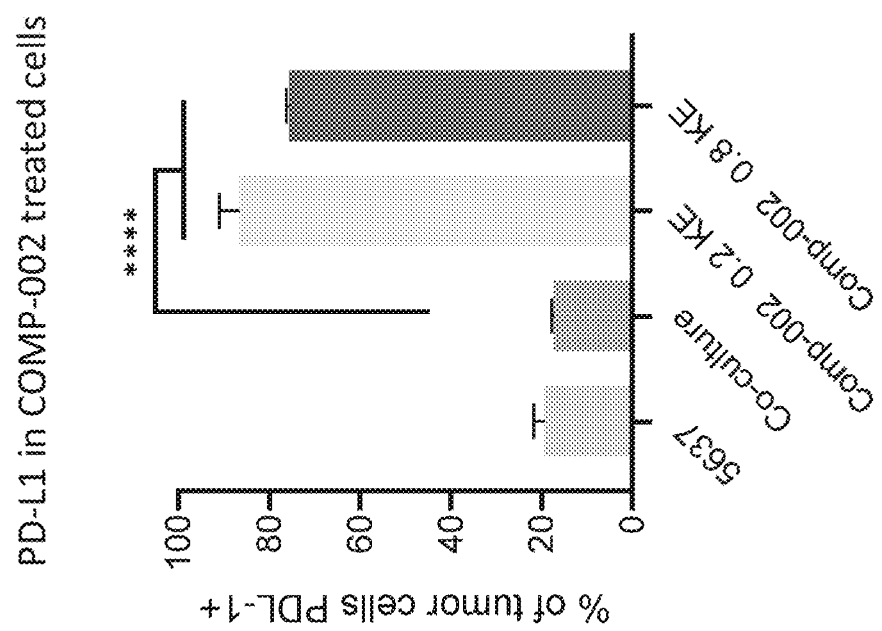
FIG. 34: COMPOSITION-002 treatment induces PD-L1 expression in 5637 bladder tumor cells in co-culture. T cells isolated from PBMC were co-cultured with the human bladder cancer cell 5637 and COMPOSITION-002 (0.2 and 0.8 KE/mL) for 72 hs. PD-L1 signal was quantified in pre-labeled 5637 by Flow Cytometry. Data are presented as Mean±SEM. N=3. T-test; *, P<0.05; **; P<0.01; * * *, P<0.001.

To investigate if COMPOSITION-002 induces PD-L1 expression in cancer cells, thereby suppressing the antitumor immune response, bladder cancer cells (5637), in coculture with PBMCs, were treated with increasing concentration of COMPOSITION-002. COMPOSITION-002 treatment led to increased PD-L1 expression in 5637 cells in comparison to the control (FIG. 34). Moreover, COMPOSITION-002 stimulation of T-cells alone increased T cell proliferation as observed by high percentage of CD4 and CD8 cells exhibiting KI67 marker (FIGS. 32A and 32H). Additionally, COMPOSITION-002 promoted IFN-γ and Granzyme B release (FIGS. 33A-33B) suggesting enhanced cytotoxic activity. However, markers of exhausted T-cell phenotypes were identified through high levels of LAG3, CTLA4, PD-1, TIGIT, and TIM3 in CD4 and CD8 T-cells (FIGS. 32B 32C, 32D, 32E, 32F, 32J, 32I, 32K, 32L, and 32M, respectively) as well as FOXP3 CD4+ regulatory T-cells (FIG. 32G). Taken together, the immunostimulatory action of COMPOSITION-002 may be potentiated with additional agents targeting these exhausted T-cell phenotypes.

Figures 35A, 35B:
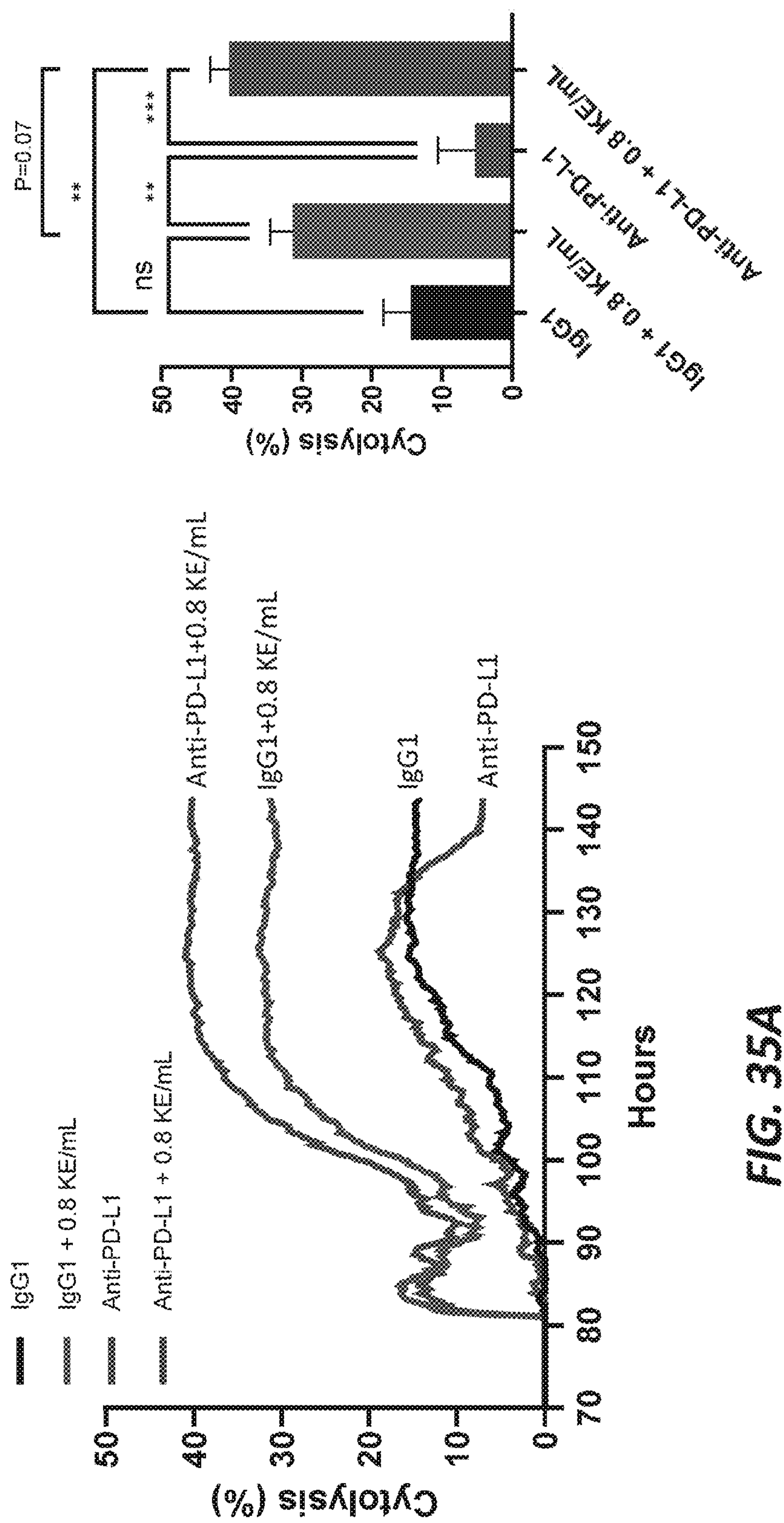
FIGS. 35A-35F: Anti-PD-L1 and anti-CTLA4 synergize with COMPOSITION-002. In vitro cytotoxicity was measured using xCELLigence real-time cell analyzer. Human bladder cancer 5637 cells were seeded in 96-well E-Plate and allow to grow for 78 h. Subsequently, the effector cells (human PBMCs; effector/target ratio 6.6:1) and treatments were added. COMPOSITION-002 treatment (0.8 KE/mL) was carried out for −65 hours in the co-culture setting (PBMC+ Tumor cells) alone or in combination with the following antibodies.
Figure 35D:
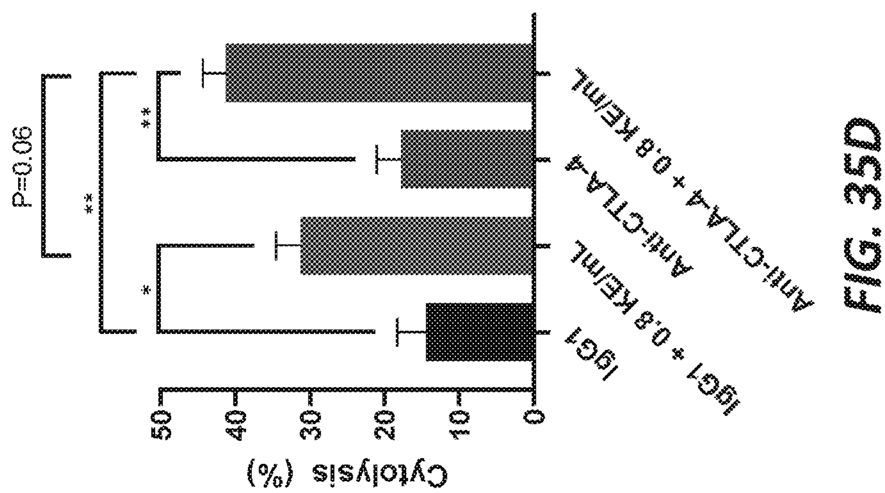
Figure 35C:
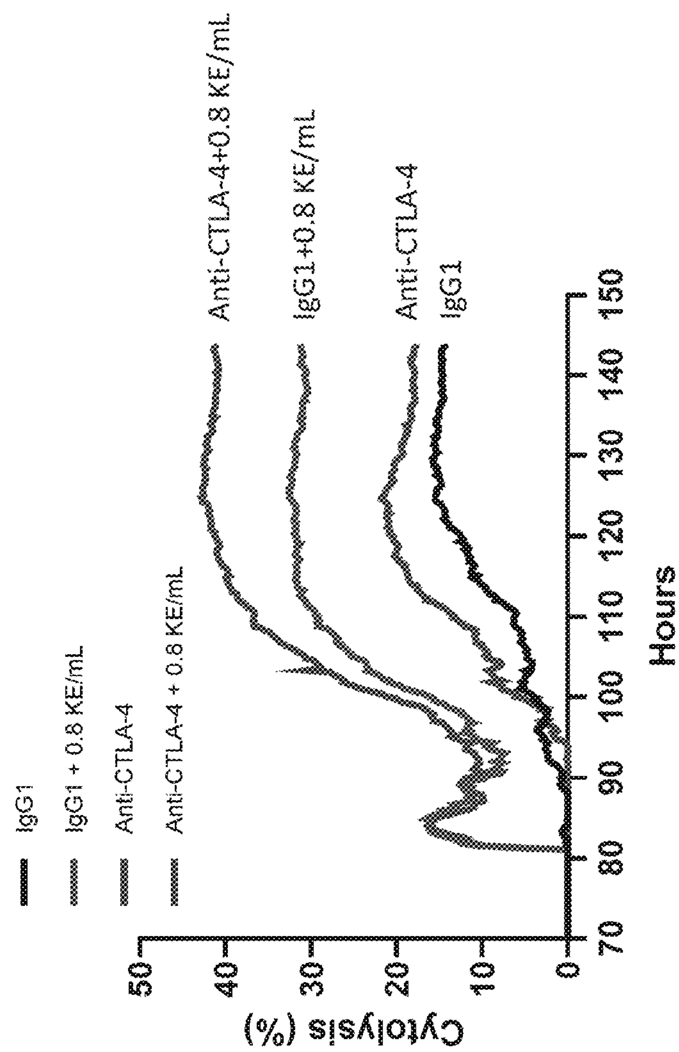
Figures 35E, 35F:
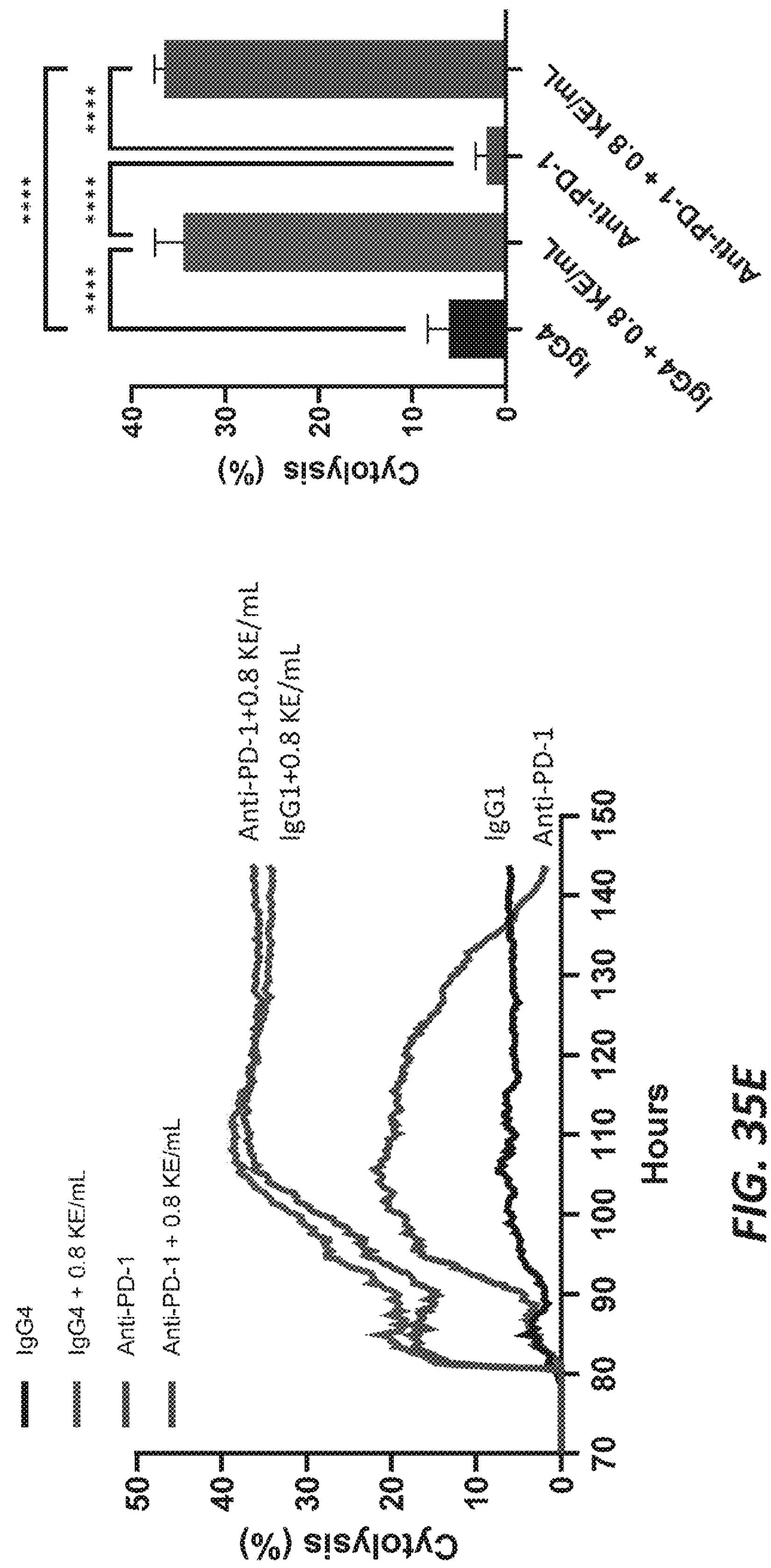

To investigate the potential synergic antitumor effect of COMPOSITION-002 with the immune checkpoint inhibitors (ICIs) anti-PD-L1 antibody, anti-CTLA4 antibody, and anti-PD1 antibody, in vitro, the xCELLigence platform was selected, which can be used monitoring cell health, proliferation, and cytolysis over time. Target 5637 bladder cancer cells were seeded in the biosensor plate (E-Plate) and allowed to attach and proliferate. After 78 h, fresh PBMCs were added on top of the 5637 cells in the presence or absence of COMPOSITION-002, ICIs or irrelevant IgGs isotypes (IgG4 for anti-PD1 and IgG1 for anti-PD-L1 and anti-CTLA4) used as controls for ~65 hours (143.5 hours total). The combination of COMPOSITION-002 with anti-PD-L1 or anti-CTLA4 showed enhancement of 5637 cell cytolysis in the presence of human PBMCs when compared to individual treatments (FIGS. 35A-35D). It is worthwhile to mention that the combination of COMPOSITION-002 and ICIs had a delayed anti-tumor effect compared to COMPOSITION-002 alone, suggesting that the combination activity is dependent on the COMPOSITION-002 mediated-expression of immune checkpoint (e.g., PD-L1, CTLA4). However, just a slight increase of cytolysis was observed when anti-PD1 antibody was used when compared to COMPOSITION-002 alone (FIGS. 35E-35F).

Figures 36A, 36B:
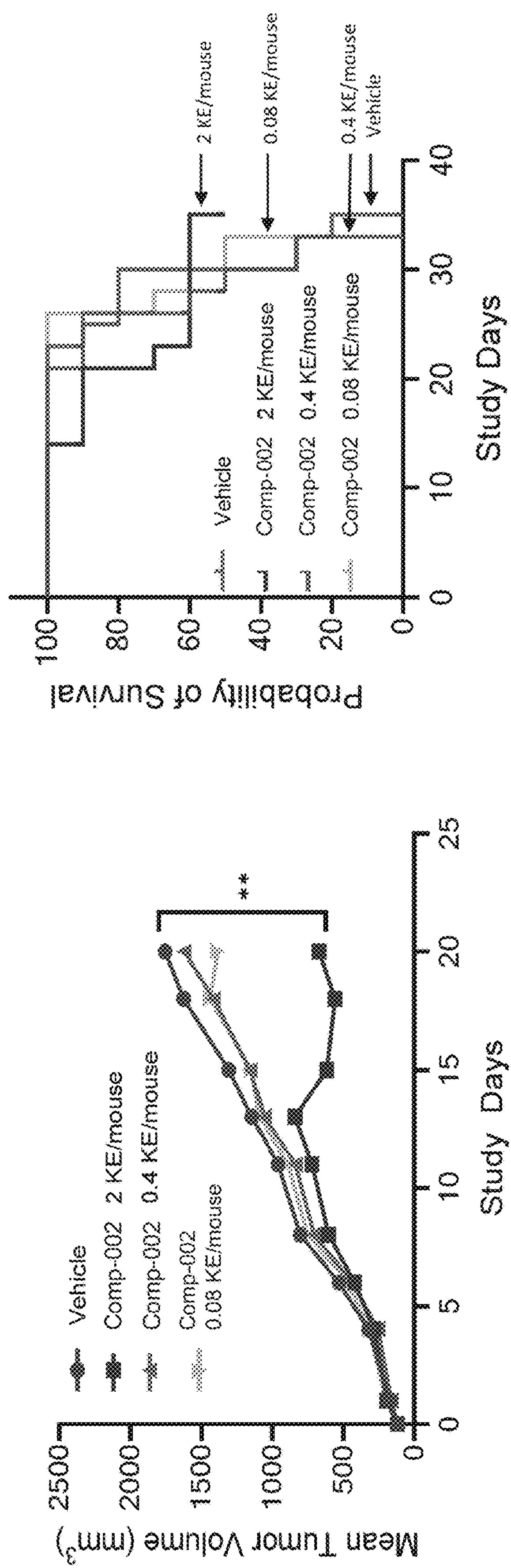
FIGS. 36A-36B: COMPOSITION-002 treatment reduces tumor growth and expands animal survival in the anti-PD-1 sensitive MB49 subcutaneous mouse model. MB49 bladder cancer cells were implanted subcutaneously in C57bl/6 mice. After 7 days, animals were randomized and received COMPOSITION-002 treatment (2, 0.4 or 0.8 KE/mouse) once a week intravenously for 4 weeks.

As the response of tumors to immunotherapy, such as anti-PD-1, may depend on interactions of several cell types in the tumor microenvironment in vivo, the COMPOSITION-002 and anti-PD1 combination study was repeated using a bladder cancer mouse model. Instead of the MBT2 model previously used (Example 2), the MB49 murine bladder carcinoma model was selected, which has the potential to respond to immune stimulants and is widely used in bladder cancer immunotherapy research. Moreover, based on the observed delayed anti-tumor effect of COMPOSITION-002 with other ICIs in vitro, mice were treated for three weeks (instead of one week as in the previous in vivo MBT2 bladder cancer study in Example 2). COMPOSITION-002, as a monotherapy, was efficient in reducing tumor growth and increasing survival in a MB49 subcutaneous model (FIGS. 36A-36B). Further analysis using COMPOSITION-002 in combination with anti-PD-1 in this same model revealed reduction in tumor volume compared to either COMPOSITION-002 or anti-PD-1 as monotherapy (FIGS. 37A-37E). For example, the mean tumor volume for anti-PD1 alone and for the combination group on Day 20 was 264 $mm^3$ and 159 $mm^3$, respectively, which indicates additional efficacy. Furthermore, 30% of complete regressions and 10% tumor free survivors were observed in the combination treatment group. No complete regression nor tumor free survivors were found in the monotherapy groups.

Figure 38A:
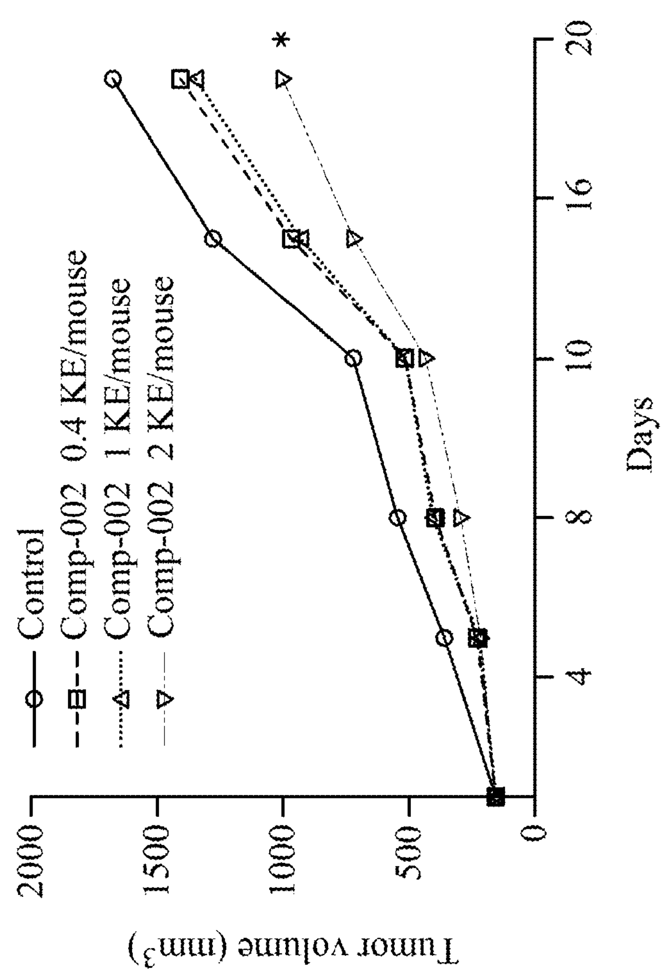
FIGS. 38A-38B: COMPOSITION-002 treatment reduces tumor growth in in PD-1 resistant triple negative breast cancer model associated with increase expression of PD-1 in T cells. The Anti-PD-1 resistant triple negative breast cancer cells (EMT6) were implanted orthotopically in female Balb/c mice. After 8 days, mice were randomized and received COMPOSITION-002 (0.4, 1 and 2 KE/mouse) treatment twice a week intravenous for 3 weeks.
Figure 38B:
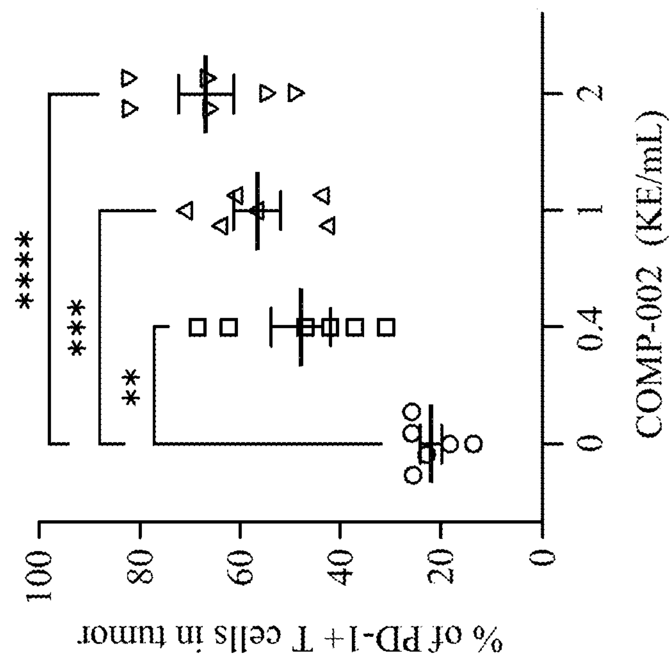
Figure 39B:
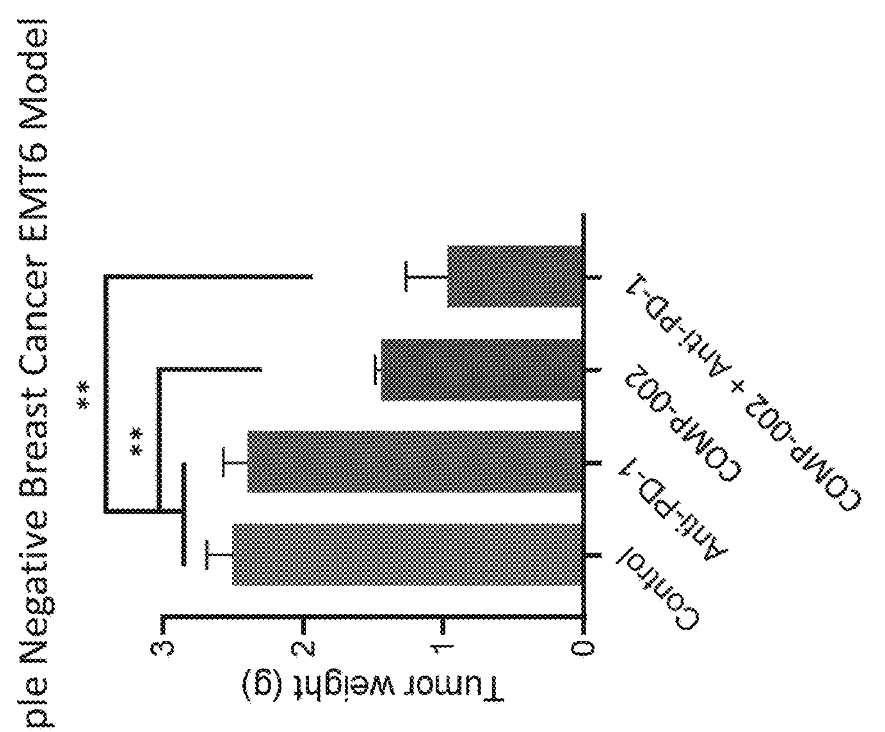
FIGS. 39A-39B: COMPOSITION-002 in combination with Anti-PD-1 revealed reduced tumor volume and weight in the anti-PD-1 resistant EMT6 orthotopic mouse model. The anti-PD-1 resistant triple negative breast cancer cells were implanted orthotopically in female Balb/c mice. After 8 days, mice were randomized and received COMPOSITION-002 (10 mg/Kg) treatment twice a week intravenously for 3 weeks and Anti-PD-1 treatment (100 ug/mouse) intraperitoneally twice a week for 2 weeks.
Figure 39A:
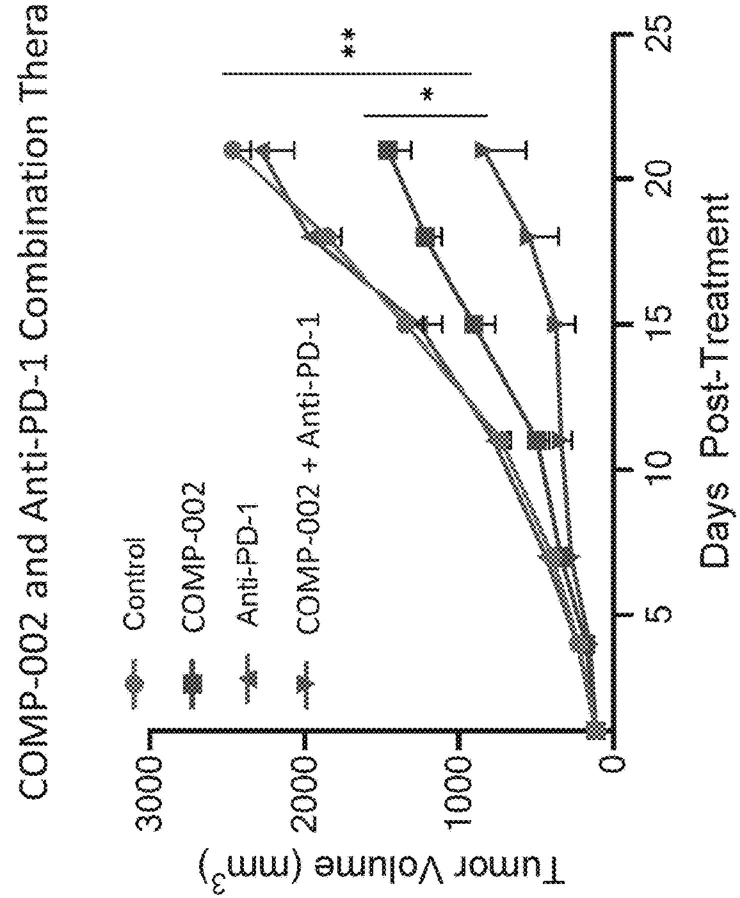

The antitumor effect of COMPOSITION-002 was also tested in vivo using a murine orthotopic triple negative breast (TNBC) cancer model (EMT6 cells) characterized by an immunosuppressive tumor microenvironment and resistance to anti-PD1 treatment. Results demonstrated a significant but modest anti-tumor effect by COMPOSITION-002 administered intravenously as monotherapy (FIG. 38A). On immune cells analyzed by flow cytometry, tumor associated macrophages (TAMs) were identified, with an increase of the anti-tumor macrophages 1 (M1) and decrease of pro-tumor macrophages 2 (M2) cell types (i.e., M1 polarization), which were associated with increased PD-1 expression on T cells (FIG. 38B). Systemic delivery of COMPOSITION-002 in combination with anti-PD1 in the EMT6 TNBC mouse model demonstrated significantly superior anti-tumor activity compared to each agent as monotherapy, indicating synergism between COMPOSITION-002 and anti-PD1 (FIGS. 39A-39B).

Figures 40A, 40B:
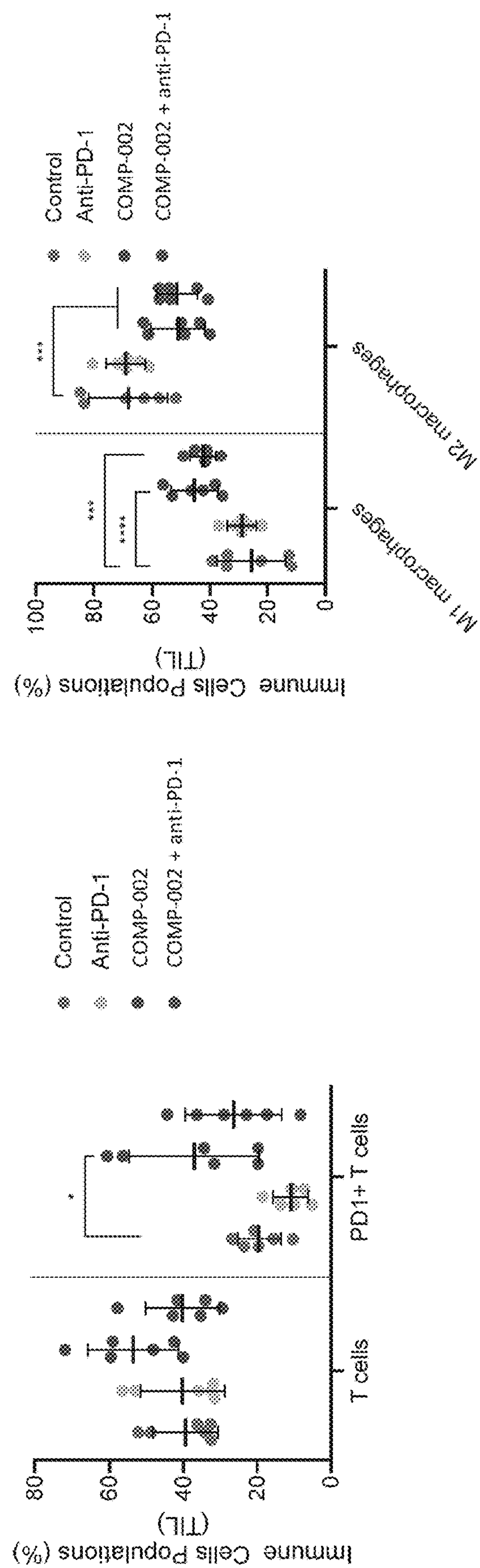
FIGS. 40A-40D: COMPOSITION-002 and Anti-PD-1 combination therapy in EMT6 orthotopic mouse model reshaped the tumor microenvironment. The Anti-PD-1 resistant triple negative breast cancer cells were implanted orthotopically in female Balb/c mice. After 8 days, mice were randomized and received COMPOSITION-002 treatment (10 mg/Kg) twice a week intravenously for 3 weeks and Anti-PD-1 treatment (200 ug/Kg) intraperitoneally twice a week for 2 weeks. On day 30 post tumor implantation, mice were euthanized, and primary tumors were collected, processed, and stained for Flow Cytometry analysis of tumor infiltrated immune cells. Tumor Infiltrated analysis of T cells and PD-1-positive T cells (FIG. 40A); macrophage cells subpopulations (FIG. 40B); C. T regulatory cells (FIG. 40C); Natural Killer (NK) cells (FIG. 40D). Data shown from left to right: Control, Anti-PD-1, COMPOSITION-002, and COMPOSITION-002+anti-PD-1. Data presented as Mean±SEM. One-Way ANOVA Tukey's post test. *, P<0.05, , P<0.01, *, P<0.001; ****, P<0.0001. N=3.
Figures 40C, 40D:
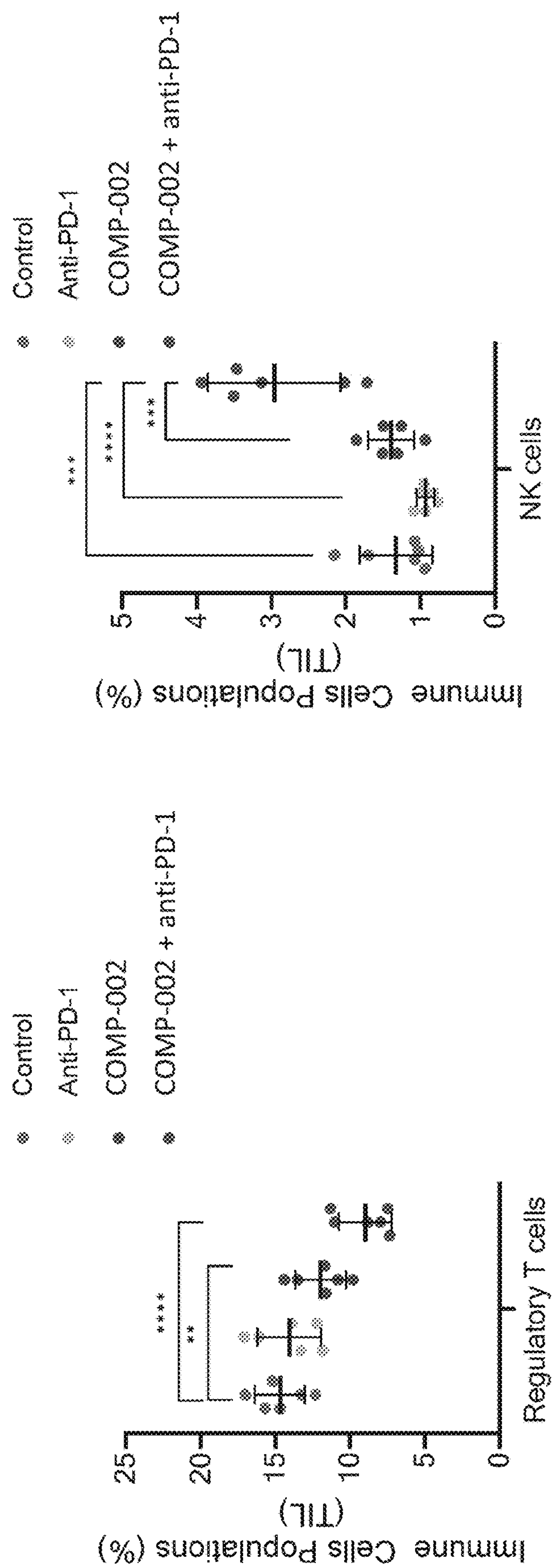

Furthermore, the combination treatment of COMPOSITION-002 with anti-PD1 re-shaped the local immune cell populations by restoring PD-1 levels in T cells, increasing levels of intratumor CD4 T-cells, promoting macrophage polarization towards M1 phenotype (anti-tumor), downregulating pro-tumor Treg cells (FIGS. 40A-40C). The fact that COMPOSITION-002 in combination with anti-PD1 significantly increases the level of tumor-infiltrating Natural Killers cells (NK) compared to monotherapy groups (FIG. 40D) is particularly important. Indeed, researchers have highlighted the advantages of anti-PD-1/PD-L1 therapy in improving NK cell function and found that interrupting the PD-1/PD-L1 interaction can enhance the killing effect of NK cells on tumor cells. Moreover, PD-1/PD-L1 antibodies are completely ineffective in some NK-deficient mouse models.

Representative Embodiments

1. A method of treating triple negative breast cancer in a subject, comprising administering to the subject (i) a composition comprising non-viable cells of *Streptococcus pyogenes*; and (ii) an immune checkpoint inhibitor.

2. The method of embodiment 1, wherein the composition comprising non-viable cells of *Streptococcus pyogenes* is administered intratumorally, intravenously, intramuscularly, subcutaneously or intraperitoneally.

3. The method of embodiment 1 or 2, wherein the non-viable cells of *Streptococcus pyogenes* is present in the composition in the amount of about 10 KE or greater.

4. The method of embodiment 3, wherein the non-viable cells of *Streptococcus pyogenes* is present in the composition in the amount of at least 20 KE.

5. The method of embodiment 3, wherein the non-viable cells of *Streptococcus pyogenes* is present in the composition in the amount of at least 40 KE.

6. The method of any one of embodiments 1-5, wherein the non-viable cells of *Streptococcus pyogenes* is administered to the subject at a dose of about 1 KE to about 100 KE, about 5 KE to about 50 KE, or about 0.1 KE, 0.5 KE, 1 KE, 2.5 KE, 5 KE, 10 KE, 15 KE, 20 KE, KE, 40 KE, 50 KE, 60 KE, 70 KE, 80 KE, 90 KE, or 100 KE.

7. The method of any one of embodiments 1-6, wherein the non-viable cells of *Streptococcus pyogenes* comprise cells of the Su strain of *Streptococcus pyogenes*.

8. The method of any one of embodiments 1-7, wherein the immune checkpoint inhibitor is an antibody or antigen binding fragment thereof, a vaccine, a nucleic acid molecule (including an inhibitory nucleic acid molecule), a gene editing system, or a small molecule.

9. The method of any one of embodiments 1-8, wherein the immune checkpoint inhibitor is an inhibitor of PD1/PD-L1/PD-L2 axis, CD80, CD86, B7-H3, B7 H4, HVEM, adenosine, GAL9, VISTA, CEACAM-1, CTLA 4, BTLA, KIR, LAG3, TIM3, A2aR, CD244/2B4, CD160, TIGIT, LAIR-1, PVRIG/CD112R, arginase, indoleamine 2,3 dioxygenase (IDO), IL-10, IL-4, IL-1RA, IL-35, or any combination thereof.

10. The method of embodiment 9, wherein the inhibitor of the PD-1/PD-L1/PD-L2 axis comprises a PD-1 inhibitor, optionally wherein the PD-1 inhibitor is an antibody.

11. The method of embodiment 10, wherein the PD-1 antibody comprises pembrolizumab, nivolumab, cetrelimab, cemiplimab, sasanlimab, nofazinlimab, geptanolimab, zimberelimab, serplulimab, pucotenlimab, prolgolimab, camrelizumab, cadonilimab, dorstarlimab, penpulimab, toripalimab, tislelizumab, sintilimab, or dostarlimab.

12. The method of embodiment 9, wherein the inhibitor of the PD-1/PD-L1/PD-L2 axis comprises a PD-L1 inhibitor, optionally wherein the PD-L1 inhibitor is an antibody.

13. The method of embodiment 12, wherein the PD-L1 antibody comprises atezolizumab, durvalumab, envafolimab, sugemalimab, cosibelimab, socazolimab, tagitanlimab, betifisolimab, lesabelimab, pacmilimab, or avelumab 14. The method of embodiment 9, wherein the inhibitor of the PD-1/PD-L1/PD-L2 axis comprises a PD-L2 inhibitor, optionally wherein the PD-L2 inhibitor is an antibody.

15. The method of embodiment 9, wherein the inhibitor of the PD-1/PD-L1/PD-L2 axis comprises a PD-1 inhibitor and a PD-L1 inhibitor, optionally wherein the PD-1 inhibitor and/or PD-L1 inhibitor is an antibody.

16. The method of embodiment 9, wherein the immune checkpoint inhibitor comprises a CTLA-4 inhibitor, optionally wherein the CTLA-4 inhibitor is an antibody.

17. The method of embodiment 16, wherein the CTLA-4 antibody comprises ipilimumab, tremelimumab, tuvonralimab.

18. The method of any one of embodiments 1-17, wherein the composition comprising non-viable cells of *Streptococcus pyogenes* is administered at least one day prior to the immune checkpoint inhibitor.

19. The method of any one of embodiments 1-18, further comprising administering an additional anti-cancer agent to the subject.

20. The method of any one of embodiments 1-19, wherein the composition comprising non-viable cells of *Streptococcus pyogenes* is administered prior to, concurrently with, or subsequent to the immune checkpoint inhibitor.

21. The method of any one of embodiments 1-20, wherein the composition comprising non-viable cells of *Streptococcus pyogenes* comprises *Streptococcus pyogenes* [A Group, Type 3] Su strain.

22. The method of any one of embodiments 1-21, wherein the composition comprising non-viable cells of *Streptococcus pyogenes* comprises benzylpenicillin-treated *Streptococcus pyogenes*.

23. The method of any one of embodiments 1-22, wherein the composition comprising non-viable cells of *Streptococcus pyogenes* further comprises maltose, magnesium sulfate, potassium dihydrogen phosphate, sodium chloride, methionine, and benzylpenicillin.

24. The method of any one of embodiments 1-23, wherein the composition comprising non-viable cells of *Streptococcus pyogenes* is a lyophilized composition, optionally wherein the lyophilized composition is reconstituted prior to administration.

25. The method of any one of embodiments 1-24, wherein the triple negative breast cancer is metastatic.

26. The method of any one of embodiments 1-25, wherein the triple negative breast cancer is recurrent.

27. The method of any one of embodiments 1-26, wherein the triple negative breast cancer is completely or partially resistant to a PD-1 inhibitor, PD-L1 inhibitor, or both.

28. A pharmaceutical composition comprising non-viable cells of *Streptococcus pyogenes* for use in combination with an immune checkpoint inhibitor for treating triple negative breast cancer.

29. A medicament comprising non-viable cells of *Streptococcus pyogenes* for use in combination with an immune checkpoint inhibitor for treating triple negative breast cancer.

30. A method of treating non-muscle invasive bladder cancer in a subject, comprising administering to the subject (i) a composition comprising non-viable cells of *Streptococcus pyogenes*; and (ii) an immune checkpoint inhibitor.

31. The method of embodiment 30, wherein the composition comprising non-viable cells of *Streptococcus pyogenes* is administered intravesically, intratumorally, intravenously, intramuscularly, subcutaneously, or intraperitoneally.

32. The method of embodiment 30 or 31, wherein the non-viable cells of *Streptococcus pyogenes* is present in the composition in the amount of about 10 KE or greater.

33. The method of embodiment 32, wherein the non-viable cells of *Streptococcus pyogenes* is present in the composition in the amount of at least 20 KE.

34. The method of embodiment 32, wherein the non-viable cells of *Streptococcus pyogenes* is present in the composition in the amount of at least 40 KE.

35. The method of any one of embodiments 30-34, wherein the non-viable cells of *Streptococcus pyogenes* is administered to the subject at a dose of about 1 KE to about 100 KE, about 5 KE to about 50 KE, or about 0.1 KE, 0.5 KE, 1 KE, 2.5 KE, 5 KE, 10 KE, 15 KE, 20 KE, KE, 40 KE, 50 KE, 60 KE, 70 KE, 80 KE, 90 KE, or 100 KE.

36. The method of any one of embodiments 30-35, wherein the non-viable cells of *Streptococcus pyogenes* comprise cells of the Su strain of *Streptococcus pyogenes*.

37. The method of any one of embodiments 30-36, wherein the immune checkpoint inhibitor is an antibody or antigen binding fragment thereof, a nucleic acid molecule, a gene editing system, or a small molecule.

38. The method of any one of embodiments 30-37, wherein the immune checkpoint inhibitor is an inhibitor of PD-1/PD-L1/PD-L2 axis, CD80, CD86, B7-H3, B7 H4, HVEM, adenosine, GAL9, VISTA, CEACAM-1, CTLA 4, BTLA, KIR, LAG3, TIM3, A2aR, CD244/2B4, CD160, TIGIT, LAIR-1, PVRIG/CD112R, arginase, indoleamine 2,3 dioxygenase (IDO), IL-10, IL-4, IL-1RA, IL-35, or any combination thereof.

39. The method of embodiment 38, wherein the inhibitor of the PD-1/PD-L1/PD-L2 axis comprises a PD-1 inhibitor, optionally wherein the PD-1 inhibitor is an antibody.

40. The method of embodiment 39, wherein the PD-1 antibody comprises pembrolizumab, nivolumab, cetrelimab, cemiplimab, sasanlimab, tislelizumab, or dostarlimab.

41. The method of embodiment 38, wherein the inhibitor of the PD-1/PD-L1/PD-L2 axis comprises a PD-L1 inhibitor, optionally wherein the PD-L1 inhibitor is an antibody.

42. The method of embodiment 41, wherein the PD-L1 antibody comprises atezolizumab, durvalumab, envafolimab, or avelumab 43. The method of embodiment 38, wherein the inhibitor of the PD-1/PD-L1/PD-L2 axis comprises a PD-L2 inhibitor, optionally wherein the PD-L2 inhibitor is an antibody.

44. The method of embodiment 38, wherein the inhibitor of the PD-1/PD-L1/PD-L2 axis comprises a PD-1 inhibitor and a PD-L1 inhibitor, optionally wherein the PD-1 inhibitor and/or PD-L1 inhibitor is an antibody.

45. The method of any one of embodiments 30-44, wherein the non-muscle invasive bladder cancer is completely or partially resistant to the PD-1 inhibitor and/or PD-L1 inhibitor.

46. The method of embodiment 38, wherein the immune checkpoint inhibitor comprises a CTLA-4 inhibitor, optionally wherein the CTLA-4 inhibitor is an antibody.

47. The method of embodiment 46, wherein the CTLA-4 antibody comprises ipilimumab, tremelimumab, tuvonralimab.

48. The method of any one of embodiments 30-47, wherein the composition comprising non-viable cells of *Streptococcus pyogenes* is administered at least one day prior to the immune checkpoint inhibitor.

49. The method of any one of embodiments 30-48, further comprising administering an additional anti-cancer agent to the subject.

50. The method of any one of embodiments 30-49, wherein the composition comprising non-viable cells of *Streptococcus pyogenes* is administered prior to, concurrently with, or subsequent to the immune checkpoint inhibitor.

51. The method of any one of embodiments 30-50, wherein the composition comprising non-viable cells of *Streptococcus pyogenes* comprises *Streptococcus pyogenes* [A Group, Type 3] Su strain.

52. The method of any one of embodiments 30-51, wherein the composition comprising non-viable cells of *Streptococcus pyogenes* comprises benzylpenicillin-treated *Streptococcus pyogenes*.

53. The method of any one of embodiments 30-52, wherein the composition comprising non-viable cells of *Streptococcus pyogenes* further comprises maltose, magnesium sulfate, potassium dihydrogen phosphate, sodium chloride, methionine, and benzylpenicillin.

54. The method of any one of embodiments 30-53, wherein the composition comprising non-viable cells of *Streptococcus pyogenes* is a lyophilized composition, optionally wherein the lyophilized composition is reconstituted prior to administration.

55. The method of any one of embodiments 30-54, wherein the subject has low grade non-muscle invasive bladder cancer.

56. The method of any one of embodiments 30-55, wherein the subject has high-grade non-muscle invasive bladder cancer.

57. The method of any one of embodiments 30-54, wherein the non-muscle invasive bladder cancer has been identified as low risk.

58. The method of any one of embodiments 30-54, wherein the non-muscle invasive bladder cancer has been identified as intermediate risk.

59. The method of any one of embodiments 30-54, wherein the non-muscle invasive bladder cancer has been identified as high risk.

60. The method of any one of embodiments 30-54, wherein the non-muscle invasive bladder cancer has been identified as high-grade Ta or T1.

61. The method of any one of embodiments 30-54, wherein the non-muscle invasive bladder cancer has been identified as cancer in situ (CIS) with or without Ta and/or T1.

62. The method of any one of embodiments 30-61, wherein the non-muscle invasive bladder cancer is recurrent.

63. The method of any one of embodiments 30-62, wherein the subject has not received prior BCG treatment.

64. The method of any one of embodiments 30-62, wherein the subject has received adequate BCG treatment.

65. The method of any one of embodiments 30-62, wherein the subject is unresponsive to BCG treatment.

66. The method of any one of embodiments 30-62, wherein the non-muscle invasive bladder cancer is BCG failed, BCG refractory, or BCG relapsing.

67. A pharmaceutical composition comprising non-viable cells of *Streptococcus pyogenes* for use in combination with an immune checkpoint inhibitor for treating non-muscle invasive bladder cancer.

68. A medicament comprising non-viable cells of *Streptococcus pyogenes* for use in combination with an immune checkpoint inhibitor for treating non-muscle invasive bladder cancer.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 63/479,170, filed on Jan. 9, 2023, U.S. Provisional Patent Application No. 63/487,224, filed on Feb. 27, 2023, and U.S. Provisional Patent Application No. 63/487,232, filed on Feb. 27, 2023, are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of treating non-muscle invasive bladder cancer in a subject, comprising:

(i) administering intravesically to the subject a composition comprising non-viable cells of *Streptococcus pyogenes*; and (ii) administering to the subject an anti-PD-1 antibody.

2. The method of claim 1, wherein the anti-PD-1 antibody comprises pembrolizumab.

3. The method of claim 1, wherein the subject is a human adult subject.

4. The method of claim 1, wherein the non-muscle invasive bladder cancer is *Bacillus* Calmette-Guerin (BCG) failed, BCG-unresponsive, BCG-refractory, BCG-relapsing, BCG inadequately treated, the subject has received adequate BCG treatment, or any combination thereof.

5. The method of claim 1, wherein the subject was inadequately treated with BCG.

6. The method of claim 5, wherein the subject did not receive a full BCG dose due to intolerance to or unavailability of BCG drug.

7. The method of claim 1, wherein the anti-PD-1 antibody is administered intravenously.

8. The method of claim 1, wherein the subject has high-grade non-muscle invasive bladder cancer.

9. The method of claim 1, wherein the non-muscle invasive bladder cancer has been identified as high-grade Ta or T1.

10. The method of claim 9, wherein the subject was diagnosed with recurrent high-grade Ta or T1 disease within 6 months of completion of adequate BCG therapy.

11. The method of claim 10, wherein adequate BCG therapy comprises:

at least five of six doses of an initial induction course and at least two of three doses of maintenance treatment; or at least five of six doses of an initial induction course and at least two of six doses of a second induction course.

12. The method of claim 9, wherein the subject was diagnosed with T1 high-grade disease on a first evaluation following an induction BCG course.

13. The method of claim 1, wherein the non-muscle invasive bladder cancer has been identified as cancer in situ (CIS) with or without Ta and/or T1.

14. The method of claim 13, wherein the subject was diagnosed with persistent or recurrent CIS alone or with Ta/T1 disease within 12 months of adequate BCG therapy.

15. The method of claim 14, wherein adequate BCG therapy comprises:

at least five of six doses of an initial induction course and at least two of three doses of maintenance treatment; or at least five of six doses of an initial induction course and at least two of six doses of a second induction course.

16. The method of claim 1, wherein the composition comprising non-viable cells of *Streptococcus pyogenes* is administered to the subject at a dose of 40 KE.

17. The method of claim 1, wherein the composition comprising non-viable cells of *Streptococcus pyogenes* is administered to the subject at a dose of 30 KE.

18. The method of claim 1, wherein the composition comprising non-viable cells of *Streptococcus pyogenes* is administered to the subject at a dose of 20 KE.

19. The method of claim 1, wherein the anti-PD-1 antibody is administered at a dose of about 5 mg/kg to about 10 mg/kg.

20. The method of claim 1, wherein the anti-PD-1 antibody is administered at a dose of about 400 mg.

21. The method of claim 1, wherein the composition comprising non-viable cells of *Streptococcus pyogenes* is administered once a week.

22. The method of claim 1, wherein the anti-PD-1 antibody is administered every 6 weeks.

23. The method of claim 1, wherein the composition comprising non-viable cells of *Streptococcus pyogenes* is administered to the subject prior to the anti-PD-1 antibody.

24. The method of claim 1, wherein the composition comprising non-viable cells of *Streptococcus pyogenes* is administered to the subject concurrent with the anti-PD-1 antibody.

25. The method of claim 1, wherein the composition comprising non-viable cells of *Streptococcus pyogenes* comprises *Streptococcus pyogenes* [A Group, Type 3] Su strain.

26. The method of claim 1, wherein the composition comprising non-viable cells of *Streptococcus pyogenes* is a lyophilized composition, and the lyophilized composition is reconstituted in an isotonic sodium chloride solution prior to administration.

27. A method of treating high-grade non-muscle invasive bladder cancer in a human adult subject, comprising:

(i) administering intravesically to the subject a composition comprising non-viable cells of *Streptococcus pyogenes*; and (ii) administering intravenously to the subject pembrolizumab;

wherein the high grade non-muscle invasive bladder cancer is *Bacillus* Calmette-Guerin (BCG) failed, BCG-unresponsive, BCG-refractory, BCG-relapsing, BCG inadequately treated, the subject has received adequate BCG treatment, or any combination thereof.

28. A method of treating high-grade non-muscle invasive bladder cancer in a human adult subject, comprising:

(i) administering intravesically to the subject a composition comprising non-viable cells of *Streptococcus pyogenes*; and (ii) administering intravenously to the subject pembrolizumab;

wherein:

the high grade non-muscle invasive bladder cancer is *Bacillus* Calmette-Guerin (BCG) failed, BCG-unresponsive, BCG-refractory, BCG-relapsing, BCG inadequately treated, the subject has received adequate BCG treatment, or any combination thereof; and the subject is administered at least six weekly 40 KE doses of the composition comprising non-viable cells of *Streptococcus pyogenes*, and at least two 400 mg doses of pembrolizumab administered six weeks apart.

* * * * *